(12) United States Patent
Grandi et al.

(10) Patent No.: US 12,551,544 B2
(45) Date of Patent: Feb. 17, 2026

(54) METHOD FOR THE PRODUCTION OF OUTER MEMBRANE VESICLES AND IMMUNOGENIC COMPOSITIONS THEREOF

(71) Applicant: BIOMVIS S.R.L., Siena (IT)

(72) Inventors: Guido Grandi, Segrate (IT); Alberto Grandi, Siena (IT); Laura Fantappie', Siena (IT); Ilaria Zanella, Trento (IT); Enrico Koenig, Trento (IT); Assunta Gagliardi, Trento (IT)

(73) Assignee: BIOMVIS SRL, Siena (IT)

( * ) Notice: Subject to any disclaimer, the term of this patent is extended or adjusted under 35 U.S.C. 154(b) by 911 days.

(21) Appl. No.: 17/594,410

(22) PCT Filed: Apr. 16, 2020

(86) PCT No.: PCT/EP2020/060762
§ 371 (c)(1),
(2) Date: Oct. 15, 2021

(87) PCT Pub. No.: WO2020/212524
PCT Pub. Date: Oct. 22, 2020

(65) Prior Publication Data
US 2022/0175903 A1    Jun. 9, 2022

(30) Foreign Application Priority Data

Apr. 18, 2019 (EP) .................................... 19170231

(51) Int. Cl.
*A61K 39/108* (2006.01)
*A61K 39/095* (2006.01)
*A61K 39/104* (2006.01)
*A61K 39/112* (2006.01)

(52) U.S. Cl.
CPC ...... *A61K 39/0258* (2013.01); *A61K 39/0283* (2013.01); *A61K 39/095* (2013.01); *A61K 39/104* (2013.01)

(58) Field of Classification Search
None
See application file for complete search history.

(56) References Cited

FOREIGN PATENT DOCUMENTS

WO   WO-2011036564 A2 *  3/2011  ............. A61K 39/00
WO   WO-2011161551 A2 * 12/2011  ........... A61K 39/118

OTHER PUBLICATIONS

Fantappie et al. Journal of Extracellular Vesicles, vol. 3, No. 1 Jan. 1, 2014. (Year: 2014).*
Fantappie et al. Journal of Extracellular Vesicles, vol. 3, No. Jan. 1, 2014 (Year: 2014).*
Adam J. Kulp et al PLOS One vol. 10, No. 9, pp. Sep. 1-18, 2015. (Year: 2015).*
Deatherage B L et al, "Biogenesis of bacterial membrane vesicles", Molecular Biology, vol. 72, No. 6, Jun. 1, 2009, pp. 1395-1407.
Fantappie' L et al., "Antibody-mediated immunity induced by engineered *Escherichia coli* OMVs carrying heterologous antigens in their lumen", Journal of Extracellular Vesicles, vol. 3, No. 1, Jan. 1, 2014, p. 24015.
Gerritzen M J H et al., "Bioengineering bacterial outer membrane vesicles as vaccine platform", Biotechnology Advances, Elsevier Publishing, Barking, GB, vol. 35, No. 5, May 15, 2017, pp. 565-574.
Grandi A et al. "Synergistic protective activity of tumor-specific epitopes engineered in bacterial outer membrane vesicles", Frontiers in Oncology, Frontiers Researchh Foundation, CH, vol. 7, No. Nov, Nov. 7, 2017, pp. 1-12.
Kim S. H et al., "Structural modifications of outer membrane vesicles to refine them as vaccine delivery vehicles", Biochimica et Biophysica Acta—Biomembranes, Elsevier, Amsterdam, NL, vol. 1788, No. 10, Oct. 1, 2009, pp. 2150-2159.
Kulp A. et al., "Genome-wide assessment of outer membrane vesicle production in *Escherichia coli*", Plus one, vol. 10, No. 9, Sep. 25, 2015, p. e0139200.
Nevermann J et al., "Identification of genes involved in biogenesis of outer membrane vesicles (OMVs) in *Salmonella enterica* Serovar Typhi", Frontiers in Microbiology, vol. 10, Feb. 4, 2019, pp. 1-17.
Search Report and Written Opinion of PCT/EP2020/060762 of Jul. 8, 2020.

* cited by examiner

*Primary Examiner* — Jana A Hines
*Assistant Examiner* — Khatol S Shahnan Shah
(74) *Attorney, Agent, or Firm* — Silvia Salvadori, P.C.; Silvia Salvadori

(57) ABSTRACT

The invention relates to gram-negative bacteria carrying gene-inactivating mutations that cause deletion of proteins belonging to the OMV proteome, to Outer Membrane Vesicles (OMVs) produced by these bacteria and immunogenic compositions thereof.

12 Claims, 15 Drawing Sheets

Specification includes a Sequence Listing.

SEQUENCE LISTING

<160> NUMBER OF SEQ ID NOS: 309

<210> SEQ ID NO 1
<211> LENGTH: 1041
<212> TYPE: DNA
<213> ORGANISM: Escherichia coli

<400> SEQUENCE: 1

```
atgaaaaaga cagctatcgc gattgcagtg gcactggctg gtttcgctac cgtagcgcag      60
gccgctccga aagataacac ctggtacact ggtgctaaac tgggctggtc ccagtaccat     120
gacactggtt tcatcaacaa caatggcccg acccatgaaa accaactggg cgctggtgct     180
tttggtggtt accaggttaa cccgtatgtt ggctttgaaa tgggttacga ctggttaggt     240
cgtatgccgt acaaaggcag cgttgaaaac ggtgcataca aagctcaggg cgttcaactg     300
accgctaaac tgggttaccc aatcactgac gacctggaca tctacactcg tctgggtggc     360
atggtatggc gtgcagacac taaatccaac gtttatggta aaaaccacga caccggcgtt     420
tctccggtct tcgctggcgg tgttgagtac gcgatcactc ctgaaatcgc tacccgtctg     480
gaataccagt ggaccaacaa catcggtgac gcacacacca tcggcactcg tccggacaac     540
ggcatgctga gcctgggtgt ttcctaccgt ttcggtcagg gcgaagcagc tccagtagtt     600
gctccggctc cagctccggc accggaagta cagaccaagc acttcactct gaagtctgac     660
gttctgttca acttcaacaa agcaaccctg aaaccggaag gtcaggctgc tctggatcag     720
ctgtacagcc agctgagcaa cctggatccg aaagacggtt ccgtagttgt tctgggttac     780
```

| | |
|---|---|
| accgaccgca tcggttctga cgcttacaac cagggtctgt ccgagcgccg tgctcagtct | 840 |
| gttgttgatt acctgatctc caaaggtatc ccggcagaca agatctccgc acgtggtatg | 900 |
| ggcgaatcca acccggttac tggcaacacc tgtgacaacg tgaaacagcg tgctgcactg | 960 |
| atcgactgcc tggctccgga tcgtcgcgta gagatcgaag ttaaaggtat caaagacgtt | 1020 |
| gtaactcagc cgcaggctta a | 1041 |

<210> SEQ ID NO 2
<211> LENGTH: 921
<212> TYPE: DNA
<213> ORGANISM: Escherichia coli

<400> SEQUENCE: 2

| | |
|---|---|
| atgaatatga aattgaaaac attattcgca gcggccttcg ctgttgtcgg cttttgcagt | 60 |
| accgcctctg cggtaactta tcctctgcca accgacggga gtcgcctggt tggtcagaat | 120 |
| caggtgatca ccattcctga aggtaacact cagccgctgg agtattttgc cgccgagtac | 180 |
| cagatggggc tttccaatat gatggaagcg aacccgggtg tggataccct cctgccgaaa | 240 |
| ggcggtactg tactgaacat tccgcagcag ctgatcctgc cggataccgt tcatgaaggc | 300 |
| atcgtcatta acagtgctga gatgcgtctt tattactatc cgaaagggac caacaccgtt | 360 |
| atcgtgctgc cgatcggcat tggtcagtta ggcaaagata cgcctatcaa ctggaccacc | 420 |
| aaagttgagc gtaaaaaagc aggcccgacc tggacgccga ccgccaaaat gcacgcagag | 480 |
| taccgcgctg cgggcgaacc gcttccggct gtcgttccgg caggtccgga taacccgatg | 540 |
| ggactgtatg cactctatat cggtcgcctg tatgctatcc atggcaccaa cgccaacttc | 600 |
| ggtatcggcc tgcgtgtaag tcatggttgt gtgcgtctgc gtaacgaaga catcaaattc | 660 |
| ctgttcgaga agtaccggt cggtacccgc gtacagttta ttgatgagcc ggtaaaagcg | 720 |
| accaccgagc cagacggcag ccgttatatt gaagtccata cccgctgtc taccaccgaa | 780 |
| gcccagtttg aaggtcagga aattgtgcca attaccctga cgaagagcgt gcagacagtg | 840 |
| accggtcagc cagatgttga ccaggttgtt cttgatgaag cgattaaaaa ccgctccggg | 900 |
| atgccggttc gtctgaatta a | 921 |

<210> SEQ ID NO 3
<211> LENGTH: 603
<212> TYPE: DNA
<213> ORGANISM: Escherichia coli

<400> SEQUENCE: 3

| | |
|---|---|
| gtgttagctt tttgccgctc ttcgttgaag tcaaaaaaat atatcatcat tttactggcg | 60 |
| ctcgctgcaa ttgccggact gggtactcat gccgcctgga gtagcaatgg tttgccacgt | 120 |
| atcgacaata aaacactggc cagactggca cagcagcacc cggttgtcgt tttgtttcgt | 180 |
| catgctgaac gttgcgaccg ttcaaccaat caatgcttgt cagataaaac aggtattacg | 240 |
| gttaaaggta cccaggatgc ccgtgaactg gcaacgcctt ttagtgctga tatccctgat | 300 |
| ttcgatcttt attccagtaa taccgtccgg accattcagt cggctacctg gttttcagcg | 360 |
| ggtaaaaaat tgacggtaga taacgacttc ttcagtgcg gtaatgggat ttatagtgca | 420 |
| attaaggact tacaaagcaa agcgcctgat aaaaatatcg ttattttcac ccataatcat | 480 |
| tgcctgacat atattgctaa agataagcgt gacgcgacat ttaaacctga ttatctggat | 540 |
| ggtttagtca tgcatgtgga aaaaggcaaa gtttatctgg atggggaatt cgttaaccac | 600 |

```
taa                                                              603
```

<210> SEQ ID NO 4
<211> LENGTH: 489
<212> TYPE: DNA
<213> ORGANISM: Escherichia coli

<400> SEQUENCE: 4

```
atgaagacca ttctacctgc agtattgttt gccgctttcg ctaccacttc cgcctgggcg    60
gcagaaagcg tccagccact ggaaaaaatc gcgccttatc acaagctga aaagggatg    120
aagcgtcagg tgattcagtt aaccccgcaa gaagatgaat ctaccctgaa agtagaactg   180
ttaatcggtc agacgctgga agtcgattgc aatttgcatc gtctcggcgg aagctggaa    240
aacaaaacgc tggaaggctg gggctatgat tattatgtct tgataaagt cagttccccg    300
gtttcgacga tgatggcctg cccggatggc aagaaagaga gaaatttgt caccgcgtat   360
ctgggcgatg ctggaatgct gcgttacaac agcaagctgc cgatcgtggt gtatacgcca   420
gacaatgtag atgtgaagta ccgcgtctgg aaggcggaag agaaaattga caacgcggta   480
gttcgctaa                                                            489
```

<210> SEQ ID NO 5
<211> LENGTH: 1077
<212> TYPE: DNA
<213> ORGANISM: Escherichia coli

<400> SEQUENCE: 5

```
atgaaattga cgctgaaaaa ccttagcatg gcgatcatga tgagcactat agtcatggga    60
agcagtgcaa tggcggcgga cagcaacgaa aaaatagtca tcgcccatcg cggtgccagt   120
ggatatttgc cggagcatac gctgccagca aaagcgatgg cgtatgcgca gggagcggat   180
tatctggaac aggatttggt gatgaccaaa gacgacaatc tggttgttct gcatgaccat   240
tacctcgatc gtgttactga tgttgccgat cgtttcccgg atcgggcgcg caaagacggt   300
cgttactacg cgatagattt cacgctggat gaaattaagt cgttgaaatt taccgaaggt   360
ttcgatattg aaaacggtaa aaaagtgcag acttatccgg ggcgtttccc aatgggtaag   420
tccgacttcc gggtgcacac cttttgaagaa gagattgaat ttgttcaggg gttaaatcac   480
tctaccggga aaaatatcgg tatttatcca gaaatcaaag cgccgtggtt ccatcatcag   540
gaagggaagg atattgcggc aaaaacgctg gaagtgctga agaaatatgg ttacaccggt   600
aaagacgata agtttatttt gcaatgtttt gatgctgatg agctgaagcg tattaagaat   660
gagctggaac ccaaaatggg catggatctc aatctggtac agctgattgc ctataccgac   720
tggaatgaaa cgcagcagaa acagccggat ggaagctggg ttaattacaa ctacgactgg   780
atgtttaagc cgggtgctat gaaacaggtg gcggaatatg ccgacggtat cgggccggat   840
taccatatgt tgattgagga acatcgcag ccgggtaata tcaaactcac tggcatggtg   900
caagatgctc agcagaataa actggtagtg catccttata ccgtgcggtc agataaactg   960
cctgaataca ctactgatgt gaatcagtta tatgatgctc tgtataacaa agcgggtgta  1020
aatgggctgt ttactgattt ccctgataag gcagtaaaat ccttaataa agagtaa     1077
```

<210> SEQ ID NO 6
<211> LENGTH: 1098
<212> TYPE: DNA
<213> ORGANISM: Escherichia coli

<400> SEQUENCE: 6

```
atgaaaggac gttgggtaaa gtaccttctt atgggcacgg ttgtggcaat gcttgccgcc    60
tgctcttcca aaccaaccga tcgcggacag caatataaag acgggaaatt tacccagcct   120
ttctctctgg tgaaccagcc agatgccgtt ggcgcgccga ttaacgccgg tgattttgcc   180
gagcaaatta accatatccg taattcgtca ccgcgtctgt atggcaacca gagtaatgtt   240
tataacgcgg tgcaagagtg gctgcgcgca ggcggtgata cccgcaatat gcgccagttc   300
ggcattgatg cctggcagat ggaaggtgcc gacaactatg gtaacgtgca gtttaccggt   360
tattacacgc cggtaattca ggcgcgccat acccgccagg gcgagttcca gtatcctatt   420
taccgtatgc cgccaaaacg tggtcgtctg ccgtctcgtg cggagatcta cgcgggggca   480
ttgagtgata aatatattct cgcttacagt aactccctga tggataactt cattatggat   540
gtgcagggta gtgggtatat cgactttggt gatggcagtc cgcttaactt tttcagctat   600
gcagggaaaa acgtcatgc ctatcgcagc attggtaagg tgctgatcga ccgtggcgaa   660
gtgaaaaaag aagatatgtc gatgcaggcg attcgtcact ggggcgaaac acacagtgaa   720
gccgaggttc gcgagctgct ggaacagaac ccgtctttcg tcttctttaa accgcaatct   780
tttgctccgg tgaaagggc aagtgcggtg ccgctggttg gtcgcgcgtc agttgcctct   840
gatcgttcca ttattccgcc aggtactacc ttgctggcag aagtgccgtt gctggataat   900
aacggcaaat ttaatggtca gtacgaactg cgtctgatgg tggcgctgga tgtcggtggt   960
gcaatcaaag gccaacactt cgatatctat caagggatcg ggccggaagc cggacaccgc  1020
gcaggttggt acaaccacta tggacgtgtc tgggtgctga aaaccgcccc gggcgcaggt  1080 aacgtctttta gcggctga                                               1098
```

<210> SEQ ID NO 7
<211> LENGTH: 993
<212> TYPE: DNA
<213> ORGANISM: Escherichia coli

<400> SEQUENCE: 7

```
atgcgacata gcgtactttt tgcgacagcg tttgccacgc ttatctctac acaaactttt    60
gctgccgatc tgccgggcaa aggcattact gttaatccag ttcagagcac catcactgaa   120
gaaaccttcc agacgctgct ggtcagtcgt gcgctggaga aattaggtta taccgtcaac   180
aaacccagcg aagtagatta caacgttggc tacacctcgc ttgcttccgg cgatgcaacc   240
ttcaccgccg tgaactggac gccactgcat gacaacatgt acgaagctgc cggtggcgat   300
aagaaatttt atcgtgaagg gtatttgtt aacggcgcgg cacagggtta cctgatcgat   360
aagaaaaccg ccgaccagta caaaatcacc aacatcgcac aactgaaaga tccgaagatc   420
gccaaactgt tcgataccaa cggcgacgga aaagcggatt taaccggttg taaccctggc   480
tggggctgcg aaggtgcgat caaccaccag cttgccgcgt atgaactgac ccataccgtg   540
acgcataatc aggggaacta cgcggcgatg atggccgaca ccatcagtcg ctacaaagag   600
ggcaaaccgg tgttttacta cacctggacg ccgtactggg tgagtaatga gctgaagcca   660
gggaaagatg tggtctggtt gcaggtgccg ttctccgcac tgccgggcga taaaacgcc   720 gataccaaac tgccgaatgg tgcgaattat ggcttcccgg tcagcaccat gcatatcgtt   780
gccaacaaag cctgggccga aaaaacccg gcagcagcga aactgtttgc cattatgcag   840
ttgccagtgg cagatattaa cgcccagaac gccattatgc atgacggcaa agcctcagaa   900
ggcgatattc agggccatgt tgatggctgg atcaaagccc accagcagca gttcgatggc   960
```

-continued

| tgggtgaatg aggcgctggc agcgcagaag taa | 993 |

<210> SEQ ID NO 8
<211> LENGTH: 669
<212> TYPE: DNA
<213> ORGANISM: Escherichia coli

<400> SEQUENCE: 8

| atgcgtacca catcatttgc gaaagttgca gctttatgcg gcttattggc tctgtctggt | 60 |
| tgtgcctcta aaatcaccca gccagataaa tattctggtt ttttaaacaa ttactctgat | 120 |
| ttaaaagaaa caacctcggc tacaggtaaa cctgttttac gttgggtaga cccgagtttt | 180 |
| gatcaaagca aatatgacag catcgtctgg aacccaatca cttattatcc ggtaccgaaa | 240 |
| ccgtcgaccc aggtagggca gaaagttctg gataaaattt tgaactatac caacaccgaa | 300 |
| atgaaagaag cgatagcgca gcgtaaacca ctggttacca ccgctgggcc gcgtagtctg | 360 |
| attttccgtg gggccattac cggtgtagat accagcaaag aagggctgca attctatgaa | 420 |
| gtggttcctg ttgcattagt ggttgcgggg acgcaaatgg ctacaggcca ccgtaccatg | 480 |
| gatactcgcc tctattttga aggtgagctg attgatgcag cgactaataa ccggttatc | 540 |
| aaagtcgttc gtcagggcga aggtaaagac ctgaataacg aaagtacgcc aatggctttc | 600 |
| gaaaatatta acaagttat tgatgacatg gcgaccgatg ccaccatgtt tgacgttaac | 660 |
| aaaaagtag | 669 |

<210> SEQ ID NO 9
<211> LENGTH: 747
<212> TYPE: DNA
<213> ORGANISM: Escherichia coli

<400> SEQUENCE: 9

| atgaagtctg tattaaaagt ttcactggct gcactgaccc tggcttttgc ggtttcttct | 60 |
| catgccgcgg ataaaaaatt agttgtcgcg acggataccg ccttcgttcc gtttgaattt | 120 |
| aaacagggcg ataaatatgt gggctttgac gttgatctgt gggctgccat cgctaaagag | 180 |
| ctgaagctgg attacgaact gaagccgatg gatttcagtg ggatcattcc ggcactgcaa | 240 |
| accaaaaacg tcgatctggc gctggcgggc attaccatca ccgacgagcg taaaaaagcg | 300 |
| atcgatttct ctgacggcta ctacaaaagc ggcctgttag tgatggtgaa agctaacaat | 360 |
| aacgatgtga aaagcgtgaa agatctcgac gggaaagtgg ttgctgtgaa gagcggtact | 420 |
| ggctccgttg attacgcgaa agcaaacatc aaaactaaag atctgcgtca gttcccgaac | 480 |
| atcgataacg cctatatgga actgggcacc aaccgcgcag acgccgttct gcacgatacg | 540 |
| ccaaacattc tgtacttcat caaaaccgcc ggtaacggtc agttcaaagc ggtaggtgac | 600 |
| tctctggaag cgcagcaata cggtattgcg ttcccgaaag gtagcgacga gctgcgtgac | 660 |
| aaagtcaacg gcgcgttgaa acccctgcgc gagaacggaa cttacaacga atctacaaa | 720 |
| aaatggttcg gtactgaacc gaaataa | 747 |

<210> SEQ ID NO 10
<211> LENGTH: 1128
<212> TYPE: DNA
<213> ORGANISM: Escherichia coli

<400> SEQUENCE: 10

| atgaccatta acttccgccg taacgcattg cagttgagcg tggctgcgct gttttcttct | 60 |
| gcttttatgg ctaacgccgc tgatgtgccg caggtcaaag tgaccgtgac ggataagcag | 120 |

```
tgcgaaccga tgaccattac ggttaacgcc gggaaaacac agttcattat tcagaaccac    180
agccagaagg cgctggagtg ggagatcctc aaaggcgtga tggtggtgga agagcgggaa    240
aatatcgccc ctggctttag ccagaaaatg acggcgaatt tacagcctgg cgaatacgat    300
atgacctgcg gtctgctgac taacccgaaa gggaagttga tcgtcaaagg tgaggcaacg    360
gcggatgcgg cgcaaagtga tgcgctgtta agtcttggtg gtgcaattac tgcatataaa    420
gcgtatgtca tggcggaaac cacgcagctg gtgaccgaca ccaaagcctt taccgacgcg    480
attaaagcag gcgatatcga aaaagcgaaa gcactgtatg caccgacgcg ccagcactat    540
gagcgtattg aaccgattgc tgaactgttc tccgatctgg atggcagcat tgacgcccgt    600
gaagatgatt acgagcaaaa agccgccgac ccaaaattca ctggtttcca ccgtctggaa    660
aaagcattgt ttggcgacaa caccaccaaa gggatggatc agtacgctga gcagctttat    720
accgatgtgg tcgatttgca aaaacgcatc agtgaactgg ctttcccacc ttcaaaagtg    780
gtcggcggcg cagccggact gattgaggaa gtggcagcca gcaaaattag cggtgaagaa    840
gatcgctaca gccacaccga tctgtgggat ttccaggcta acgttgaagg ctcgcagaaa    900
attgtcgatt tgctgcgtcc acaactgcaa aaagccaacc cggaactgct ggcaaaagtc    960
gatgccaact ttaaaaaggt cgataccatt ctggcgaaat accgtactaa agacggtttt   1020
gaaacctacg acaaattgac cgatgccgac cggaatgcac tgaaaggacc gattactgcg   1080
ctggcggaag atctggcgca acttcgcggt gtgctgggac tggattaa                1128

<210> SEQ ID NO 11
<211> LENGTH: 2298
<212> TYPE: DNA
<213> ORGANISM: Escherichia coli

<400> SEQUENCE: 11
atgaaatggc tatgttcagt aggaatcgcg gtgagtctgg ccctgcagcc agcactggcg     60
gatgatttat tcggcaacca tccattaacg cccgaagcgc gggatgcgtt cgtcaccgaa    120
ctgcttaaga aaatgacagt tgatgagaaa attggtcagc tgcgcttaat cagcgtaggc    180
ccggataatc cgaaagaggc gatccgcgag atgatcaaag acggtcaggt tggggcgatt    240
ttcaacaccg taacccgtca ggatatccgc gccatgcagg atcaggtgat ggaattaagc    300
cgcctgaaaa ttcctctttt ctttgcttac gacgtgctgc acggtcagcg cacggtgttc    360
ccgattagcc tcggtctggc ctcgtctttt aacctcgatg cggtgaaaac ggtcgggcgt    420
gtctctgctt atgaagcggc agatgatggc ctgaatatga cctgggcacc gatggtcgat    480
gtctcgcgcg atccgcgctg gggacgtgcc tccgaaggtt ttggcgaaga tacgtatctc    540
acctcaacaa tgggtaaaac catggtgaaa gcgatgcagg gtaaaagccc ggcagatcgc    600
tactcggtga tgaccagcgt caaacacttt gccgcatacg gcgcggtaga aggcggtaaa    660
gagtacaaca ccgtcgatat gagtccgcag cgcctgttta tgattatat gccgccgtac    720 aaagcggggc tggacgcagg cagcggcgcg gtgatggtgg cgctgaactc gctgaacggc    780
acgccagcca cctccgattc ctggctgctg aaagatgttc tgcgcgacca gtggggtttt    840
aaaggcatca ccgtttccga tcacggtgca atcaaagagc tgattaaaca tggcacggcg    900
gcagatccgg aagatgcggt gcgcgtggcg ctgaaatccg gcatcaacat gagcatgagc    960
gacgagtact actcgaagta tctgcctggg ttgatcaaat ccggcaaagt gacgatggaa   1020
gagctggacg atgctgcccg ccatgtactg aacgttaaat atgatatggg attgtttaac   1080
```

```
gacccataca gccatttggg gccgaaagag tctgacccgg tggataccaa tgccgaaagc    1140
cgcctgcacc gtaaagaagc gcgtgaagtg gcgcgcgaaa gcctggtgtt gctgaaaaac    1200
cgtctcgaaa cgttaccgct gaaaaaatcg gccaccattg cggtggttgg ccactggcg     1260 gacagtaaac gtgacgtgat gggcagctgg tccgcagccg gtgttgccga tcaatccgtg    1320
accgtactga ccgggattaa aaatgccgtc ggtgaaaacg gtaaagtgct gtatgccaaa    1380
ggggcgaacg ttaccagtga caaaggcatt atcgatttcc tgaatcagta tgaagaagcg    1440
gtcaaagtcg atccgcgctc gccgcaagag atgattgatg aagcggtgca gactgcgaaa    1500
caatctgatg tggtggtggc tgtggtcggt gaagcacagg ggatgcgcca cgaggcctcc    1560
agccgtaccg atatcactat tccgcaaagc caacgtgact tgattgcggc gctgaaagcc    1620
accggtaaac cgctggtgct ggtgcttatg aacgggcgtc cgctggcgct ggtgaaagaa    1680
gatcagcagg ctgatgcgat tctggaaacc tggtttgcgg ggactgaagg cggtaatgca    1740
attgccgatg tgttgtttgg cgattacaac ccgtccggca gctgccgat gtccttcccg      1800 cgttctgtcg ggcagatccc ggtgtactac agccatctga acaccggtcg tccgtataat    1860
gccgacaagc cgaacaaata cacttcgcgt tattttgatg aagctaacgg ggcgctttat    1920
ccgttcggct atggtctgag ctataccact ttcaccgtct ctgatgtgaa actttctgcg    1980
ccgaccatga agcgtgacgg caaagtgacg gccagcgtgc aggtgacgaa caccggtaag    2040
cgcgagggtg ccacggtagt gcagatgtac ttgcaggatg tgacggcttc catgagtcgc    2100
cctgtgaaac agctgaaagg ctttgagaaa atcaccctga agccgggcga aactcagacc    2160
gtcagcttcc cgattgatat tgaggcgctg aagttctgga atcaacagat gaaatatgac    2220
gccgagcctg gcaagttcaa tgtctttatc ggcactgatt ccgcacgcgt taagaaaggc    2280
gagtttgagt tgctgtaa                                                  2298
```

<210> SEQ ID NO 12
<211> LENGTH: 1242
<212> TYPE: DNA
<213> ORGANISM: Escherichia coli

<400> SEQUENCE: 12

```
atgaacaaaa cgctaatcac cgcaactgtg cagggataag ttttactcgc ttcaaatgct      60
caggcacaaa ccgtaccgga aggctatcag ctacagcaag tgctcatgat gagccgccat     120
aacttacgtg cgccgctggc gaacaatggc agtgtgctgg agcagtcgac gccgaataaa     180
tggccagaat gggacgtccc cggtgggcaa ctcaccacca aggtggcgt gctcgaagtg     240 tatatgggcc attacatgcg tgaatggctg gcagagcagg ggatggtaaa atcggggaa     300 tgcccgccgc cggacaccgt atatgcctat gccaatagtc tgcaacgtac cgttgcgact    360
gcacagttct ttattaccgg cgcattcccg gggtgtgata ttcctgtgca tcaccaggaa    420
aaaatgggca ccatggaccc aacctttaac ccggtgatca ccgatgattc cgccgcattc    480
agtgaaaagg cggtggcggc aatggagaaa gagctcagca aactccagct taccgacagc    540
taccagctac tggaaaaaat cgttaactat aaagattccc ctgcctgtaa agagaaacaa    600
cagtgttcgc tggtggatgg caaaaatacc tttagcgcga gtatcaaca agaaccaggt    660 gtttccgggc cgctgaaagt cggcaactcg ctggtagatg cgtttactt gcaatactac    720 gaaggttttc cgatggatca ggtggcctgg ggagaaatca atctgaccca gcagtggaag    780
gtgttgtcga agctgaaaaa cggttaccag gacagcctgt ttacctcacc ggaagtggcg    840
cgcaatgttg cgaaaccgct ggtcagttat atcgacaaag ctctggtcac cgatcgcacc    900
```

```
agcgcaccga aaattacagt gttggttggg cacgactcca acattgcctc tctgttaacg    960
gcgctggatt tcaaaccgta tcagttgcat gaccagaacg aacgcacgcc gattggcggc   1020
aaaatcgttt ccagcgttg gcatgacagc aaagccaatc gcgatttgat gaaaattgaa   1080
tatgtgtatc agagtgcgga acagttacgt aatgccgatg cgttaaccct gcaggcacct   1140
gctcagcgtg tgacgctgga attaagcggt tgcccgatag atgccaacgg tttctgcccg   1200
atggataaat tgatagcgt gttgaatgaa gcggtgaaat aa                       1242

<210> SEQ ID NO 13
<211> LENGTH: 228
<212> TYPE: DNA
<213> ORGANISM: Escherichia coli

<400> SEQUENCE: 13
atgaaaaaga ctgccgcaat tatttctgcc tgtatgctga cttttgccct gagcgcctgt    60
tccggttcga actatgtgat gcacaccaat gacggacgta ccatcgtctc tgacggcaaa   120
ccacagactg ataacgatac cggtatgatt tcgtataaag acgctaatgg caacaaacag   180
cagatcaacc gtactgacgt gaaagagatg gtcgaactgg atcagtaa               228

<210> SEQ ID NO 14
<211> LENGTH: 2103
<212> TYPE: DNA
<213> ORGANISM: Escherichia coli

<400> SEQUENCE: 14
atgaagattt tttccgtccg acagaccgtt ttgcccgcac tacttgccct ttccccgtt    60 gtttttgccg ctgatgaaca aaccatgatt gtcagtgccg caccgcaggt ggtttccgag   120
ctggatacgc cagcagcagt aagcgtggtg gatggcgagg agatgcgcct ggcaacaccg   180
cgcattaact tgtccgaatc actgaccagc gtgcctggtt tgcaggtaca aaatcggcag   240
aactatgcgc aagatttaca gctgtcgatt cgcggatttg gctcccgctc cacttacgga   300
attcgcggta ttcgcctgta tgtggacggt attcccgcca ccatgccgga cgggcaaggg   360
caaacatcca acatcgattt aagcagtgtg caaaatgtgg aagtgctgcg tggcccccttt   420 tctgccctgt atggcaacgc gtctggcggt gtaatgaatg tcaccaccca gaccggacaa   480
cagccaccaa ccattgaagc cagtagttac acggcagttt ttggcagctg gcgctatggg   540
ctgaaagcaa cgggcgcaac gggagacggc acacaacccg gcgatgttga ttacaccgtc   600
tcaaccacgc gttttacgac ccacggctat cgtgaccata tggcgcaca gaaaaattta   660 gccaatgcca aactgggcgt acgcattgat gaagccagca aattaagcct gattttcaat   720
agtgtggata tcaaagcaga tgacccaggt gggctaacca agcagaatg gaaggcgaat   780 ccacaacaag cgcctcgtgc agaacagtac gacacgcgaa aaaccatcaa gcaaactcag   840
gctgggttgc gctatgaacg tagcctgagt tcgcgggatg atatgagtgt gatgatgtat   900
gccggagagc gagaaacgac ccagtaccag tcaatacccca tggcaccaca acttaacccg   960
tcacatgcgg gcggcgtgat taccctgcaa cgccattacc agggaataga cagccgctgg  1020
acacaccgtg gtgaactggg cgttccggtc acgttcacta ccggcctgaa ctacgaaaac  1080
atgagtgaaa accgcaaggg ctacaataac ttccgcctga atagcggcat gccggagtac  1140
gggcaaaaag gtgagttgcg tcgcgacgaa cgcaatctga tgtggaacat cgatccctat  1200
ttacagacgc agtggcagct gagcgaaaaa ctgtcgctgg atgctgacgt gcgctacagc  1260
```

```
tccgtgtggt ttgattccaa cgaccattac gttactccgg gtaacggcga tgacagcggt    1320
gatgccagtt atcataaatg gctacctgcc ggttcgttaa aatatgcaat gaccgatgcc    1380
tggaatatct atctggcagc cgggcgaggt tttgaaacgc cgacgattaa tgagctgtct    1440
tatcgtgctg atgggcaaag cggtatgaac ttaggtttaa aaccatccac caacgataca    1500
attgagatcg gcagtaaaac gcgtattggt gatgggctgc ttagtctcgc attgtttcag    1560
accgacactg atgatgaaat tgttgtcgat agcagtagcg gtgggcgtac gacttacaaa    1620
aatgccggaa agaccgtcg tcaaggcgct gaactggcat gggatcaacg tttcgcagga    1680
gattttcgcg taaacgcgtc ctggacctgg cttgatgcga cctatcgcag caatgttttgc    1740 aatgaacagg attgtaacgg taatcggatg ccagggatcg cccgtaatat gggctttgcg    1800
tcgataggtt atgtaccgga agatggttgg tatgcaggca cggaagcgcg ttatatgggc    1860
gatattatgg cagatgatga aaatacggca aaagcgccgt cttatactct cgtcggctta    1920
ttcaccgggt ataaatacaa ttaccacaat ttaactgtgg atttatttgg tcgtgtcgat    1980
aatttattcg ataaagaata cgttggttct gtcattgtca atgagtcaaa cgggcgatat    2040
tacgaacctt cgcccggacg aaattatggt gtcggcatga atattgcgtg gagatttgag    2100
taa                                                                 2103

<210> SEQ ID NO 15
<211> LENGTH: 567
<212> TYPE: DNA
<213> ORGANISM: Escherichia coli

<400> SEQUENCE: 15
atgaacatga caaaaggtgc actcatcctc agcctttcat ttttgcttgc cgcatgtagt      60
tcaattccgc aaaatatcaa aggcaataac caacctgata ttcaaaaaag ttttgttgct    120
gttcataacc agccggggtt atatgttggt caacaagcgc gctttggtgg aaggttatc     180 aacgttatca atggcaaaac ggatacgttg ttagaaatcg ctgtattacc gttggatagc    240
tatgcgaagc ctgatattga agccaactat cagggccgac tgctcgccag acaaagcggc    300
ttccttgatc cagtgaacta tcgtaatcac tttgttacca tcctcggcac cattcagggt    360
gaacaacctg gctttatcaa taaagtcccg tataacttcc tggaagtgaa tatgcagggc    420
atccaggtgt ggcatttgag agaagtggtt aataccacct ataacctgtg ggattacggc    480
tatggtgcat tctggccgga accgggctgg ggtgcgcctt actacaccaa tgcggtgagt    540
caggtaacac ctgagctggt caaataa                                       567

<210> SEQ ID NO 16
<211> LENGTH: 732
<212> TYPE: DNA
<213> ORGANISM: Escherichia coli

<400> SEQUENCE: 16
atgaaaaaag ttctgattgc cgcgttaatt gcaggtttta gtctttccgc cacagctgcc     60
gaaaccattc gttttgctac cgaagcctcc tatcctccgt ttgaatcgat tgatgcaaac    120
aaccagatcg ttggttttga cgtcgacctg gcacaagcgc tgtgtaaaga gattgatgca    180
acctgcactt tctctaacca ggcgtttgac agcctgatcc caagcctgaa attccgtcgc    240
gtagaagccg tgatggcggg catggatatc actccggagc gtgaaaagca ggtgctgttt    300
accaccccgt actatgacaa ctctgccctg tttgtgggtc agcaaggcaa atacaccagt    360
gttgatcagc tgaaaggcaa aaaagtcggc gtacagaacg ggacgacaca ccagaaattc    420
```

| | |
|---|---|
| attatggata agcacccgga aatcactacc gttccgtatg acagctacca gaacgcaaaa | 480 |
| ctggatctgc aaaacgggcg tatcgacggc gtcttcggtg acaccgcagt ggtcactgag | 540 |
| tggctgaaag ataacccgaa actggcggcg gtgggcgaca agtgaccga taaagattac | 600 |
| ttcggcactg gcctcggcat cgcgtacgt cagggcaaca ctgagctgca gcagaaactc | 660 |
| aacactgcgc tggaaaaagt gaagaaagat ggcacttacg aaaccatcta caacaaatgg | 720 |
| ttccagaagt aa | 732 |

<210> SEQ ID NO 17
<211> LENGTH: 660
<212> TYPE: DNA
<213> ORGANISM: Escherichia coli

<400> SEQUENCE: 17

| | |
|---|---|
| atgaagaaac gtgtttatct tattgccgcc gtagtgagtg gtgctctggc ggtatctggc | 60 |
| tgcacaacta acccttacac cggcgaacgc gaagcaggta atctgctat cggcgcaggt | 120 |
| ctgggctctc tcgtgggcgc gggtattggt gcgctatctt cttcgaagaa agatcgcggt | 180 |
| aaaggcgcgc tgattggcgt agcagcaggc gcagctctgg cggcggcgt gggttattac | 240 |
| atggatgtgc aggaagcgaa gctgcgtgac aaaatgcgcg gcactggtgt tagcgtaacc | 300 |
| cgcagcgggg ataacattat cctcaatatg ccgaacaatg tgaccttcga cagcagcagc | 360 |
| gcgaccctga accggcggg cgctaacacc ctgaccggcg tggcaatggt actgaaagag | 420 |
| tatccgaaaa cggcggttaa cgtgattggt tatactgaca gcacgggtgg tcacgacctg | 480 |
| aacatgcgtc tctcccagca acgtgcggat tccgttgcca gcgcgttgat cacccagggc | 540 |
| gtggacgcca gccgcatccg tactcagggc cttggcccgg ctaacccaat cgccagcaac | 600 |
| agcaccgcag aaggtaaggc gcaaaaccgc cgtgtagaaa ttaccttaag cccgctgtaa | 660 |

<210> SEQ ID NO 18
<211> LENGTH: 516
<212> TYPE: DNA
<213> ORGANISM: Escherichia coli

<400> SEQUENCE: 18

| | |
|---|---|
| atgaaaaaaa ttgcatgtct ttcagcactg gccgcagttc tggctttcac cgcaggtact | 60 |
| tccgtagctg cgacttctac tgtaactggc ggttacgcac agagcgacgc tcagggccaa | 120 |
| atgaacaaaa tgggcggttt caacctgaaa taccgctatg aagaagacaa cagcccgctg | 180 |
| ggtgtgatcg gttctttcac ttacaccgag aaaagccgta ctgcaagctc tggtgactac | 240 |
| aacaaaaacc agtactacgg catcactgct ggtccggctt accgcattaa cgactgggca | 300 |
| agcatctacg tgtagtgggg tgtgggttat ggtaaattcc agaccactga atacccgacc | 360 |
| tacaaacacg acaccagcga ctacggtttc tcctacggtg cgggtctgca gttcaacccg | 420 |
| atggaaaacg ttgctctgga cttctcttac gagcagagcc gtattcgtag cgttgacgta | 480 |
| ggcacctgga ttgccggtgt tggttaccgc ttctaa | 516 |

<210> SEQ ID NO 19
<211> LENGTH: 294
<212> TYPE: DNA
<213> ORGANISM: Escherichia coli

<400> SEQUENCE: 19

| | |
|---|---|
| atgaaaaaaa tgttgttttc tgccgctctg gcaatgctta ttacaggatg tgctcaacag | 60 |

| | |
|---|---|
| acgtttactg ttggaaacaa accgacagca gtaacaccaa aggaaaccat cacccatcac | 120 |
| ttcttcgttt cgggaattgg acaggagaaa actgttgatg cagccaaaat ttgtggcggc | 180 |
| gcagaaaatg ttgttaaaac agaaacccag caaacattcg taaatggatt gctcggtttt | 240 |
| attactttag gcatttatac tccgctggaa gcgcgtgtgt attgctcaca ataa | 294 |

<210> SEQ ID NO 20
<211> LENGTH: 1497
<212> TYPE: DNA
<213> ORGANISM: Escherichia coli

<400> SEQUENCE: 20

| | |
|---|---|
| atgcagggca caaaaattcg acttttagcg gcggtttgc tgatgatggc cactgctggc | 60 |
| tatgtgcagg cagatgcgct ccagcctgat ccagcatggc aacagggac gctttccaac | 120 |
| ggtttacagt ggcaagtgct gaccacccc cagcgtccca gcgatcgtgt tgaaattcgc | 180 |
| ctgctggtta taccggttc gctcgccgaa agtacacaac agagcggtta cagtcacgcc | 240 |
| atccctcgta ttgcgctaac gcaaagcggt ggccttgacg cagcacaggc gcgttcattg | 300 |
| tggcagcagg ggatcgaccc taaacgcccg atgccgccgg taattgtctc ttatgacacc | 360 |
| acgctgttta tctgagtttt gcccaataac cgtaacgatt tgctgaaaga gcgctctct | 420 |
| tatctggcaa atgccactgg caaattgacc atcacaccag aaaccatcaa ccacgcgctg | 480 |
| caaagtcagg acatggtggc aacctggcct gccgatacta agagggctg gtggcgctat | 540 |
| cgtctgaaag ggtcaacctt gttaggtcac gatcctgccg atccgctgaa caacccgtt | 600 |
| gaagcggaaa aaattaaaga tttctatcag aaatggtaca ccccggatgc aatgacgcta | 660 |
| ctggtggtgg aaacgtgga tgcgcgctcg gttgtcgacc aaataaacaa acgtttggc | 720 |
| gaactgaaag gcaaacgtga aacgccagct ccggtgccga cgctttctcc gctgcgtgcg | 780 |
| gaagcggtga gtattatgac tgacgcggtg cgtcaggacc ggttatctat catgtgggat | 840 |
| acgccgtggc agccgattcg tgaatcagcc gcactgctgc gctactggcg tgcggacctg | 900 |
| gcccgcgagg cgctgttctg gcatgttcag caagcgttaa gtgccagtaa cagcaaagac | 960 |
| atcggtcttg gatttgactg ccgtgtgctg tatctgcgtg cgcagtgtgc catcaacatc | 1020 |
| gaatcaccaa acgacaagct gaacagcaac cttaatctgg tggcgcgtga actggcgaag | 1080 |
| gttcgcgata aggtctgcc ggaagaagag ttcaatgcgt tagtggcgca aaagaaactg | 1140 |
| gagctgcaga aactgtttgc cgcctatgca cgagctgata ccgatattct gatgggtcag | 1200 |
| cggatgcgtt cgttgcaaaa tcaggttgtc gatatcgcgc cggagcaata tcagaaactg | 1260 |
| cggcaggatt tccttaatag cctgacggta gagatgttaa atcaggatct gcgtcaacag | 1320 |
| ttgtcgaatg atatggcgtt aatactgctg cagccgaaag gcgagccgga atttaacatg | 1380 |
| aaagcgttgc aggcggtctg ggatcaaatc atggcccat ctaccgccgc tgcgaccacc | 1440 |
| tctgtcgcca cggatgacgt acatcctgaa gtgacggata ttccacctgc acagtaa | 1497 |

<210> SEQ ID NO 21
<211> LENGTH: 612
<212> TYPE: DNA
<213> ORGANISM: Escherichia coli

<400> SEQUENCE: 21

| | |
|---|---|
| gtgaaattga gatggtttgc ctttttgatt gtgttattag cgggttgttc atcaaagcat | 60 |
| gactatacga acccgccgtg gaacgcgaaa gttccggtgc aacgtgcgat gcagtggatg | 120 |
| ccaataagcc agaaagccgg tgcagcctgg ggcgtcgatc cacaattgat cacggcgatt | 180 |

```
atcgctatcg aatcgggtgg taatccgaac gcggtgagta aatcgaatgc cattggtttg      240
atgcagttaa aagcttcaac ctccggacgt gatgtttatc gccgtatggg ctggagtggt      300
gagccgacga ccagcgagct gaaaaatcca gagcgtaata tttcaatggg ggcggcttac      360
ctgaatattc tggaaaccgg cccgctggca ggcattgaag atccgaaggt actgcaatat      420
gcgctggtgg tgtcatacgc taacggggca ggtgcgctgc tacggacttt ctcgtcagat      480
cggaaaaagg cgatcagcaa aatcaacgat ttggatgctg acgagttcct cgaacacgta      540
gcgcgaaatc accctgcgcc gcaggctccg cgctatatct acaaacttga gcaggcactg      600
gacgcgatgt aa                                                          612

<210> SEQ ID NO 22
<211> LENGTH: 2325
<212> TYPE: DNA
<213> ORGANISM: Escherichia coli

<400> SEQUENCE: 22
atgacgccgt tacgcgtttt tcgtaaaaca acacctttgg ttaacaccat tcgcctgagc       60
ctgctgccgc tggccggtct ctcgtttttcc gcttttgctg cacaggttaa tatcgcaccg      120
ggatcgctcg ataaagcgct caatcagtat gccgcacaca gcggatttac cctctcggtt      180
gacgccagcc tgacgcgcgg caagcagagc aacggcctgc acggcgatta cgacgtcgag      240
agcggcctgc aacaactgct ggacggcagc ggactgcagg taaaaccgct gggaaataac      300
agctggacgc tggagcccgc gcccgcacca aaagaagatg ccctgaccgt ggtcggcgac      360
tggctgggtg atgcgcgtga aaacgacgta tttgaacatg ctggcgcgcg tgacgtgatc      420
cgccgtgagg atttcgccaa aaccggcgca accaccatgc gtgaggtact taaccgcatc      480
cctggcgtca gcgcgccgga aaacaacggc accggcagcc acgacctggc gatgaacttt      540
ggcatccggg gcctgaaccc gcgcctcgcc agcgcgctcga ccgtcctgat ggacggcatc      600
cccgtcccct tcgcccctta cggtcagccg cagctttcac tggctcccgt ttcgctcggc      660
aacatggatg ccattgacgt ggtacgcggt ggtggtgcgg tgcgttacgg accgcagagc      720
gtgggcggcg tggtgaactt tgttacccgt gccattccgc aggactttgg tatcgaggcg      780
ggcgtggaag gtcagctcag cccaaccttct tcacaaaaca acccgaaaga gacgcacaac      840
ctgatggtgg cggcacagc ggacaacggt tttggcaccg cgctgctcta ctccggcacg      900
cgcggcagtg actggcgcga gcacagcgcc acccgcatcg acgacctgat gctgaaaagc      960
aaatatgcgc cggatgaggt gcacaccttc aacagcctgc tgcaatatta cgacggtgaa     1020
gccgacatgc ccgtggcct gtctcgcgcg gattacgacg ccgatcgctg gcaatccacc     1080
cgcccgtatg accgcttctg gggtcgtcgc aagctggcga gcctgggcta ccagttccag     1140
ccagacagcc agcataaatt caacattcag gggttctaca cccaaacccct gcgcagcggc     1200 tacctggagc aaggcaaacg catcaccctc tcgccgcgta actactgggt gcgcggtatt     1260
gagccacgct acagccagat ctttatgatc ggcccttccg cgcacgaagt gggcgtgggc     1320
tatcgctatt tgaatgaatc aacgcatgaa atgcgttact acaccgccac cagcagcggg     1380
cagttgccgt ccggctcaag cccttacgac cgcgatacgc gttccggcac cgaggcgcac     1440
gcctggtatc tggatgacaa aatcgacatc ggcaactgga ccatcacgcc gggtatgcgt     1500
ttcgaacata tcgagtcata ccagaacaac gccatcacag gcacgcacga agaagtgagc     1560
tataacgcac cgcttccggc gttgaacgtg ctctatcacc tgactgacag ctggaatctt     1620
```

-continued

| | |
|---|---|
| tatgcaaaca ctgaaggctc gttcggcacc gtacagtaca gccagattgg caaggctgtg | 1680 |
| caaagcggca atgttgaacc ggaaaaagcg cgaacctggg aactcggtac ccgctacgac | 1740 |
| gacggcgcgc tgacggcgga atggggctg ttcctgatta actttaacaa tcagtacgac | 1800 |
| tccaaccaga ccaacgacac cgtcactgca cgtggcaaaa cgcgccatac cgggctggaa | 1860 |
| acgcaggcac gttacgatct gggtacgcta acgccaacgc ttgataacgt ttccatctac | 1920 |
| gccagctatg cgtatgtgaa cgcggaaatc cgcgagaaag cgacaccta cggcaatctg | 1980 |
| gtaccattct ccccgaaaca taaaggcacg ctgggcgtgg actacaagcc aggaaactgg | 2040 |
| acgttcaatc tgaacagcga tttccagtcc agccagtttg cggataacgc caatacggtg | 2100 |
| aaagagagcg ccgacggcag taccggccgc attcccggct tcatgctctg gggcgcacgc | 2160 |
| gtggcgtatg actttggccc gcagatggca gatctgaacc tggcattcgg tgtgaaaaac | 2220 |
| atcttcgacc aggactactt catccgctct tatgacgaca caacaaagg catctatgca | 2280 |
| ggccagccgc gcacgctgta tatgcagggg tcgttgaagt tctga | 2325 |

<210> SEQ ID NO 23
<211> LENGTH: 606
<212> TYPE: DNA
<213> ORGANISM: Escherichia coli

<400> SEQUENCE: 23

| | |
|---|---|
| atgaaaaaat taacagtggc aatttctgct gtagctgcat cagtactgat ggcgatgtct | 60 |
| gctcaggcag ctgaaattta taataaagac agtaacaagc tggatctgta cgggaaagtt | 120 |
| aatgccaagc actacttttc ctctaacgat gcagatgatg gtgatactac ttatgcccgt | 180 |
| cttggcttca aggtgaaac ccaaatcaac gatcaactga ctggtttcgg tcagtgggaa | 240 |
| tatgaattca aggcaaccg cgctgaatct caaggttcct ccaaagacaa acccgtctt | 300 |
| gcatttgcag gcctgaaatt cggtgactac ggctcaatcg attacggccg taactacggt | 360 |
| gtagcatacg acatcggtgc gtggactgac gttctgccag aattcggtgg cgatacctgg | 420 |
| acccaaacag atgtgttcat gactggtcgc accactggtg ttgcaaccta tcgtaacaac | 480 |
| gacttctttg gtctggtcga tggcctgaac tttgctgctc agtatcaggg taaaaatgac | 540 |
| cgcactgacg taactgaagc caatggtgat ggtttcggtg gtgatgctgc caacttactg | 600 |
| atttag | 606 |

<210> SEQ ID NO 24
<211> LENGTH: 2244
<212> TYPE: DNA
<213> ORGANISM: Escherichia coli

<400> SEQUENCE: 24

| | |
|---|---|
| atggcgcgtt ccaaaactgc tcagccaaaa cactcactgc gtaaaatcgc agttgtagta | 60 |
| gccacagcgg ttagcggcat gtctgtttat gcacaggcag cggttgaacc gaaagaagac | 120 |
| actatcaccg ttaccgctgc acctgcgccg caagaaagcg catggggcc tgctgcaact | 180 |
| attgcggcgc gacagtcagc taccggcact aaaaccgata cgccgattca aaaagtgcca | 240 |
| cagtctattt ctgttgtgac cgccgaagag atggcgctgc atcagccgaa gtcggtaaaa | 300 |
| gaagcgctta gctacacgcc gggtgtctct gttggtacgc gtggcgcatc caacacctat | 360 |
| gaccacctga tcattcgcgg ttttgcggca gaaggccaaa gccagaataa ctatctgaat | 420 |
| ggcctgaagt tgcaggcaa cttctataac gatgcggcca ttgatccgta tatgctggaa | 480 |
| cgcgctgaaa ttatgcgtgg cccggttcc gtgctttacg gtaaaagcag tcctggcggt | 540 |

```
ctgttgaata tggtcagcaa gcgtccgacc accgaaccgc tgaaagaagt tcagtttaaa      600
gccggtactg acagcctgtt ccagactggt tttgacttta gcgatgcgct ggatgatgac      660
ggcgtttact cttatcgcct gaccggtctt gcgcgttctg ccaatgccca gcagaaaggg      720
tcagaagagc agcgttatgc tattgcaccg gcgttcacct ggcgtccgga tgataaaacc      780
aatttcacct tcctttctta cttccagaac gagccggaaa ccggttatta cggctggttg      840
ccgaaagagg gaaccgttga gccgctgccg aacggtaagc gtctgccgac agactttaat      900 gaagggcga agaacaacac ctattcacgt aatgagaaga tggtgggcta cagcttcgat      960
cacgaattta cgacaccttt actgtgcgt cagaacctgc gctttgctga aaacaaaacc      1020
tcgcaaaaca gcgtttatgg ttacggcgtc tgctccgatc cggcgaatgc ttacagcaaa      1080
cagtgtgcgg cattagcgcc agcggataaa ggccattatc tggcacgtaa atacgtcgtt      1140
gatgatgaga agctgcaaaa cttctccgtt gatacccagt tgcagagcaa gtttgccact      1200
ggcgatatcg accacaccct gctgaccggt gtcgactttta tgcgtatgcg taatgacatc      1260
aacgcctggt ttggttacga cgactctgtg ccactgctca atctgtacaa tccggtgaat      1320
accgatttcg acttcaatgc caaagatccg gcaaactccg gcccttaccg cattctgaat      1380
aaacagaaac aaacgggcgt ttatgttcag gatcaggcgc agtgggataa agtgctggtc      1440
accctgggcg tcgttatgga ctgggcagat caagaatctc ttaaccgcgt tgccgggacg      1500
accgataaac gtgatgacaa acagtttacc tggcgtggtg gtgttaacta cctgtttgat      1560
aatggcgtaa caccttactt tagctatagc gaatcgtttg aaccttcttc gcaagttggg      1620
aaggatggta atattttcgc accgtctaaa ggtaagcagt atgaagtcgg cgtgaaatat      1680
gtaccggaag atcgtccgat tgtagttacc ggtgccgtgt ataatctcac taaaaccaac      1740
aacctgatgg cggaccctga gggttccttc ttctcggttg aaggtggcga gatccgcgca      1800
cgtggcgtag aaatcgaagc gaaagcggcc ctgtcggcga gtgttaacgt agtcggttct      1860
tatacttaca ccgatgcgga atacaccacc gatactacct ataaaggcaa tacgcctgca      1920
caggtgccaa aacacatggc ttcgctgtgg gctgactata ccttctttga cggtccgctt      1980
tcaggtctga cgctgggcac cggtggtcgt tatactggcc ccagctatgg tgatccggct      2040 aactcccttta aagtgggaag ttatacggtc gtggatgcgt tagtgcgtta tgatctggcg      2100
cgagtcggca tggctggctc caacgtgcg ctgcatgtta acaacctgtt cgatcgtgaa      2160
tacgtcgcca gctgctttaa cacttatggc tgcttctggg gcgcagaacg tcaggtcgtt      2220
gcaaccgcaa ccttccgttt ctaa                                            2244
```

<210> SEQ ID NO 25  
<211> LENGTH: 783  
<212> TYPE: DNA  
<213> ORGANISM: Escherichia coli
<400> SEQUENCE: 25

```
atgaaaaaac tggtgctatc gctctctctg gttctggcct tctccagcgc aactgcggcg       60
tttgctgcga ttccgcaaaa catccgcatc ggtaccgacc cgacctatgc gccatttgaa      120
tcaaaaaatt cacaaggcga actggttggc ttcgatatcg atctggcaaa ggaattatgc      180
aaacgcatca atacgcaatg tacgtttgtc gaaaatccgc tggatgcgtt aattccgtcc      240
ttaaaagcga agaagattga cgccatcatg tcatcgcttt ccattacgga aaaacgtcag      300
caagaaatag ccttcaccga caaactgtac gctgccgatt ctcgtttggt ggtggcgaaa      360
```

```
aattctgaca ttcagccgac agtcgagtcg ctgaaaggca aacgggtagg cgtattgcag      420
ggcaccaccc aggagacgtt cggtaatgaa cattgggcac caaaaggcat tgaaatcgtc      480
tcgtatcagg ggcaggacaa catttattct gacctgactg ccggacgtat tgatgccgcg      540
ttccaggatg aggtcgctgc cagcgaaggt ttcctcaaac aacctgtcgg taaagattac      600
aaattcggtg gcccgtctgt taaagatgaa aaactgtttg gcgtagggac cggcatgggc      660
ctgcgtaaag aagataacga actgcgcgaa gcactgaaca aagcctttgc cgaaatgcgc      720
gctgacggta cttacgagaa attagcgaaa aagtacttcg attttgatgt ttatggtggc      780
taa                                                                   783

<210> SEQ ID NO 26
<211> LENGTH: 1341
<212> TYPE: DNA
<213> ORGANISM: Escherichia coli

<400> SEQUENCE: 26
atgatgatta ctctgcgcaa acttcctctg gcggttgccg tcgcagcggg cgtaatgtct       60
gctcaggcaa tggctgttga tttccacggc tatgcacgtt ccggtattgg ttggacaggt      120
agcggcggtg aacaacagtg tttccagact accggtgctc aaagtaaata ccgtcttggc      180
aacgaatgtg aaacttatgc tgaattaaaa ttgggtcagg aagtgtggaa agagggcgat      240
aagagcttct atttcgacac taacgtgccc tattccgtcg cacaacagaa tgactgggaa      300
gctaccgatc cggccttccg tgaagcaaac gtgcagggta aaaacctgat cgaatggctg      360
ccaggctcca ccatctgggc aggtaagcgc ttctaccaac gtcatgacgt tcatatgatc      420
gacttctact actgggatat ttctggtcct ggtgccggtc tggaaaacat cgatgttggc      480
ttcggtaaac tctctctggc agcaacccgc tcctctgaag ctggtggttc ttcctctttc      540
gccagcaaca atatttatga ctataccaac gaaaccgcga acgacgtttt cgatgtgcgt      600
ttagcgcaga tggaaatcaa cccgggcggc acattagaac tgggtgtcga ctacggtcgt      660
gccaacttgc gtgataacta tcgtctggtt gatggcgcat cgaaagacgg ctggttattc      720
actgctgaac atactcagag tgtcctgaag ggctttaaca agtttgttgt tcagtacgct      780
actgactcga tgacctcgca gggtaaaggg ctgtcgcagg ttctggcgt tgcatttgat      840 aacgaaaaat ttgcctacaa tatcaacaac aacggtcaca tgctgcgtat cctcgaccac      900
ggtgcgatct ccatgggcga caactgggac atgatgtacg tgggtatgta ccaggatatc      960
aactgggata cgacaacgg caccaagtgg tggaccgtcg gtattcgccc gatgtacaag     1020
tggacgccaa tcatgagcac cgtgatggaa atcggctacg acaacgtcga atcccagcgc     1080
accggcgaca gaacaatca gtacaaaatt accctcgcac aacaatggca ggctggcgac     1140
agcatctggt cacgcccggc tattcgtgtc ttcgcaacct acgccaagtg ggatgagaaa     1200
tggggttacg actacaccgg taacgctgat aacaacgcga acttcggcaa agccgttcct     1260
gctgatttca acgcggcag cttcggtcgt ggcgacagcg acgagtggac cttcggtgcc     1320
cagatggaaa tctggtggta a                                              1341

<210> SEQ ID NO 27
<211> LENGTH: 1191
<212> TYPE: DNA
<213> ORGANISM: Escherichia coli

<400> SEQUENCE: 27
atgaaaataa aaacaggtgc acgcatcctc gcattatccg cattaacgac gatgatgttt       60
```

-continued

| | |
|---|---|
| tccgcctcgg ctctcgccaa aatcgaagaa ggtaaactgg taatctggat taacggcgat | 120 |
| aaaggctata acggtctcgc tgaagtcggt aagaaattcg agaaagatac cggaattaaa | 180 |
| gtcaccgttg agcatccgga taaactgaaa gagaaattcc cacaggttgc ggcaactggc | 240 |
| gatggccctg acattatctt ctgggcacac gaccgctttg gtggctacgc tcaatctggc | 300 |
| ctgttggctg aaatcacccc ggacaaagcg ttccaggaca agctgtatcc gtttacctgg | 360 |
| gatgccgtac gttacaacgg caagctgatt gcttacccga tcgctgttga agcgttatcg | 420 |
| ctgatttata caaagatctg ctgccgaacc cgccaaaaaa cctgggaaga gatcccggcg | 480 |
| ctggataaag aactgaaagc gaaaggtaag agcgcgctga tgttcaacct gcaagaaccg | 540 |
| tacttcacct ggccgctgat tgctgctgac ggggggttatg cgttcaagta tgaaaacggc | 600 |
| aagtacgaca ttaaagacgt gggcgtggat aacgctggcg cgaaagcggg tctgaccttc | 660 |
| ctggttgacc tgattaaaaa caaacacatg aatgcagaca ccgattactc catcgcagaa | 720 |
| gctgccttta taaaggcgaa acagcgatga ccatcaacg gcccgtgggc atggtccaac | 780 |
| atcgacacca gcaaagtgaa ttatggtgta acggtactgc cgaccttcaa gggtcaacca | 840 |
| tccaaaccgt tcgttggcgt gctgagcgca ggtattaacg ccgccagtcc gaacaaagag | 900 |
| ctggcgaaag agttcctcga aaactatctg ctgactgatg aaggtctgga agcggttaat | 960 |
| aaagacaaac cgctgggtgc cgtagcgctg aagtcttacg aggaagagtt ggcgaaagat | 1020 |
| ccacgtattg ccgccaccat ggaaaacgcc cagaaaggtg aaatcatgcc gaacatcccg | 1080 |
| cagatgtccg ctttctggta tgccgtgcgt actgcggtga tcaacgccgc cagcggtcgt | 1140 |
| cagactgtcg atgaagccct gaaagacgcg cagactcgta tcaccaagta a | 1191 |

<210> SEQ ID NO 28
<211> LENGTH: 921
<212> TYPE: DNA
<213> ORGANISM: Escherichia coli

<400> SEQUENCE: 28

| | |
|---|---|
| atgaaaatga ataaaagtct catcgtcctc tgtttatcag cagggttact ggcaagcgcg | 60 |
| cctggaatta gccttgccga tgttaactac gtaccgcaaa acaccagcga cgcgccagcc | 120 |
| attccatctg ctgcgctgca acaactcacc tggacaccgg tcgatcaatc taaaacccag | 180 |
| accacccaac tggcgaccgg cggccaacaa ctgaacgttc ccggcatcag tggtccggtt | 240 |
| gctgcgtaca cgtcccggc aaacattggc gaactgaccc tgacgctgac cagcgaagtg | 300 |
| aacaaacaaa ccagcgtttt tgcgccgaac gtgctgattc ttgatcagaa catgaccccca | 360 |
| tcagccttct tccccagcag ttatttcacc taccaggaac caggcgtgat gagtgcagat | 420 |
| cggctggaag gcgttatgcg cctgacaccg gcgttggggc agcaaaaact ttatgttctg | 480 |
| gtctttacca cggaaaaaga tctccagcag acgacccaac tgctcgaccc ggctaaagcc | 540 |
| tatgccaagg gcgtcggtaa ctcgatcccg gatatccccg atccggttgc tcgtcatacc | 600 |
| accgatggct actgaaaact gaaagtgaaa acgaactcca gctccagcgt gttggtagga | 660 |
| cctttatttg gttcttccgc tccagctccg gttacggtag gtaacacggc ggcaccagct | 720 |
| gtggctgcac ccgctccggc accggtgaag aaaagcgagc cgatgctcaa cgacacggaa | 780 |
| agttatttta ataccgcgat caaaaacgct gtcgcgaaag gtgatgttga taggcgttaa | 840 |
| aaactgcttg atgaagctga acgcctggga tcgacatctg cccgttccac ctttatcagc | 900 |
| agtgtaaaag gcaagggggta a | 921 |

<210> SEQ ID NO 29
<211> LENGTH: 393
<212> TYPE: DNA
<213> ORGANISM: Escherichia coli

<400> SEQUENCE: 29

| | | | | | | |
|---|---|---|---|---|---|---|
| atgaaaaaat | tcgcagcagt | aatcgcagta | atggccctgt | gcagcgcacc | ggtgatggca | 60 |
| gcagagcagg | gcggtttttc | tggcccatcg | gcaacgcaaa | gtcaggccgg | aggattccag | 120 |
| gggccgaacg | gcagcgtaac | gactgtagaa | agcgcaaaat | ccctgcgtga | cgacacctgg | 180 |
| gtaaccctgc | gcggcaatat | cgttgaacgc | atctctgacg | atctctacgt | gttcaaagat | 240 |
| gccagcggta | ctatcaatgt | tgatatcgac | acaaacgct | ggaacggcgt | gacggtgacg | 300 |
| ccgaaagata | cggttgagat | tcagggtgaa | gtcgataaag | actggaattc | tgttgaaatt | 360 |
| gacgtcaaac | agatccgcaa | agtaaatccg | taa | | | 393 |

<210> SEQ ID NO 30
<211> LENGTH: 1992
<212> TYPE: DNA
<213> ORGANISM: Escherichia coli

<400> SEQUENCE: 30

| | | | | | | |
|---|---|---|---|---|---|---|
| atgtttaggt | tgaacccttt | cgtacgggtc | gggctgtgtt | tgtccgctat | ttcttgtgca | 60 |
| tggcctgtgt | tagcggtcga | tgatgatggc | gaaacgatgg | ttgtcactgc | atcttccgtg | 120 |
| gaacaaaatc | ttaaagatgc | acctgccagt | atcagcgtca | ttacccagga | agacctgcag | 180 |
| cgaaaaccgg | tacagaatct | gaaggatgtc | ctcaaagaag | tgcctggcgt | acaactgacg | 240 |
| aacgaagggg | ataaccgtaa | gggcgttagt | attcgtggtc | tggacagcag | ctatacc ctg | 300 |
| attctcgtcg | acggtaaacg | cgtgaactcc | cgcaatgccg | tcttccgcca | caatgatttc | 360 |
| gatctgaact | ggatcccggt | cgattccatc | gaacgtattg | aagtggtccg | tggcccgatg | 420 |
| tcgtcgctgt | acggttccga | tgcgctcggc | ggtgtagtga | atatcatcac | caaaaaaatc | 480 |
| ggtcagaaat | ggtcgggtac | cgttaccgtc | gataccacca | ttcaggaaca | tcgcgatcgc | 540 |
| ggtgacacct | ataacggtca | gttctttacc | agtggaccat | taattgatgg | tgtgctggga | 600 |
| atgaaagctt | acggcagcct | ggcaaaacgt | gaaaaggatg | acccgcaaaa | ctcaacgacc | 660 |
| accgataccg | gagaaacgcc | gcgtattgaa | ggattctcca | gccgcgacgg | caatgtcgaa | 720 |
| tttgcctgga | caccgaatca | aaatcacgat | ttttctgccg | gatacggttt | cgaccgtcag | 780 |
| gatcgtgatt | ccgactcgct | ggacaaaaac | cgcctggaac | gccagaacta | ctccgtcagc | 840 |
| cataatgggc | gttgggatta | cggcaccagc | gaactgaaat | actacggtga | gaaagtcgag | 900 |
| aacaaaaacc | ctggcaacag | cagcccgata | acttccgaaa | gcaatacggt | cgacggcaaa | 960 |
| tacacgttgc | cgctgacggc | gattaatcag | tttctcacgg | ttggcggtga | atggcgtcac | 1020 |
| gacaaactta | gcgatgcggt | gaacctgacc | ggggggaacca | gctccaaaac | gtctgccagc | 1080 |
| cagtacgcgc | tgtttgtgga | agatgaatgg | cggatcttcg | agccgctggc | gctgacgacc | 1140 |
| ggcgtgcgta | tggacgatca | cgaaacctac | ggtgaacact | ggagtccgcg | tgcctacctg | 1200 |
| gtttataacg | ccaccgacac | cgtaacggtg | aagggggct | gggcgacggc | atttaaagca | 1260 |
| ccttctctgt | tgcaacttag | ccctgactgg | acgagcaatt | cctgccgtgg | cgcatgtaag | 1320 |
| attgtgggta | gcccggatct | gaaaccagaa | accagcgaaa | gttgggagct | ggggctttac | 1380 |
| tacatgggtg | aagaaggctg | gctggaaggg | gttgaatcca | gcgttaccgt | tttccgtaac | 1440 |
| gatgtgaaag | atcgtatcag | catcagccgt | acgtctgacg | tcaacgctgc | accgggctac | 1500 |

-continued

```
caaaactttg ttggttttga gacgggcgct aacggacggc gcataccggt atttagctac    1560
tacaacgtta acaaagctcg tattcagggc gtggaaaccg aactgaaaat tccgttcaac    1620
gatgaatgga aactgtcgat caactacacc tacaacgatg gtcgtgatgt cagcaacggc    1680
gaaaacaaac cgctatccga tctgccgttc catactgcta acggtacgct ggactggaaa    1740
ccgctggcgc tggaagactg gtcattctat gtttctgggc actataccgg cagaaacgc    1800 gccgacagcg cgacggctaa acaccgggc ggttatacca tctggaatac cggcgcggcc    1860
tggcaggtga ctaaagacgt caaactgcgc gcaggcgtgc tgaaccttgg cgacaaggat    1920
ctcagtcgtg acgactacag ctataacgaa gacggacgtc gttactttat ggcagtggat    1980
tatcgcttct ga                                                        1992
```

<210> SEQ ID NO 31
<211> LENGTH: 2241
<212> TYPE: DNA
<213> ORGANISM: Escherichia coli

<400> SEQUENCE: 31

```
atgaacaaga agattcattc cctggccttg ttggtcaatc tggggattta tggggtagcg     60
caggcacaag agccgaccga tactcctgtt tcacatgacg atactattgt cgttaccgcc    120
gccgagcaga acttacaggc gcctggcgtt tcgaccatca ccgcagatga atccgcaaa     180 aacccggttg cccgcgatgt gtcggagatc atccgtacca tgccaggcgt taacctgacc    240
ggtaactcca ccagtggtca gcgtgggaat aaccgacaga ttgatattcg cggtatgggt    300
ccggaaaaca cgctgatttt gattgacggc aagccggtaa gcagccgtaa ctcggtgcgt    360
cagggctggc gtggcgagcg cgataccgt ggtgatactt cctgggtgcc acctgaaatg    420
attgaacgta ttgaagttct gcgtggtccg gcagctgcgc gttatggcaa cggcgcggcg    480
ggcggcgtgg ttaacatcat taccaaaaaa ggcagcggcg agtggcacgg ctcctgggac    540
gcatatttca atgcgccaga acataaagag gaaggtgcca ccaaacgcac taactttagc    600
ctgaccggtc cgctgggcga cgaattcagc ttccgttgt atggcaacct cgacaaaaacc    660 caggctgacg cgtgggatat caaccagggc catcagtccg cgcgtgccgg aacgtatgcc    720
acgacgttac cagccgggcg cgaagggta atcaacaaag atattaatgg cgtggtgcgc    780
tgggatttcg cgccattgca atcgctggaa ctggaagcag gttacagccg ccagggtaac    840
ctgtatgcgg cgacacccga gaataccaac tccgattcct atacccgctc gaaatatggc    900
gatgaaacca accgtctgta tcgccagaac tacgcgctga cctggaacgg tggctgggat    960
aacggcgtga ccaccagcaa ctgggtgcag tacgaacaca cccgtaactc gcgtattccg    1020
gaaggtctgg cgggcggtac cgaagggaaa tttaacgaaa aagcgacaca ggatttcgtc    1080
gatatcgatc ttgatgacgt gatgctgcac agcgaagtta acctgccgat tgatttcctc    1140
gttaaccaga cgctgacgct gggtacggag tggaatcagc aacggatgaa ggacttaagt    1200
tccaacaccc aggcactgac cggaacgaat accggtggcg ctattgatgg cgtgagtacc    1260
accgaccgta gcccgtattc aaaagcagaa attttctcgc tgtttgccga aaacaacatg    1320
gagctgactg acagcaccat cgtaacgccg ggctgcgtt tcgatcatca cagtattgtc    1380
ggcaataact ggagcccggc gctgaacata tcgcaaggtt taggcgatga cttcacgctg    1440
aaaatgggca tcgcccgtgc ttataaagcg ccgagcctgt accagactaa cccgaactac    1500
attctctaca gtaaaggtca gggttgctat gccagcgcgg gcggctgcta tctgcaaggt    1560
```

|  |  |
|---|---|
| aacgatgacc tgaaagcaga aaccagcatc aacaaagaga ttggtctgga gttcaaacgc | 1620 |
| gacgggtggc tggcgggcgt cacctggttc cgtaacgatt atcgcaataa gattgaagcg | 1680 |
| ggctatgtgg ctgtagggca aaacgcagtc ggcaccgatc tctatcagtg ggataacgtg | 1740 |
| ccgaaagcgg tggttgaagg tctggaagga tcgttaaacg taccggttag cgaaacggtg | 1800 |
| atgtggacca ataacatcac ttatatgctg aagagtgaaa acaaaaccac gggcgaccgt | 1860 |
| ttgtcgatca tcccggagta tacgttgaac tcaacgctga gctggcaggc acggaagat | 1920 |
| ttgtcgatgc aaacgacctt cacctggtac ggcaagcagc agccgaagaa gtacaactat | 1980 |
| aaaggtcagc cagcggttgg accggaaacc aaagaaatta gtccttacag cattgttggc | 2040 |
| ctgagcgcga cctgggatgt gacgaagaat gtcagtctga ccggcggcgt ggacaatctg | 2100 |
| ttcgacaaac gtttgtggcg tgcgggtaat gcccagacca cgggcgattt ggcaggggcc | 2160 |
| aactatatcg ccggtgccgg ggcgtatacc tataacgagc cgggacgtac gtggtatatg | 2220 |
| agcgtaaaca cccacttctg a | 2241 |

<210> SEQ ID NO 32
<211> LENGTH: 759
<212> TYPE: DNA
<213> ORGANISM: Escherichia coli

<400> SEQUENCE: 32

|  |  |
|---|---|
| atgaaaattc gcgccttatt ggtagcaatg agcgtggcaa cggtactgac cggttgccag | 60 |
| aatatggact ccaacggact gctctcatca ggagcggaag cttttcaggc ttacagtttg | 120 |
| agtgatgcgc aggtgaaagc cctgagcgat caggcatgtc aggagatgga cagcaaggcg | 180 |
| acgattgcgc cagccaatag cgaatacgct aaacgtctga caactattgc caatgcgcta | 240 |
| ggcaacaata tcaacggtca gccggtaaat tacaaagtgt atatggcgaa ggatgtgaac | 300 |
| gccttttgcaa tggctaacgg ctgtatccgt gtctatagcg ggctgatgga tatgatgacg | 360 |
| gataacgaag tcgaagcggt gatcggtcac gaaatgggc acgtggcgtt aggccatgtg | 420 |
| aaaaaaggaa tgcaggtggc acttggtaca aatgccgtgc gagtagctgc ggcctctgcg | 480 |
| ggcgggattg tcggaagttt atctcaatca caacttggta atctgggcga gaaattagtc | 540 |
| aattcgcaat tctcccagcg ccaggaagca gaagccgatg attattctta cgatcttctg | 600 |
| cgccaacgcg gcatcagccc ggcaggtctt gccaccagct ttgaaaaact ggcaaaactg | 660 |
| gaagaaggtc gccaaagctc aatgtttgac gaccatcctg catccgccga acgcgcccag | 720 |
| catattcgcg atcgcatgag cgcggatggg attaagtaa | 759 |

<210> SEQ ID NO 33
<211> LENGTH: 354
<212> TYPE: DNA
<213> ORGANISM: Escherichia coli

<400> SEQUENCE: 33

|  |  |
|---|---|
| atgcacgtaa aatacttatc agggattgtc ggtgccgcgc tactgatggc gggttgtagc | 60 |
| tccagcaacg aattgagtgc tgccggtcag agtgtacgca ttgtggacga gcagccaggc | 120 |
| gcagagtgcc agctgattgg tactgcgaca ggtaagcaaa gcaactggct ttccgggcaa | 180 |
| cacggagaag agggcggttc tatgcgcggc gcagcaaacg atctgcgcaa ccaggcggct | 240 |
| gcaatgggcg gtaacgtgat ttatggcatc agcagcccgt cgcagggaat gttgtccagt | 300 |
| tttgtcccga cggatagcca gattatcggt caggtttata agtgcccgaa ctga | 354 |

```
<210> SEQ ID NO 34
<211> LENGTH: 147
<212> TYPE: DNA
<213> ORGANISM: Escherichia coli

<400> SEQUENCE: 34
atggtgaaga agacaattgc agcgatcttt tctgttctgg tgctttcaac agtattaact    60
gcctgcaaca ccacgcgtgg cgttggtgaa gacatttctg atggcggtaa cgcgatttct   120
ggcgcagcaa cgaaagcgca gcaataa                                       147

<210> SEQ ID NO 35
<211> LENGTH: 405
<212> TYPE: DNA
<213> ORGANISM: Escherichia coli

<400> SEQUENCE: 35
atgcgtgctt taccgatctg tttagtagca ctcatgctaa gcggctgttc catgttaagc    60 agatccctg tcgaacccgt tcaaagcact gcacccccagc cgaaagcgga gcctgcaaaa   120
ccgaaagcgc gcgcgccac gccggtccga atttatacca atgcagaaga attagtcggc   180
aaaccgttcc gcgatctcgg tgaagtcagt ggcgactctt gccaggcctc taatcaggac   240
tctccgccga gcattccaac cgcacgtaag cggatgcaaa tcaacgcctc gaaaatgaaa   300
gccaatgcgg tattactgca tagctgcgaa gttaccagcg gtacgccagg ctgctatcgt   360
caggctgtat gtatcggctc tgcgcttaac attacggcga aatga                  405

<210> SEQ ID NO 36
<211> LENGTH: 1038
<212> TYPE: DNA
<213> ORGANISM: Escherichia coli

<400> SEQUENCE: 36
atgaaaaaga gcactctggc attagtggtg atgggcattg tggcatctgc atccgtacag    60
gccgcagaaa tatataacaa agacggtaat aaactggatg tctatggcaa agttaaagcc   120
atgcattata tgagtgataa cgacagtaaa gatggcgacc agagttatat ccgttttggt   180
tttaaaggcg aaacacaaat taacgatcaa ctgactggtt atggtcgttg ggaagcagag   240
tttgccggta ataaagcaga gagtgatact gcacagcaaa aaacgcgtct cgcttttgcc   300
gggttgaaat ataagatttt ggttcttttc gattatggtc gtaacctggg cgcgttgtat   360
gacgtggaag cctggaccga tatgttcccg gaatttggtg cgactcctc ggcgcagacc   420 gacaacttta tgaccaaacg cgccagcggt ctggcgacgt atcggaacac cgacttcttc   480
ggcgttatcg atggcctgaa cttaaccctg caatatcaag ggaaaaacga aaccgcgac   540 gttaaaaagc aaaacggcga tggcttcggc acgtcattga catatgactt tggcggcagc   600
gatttcgcca ttagtgggc ctataccaac tcagatcgca ccaacgagca gaacctgcaa   660
agccgtggca caggcaagcg tgcagaagca tgggctacag gtctgaaata cgatgccaat   720
aatatttatc tggcaacttt ttattctgaa acacgcaaaa tgacgccaat aactggcggc   780
tttgccaata agacacagaa ctttgaagcg gtcgctcaat accagtttga ctttggtctg   840
cgtccttcgc tgggttatgt cttatcgaaa gggaaagata ttgaaggtat cggtgatgaa   900
gatctggtca attatatcga tgtcggggct acgtattatt tcaacaaaaa tatgtcagcg   960
tttgttgatt ataaaatcaa ccaactggat agcgataaca aattgaatat taataatgat  1020
gatattgtcg cgggataa                                                1038
```

<210> SEQ ID NO 37
<211> LENGTH: 1632
<212> TYPE: DNA
<213> ORGANISM: Escherichia coli

<400> SEQUENCE: 37

| | | | | | |
|---|---|---|---|---|---|
| atgaccaaca | tcaccaagag | aagtttagta | gcagctggcg | ttctggctgc | gctaatggca | 60 |
| gggaatgtcg | cgctggcagc | tgatgtaccc | gcaggcgtca | cactggcgga | aaaacaaaca | 120 |
| ctggtacgta | acaatggttc | agaagttcag | tcattagatc | cgcacaaaat | tgaaggtgtt | 180 |
| ccggagtcta | atatcagccg | agacctgttt | gaaggcttac | tggtcagcga | tcttgacggt | 240 |
| catccagcac | ctggcgtcgc | tgaatcctgg | gataataaag | acgcgaaagt | ctggaccttc | 300 |
| catttgcgta | aagatgcgaa | atggtctgat | ggcacgccag | tcacagcaca | agactttgtg | 360 |
| tatagctggc | aacgttctgt | tgatccgaac | actgcttctc | cgtatgccag | ttatctgcaa | 420 |
| tatgggcata | tcgccggtat | tgatgaaatt | cttgaaggga | aaaaaccgat | taccgatctc | 480 |
| ggcgtgaaag | ctattgatga | tcacacatta | gaagtcacct | aagtgaacc | cgttccgtac | 540 |
| ttctataaat | tacttgttca | cccatcaact | tcaccggtgc | aaaagccgc | tatcgagaaa | 600 |
| ttcggcgaaa | aatggaccca | gcctggtaat | atcgtcacca | cggtgccta | taccttaaaa | 660 |
| gattgggtcg | taaacgaacg | aatcgttctt | gaacgcagcc | cgacctactg | gaacaacgcg | 720 |
| aaaaccgtta | ttaaccaggt | aacctatttg | cctattgctt | ctgaagttac | cgatgtcaac | 780 |
| cgctaccgta | gtggtgaaat | cgacatgact | tataacaaca | tgccgatcga | attgttccag | 840 |
| aagctgaaaa | aagagatccc | ggacgaagtt | cacgttgatc | catacctgtg | cacttactat | 900 |
| tacgaaatta | caaccagaa | accgccattc | aacgatgtgc | gtgtgcgtac | cgcactgaaa | 960 |
| ctaggtatgg | accgcgatat | cattgttaat | aaagtgaaag | cgcagggcga | catgcccgcc | 1020 |
| tatggttaca | ctccaccgta | tactgatggc | gcaaaattga | ctcagccgga | atggtttggc | 1080 |
| tggagccagg | aaaaacgtaa | cgaagaagcg | aaaaaactgc | tggctgaagc | gggttatacc | 1140 |
| gcagacaaac | cgttgaccat | caacctgttg | tataacacct | ccgatctgca | taaaaagctg | 1200 |
| gcgattgctg | cctcttcatt | gtggaagaaa | aacattggtg | taaacgtcaa | actggttaac | 1260 |
| caggagtgga | aaacgttcct | cgacacccgt | caccagggta | ctttttgatgt | ggcccgtgca | 1320 |
| ggctggtgtg | ctgactacaa | cgaaccaact | tccttcctga | acaccatgct | ttcgaacagc | 1380 |
| tcgatgaata | ccgcgcatta | taagagcccg | gcctttgaca | gcattatggc | ggaaacgctg | 1440 |
| aaagtgactg | acgaggcgca | gcgcacagct | ctgtacacta | aagcagaaca | acagctggat | 1500 |
| aaggattcgg | ccattgttcc | tgtttattac | tacgtgaatg | cgcgtctggt | gaaaccgtgg | 1560 |
| gttggtggct | ataccggcaa | agatccgctg | gataatacct | atacccggaa | tatgtacatt | 1620 |
| gtgaagcact | aa | | | | | 1632 |

<210> SEQ ID NO 38
<211> LENGTH: 813
<212> TYPE: DNA
<213> ORGANISM: Escherichia coli

<400> SEQUENCE: 38

| | | | | | |
|---|---|---|---|---|---|
| atgaaatcac | tgtttaaagt | aacgctgctg | gcgaccacaa | tggccgttgc | cctgcatgca | 60 |
| ccaatcactt | ttgctgctga | agctgcaaaa | cctgctacaa | ctgctgacag | caaagcagcg | 120 |
| ttcaaaaatg | acgatcagaa | atcagcttat | gcactgggtg | cttcgctggg | tcgttacatg | 180 |
| gaaaactctc | ttaaagaaca | agaaaaactg | ggcatcaaac | tggataaaga | tcagctgatc | 240 |

```
gctggtgttc aggatgcatt tgctgataag agcaaactct ccgaccaaga gatcgaacag    300
actctgcaag cattcgaagc tcgcgtgaag tcttctgctc aggcgaagat ggaaaaagac    360
gcggctgata acgaagcaaa aggtaaagag taccgcgaga aatttgccaa agagaaaggt    420
gtgaaaacct cttcaactgg tctggtttat caggtagtag aagccggtaa aggcgaagca    480
ccgaaagaca gcgatactgt tgtagtgaac tacaaaggta cgctgatcga cggtaaagag    540
ttcgacaact cttacacccg tggtgaaccg ctctctttcc gtctggacgg tgttatcccg    600
ggttggacag aaggtctgaa gaacatcaag aaaggcggta agatcaaact ggttattcca    660
ccagaactgg cttacggcaa agcgggtgtt ccggggatcc caccgaattc taccctggtg    720
tttgacgtag agctgctgga tgtgaaacca gcgccgaagg ctgatgcaaa gccggaagct    780
gatgcgaaag ccgcagattc tgctaaaaaa taa                                813

<210> SEQ ID NO 39
<211> LENGTH: 573
<212> TYPE: DNA
<213> ORGANISM: Escherichia coli

<400> SEQUENCE: 39
atgaaactcg tgcacatggc cagtggttta gcggttgcga ttgcgttggc ggcttgcgca     60
gataaaagcg cggatattca gacgccagcc ccggctgcaa atacgtctat ttcagcaaca    120
caacaacctg ctatccagca accgaatgtc tccggtaccg tctggatccg gcagaaagtc    180
gcactgccgc ctgatgctgt gctgaccgtg acactttctg acgcgtcgtt agccgatgca    240
ccgtcaaaag tgctggcgca gaaagcggtg cgtaccgaag gtaaacagtc accattcagc    300
tttgttctgc catttaatcc ggcagatgtt cagccgaacg cgcgtattct gttgagtgcg    360
gcgattaccg tgaatgacaa actggtattt attaccgata ccgttcagcc ggtgatcaac    420
aagggcggaa ctaaagccga cctgacattg gtgccggtgc agcaaaccgc cgtgccggtt    480
caggccagcg gtggtgcaac gactaccgta ccttcgactt caccaactca ggtgaatccg    540
tcttcggcag ttccagctcc tacgcaatat taa                                573

<210> SEQ ID NO 40
<211> LENGTH: 885
<212> TYPE: DNA
<213> ORGANISM: Escherichia coli

<400> SEQUENCE: 40
atgaaaaaaa cattactggc agccggtgcg gtactggcgc tctcttcgtc ttttactgtc     60
aacgcagctg aaaacgacaa accgcagtat ctttccgact ggtggcacca gagcgttaac    120
gttgtcggaa gctatcacac ccgtttcgga ccgcagatcc gcaacgatac ctaccttgag    180
tacgaagcat cgctaaaaaa agactggttc gacttctatg ttatgcggat gcgccggta    240 ttcttcggcg gtaactccga tgcaaaaggt atctggaacc acggttctcc gctgtttatg    300
gaaatcgaac cacgtttctc catcgacaag ctgaccaata ctgaccttag cttcggtccg    360
ttcaaagagt ggtacttcgc gaacaactac atttacgaca tgggtcgtaa taaagatggt    420
cgccagagca cctggtacat gggtctgggt accgatatcg cactggcct gccgatgagc    480 ctgtccatga acgtctatgc gaaataccag tggcagaact atggcgcagc gaacgaaaac    540
gagtgggacg gttaccgttt caaaattaaa tactttgtgc cgattaccga tctgtggggc    600
ggtcagctga gctacatcgg cttcaccaac ttcgactggg gttccgattt aggggatgac    660
```

```
agcggtaacg caatcaacgg tattaagacc cgtactaata actctatcgc ttccagccat    720
attctggctc tgaactacga tcactggcac tactctgtcg tagctcgtta ctggcacgac    780
ggtggtcagt ggaacgacga tgcagaactg aacttcggca acggcaactt caacgttcgc    840
tctaccggct ggggtggtta cctggtagta ggttacaact tctga                    885
```

<210> SEQ ID NO 41
<211> LENGTH: 741
<212> TYPE: DNA
<213> ORGANISM: Escherichia coli

<400> SEQUENCE: 41

```
gtgaagttca aagttatcgc cctggcggca ttaatgggta ttagcgggat ggcagcgcag     60
gctaacgaat tgccggatgg accgcatatt gtcacctccg gtacggcaag cgtggatgcg    120
gtgccagaca ttgccactct tgcgattgaa gttaacgtgg ccgcgaagga tgccgctact    180
gccaagaaac aggcagatga gcgcgtcgca caatacattt ccttccttga actcaatcag    240
atcgcgaaaa aagatatcag ctcagcgaac ttacgcaccc agccagatta tgattatcag    300
gatggtaaaa gtatccttaa aggctaccgc gctgtgagaa cggtggaagt cacgctccgt    360
cagttagaca aactgaattc cttgctggat ggcgcgctga aggcgggtct taacgaaatt    420
cgttctgtgt cgctgggcgt ggcgcagccg gatgcctata agacaaaagc gcgtaaggca    480
gcgattgata acgcgattca tcaggcgcag gaactggcga acggctttca tcgtaaactg    540
gggccggtat atagcgtgcg ctaccatgtt tccaactatc agcccagccc aatggtgcgg    600
atgatgaaag ccgatgccgc gccggtgtcc gcccaggaaa cttacgagca ggccgctatt    660
cagtttgatg atcaggtcga tgtggtcttc cagttagaac ctgtggatca acaacccgct    720
aaaacacctg cagcacaata a                                              741
```

<210> SEQ ID NO 42
<211> LENGTH: 339
<212> TYPE: DNA
<213> ORGANISM: Escherichia coli

<400> SEQUENCE: 42

```
atgaacaaga atatggcagg aattctgagt gcagcggcgg tattaaccat gctggcgggt     60
tgtacggctt atgatcgtac caaagaccag tttgtacagc ctgtggtgaa agacgtcaaa    120
aaaggcatga gccgggcgca ggttgcacaa attgcgggta accttcgtc tgaagtgagc    180 atgatccatg ctcgtggtac ttgccagacc tacatcctgg gtcaacgtga tggtaaagca    240
gaaacctact ttgtcgcgtt agatgatacc ggacatgtca tcaactccgg ttatcagacc    300
tgtgctgaat acgacactga tccacaggct gcgaagtaa                           339
```

<210> SEQ ID NO 43
<211> LENGTH: 219
<212> TYPE: DNA
<213> ORGANISM: Escherichia coli

<400> SEQUENCE: 43

```
atgaaaaaat gggcagtaat aatttctgca gtcggactgg cgtttgctgt ttccgggtgt     60
tccagtgatt acgtcatggc gaccaaagat ggccgtatga ttttgaccga tggaaaacct    120
gaaattgatg atgataccgg gctggtgagt tatcacgatc agcaaggtaa cgcaatgcaa    180 attaccgtg atgatgtttc gcaaattatt gaacgttaa                            219
```

<210> SEQ ID NO 44
<211> LENGTH: 576
<212> TYPE: DNA
<213> ORGANISM: Escherichia coli

<400> SEQUENCE: 44

| | | | | | |
|---|---|---|---|---|---|
| atgaaaaaaa | gcctgcttgg | tttaaccttc | gcgtccctga | tgttctctgc | cggttcagcg | 60 |
| gttgccgccg | attacaaaat | tgacaaagaa | ggtcagcacg | cctttgttaa | tttccgcatc | 120 |
| cagcaccttg | gctatagctg | gttatacggc | acctttaaag | atttcgacgg | tacttttacc | 180 |
| tttgacgaaa | aaatccggc | tgccgataaa | gtgaatgtga | caattaacac | caccagcgtc | 240 |
| gatactaatc | acgccgaacg | cgataaacat | cttcgcagtg | cagatttcct | caataccgca | 300 |
| aaatatccac | aggcaacatt | cacctccacc | agcgtgaaga | agacggtga | cgaactggat | 360 |
| attaccggcg | atctgacgct | gaatggcgta | accaaacccg | tcacgctgga | agcgaaatta | 420 |
| attggtcagg | gcgacgaccc | atggggtggt | aaacgtgcag | gcttcgaggc | cgaaggcaaa | 480 |
| attaagctca | aggacttcaa | tatcaagaca | gatttaggtc | cagcttctca | ggaagtggat | 540 |
| ctgattattt | cagtggaagg | cgtacagcag | aagtaa | | | 576 |

<210> SEQ ID NO 45
<211> LENGTH: 258
<212> TYPE: DNA
<213> ORGANISM: Escherichia coli

<400> SEQUENCE: 45

| | | | | | |
|---|---|---|---|---|---|
| atgaaaaacg | taaaaaccct | catcgctgcg | gcgattttaa | gctccatgtc | atttgccagc | 60 |
| tttgcggcgg | tcgaagttca | gtcaacgcca | gaaggccaac | aaaaagtcgg | tacaatcagt | 120 |
| gctaacgcgg | ggacaaatct | gggatcgctg | gaagagcagc | tggcgcaaaa | agcggatgag | 180 |
| atgggcgcaa | aatctttccg | tattacttct | gtaaccggtc | cgaataccct | ccatggaaca | 240 |
| gcagtaattt | ataaataa | | | | | 258 |

<210> SEQ ID NO 46
<211> LENGTH: 711
<212> TYPE: DNA
<213> ORGANISM: Escherichia coli

<400> SEQUENCE: 46

| | | | | | |
|---|---|---|---|---|---|
| atggtgaaaa | aagcgatagt | gacagcgatg | gctgtaatca | gcctctttac | tctgatggga | 60 |
| tgtaataatc | gggccgaagt | cgatacgctt | tctccggcgc | aggctgccga | actgaaaccg | 120 |
| atgccgcaaa | gttggcgcgg | cgtgctgccg | tgtgccgatt | gcgaaggaat | cgaaacctct | 180 |
| ctgttcctcg | aaaaagacgg | aacatggggtg | atgaatgagc | gttatctcgg | tgctcgtgaa | 240 |
| gaaccttcct | cctttcgcttc | ctacggtaca | tgggcgcgaa | ccgctgacaa | gctggtatta | 300 |
| accgacagca | aggtgaaaa | gtcatattat | cgggcgaaag | gcgatgcgct | ggagatgctc | 360 |
| gatcgtgaag | gcaatccgat | tgaatcgcag | ttcaactata | cgctggaagc | ggcacaatcc | 420 |
| agtttaccta | tgacgccgat | gaccctgcgg | ggcatgtatt | tttatatggc | tgatgcggcg | 480 |
| accttcactg | attgcgcgac | cggaaaaacgt | ttcatggtag | cgaataacgc | agagctggag | 540 |
| cgtagctacc | tggctgcgcg | cggtcacagt | gaaaaaccgg | tgttactgtc | agtagaaggt | 600 |
| cactttacgc | ttgagggtaa | tccggatacc | ggtgcgccga | ctaaagtatt | ggcacccgat | 660 |
| acggcaggga | aattttaccc | caaccaggat | tgcagtagtt | tggggcagta | a | 711 |

<210> SEQ ID NO 47

<211> LENGTH: 870
<212> TYPE: DNA
<213> ORGANISM: Escherichia coli

<400> SEQUENCE: 47

```
atgcggactc tgcagggctg gttgttgccg gtgtttatgt tgcctatggc agtatatgca     60
caagaggcaa cggtgaaaga ggtgcatgac gcgccagcgg tgcgtggcag tattatcgcc    120
aatatgctgc aggagcatga caatccgttc acgctctatc cttatgacac caactacctc    180
atttacaccc aaaccagcga tctgaataaa gaagcgattg ccagttacga ctgggcggaa    240
aatgcgcgta aggatgaagt aaagtttcag ttgagcctgg catttccgct gtggcgtggg    300
attttaggcc cgaactcggt gttgggtgcg tcttatacgc aaaaatcctg gtggcaactg    360
tccaatagcg aagagtcttc accgtttcgt gaaaccaact acgaaccgca attgttcctc    420
ggttttgcca ccgattaccg tttttgcaggt tggacgctgc gcgatgtgga gatggggtat    480
aaccacgact ctaacgggcg ttccgacccg acctcccgca gctggaaccg cctttatact    540
cgcctgatgg cagaaaacgg taactggctg gtagaagtga agccgtggta tgtggtgggt    600
aatactgacg ataacccgga tatcaccaaa tatatgggtt actaccagct aaaatcggc    660
tatcacctcg gtgatgcggt gctcagtgcg aaaggacaga caactggaa caccggctac    720
ggcggcgcgg agttaggctt aagttacccg atcaccaaac atgtgcgcct ttatactcag    780
gtttacagcg gctatggcga atcgctcatc gactataact caaccagac ccgtgtcggt    840
gtgggggtta tgctaaacga tttgttttga                                     870
```

<210> SEQ ID NO 48
<211> LENGTH: 4563
<212> TYPE: DNA
<213> ORGANISM: Escherichia coli

<400> SEQUENCE: 48

```
atgaataaga aatttaaata taagaaatcg cttttagcgg ctattttgag cgcaaccctg     60
ttagccggtt gtgatggcgg tggttccgga tcttcctccg atacgccgcc tgtagattct    120
ggaacagggt ctttgccgga agtgaaacct gatccaacac aaacccggga gccgacgcct    180
gagccaacgc cggacccaga gcctacgcca gaaccgatac ctgatcctga ccaacacca    240
gaaccggagc cagaacctgt tcctacgaaa acggggttatc tgaccctggg cggaagccag    300
cgggtaactg gtgctaccct taatggtgaa tccagcgatg gctttacatt taaacctggc    360
gaggacgtta cttgcgtggc gggtaacacg acaattgcca ccttcaacac tcagtcagaa    420
gctgcgcgta gcttgcgtgc ggttgaaaaa gtgtcgttta gccttgagga cgcgcaagaa    480
ctggcgggct ccgatgacaa gaaaagcaat gcggtttcgc tggtaacgtc cagtaacagc    540
tgtccggcga atacagaaca ggtttgtctg acgttctcct cggtgatcga gagtaaacgc    600
ttcgactcgc tgtataagca aatcgatctg gcaccggaag agttcaaaaa gctggtcaat    660
gaagaggtgg aaaacaatgc tgcgaccgat aaagcgccat ccactcatac ttcaccggtc    720
gtgcccgtca ccacgccggg aacaaaaccg gatctgaacg cttccttcgt gtcggctaac    780
gcggaacagt tttatcagta tcaacccact gaaatcattc tctctgaagg tcgactggtc    840
gatagccagg gatatggtgt tgctggcgtc aactactaca ccaattcagg ccgtggcgtg    900
acaggggaaa atggtgaatt tccctttagc tggggcgaaa ccatctcctt tggtatcgat    960
acctttgaac tgggttcagt gcgcggcaat aagtcgacca ttgcgctgac tgaactgggt   1020
gatgaagttc gcgggggcaa tattgatcag cttattcatc gctattcgac gaccgggcaa   1080
```

```
aataatacccc gtgttgttcc ggacgatgta cgcaaggtct ttgccgaata tcccaacgtg   1140
atcaacgaga ttatcaatct ctcgttatcc aacggtgcga cgctggggga aggtgagcaa   1200
gtcgttaatc tgcctaacga atttattgag cagtttaata cgggtcaggc caaagagatc   1260
gataccgcga tttgtgcgaa aaccgatggt tgtaacgagg ctcgctggtt ctcgctgacg   1320
acgcgcaatg ttaatgacgg ccagattcag ggcgttatca acaagctgtg gggcgtggat   1380
acgaactaca aatctgtcag caagttccat gtattccatg actccaccaa cttctatggc   1440
agcacgggta atgcgcgcgg tcaggcggtg gtgaatatct ccaacgcggc cttcccgatt   1500
ctgatggcgc gtaatgataa aaactactgg ctggccttcg gcgaaaaacg cgcctgggat   1560
aaaaacgagc tggcgtacat tacggaagcg ccttctcttg ttgagccgga aaacgttacg   1620
cgcgataccg ccacctttaa cctgccgttt atttcgctgg ggcaagtcgg tgagggcaaa   1680
ctgatggtta tcgtaacccc acactacaac agcatttttgc gttgcccgaa cggttacagc   1740
tggaacgggg gcgttaataa agatgggcag tgtacgctca acagcgaccc ggatgacatg   1800
aagaacttca tggagaacgt gctgcgctat ctgtccgacg ataaatggaa gccggacgcg   1860
aaagccagca tgaccgtagg caccaacctg gatactgtct attttaaacg tcatggtcag   1920
gttacaggaa acagcgctgc gttcgacttc catccggatt ttgcgggcat ctctgttgag   1980
catttaagta gctatggcga tctcgatccg caggaaatgc cgctgctgat ccttaacggc   2040
tttgaatatg tgactcaggt gggtaacgat ccttatgcaa tcccgctgcg tgcagatacc   2100
agcaaaccga gctgactca gcaggatgtg accgatctga tcgcctatct gaacaaaggt   2160
ggatcggtgc tgatcatgga aaacgtgatg agcaatctta aggaagagag cgcgtctggt   2220
tttgtgcgtc tgttggatgc cgcaggtctg tcgatggcac tgaacaagtc ggtagtaaat   2280
aacgatccgc aagggtatcc gaaccgcgtt cgtcagcagc gcgcaacggg catttgggtc   2340
tatgaacgtt atcctgccgt agatggtgcg ctgccgtaca ccatcgatag taagacaggg   2400
gaagttaagt ggaaatatca ggtagaaaac aaacctgatg acaaaccgaa gctggaagtt   2460
gccagctggc tggaagatgt agatggcaaa caggaaacgc gttatgcctt tattgatgag   2520
gccgatcata aaacagagga ttctctgaag gctgcgaagg agaaaatttt cgccgcgttc   2580
ccggggctga agagtgtac taatccggca tatcactatg aggtcaactg cctggaatat   2640
cgtcctggca cggggggttcc ggttactggt ggcatgtatg ttccacagta tacgcaacta   2700
agccttaacg ccgacactgc aaaagcgatg gtgcaggctg cggatttagg caccaacatt   2760
cagcgtctgt atcagcatga gctctacttc cggaccaatg gtcgcaaagg tgagcgtctg   2820
agcagcgtcg atctggaacg tctgtaccag aacatgtcgg tctggctgtg gaacgatacg   2880
agctatcgtt atgaagaagg caaaaatgac gagctgggct ttaaaacgtt caccgagttc   2940
ctgaactgct acgccaatga tgcctatgca ggcggcacca gtgttctgc agatctgaaa   3000
aaatcgctgg tcgataacaa catgatctac ggtgacggta gcagcaaagc gggcatgatg   3060
aacccgagct acccgctcaa ctatatggaa aaaccgctga cacgcctgat gctgggccgt   3120
tcctggtggg atctgaacat caaagttgat gtcgagaagt atccgggagc agtatcggaa   3180
gagggacaga acgttactga aaccatcagc ctgtactcga atccgaccaa atggtttgca   3240
ggtaacatgc agtcaactgg cctgtgggca ccggctcaga agaggtcac cattaagtcc   3300
aatgcgaacg ttcctgtgac cgtcaccgtg gcgctggctg acgacctgac cggacgtgag   3360
aagcatgaag ttgcgctgaa ccgtccgcca agagtgacta aaacgtactc tctggacgct   3420
```

```
agcggtacgg tgaagttcaa ggtgccttac ggtggcctga tttatatcaa gggcaatagc    3480
tctaccaatg aatctgccag cttcaccttt actggcgtgg taaaagcacc gttctataaa    3540
gacggcgcat ggaaaaacga tctgaactca ccggctccgc tgggtgagct ggaatcagac    3600
gctttcgtct ataccacacc gaagaagaac ctgaatgcca gcaattacac tggcggactg    3660
gagcaattcg ctaacgatct ggatacctttg ccagctcga tgaatgactt ctacggccgt    3720
gatagcgaag acgtaagca ccggatgttt acctataaaa acttgccggg ccacaaacat    3780
cgtttcacca acgatgtgca gatctccatc ggtgatgcgc attcgggtta ccggtaatg    3840 aacagcagct tctcgccgaa cagcaccacg ctgccgacga cgccgctgaa cgactggctg    3900
atctggcatg aagtcggtca taacgccgca gaaacgccgt tgactgtacc gggtgcaact    3960
gaagtcgcta caacgtgct ggcgctgtac atgcaggatc gttatctcgg caagatgaac    4020
cgtgtcgctg acgatattac cgtcgcaccg gaatatctgg aggagagcaa caaccaggca    4080
tgggcacgcg gcggtgcggg tgaccgtctg ctgatgtacg cacagctgaa ggaatgggca    4140
gagaaaaact ttgatatcaa gaaatggtat ccagatggca ctcctctgcc agagttttac    4200
agcgagcgtg aagggatgaa aggctggaac ctgttccagt tgatgcatcg taaagcacgc    4260
ggcgatgagg tcagcaatga caagtttggc ggcaagaatt actgtgctga atccaacggt    4320
aacgcagcgg acacgctgat gctgtgtgcc tcctgggtcg cccagacgga tctttcggag    4380
ttctttaaga aatggaatcc gggcgcgaat gcttaccagc tgccggggggc gagcgagatg    4440 agcttcgagg gcggtgtgag ccagtcggct tacaacacgc tcgcgtcact cgatctgccg    4500
aaaccggaac agggaccgga aaccattaat caggttaccg agcataagat gtctgccgag    4560
taa                                                                    4563

<210> SEQ ID NO 49
<211> LENGTH: 1683
<212> TYPE: DNA
<213> ORGANISM: Escherichia coli

<400> SEQUENCE: 49
atgaagtctg cattaaagaa aagtgtcgta agtacctcga tatctttgat actggcatct      60
ggtatggctg catttgctgc tcatgcggca gatgatgtaa agctgaaagc aaccaaaaca     120
aacgttgctt tctcagactt tacgccgaca gaatacagta ccaaaggaaa gccaaatatt     180
atcgtactga ccatggatga tcttggttat ggacaacttc ctttttgataa gggatctttt     240 gacccaaaaa caatggaaaa tcgtgaagtt gtcgatacct acaaaatagg gatagataaa     300
gccattgaag ctgcacaaaa atcaacgccg acgctccttt cattaatgga tgaaggcgta     360
cgttttacta acggctatgt ggcacacggt gtttccggcc cctcccgcgc cgcaataatg     420
accggtcgag ctcccgcccg ctttggtgtc tattccaata ccgatgctca ggatggtatt     480
ccgctaacag aaactttctt gcctgaatta ttccagaatc atggttatta cactgcagca     540
gtaggtaaat ggcacttgtc aaaaatcagt aatgtgccgg taccggaaga taaacaaacg     600
cgtgactatc atgacaactt caccacattt tctgcggaag aatggcaacc tcaaaaccgt     660
ggctttgatt actttatggg attccacgct gcaggaacgg catattacaa ctcccccttca     720 ctgttcaaaa atcgtgaacg tgtccccgca aaaggttata tcagcgatca gttaaccgat     780
gaggcaattg gcgttgttga tcgtgccaaa acacttgacc agccttttat gctttacctg     840
gcttataatg ctccgcacct gccaaatgat aatcctgcac cggatcaata tcagaagcaa     900
tttaataccg gtagtcaaac agcagataac tactacgctt ccgtttattc tgttgatcag     960
```

```
ggtgtaaaac gcattctcga caaactgaag aaaaacggac agtatgacaa tacaattatt    1020
ctctttacct ccgataatgg tgcggttatc gatggtcctc tgccgctgaa cggggcgcaa    1080
aaaggctata agagtcagac ctatcctggc ggtactcaca ccccaatgtt tatgtggtgg    1140
aaaggaaaac ttcaacccgg taattatgac aagctgattt ccgcaatgga tttctacccg    1200
acagctcttg atgcagccga tatcagcatt ccaaaagacc ttaagctgga tggcgttttcc   1260 ttgctgccct ggttgcaaga taagaaacaa ggcgagccac ataaaaatct gacctggata    1320
acctcttatt ctcactggtt tgacgaggaa atattccat tctgggataa ttaccacaaa     1380
tttgttcgcc atcagtcaga cgattacccg cataacccca acactgagga cttaagccaa    1440
ttctcttata cggtgagaaa taacgattat tcgcttgtct atacagtaga aaacaatcag    1500
ttaggtctct acaaactgac ggatctacag caaaaagata accttgccgc cgccaatccg    1560
caggtcgtta agagatgca aggcgtggta agagagttta tcgacagcag ccagccaccg     1620
cttagcgagg taaatcagga gaagtttaac aatatcaaga agcactaag cgaagcgaaa     1680 taa                                                                 1683

<210> SEQ ID NO 50
<211> LENGTH: 1653
<212> TYPE: DNA
<213> ORGANISM: Escherichia coli

<400> SEQUENCE: 50
atgaaattat tgcagcgggg cgtggcgtta gcgctgttaa ccacatttac actggcgagt      60
gaaactgctc tggcgtatga gcaggataaa acctacaaaa ttacagttct gcataccaat    120
gatcatcatg gcatttttg gcgcaatgaa tatggcgaat atggtctggc ggcgcaaaaa     180
acgctggtgg atggtatccg caaagaggtt gcggctgaag gcggtagcgt gctgctactt    240
tccggtggcg acattaacac tggcgtgccc gagtctgact tacaggatgc cgaacctgat    300
tttcgcggta tgaatctggt gggctatgac gcgatggcga tcggtaatca tgaatttgat    360
aatccgctca ccgtattacg ccagcaggaa agtgggccaa gttcccgtt gctttccgcg     420 aatatctacc agaaaagtac tggcgagcgc ctgtttaaac cgtgggcgct gtttaagcgt    480
caggatctga aaattgccgt tattgggctg acaaccgatg acacagcaaa aattggtaac    540
ccggaatact tcactgatat cgaatttcgt aagcccgccg atgaagcgaa gctggtgatt    600
caggagctgc aacagacaga aaagccagac attattatcg cggcgaccca tgggggcat    660 tacgataatg gtgagcacgg ctctaacgca ccgggcgatg tggagatggc acgcgcgctg   720
cctgccggat cgctggcgat gatcgtcggt ggtcactcgc aagatccggt ctgcatggcg    780
gcagaaaaca aaaaacaggt cgattacgtg ccgggtacgc catgcaaacc agatcaacaa    840
aacggcatct ggattgtgca ggcgcatgag tggggcaaat acgtgggacg ggctgatttt    900
gagtttcgta tggcgaaat gaaatggtt aactaccagc tgattccggt gaacctgaag     960
aagaaagtga cctgggaaga cgggaaaagc gagcgcgtgc tttacactcc tgaaatcgct   1020
gaaaaccagc aaatgatctc gctgttatca ccgttccaga acaaaggcaa agcgcagctg   1080
gaagtgaaaa taggcgaaac caatggtcgt ctggaaggcg atcgtgacaa agtgcgtttt    1140
gtacagacca atatggggcg gttgattctg gcagcccaaa tggatcgcac tggtgccgac   1200 tttcgcggtga tgagcggagg cggaattcgt gattctatcg aagcaggcga tatcagctat    1260
aaaaacgtgc tgaaagtgca gccattcggc aatgtggtgg tgtatgccga catgaccggt    1320
```

| | |
|---|---|
| aaagaggtga ttgattacct gaccgccgtc gcgcagatga agccagattc aggtgcctac | 1380 |
| ccgcaatttg ccaacgttag ctttgtggcg aaagacggca aactgaacga ccttaaaatc | 1440 |
| aaaggcgaac cggtcgatcc ggcgaaaact taccgtatgg cgacattaaa cttcaatgcc | 1500 |
| accggcggtg atggatatcc gcgccttgat aacaaaccgg ctatgtgaa taccggcttt | 1560 |
| attgatgccg aagtgctgaa agcgtatatc cagaaaagct cgccgctgga tgtgagtgtt | 1620 |
| tatgaaccga aggtgaggt gagctggcag taa | 1653 |

<210> SEQ ID NO 51
<211> LENGTH: 1656
<212> TYPE: DNA
<213> ORGANISM: Escherichia coli

<400> SEQUENCE: 51

| | |
|---|---|
| atggatcgta gacgatttat taaaggttca atggctatgg ccgccgtgtg cggtaccagc | 60 |
| ggcattgctt ctcttttttc tcaggcggca ttcgcggcag attctgatat tgccgacggg | 120 |
| caaacccagc gttttgactt ctccattcta cagtcaatgg cgcacgactt agcgcaaaca | 180 |
| gcgtggcgtg gtgcgcctcg tccgttacct gacacgctgg cgacaatgac gccgcaggct | 240 |
| tataacagta ttcaatacga cgccgaaaaa tcgctctggc ataacgttga gaaccgtcaa | 300 |
| ctggacgctc agttcttcca tatgggaatg ggattccgtc gccgcgttcg tatgttttct | 360 |
| gtagatccag caacacatct ggcgcgtgaa attcactttc gcccggagtt gttcaaatac | 420 |
| aacgatgcag gtgttgatac aaaacaatta gaagggcaaa gcgatctcgg ctttgccggt | 480 |
| tttcgcgtgt ttaaagcccc cgaactggcg cgccgtgatg tagtatcatt tctcggcgcg | 540 |
| agttatttcc gcgccgttga tgatacatat caatacggtt tgtcggcccg cggcctggcg | 600 |
| atcgacactt acaccgacag taaagaagag ttccccgact ttaccgcctt ctggtttgat | 660 |
| acggtaaaac cggggcaac tacctttacc gtttatgcgt tgctcgatag cgccagcatt | 720 |
| actggtgcct ataagttcac tatccattgt gagaaaagtc aggtgattat ggatgtggaa | 780 |
| aatcacctgt atgcgcgcaa agacattaaa cagctgggca ttgcgccgat gaccagtatg | 840 |
| ttcagctgcg gtactaatga acgtcggatg tgcgataaa ttcatccgca aattcatgac | 900 |
| tctgatcgtc tgtccatgtg gcggggcaac ggcgagtgga tttgccgtcc gctgaataat | 960 |
| ccgcaaaaat tgcagttcaa tgcttacacc gacaacaacc cgaaagggt tggtttattg | 1020 |
| caactggatc gtgacttctc ccattatcag gacattatgg gctggtataa caaacgccca | 1080 |
| agtctgtggg tggaaccgcg taacaagtgg ggtaagggca ccatcggcct gatgaaaatc | 1140 |
| ccaacaacgg gcgaaacgct ggataacatt gtctgcttct ggcagccaga aaaagctgta | 1200 |
| aaagcaggtg atgagtttgc attccagtat cgtctgtact ggagtgcgca accgcctgtt | 1260 |
| cattgcccat tagcgcgcgt tatggcgacg cgtaccggca tgggcggttt ctcggaaggt | 1320 |
| tgggcgccag gtaacactta tcccgaaaaa tgggcgcgtc gttttgccgt cgatttcgtt | 1380 |
| ggtggtgatc tgaaagctgc cgcgccaaaa ggcattgagc cggtgattac gctttccagt | 1440 |
| ggggaagcga agcaaatcga aattctctat attgaaccca tcgatggtta tcgtattcag | 1500 |
| tttgactggt atccgacttc ggactccact gatccggtcg atatgcggat gtatctacgt | 1560 |
| tgtcagggg acgctatcag tgaaacatgg ctgtatcagt atttcccgcc agcgccggat | 1620 |
| aaacgtcagt atgttgacga ccgcgtgatg agttaa | 1656 |

<210> SEQ ID NO 52
<211> LENGTH: 1698

```
<212> TYPE: DNA
<213> ORGANISM: Escherichia coli

<400> SEQUENCE: 52
atgaaatccc ccgcaccttc tcgcccgcaa aaaatggcgt taattccagc ctgtatcttt      60
ttgtgtttcg ctgcgctatc ggtgcaggca gaagaaacac cggtaacacc acagccgcct     120
gatattttat tagggccgct gtttaatgat gtgcaaaacg ccaaactttt tccggaccaa     180
aaaacctttg ccgatgccgt gccgaacagc gatccgctga tgatccttgc tgattatcgg     240
atgcagcaaa accagagcgg atttgatctg cgccatttcg ttaacgtcaa tttcaccctg     300
ccgaaagaag gcgagaaata tgttccgcca gaggggcagt cactgcgcga acatattgac     360
ggactttggc cggtattaac gcgttctacc gaaaacaccg aaaaatggga ttctctgtta     420
ccgctgccgg aaccttatgt cgtgccgggc ggacgctttc gcgaggtata ttactgggac     480
agttacttca ccatgttagg acttgccgaa agcggtcact gggataaagt cgcggatatg     540
gtggccaatt ttgctcatga aatagacact tacggtcata ttcccaacgg caaccgcagt     600
tactatttaa gccgctcgca accgcccttc tttgccctga tggtagagtt actggcgcag     660
catgaaggcg atgccgcgtt gaagcaatac ctgccgcaaa tgcaaaaaga atatgcttac     720
tggatggacg gtgttgaaaa cctgcaagcc ggacaacagg aaaaacgcgt tgtcaaactt     780
caggatggta cccttctcaa ccgctactgg gacgatcgcg atacgccacg accagagtca     840
tgggtggaag atattgccac cgccaaaagc aatccgaatc gacctgccac tgaaatttac     900
cgcgacctgc gctctgccgc tgcgtctggc tgggatttca gctcgcgctg gatgacaac      960 ccgcagcagt taaataccct tacgcaccacc agcatcgtac cggtcgatct gaacagcctg    1020
atgtttaaaa tggaaaaaat cctcgcccgc gccagcaaag ctgccggaga taacgcgatg    1080
gcaaaccagt acgaaacgct ggcaaatgcc cgtcaaaaag ggatcgaaaa atacctgtgg    1140
aacgatcaac aaggctggta tgccgattac gacctgaaaa gtcataaagt gcgcaatcag    1200
ttaaccgcgg ccgccctgtt cccgctgtac gtcaatgcgg cagcgaaaga tcgcgccaac    1260
aaaatggcga cggcgacgaa aacacatctg ctgcaacccg gcggcctgaa caccacgtcg    1320
gtgaaaagtg ggcaacaatg ggatgcgcca aatggctggg caccgttaca gtgggtcgcg    1380
acagaaggat tacaaaacta cgggcaaaaa gaggtggcga tggacattag ctggcacttc    1440
ctgaccaatg ttcagcacac ctatgaccgg gagaaaaagc tggtggaaaa atatgatgtc    1500
agcaccaccg gaacgggggg cggcggtggc gaatatccat tacaggatgg ctttggctgg    1560
accaatggcg tgacgctgaa aatgctggat ttgatctgcc cgaaagagca accgtgtgac    1620
aatgttccgg cgacgcgtcc gaccgttaag tcagcaacga cgcaacccctc aaccaaagag    1680 gcacaaccca caccttaa                                                   1698

<210> SEQ ID NO 53
<211> LENGTH: 3474
<212> TYPE: DNA
<213> ORGANISM: Escherichia coli

<400> SEQUENCE: 53
atgcgcaaat tcacactaaa catattcacg ctttccctcg gtctggccgt catgccgatg      60
gtcgaggcag caccaaccgc tcagcaacag ttgctggagc aagttcggtt aggcgaagcg     120
acccatcgtg aagatctggt gcaacagtcg ttatatcggc tggaacttat tgatccgaat     180
aacccggacg tcgttgccgc ccgtttccgt tctttgttac gtcagggcga tattgatggc     240
```

```
gcgcaaaaac agctcgatcg gctgtcgcag ttagcgccga gttcaaatgc gtataaatcg      300
tcgcggacta cgatgctact ttccacgccg gatggtcgtc aggcactgca acaggcacga      360
ttgcaggcga cgaccggtca tgcagaagaa gctgtggcga gttacaacaa actgttcaac      420
ggtgcgccgc cggaaggtga cattgctgtc gagtactgga gtacggtggc gaaaattccg      480
gctcgccgtg gcgaagcgat taatcagtta aaacgcatca atgcggatgc accgggcaat      540
acgggcctgc aaaacaatct ggcgctattg ctgtttagta gcgatcgccg tgacgaaggt      600
tttgccgtcc tggaacagat ggcaaaatcg aacgccgggc gcgaaggggc ctctaaaatc      660
tggtacgggc agattaaaga catgcccgtc agtgatgcca gtgtgtcggc gctgaaaaaa      720
tatctctcga tctttagtga tggcgatagc gtggcggctg cgcaatcgca actggcagaa      780
cagcaaaaac agctggccga tcctgctttc cgcgctcgtg cgcaaggttt agcggcggtg      840
gactctggta tggcgggtaa agccattccc gaactacaac aggcggtgcg ggcgaacccg      900
aaagacagtg aagctctggg ggcgctgggc caggcgtatt ctcagaaagg cgatcgcgcc      960
aatgcagtgg cgaatctgga aaaagccctc gcactgacc cgcacagcag caacaacgac     1020
aaatggaaca gtctgctgaa agtaaaccgc tactggctgg cgatccagca gggcgatgct     1080
gcgctgaaag ccaataatcc tgaccgggca gaacgcctgt ccagcaggc gcgtaatgtc     1140 gataacaccg acagttatgc agtgctgggg ctgggcgatg tggcgatggc gcgaaaagat     1200
tatcccgccg ccgaacgtta ttatcagcag accttgcgta tggacagcgg caacactaac     1260
gccgtgcgcg ggctggcaaa tatttaccgc cagcaatcgc cagaaaaagc tgaagcgttt     1320
atcgcctcgc tctctgccag tcagcggcgt agcattgatg atatcgaacg cagcctgcaa     1380
aacgaccgtc tggcacagca ggcagaggca ctggaaaacc agggcaaatg gcgcaggcg     1440 gcagcacttc agcggcaacg actggcgctg accccggca gcgtatggat tacttaccga     1500
ctttcgcagg atctctggca ggccggacaa cgcagccagg ccgatacgtt aatgcgcaat     1560
ctggcgcagc agaagtcgaa cgacccggag caggtttacg cttacgggct gtacctctct     1620
ggtcatgacc aggacagagc ggcgctggcg catatcaata gcctgccgcg tgcgcagtgg     1680
aacagcaata ttcaggagct ggttaatcga ctgcaaagcg atcaggtgct ggaaaccgct     1740
aaccgcctgc gagaaagcgg caaagaggca gaagcggaag cgatgctgcg ccagcaacca     1800
ccttccacgc gtattgacct cacgctggct gactgggcgc aacaacgacg tgattacacc     1860
gccgcccgcg ctgcatatca gaatgtcctg acgcgggagc cagctaacgc cgacgccatt     1920
cttggtctga cggaagtgga tattgctgcc ggtgacaaag cggcggcacg tagccagctg     1980
gcgaaactgc ccgctaccga taacgcctcg ctgaacacac agcggcgcgt ggcgctggca     2040
caggcgcagc ttggcgatac cgcagcagcg cagcggacgt ttaataagtt gatcccgcag     2100
gcaaaatctc agccaccgtc gatggaaagc gcgatggtgc tgcgtgatgg tgcgaagttt     2160
gaagcgcagg cgggcgatcc aacgcaggcg ctggaaacct acaaagacgc catggtcgca     2220
tccggtgtga ctacgacgcg tccgcaggat aacgacacct ttacccgact gacccgtaac     2280
gacgagaaag atgactggct gaaacgtggc gtgcgcagcg atgcggcgga cctctatcgc     2340
cagcaggatc ttaacgtcac ccttgagcac gattactggg gttcgagcgg caccggtggt     2400
tactccgatc tgaaagcgca cactaccatg ttgcaggtgg atgcgccgta ttctgacggg     2460
cggatgttct ttcgcagtga tttcgtcaat atgaacgtcg gcagtttctc cactaatgcc     2520
gatggcaaat gggatgacaa ctggggcacc tgtacattac aggactgtag cggcaaccgc     2580
agccagtcgg attccggtgc cagcgtggcg gtcggctggc gaaatgacgt ctggagctgg     2640
```

```
gatatcggta ccacgccgat gggcttcaac gtggtggatg tggtcggcgg catcagttac    2700
agcgatgata tcgggccgct gggttacacc gttaacgccc accgtcggcc catctccagt    2760
tctttgctgg cctttggtgg gcaaaaagac tccccgagca ataccgggaa aaatgggggt    2820
ggcgtacgtg ccgacggtgt ggggctaagt ctgagctacg ataaaggtga agcaaacggc    2880
gtctgggcat cgcttagtgg cgaccagtta accggtaaaa atgtcgaaga taactggcgc    2940
gtgcgctgga tgacgggcta ttactataag gtcattaacc agaacaatcg ccgcgtcaca    3000
atcggcctga caacatgat ctggcattac gacaaagatc tgagtggcta ctcactcggt    3060
cagggcggtt actacagtcc gcaggaatac ctgtcgtttg ccataccggt gatgtggcgg    3120
gagcgcacgg aaaactggtc gtgggagctg ggtgcgtctg gctcgtggtc gcattcacgc    3180 accaaaaacca tgccgcgtta tccgctgatg aatctgatcc cgaccgactg gcaggaagaa    3240
gctgcgcggc aatccaacga tggcggcagc agtcagggct tcggctacac ggcgcgggca    3300
ttacttgaac gacgtgttac ttccaactgg tttgttggca cggcaattga tatccagcag    3360
gcgaaagatt acgcacccag ccatttcctg ctctacgtac gttattccgc cgccggatgg    3420
cagggtgaca tggatttacc gccgcagccg ctgatacctt acgccgactg gtaa          3474

<210> SEQ ID NO 54
<211> LENGTH: 1413
<212> TYPE: DNA
<213> ORGANISM: Escherichia coli

<400> SEQUENCE: 54
atgtcactca gtcggcgtca gttcattcag gcatcgggga ttgcactttg tgcaggcgct      60
gttcccctga aggccagcgc agccgggcaa cagcaaccgc tacccgttcc gccgctactt     120
gaatctcgcc gtgggcaacc gctgtttatg actgtacaac gtgcgcactg tcatttacg     180 ccagggacac gcgcgtcggt ctggggaatc aatggtcgtt acctggggcc gactatccgc     240
gtctggaagg gcgacgatgt taagcttatt tacagcaacc gcctgacaga aaatgtctca     300
atgacggtgg ccgggctaca ggtaccaggc ccgctgatgg gcggtccggc acggatgatg     360
tcgccaaacg ctgactgggc acccgtactg cccattcgcc agaacgcagc tactctgtgg     420
tatcacgcca atactcccaa ccgcacggct cagcaggtct ataacggcct tgccggaatg     480
tggctggtgg aagatgaagt cagcaagtcg ctgcctatcc ccaaccatta tggtgtggat     540
gattttccgg tcattatcca ggataaacgg ctggataact ttggtacgcc agaatacaac     600
gaaccgggaa gcggcggctt tgttggtgat acgctgctgg ttaacggtgt acaaagcccg     660
tacgttgaag tctcgcgtgg ctgggtgcgc ttgcgactgc tgaacgcgtc gaactctcgt     720
cgctatcaac tacagatgaa cgatggtcgc ccgttacatg tgatttctgg cgatcaggga     780
ttcctgcctg ctcctgtatc ggtgaagcaa cttttcgctgg caccgggcga gcgccgcgag     840
attctggtgg atatgagcaa cggcgatgaa gtgtcgatca cctgtggcga gcggcgagc     900 attgttgatc gtattcgtgg cttctttgag ccatccagta ttctggttc tacctggtg     960 ctaacgctgc gcccaaccgg ccttctgccg ctggtcacag acagtcttcc gatgcgcttg    1020
ctgccaactg aaatcatggc tggttcgcca attcgcagtc gcgatatcag tctgggtgat    1080
gacccgggta ttaatggaca gctgtgggac gtcaaccgta ttgatgtcac cgcgcagcaa    1140
ggaacgtggg aacgctggac ggtacgcgcg gacgagccgc aagcgttcca tattgaaggc    1200
gtaatgttcc agatccgtaa cgtgaatggc gcgatgccgt tcccggaaga cagaggctgg    1260
```

```
aaagataccg tttgggttga cggacaagtg gagctgcttg tttatttcgg tcagccttcc   1320
tgggcgcact tcccgttcta cttcaacagt cagacgctgg aaatggcgga ccgtggctcg   1380
attgggcaac tgttggtcaa tccggtaccg taa                                1413

<210> SEQ ID NO 55
<211> LENGTH: 2889
<212> TYPE: DNA
<213> ORGANISM: Escherichia coli

<400> SEQUENCE: 55
atgccccgca gcacctggtt caaagcatta ttgttgttag ttgccctttg ggcacccttg     60
agtcaggcag aaacgggatg gcagccgatt caggaaacca tccgtaaaag tgataaagat   120
aaccgccagt atcaggctat acgtctggat aacggtatgg tggtcttgct ggtttctgat   180
ccgcaggcag ttaaatcgct ctcggcgctg gtggtgcccg ttgggtcgct ggaagatccc   240
gaggcgtacc aggggctggc acattacctt gaacatatga gtctgatggg gtcgaaaaag   300
tacccgcagg ctgacagtct ggccgaatat ctcaaaatgc acggcggtag tcacaatgcc   360
agcactgcgc cgtatcgcac ggctttctat ctggaagttg agaacgacgc cttgcctggt   420
gcggtagacc gcctggccga tgctattgct gaaccctttgc tcgacaagaa atatgccgaa   480
cgtgagcgta atgcggtgaa cgctgaatta accatggcgc gtacgcgtga cgggatgcgc   540
atggcacagg tcagcgcaga aaccattaac ccggcacacc ccggttcaaa gttttctggt   600
ggtaacctcg aaactttaag cgacaaacct ggtaatccgg tgcagcaggc gctgaaagat   660
ttccacgaga agtactattc cgccaatttg atgaaggcgg ttatttacag taataaaccg   720
ctgccggagt tggcaaaaat ggcggcggac acctttggtc gcgtgccgaa caagagagc   780 aaaaaaccgg aaatcaccgt gccggtagtc accgacgcgc aaaagggcat tatcattcat   840
tacgtccctg cgctgccgcg taaagtgttg cgcgttgagt ttcgcatcga taacaactca   900
gcgaagttcc gtagtaaaac cgatgaattg attaccctatc tgattggcaa tcgcagccca   960
ggtacacttt ctgactggct gcaaaagcag ggattagttg agggcattag cgccaactcc  1020
gatcctatcg tcaacggcaa cagcggcgta ttagcgatct ctgcgtcttt aaccgataaa  1080
ggcctggcta atcgcgatca ggttgtggcg gcaattttta gctatctcaa tctgttacgt  1140
gaaaaaggca ttgataaaca atacttcgat gaactggcga atgtgctgga tatcgacttc  1200
cgttatccgt cgatcacccg tgatatggat tacgtcgaat ggctggcaga taccatgatt  1260
cgcgttcctg ttgagcatac gctggatgca gtcaatattg ccgatcggta cgatgctaaa  1320
gcagtaaagg aacgtctggc gatgatgacg ccgcagaatg cgcgtatctg gtatatcagc  1380
ccgaaagagc cgcacaacaa aacggcttac tttgtcgatg cgccgtatca ggtcgataaa  1440
atcagcgcac aaactttcgc cgactggcag aaaaaagccg ccgacattgc gctctctttg  1500
ccagagctta cccttatat tcctgatgat ttctcgctga ttaagtcaga gaagaaatac  1560
gaccatccag agctgattgt tgatgagtcg aatctgcgcg tggtgtatgc gccaagccgt  1620
tattttgcca gcgagcccaa agctgatgtc agcctgattt tgcgtaatcc gaaagccatg  1680
gacagcgccc gcaatcaggt gatgtttgcg ctcaatgatt atctcgcagg gctggcgctt  1740
gatcagttaa gcaaccaggc gtcggttggt ggcataagtt tttccaccaa cgctaacaac  1800
ggccttatgg ttaatgctaa tggttacacc cagcgtctgc cgcagctgtt ccaggcattg  1860
ctcgaggggt actttagcta taccgctacg gaagatcagc ttgagcaggc gaagtcctgg  1920
tataaccaga tgatggattc cgcagaaaag ggtaaagcgt ttgagcaggc gattatgccc  1980
```

```
gcgcagatgc tctcgcaagt gccgtacttc tcgcgagatg aacggcgtaa aattttgccc    2040
tccattacgt tgaaagaggt gctggcctat cgcgacgcct taaaatcagg ggctcgacca    2100
gagtttatgg ttatcggcaa catgaccgag gcccaggcaa caacgctggc acgcgatgtg    2160
caaaaacagt tgggcgctga tggttcagag tggtgtcgaa acaaagatgt agtggtcgat    2220
aaaaaacaat ccgtcatctt tgaaaaagcc ggtaacagca ccgactccgc actggcagcg    2280
gtatttgtac cgactggcta cgatgaatac accagctcag cctatagctc tctgttgggg    2340
cagatcgtac agccgtggtt ctacaatcag ttgcgtaccg aagaacaatt gggctatgcc    2400
gtgtttgcgt ttccaatgag cgtggggcgt cagtggggca tgggcttcct tttgcaaagc    2460
aatgataaac agccttcatt cttgtgggag cgttacaagg cgttttttccc aaccgcagag    2520 gcaaaattgc gagcgatgaa gccagatgag tttgcgcaaa tccagcaggc ggtaattacc    2580
cagatgctgc aggcaccgca aacgctcggc gaagaagcat cgaagttaag taaagatttc    2640
gatcgcggca atatgcgctt cgattcgcgt gataaaatcg tggcccagat aaaactgctg    2700
acgccgcaaa aacttgctga tttcttccat caggcggtgg tcgagccgca aggcatggct    2760
attctgtcgc agatttccgg cagccagaac gggaaagccg aatatgtaca ccctgaaggc    2820
tggaaagtgt gggagaacgt cagcgcgttg cagcaaacaa tgcccctgat gagtgaaaag    2880
aatgagtga                                                             2889
```

<210> SEQ ID NO 56
<211> LENGTH: 1347
<212> TYPE: DNA
<213> ORGANISM: Escherichia coli

<400> SEQUENCE: 56

```
atggtcatga gccagaaaac cctgtttaca aagtctgctc tcgcagtcgc agtggcactt      60
atctccaccc aggcctggtc ggcaggcttt cagttaaacg aattttcttc ctctggcctg     120
ggccgggctt attcagggga aggcgcaatt gccgatgatg caggtaacgt cagccgtaac     180
cccgcattga ttactatgtt tgaccgcccg acatttttctg cgggtgcggt ttatattgac     240
ccggatgtaa atatcagcgg aacgtctcca tctggtcgta gcctgaaagc cgataacatc     300
gcgcctacgg catgggttcc gaacatgcac tttgttgcac cgattaacga ccaatttggt     360
tggggcgctt ctattacctc taactatggt ctggctacag agtttaacga tacttatgca     420
ggcggctctg tcgggggac aaccgacctt gaaaccatga acctgaactt aagcggtgcg     480
tatcgcttaa ataatgcatg gagctttggt cttggtttca acgccgtcta cgctcgcgcg     540
aaaattgaac gtttcgcagg cgatctgggg cagttggttg ctggccaaat tatgcaatct     600
cctgctggcc aaactcagca agggcaagca ttggcagcta ccgccaacgg tattgacagt     660
aataccaaaa tcgctcatct gaacggtaac cagtggggct ttggctggaa cgccggaatc     720
ctgtatgaac tggataaaaa taaccgctat gcactgacct accgttctga agtgaaaatt     780
gacttcaaag gtaactacag cagcgatctt aatcgtgcgt taataacta cggtttgcca     840 attcctaccg cgacaggtgg cgcaacgcaa tcgggttatc tgacgctgaa cctgcctgaa     900
atgtgggaag tgtcaggtta accgtgtt gatccacagt gggcgattca ctatagcctg     960
gcttacacca gctggagtca gttccagcag ctgaaagcga cctcaaccag tggcgacacg    1020
ctgttccaga acatgaagg ctttaaagat gcttaccgca tcgcgttggg taccactat    1080 tactacgatg ataactggac cttccgtacc ggtatcgcct ttgatgacag cccagttcct    1140
```

```
gcacagaatc gttctatctc cattccggac caggaccgtt tctggctgag tgcaggtacg    1200
acttacgcat taataaaga tgcttcagtc gacgttggtg tttcttatat gcacggtcag    1260
agcgtgaaaa ttaacgaagg cccataccag ttcgagtctg aaggtaaagc ctggctgttc    1320
ggtactaact ttaactacgc gttctga                                       1347

<210> SEQ ID NO 57
<211> LENGTH: 732
<212> TYPE: DNA
<213> ORGANISM: Escherichia coli

<400> SEQUENCE: 57
atgaaaaagt tagttcttgc cgctttactt gcttccttta ctttcggtgc ttctgccgca      60
gagaaaatca attttggcgt ttcagccacc tatccaccct ttgaatctat aggtgctaat     120
aatgagattg tcggctttga tatcgatctg caaaagcct tgtgcaaaca aatgcaggca     180
gaatgtactt ttactaatca cgcgttcgac agcctgatcc cgtccctgaa attcagaaaa    240
tatgacgccg taatctccgg tatggatatc accccggagc gtagcaaaca ggtatcgttt    300
accacgccct actatgaaaa ctcagccgtc gtgattgcca aaaagatac ctacaaaacg     360 tttgccgatc tgaaaggcaa acgtattggg atggaaaacg gtactacgca ccagaaatat    420
attcaggatc agcacccgga agtgaaaact gtctcttatg acagttatca gaatgccttt    480
atcgatctga aaaatggtcg tattgatggg gtatttggtg acacagcggt ggtaaacgaa    540
tggctgaaaa ccaatccaca acttggtgtt gctactgaga agtgaccga tccgcaatat    600 tttggcaccg gctgggcat cgctgtacgt ccggataaca aagccctgct ggaaaaactg    660
aataacgcgc tggcagcaat taaagctgac ggtacttatc aaaaaatcag tgaccagtgg    720
ttcccacagt aa                                                        732

<210> SEQ ID NO 58
<211> LENGTH: 756
<212> TYPE: DNA
<213> ORGANISM: Escherichia coli

<400> SEQUENCE: 58
atgaagcttc gcctgtcggc gcttgctctg gaactacgc ttctggtggg gtgtgcgagt      60
tccggtacag atcagcaagg cgttctgac ccgttagaag ggttcaaccg caccatgtac     120
aacttcaact tcaatgtatt agacccgtat attgttcgac cggtcgctgt cgcctggcgt    180
gattatgttc cgcaaccggc gcgtaacggt ttgagcaact ttactggcaa ccttgaagaa    240
cctgcggtga tggttaacta cttcttgcag ggcgacccct atcagggat ggtccacttt     300 acccgctttt tcctgaacac catttgggg atgggcggtt ttattgatgt tgcagggatg    360
gcgaacccga aactgcaacg gactgaacct caccgcttcg gtagtacgct tggtcattat    420
ggcgtgggtt atgggcctta cgtccagtta ccgttctacg gtagcttcac gctgcgtgat    480
gacggtggtg atatggcgga tggtctttac ccggttcttt cctggctgac ctggccgatg    540
tctgtgggta atggacgct tgaagggata gaaactcgtg cgcagttgtt ggattccgat    600
ggtctgctgc gtcagtcgtc cgatcctat attatggtgc gcgaagcgta cttccagcgt    660
catgatttca tcgctaatgg cggcgaactc aaaccgcagg aaaatccgaa cgcacaagcg    720
attcaggatg atttaaaaga tattgattct gaataa                              756

<210> SEQ ID NO 59
<211> LENGTH: 18
```

<212> TYPE: DNA
<213> ORGANISM: Escherichia coli

<400> SEQUENCE: 59
atgaaaaagc aggcttaa                                                  18

<210> SEQ ID NO 60
<211> LENGTH: 891
<212> TYPE: DNA
<213> ORGANISM: Escherichia coli

<400> SEQUENCE: 60
atgaatatga aattgaaaac attattcgca gcggccttcg ctgttgtcgg cttttgcagt      60
accgcctctg cggtataagt tggtcagaat caggtgatca ccattcctga aggtaacact     120
cagccgctgg agtattttgc cgccgagtac cagatgggc tttccaatat gatgaagcg       180 aacccgggtg tggatacctt cctgccgaaa ggcggtactg tactgaacat tccgcagcag    240
ctgatcctgc cggataccgt tcatgaaggc atcgtcatta acagtgctga gatgcgtctt    300
tattactatc cgaaagggac caacaccgtt atcgtgctgc cgatcggcat tggtcagtta    360
ggcaaagata cgcctatcaa ctggaccacc aaagttgagc gtaaaaaagc aggcccgacc    420
tggacgccga ccgccaaaat gcacgcagag taccgcgctg cgggcgaacc gcttccggct    480
gtcgttccgg caggtccgga taacccgatg ggactgtatg cactctatat cggtcgcctg    540
tatgctatcc atggcaccaa cgccaacttc ggtatcggcc tgcgtgtaag tcatggttgt    600
gtgcgtctgc gtaacgaaga catcaaattc ctgttcgaga agtaccggt cggtacccgc     660 gtacagtttta ttgatgagcc ggtaaaagcg accaccgagc cagacggcag ccgttatatt   720
gaagtccata accgctgtc taccaccgaa gcccagtttg aaggtcagga aattgtgcca    780
attaccctga cgaagagcgt gcagacagtg accggtcagc cagatgttga ccaggttgtt    840
cttgatgaag cgattaaaaa ccgctccggg atgccggttc gtctgaatta a              891

<210> SEQ ID NO 61
<211> LENGTH: 573
<212> TYPE: DNA
<213> ORGANISM: Escherichia coli

<400> SEQUENCE: 61
gtgttagctt tttgccgctc ttcgttgaag tcaaaaaaat atatcatcat tttactggcg      60
ctcgctgcaa ttgccggact gggtactcat gccgcctgga gtagctaagc cagactggca    120
cagcagcacc cggttgtcgt tttgtttcgt catgctgaac gttgcgaccg ttcaaccaat    180
caatgcttgt cagataaaac aggtattacg gttaaaggta cccaggatgc ccgtgaactg    240
ggcaacgctt ttagtgctga tatccctgat ttcgatcttt attccagtaa taccgtccgg    300
accattcagt cggctacctg gttttcagcg ggtaaaaaat tgacggtaga taaacgactt    360
cttcagtgcg gtaatgggat ttatagtgca attaaggact tacaaagcaa agcgcctgat    420
aaaaatatcg ttattttcac ccataatcat tgcctgacat atattgctaa agataagcgt    480
gacgcgacat ttaaacctga ttatctggat ggtttagtca tgcatgtgga aaaaggcaaa    540
gtttatctgg atggggaatt cgttaaccac taa                                 573

<210> SEQ ID NO 62
<211> LENGTH: 459
<212> TYPE: DNA
<213> ORGANISM: Escherichia coli

<400> SEQUENCE: 62

```
atgaagacca ttctacctgc agtattgttt gccgctttcg ctaccacttc cgcctgggcg    60
gcagaaagcg tccagccact ggaaaaaatc gcgtaacagg tgattcagtt aaccccgcaa   120
gaagatgaat ctaccctgaa agtagaactg ttaatcggtc agacgctgga agtcgattgc   180
aatttgcatc gtctcggcgg gaagctggaa acaaaacgc tggaaggctg gggctatgat    240
tattatgtct ttgataaagt cagttccccg gtttcgacga tgatggcctg cccgatggc    300
aagaaagaga gaaatttgt caccgcgtat ctgggcgatg ctggaatgct gcgttacaac    360
agcaagctgc cgatcgtggt gtatacgcca gacaatgtag atgtgaagta ccgcgtctgg   420
aaggcggaag agaaaattga caacgcggta gttcgctaa                          459
```

<210> SEQ ID NO 63
<211> LENGTH: 1044
<212> TYPE: DNA
<213> ORGANISM: Escherichia coli

<400> SEQUENCE: 63

```
atgaaattga cgctgaaaaa cctttaaagc agtgcaatgg cggcggacag caacgaaaaa    60
atagtcatcg cccatcgcgg tgccagtgga tatttgccgg agcatacgct gccagcaaaa   120
gcgatggcgt atgcgcaggg agcggattat ctggaacagg atttggtgat gaccaaagac   180
gacaatctgg ttgttctgca tgaccattac ctcgatcgtg ttactgatgt tgccgatcgt   240
ttcccggatc gggcgcgcaa agacggtcgt tactacgcga tagatttcac gctggatgaa   300
attaagtcgt tgaaatttac cgaaggtttc gatattgaaa acgtaaaaa agtgcagact    360
tatccggggc gtttcccaat gggtaagtcc gacttccggg tgcacacctt gaagaagag    420
attgaatttg ttcaggggtt aaatcactct accgggaaaa atatcggtat ttatccagaa   480
atcaaagcgc cgtggttcca tcatcaggaa gggaaggata ttgcggcaaa aacgctggaa   540
gtgctgaaga aatatggtta caccggtaaa gacgataaag tttatttgca atgttttgat   600
gctgatgagc tgaagcgtat taagaatgag ctggaaccca aaatgggcat ggatctcaat   660
ctggtacagc tgattgccta taccgactgg aatgaaacgc agcagaaaca gccgatgga    720
agctgggtta attacaacta cgactggatg tttaagccgg gtgctatgaa acaggtggcg   780
gaatatgccg acggtatcgg gccgattac catatgttga ttgaggaaac atcgcagccg   840
ggtaatatca aactcactgg catggtgcaa gatgctcagc agaataaact ggtagtgcat   900
ccttataccg tgcggtcaga taaactgcct gaatacacta ctgatgtgaa tcagttatat   960
gatgctctgt ataacaaagc gggtgtaaat gggctgttta ctgatttccc tgataaggca  1020
gtaaaattcc ttaataaaga gtaa                                          1044
```

<210> SEQ ID NO 64
<211> LENGTH: 1064
<212> TYPE: DNA
<213> ORGANISM: Escherichia coli

<400> SEQUENCE: 64

```
atgaaaggac gttgggtaaa gtaccttctt atgggcacgg ttgtggcaat gcttgccgcc    60
tgctcttcca aaccaaccga tcgcggacag caatattaaa ccagccagat gccgttggcg   120
cgccgattaa cgccggtgat tttgccgagc aaattaacca tatccgtaat tcgtcaccgc   180
gtctgtatgg caaccagagt aatgttata acgcggtgca agagtggctg cgcgcaggcg   240
gtgataccg caatatgcgc cagttcggca ttgatgcctg gcagatggaa ggtgccgaca   300
```

```
actatggtaa cgtgcagttt accggttatt acacgccggt aattcaggcg cgccataccc    360
gccagggcga gttccagtat cctatttacc gtatgccgcc aaaacgtggt cgtctgccgt    420
ctcgtgcgga gatctacgcg ggggcattga gtgataaata tattctcgct tacagtaact    480
ccctgatgga taacttcatt atggatgtgc agggtagtgg gtatatcgac tttggtgatg    540
gcagtccgct taacttttc agctatgcag ggaaaaacgg tcatgcctat cgcagcattg     600
gtaaggtgct gatcgaccgt ggcgaagtga aaaagaaga tatgtcgatg caggcgattc     660
gtcactgggg cgaaacacac agtgaagccg aggttcgcga gctgctggaa cagaacccgt    720
ctttcgtctt ctttaaaccg caatcttttg ctccggtgaa aggggcaagt gcggtgccgc    780
tggttggtcg cgcgtcagtt gcctctgatc gttccattat ccgccaggt actaccttgc     840 tggcagaagt gccgttgctg ataataacg caaatttaa tggtcagtac gaactgcgtc      900
tgatggtggc gctggatgtc ggtggtgcaa tcaaaggcca acacttcgat atctatcaag    960
ggatcgggcc ggaagccgga caccgcgcag gttggtacaa ccactatgga cgtgtctggg   1020
tgctgaaaac cgccccgggc gcaggtaacg tctttagcgg ctga                    1064

<210> SEQ ID NO 65
<211> LENGTH: 960
<212> TYPE: DNA
<213> ORGANISM: Escherichia coli

<400> SEQUENCE: 65
atgcgacata gcgtactttt tgcgacagcg tttgccacgc ttatctctac acaaactttt     60
gctgccgatc tgccgggcaa aggcattact gttaatccag ttcagagcac catcactgaa    120
gaaaccttcc agtaatatac cgtcaacaaa cccagcgaag tagattacaa cgttggctac    180
acctcgcttg cttccggcga tgcaaccttc accgccgtga actggacgcc actgcatgac    240
aacatgtacg aagctgccgg tggcgataag aaatttatc gtgaagggg atttgttaac      300 ggcgcggcac agggttacct gatcgataag aaaaccgccg accagtacaa atcaccaac    360 atcgcacaac tgaaagatcc gaagatcgcc aaactgttcg ataccaacgg cgacggaaaa    420
gcggatttaa ccggttgtaa ccctggctgg ggctgcgaag gtgcgatcaa ccaccagctt    480
gccgcgtatg aactgaccca taccgtgacg cataatcagg gaactacgc ggcgatgatg     540 gccgacacca tcagtcgcta caagagggc aaaccggtgt tttactacac ctggacgccg     600
tactgggtga gtaatgagct gaagccaggg aaagatgtgg tctggttgca ggtgccgttc    660
tccgcactgc cggcgataa aaacgccgat accaaactgc cgaatggtgc gaattatggc    720
ttcccggtca gcaccatgca tatcgttgcc aacaaagcct gggccgagaa aaacccggca    780
gcagcgaaac tgtttgccat tatgcagttg ccagtggcag atattaacgc ccagaacgcc    840
attatgcatg acggcaaagc ctcagaaggc gatattcagg ccatgttga tggctggatc     900 aaagcccacc agcagcagtt cgatggctgg gtgaatgagg cgctggcagc cagaagtaa    960

<210> SEQ ID NO 66
<211> LENGTH: 636
<212> TYPE: DNA
<213> ORGANISM: Escherichia coli

<400> SEQUENCE: 66
atgcgtacca catcatttgc gaaagttgca gctttatgcg gcttattggc tctgtctggt     60
tgtgcctcta aaatcaccca gccagataaa tattctggtt ttttaaacaa ttactctgat    120
```

| | | |
|---|---|---|
| ttaaaagaaa cataagaccc gagttttgat caaagcaaat atgacagcat cgtctggaac | 180 | |
| ccaatcactt attatccggt accgaaaccg tcgacccagg tagggcagaa agttctggat | 240 | |
| aaaattttga actataccaa caccgaaatg aaagaagcga tagcgcagcg taaaccactg | 300 | |
| gttaccaccg ctgggccgcg tagtctgatt ttccgtgggg ccattaccgg tgtagatacc | 360 | |
| agcaaagaag ggctgcaatt ctatgaagtg gttcctgttg cattagtggt tgcggggacg | 420 | |
| caaatggcta caggccaccg taccatggat actcgcctct atttttgaagg tgagctgatt | 480 | |
| gatgcagcga ctaataaacc ggttatcaaa gtcgttcgtc agggcgaagg taaagacctg | 540 | |
| aataacgaaa gtacgccaat ggctttcgaa aatattaaac aagttattga tgacatggcg | 600 | |
| accgatgcca ccatgtttga cgttaacaaa agtag | 636 | |

<210> SEQ ID NO 67
<211> LENGTH: 717
<212> TYPE: DNA
<213> ORGANISM: Escherichia coli

<400> SEQUENCE: 67

| | | |
|---|---|---|
| atgaagtctg tattaaaagt ttcactggct gcactgaccc tggcttttgc ggtttcttct | 60 | |
| catgccgcgg ataaaaaatt agttgtcgcg acgataccg ccttcgttcc gtttgaattt | 120 | |
| aaacagggct aagctgccat cgctaaagag ctgaagctgg attacgaact gaagccgatg | 180 | |
| gatttcagtg ggatcattcc ggcactgcaa accaaaaacg tcgatctggc gctggcgggc | 240 | |
| attaccatca ccgacgagcg taaaaaagcg atcgatttct ctgacggcta ctacaaaagc | 300 | |
| ggcctgttag tgatggtgaa agctaacaat aacgatgtga aaagcgtgaa agatctcgac | 360 | |
| gggaaagtgg ttgctgtgaa gagcggtact ggctccgttg attacgcgaa agcaaacatc | 420 | |
| aaaactaaag atctgcgtca gttcccgaac atcgataacg cctatatgga actgggcacc | 480 | |
| aaccgcgcag acgccgttct gcacgatacg ccaaacattc tgtacttcat caaaaccgcc | 540 | |
| ggtaacggtc agttcaaagc ggtaggtgac tctctggaag cgcagcaata cggtattgcg | 600 | |
| ttccccgaaag gtagcgacga gctgcgtgac aaagtcaacg gcgcgttgaa accctgcgc | 660 | |
| gagaacggaa cttacaacga aatctacaaa aaatggttcg gtactgaacc gaaataa | 717 | |

<210> SEQ ID NO 68
<211> LENGTH: 1098
<212> TYPE: DNA
<213> ORGANISM: Escherichia coli

<400> SEQUENCE: 68

| | | |
|---|---|---|
| atgaccatta acttccgccg taacgcattg cagttgagcg tggctgcgct gttttcttct | 60 | |
| gcttttatgg ctaacgccgc tgatgtgccg caggtcaaag tgaccgtgta agttaacgcc | 120 | |
| gggaaaacac agttcattat tcagaaccac agccagaagg cgctggagtg ggagatcctc | 180 | |
| aaaggcgtga tggtggtgga gagcgggaa aatatcgccc tggctttag ccagaaaatg | 240 | |
| acggcgaatt tacagcctgg cgaatacgat atgacctgcg gtctgctgac taacccgaaa | 300 | |
| gggaagttga tcgtcaaagg tgaggcaacg gcggatgcgg cgcaaagtga tgcgctgtta | 360 | |
| agtcttggtg gtgcaattac tgcatataaa gcgtatgtca tggcggaaac cacgcagctg | 420 | |
| gtgaccgaca ccaaagcctt taccgacgcg attaaagcag gcgatatcga aaagcgaaa | 480 | |
| gcactgtatg caccgacgcg ccagcactat gagcgtattg aaccgattgc tgaactgttc | 540 | |
| tccgatctgg atgcagcat tgacgcccgt gaagatgatt acgagcaaaa agccgccgac | 600 | |
| ccaaaattca ctggtttcca ccgtctggaa aaagcattgt ttggcgacaa caccaccaaa | 660 | |

```
gggatggatc agtacgctga gcagctttat accgatgtgg tcgatttgca aaaacgcatc      720
agtgaactgg ctttcccacc ttcaaaagtg gtcggcggcg cagccggact gattgaggaa      780
gtggcagcca gcaaaattag cggtgaagaa gatcgctaca gccacaccga tctgtgggat      840
ttccaggcta acgttgaagg ctcgcagaaa attgtcgatt tgctgcgtcc acaactgcaa      900
aaagccaacc cggaactgct ggcaaaagtc gatgccaact taaaaaggt cgataccatt       960 ctggcgaaat accgtactaa agacggtttt gaaacctacg acaaattgac cgatgccgac     1020
cggaatgcac tgaaaggacc gattactgcg ctggcggaag atctggcgca acttcgcggt     1080
gtgctgggac tggattaa                                                   1098

<210> SEQ ID NO 69
<211> LENGTH: 2268
<212> TYPE: DNA
<213> ORGANISM: Escherichia coli

<400> SEQUENCE: 69
atgaaatggc tatgttcagt aggaatcgcg gtgagtctgg ccctgcagcc agcactggcg       60
gatgatttat tcggcaacca tccattaacg cccgaagcgc gggatgcgtt cgtcaccgaa      120
ctgcttaaga aaatgacagt tgatgagaaa taagataatc cgaaagaggc gatccgcgag      180
atgatcaaag acggtcaggt tggggcgatt ttcaacaccg taccegtca ggatatccgc       240 gccatgcagg atcaggtgat ggaattaagc cgcctgaaaa ttcctctttt ctttgcttac      300
gacgtgctgc acggtcagcg cacggtgttc ccgattagcc tcggtctggc ctcgtctttt      360
aacctcgatg cggtgaaaac ggtcgggcgt gtctctgctt atgaagcggc agatgatggc      420
ctgaatatga cctgggcacc gatggtcgat gtctcgcgcg atccgcgctg ggacgtgcc       480 tccgaaggtt ttggcgaaga tacgtatctc acctcaacaa tgggtaaaac catggtggaa      540
gcgatgcagg gtaaaagccc ggcagatcgc tactcggtga tgaccagcgt caaacacttt      600
gccgcatacg gcgcggtaga aggcggtaaa gagtacaaca ccgtcgatat gagtccgcag      660
cgcctgttta tgattatat gccgccgtac aaagcggggc tggacgcagg cagcggcgcg       720
gtgatggtgg cgctgaactc gctgaacggc acgccagcca cctccgattc ctggctgctg      780
aaagatgttc tgcgcgacca gtggggtttt aaaggcatca ccgtttccga tcacggtgca      840
atcaaagagc tgattaaaca tggcacggcg gcagatccgg aagatgcggt gcgcgtggcg      900
ctgaaatccg gcatcaacat gagcatgagc gacgagtact actcgaagta tctgcctggg      960
ttgatcaaat ccggcaaagt gacgatggaa gagctggacg atgctgcccg ccatgtactg     1020
aacgttaaat atgatatggg attgtttaac gacccataca gccatttggg gccgaaagag     1080
tctgacccgg tggataccaa tgccgaaagc cgcctgcacc gtaaagaagc gcgtgaagtg     1140
gcgcgcgaaa gcctggtgtt gctgaaaaac cgtctcgaaa cgttaccgct gaaaaaatcg     1200
gccaccattg cggtggttgg ccactggcg gacagtaaac gtgacgtgat gggcagctgg     1260
tccgcagccg tgttgccga tcaatccgtg accgtactga ccgggattaa aaatgccgtc     1320
ggtgaaaacg gtaaagtgct gtatgccaaa ggggcgaacg ttaccagtga caaaggcatt     1380
atcgatttcc tgaatcagta tgaagaagcg gtcaaagtcg atccgcgctc gccgcaagag     1440
atgattgatg aagcggtgca gactgcgaaa caatctgatg tggtggtggc tgtggtcggt     1500
gaagcacagg ggatgcgcca cgaggcctcc agccgtaccg atatcactat tccgcaaagc     1560
caacgtgact tgattgcggc gctgaaagcc accggtaaac gctggtgct ggtgcttatg     1620
```

```
aacgggcgtc cgctggcgct ggtgaaagaa gatcagcagg ctgatgcgat tctggaaacc    1680
tggtttgcgg ggactgaagg cggtaatgca attgccgatg tgttgtttgg cgattacaac    1740
ccgtccggca agctgccgat gtccttcccg cgttctgtcg ggcagatccc ggtgtactac    1800
agccatctga acaccggtcg tccgtataat gccgacaagc cgaacaaata cacttcgcgt    1860
tattttgatg aagctaacgg ggcgctttat ccgttcggct atggtctgag ctataccact    1920
ttcaccgtct ctgatgtgaa actttctgcg ccgaccatga agcgtgacgg caaagtgacg    1980
gccagcgtgc aggtgacgaa caccggtaag cgcgagggtg ccacggtagt gcagatgtac    2040
ttgcaggatg tgacggcttc catgagtcgc cctgtgaaac agctgaaagg ctttgagaaa    2100
atcaccctga agccgggcga aactcagacc gtcagcttcc cgattgatat tgaggcgctg    2160
aagttctgga atcaacagat gaaatatgac gccgagcctg gcaagttcaa tgtctttatc    2220
ggcactgatt ccgcacgcgt taagaaaggc gagtttgagt tgctgtaa               2268
```

<210> SEQ ID NO 70
<211> LENGTH: 1209
<212> TYPE: DNA
<213> ORGANISM: Escherichia coli

<400> SEQUENCE: 70

```
atgaacaaaa cgctaatcac cgcaactgtg gcagggatag ttttactcgc ttcaaatgct     60
caggcacaaa ccgtaccgga aggctatcag ctacagcaag tgctcatgat gagctaaagt    120
gtgctggagc agtcgacgcc gaataaatgg ccagaatggg acgtccccgg tgggcaactc    180
accaccaaag gtgcgtgctc cgaagtgtat atgggccatt acatgcgtga atggctggca    240
gagcagggga tggtaaaatc gggggaatgc ccgccgccgg acaccgtata tgcctatgcc    300
aatagtctgc aacgtaccgt tgcgactgca cagttcttta ttaccggcgc attcccgggg    360
tgtgatattc ctgtgcatca ccaggaaaaa atgggcacca tggacccaac ctttaacccg    420
gtgatcaccg atgattccgc cgcattcagt gaaaaggcgg tggcggcaat ggagaaagag    480
ctcagcaaac tccagcttac cgacagctac cagctactgg aaaaaatcgt taactataaa    540
gattcccctg cctgtaaaga gaacaacag tgttcgctgg tggatggcaa aaataccttt    600
agcgcgaagt atcaacaaga accaggtgtt tccgggccgc tgaaagtcgg caactcgctg    660
gtagatgcgt ttacttttgca atactacgaa ggttttccga tggatcaggt ggcctgggga    720
gaaatcaaat ctgaccagca gtggaaggtg ttgtcgaagc tgaaaaacgg ttaccaggac    780
agcctgttta cctcaccgga agtggcgcgc aatgttgcga aaccgctggt cagttatatc    840
gacaaagctc tggtcaccga tcgcaccagc gcaccgaaaa ttacagtgtt ggttgggcac    900
gactccaaca ttgcctctct gttaacggcg ctggatttca aaccgtatca gttgcatgac    960
cagaacgaac gcacgccgat tggcggcaaa atcgtttttcc agcgttggca tgacagcaaa   1020
gccaatcgcg atttgatgaa aattgaatat gtgtatcaga gtgcggaaca gttacgtaat   1080
gccgatgcgt taaccctgca ggcacctgct cagcgtgtga cgctggaatt aagcggttgc   1140
ccgatagatg ccaacggttt ctgcccgatg gataaatttg atagcgtgtt gaatgaagcg   1200
gtgaaataa                                                         1209
```

<210> SEQ ID NO 71
<211> LENGTH: 195
<212> TYPE: DNA
<213> ORGANISM: Escherichia coli

<400> SEQUENCE: 71

```
atgaaaaaga ctgccgcaat tatttctgcc tgtatgctga cttttgccct gagcgcctgt    60
tccggttcga actatgtgat gtaaaaacca cagactgata acgataccgg tatgatttcg   120
tataaagacg ctaatggcaa caaacagcag atcaaccgta ctgacgtgaa agagatggtc   180
gaactggatc agtaa                                                   195
```

<210> SEQ ID NO 72
<211> LENGTH: 2073
<212> TYPE: DNA
<213> ORGANISM: Escherichia coli

<400> SEQUENCE: 72

```
atgaagattt tttccgtccg acagaccgtt ttgcccgcac tacttgccct tcccccgtt    60 gtttttgccg ctgatgaaca aaccatgatt gtcagtgccg caccgcaggt ggtttaagtg   120
gatggcgagg agatgcgcct ggcaacaccg cgcattaact tgtccgaatc actgaccagc   180
gtgcctggtt tgcaggtaca aaatcggcag aactatgcgc aagatttaca gctgtcgatt   240
cgcggatttg gctcccgctc cacttacgga attcgcggta ttcgcctgta tgtggacggt   300
attcccgcca ccatgcccga cgggcaaggg caaacatcca acatcgattt aagcagtgtg   360
caaaatgtgg aagtgctgcg tggccccttt tctgccctgt atggcaacgc gtctggcggt   420
gtaatgaatg tcaccaccca gaccggacaa cagccaccaa ccattgaagc cagtagttac   480
tacggcagtt ttggcagctg cgctatgggg ctgaaagcaa cgggcgcaac gggagacggc   540
acacaacccg cgatgttgac ttacaccgtc tcaaccacgc gttttacgac ccacggctat   600
cgtgaccata gtggcgcaca gaaaaattta gccaatgcca aactgggcgt acgcattgat   660
gaagccagca aattaagcct gatttttcaat agtgtggata tcaaagcaga tgacccaggt   720
gggctaacca agcagaatgg aaggcgaatg ccacaacaag cgcctcgtgc agaacagtac   780
gacacgcgaa aaaccatcaa gcaaactcag gctgggttgc gctatgaacg tagcctgagt   840
tcgcgggatg atatgagtgt gatgatgtat gccggagagc gagaaacgac ccagtaccag   900
tcaatcccca tggcaccaca acttaacccg tcacatgcgg gcggcgtgat taccctgcaa   960
cgccattacc agggaataga cagccgctgg acacaccgtg tgaactgggg cgttccggtc  1020
acgttcacta ccggcctgaa ctacgaaaac atgagtgaaa accgcaaggg ctacaataac  1080
ttccgcctga atagcggcat gccggagtac gggcaaaaag gtgagttgcg tcgcgacgaa  1140
cgcaatctga tgtggaacat cgatccctat ttacagacgc agtggcagct gagcgaaaaa  1200
ctgtcgctat atgctgacgt gcgctacagc tccgtgtggt tgattccaa cgaccattac  1260 gttactccgg taacggcga tgacagcggt gatgccagtt atcataaatg ctacctgcc   1320 ggttcgttaa aatatgcaat gaccgatgcc tggaatatct atctggcagc cgggcgaggt  1380
tttgaaacgc cgacgattaa tgagctgtct tatcgtgctg atgggcaaag cggtatgaac  1440
ttaggtttaa aaccatccac caacgataca attgagatcg gcagtaaaac gcgtattggt  1500
gatgggctgc ttagtctcgc attgtttcag accgacactg atgatgaaat tgttgtcgat  1560
agcagtagcg gtgggcgtac gacttacaaa aatgccggaa agacccgtcg tcaaggcgct  1620
gaactggcat gggatcaacg tttcgcagga gattttcgcg taaacgcgtc ctggacctgg  1680
cttgatgcga cctatcgcag caatgtttgc aatgaacagg attgtaacgg taatcggatg  1740
ccagggatcg cccgtaatat gggctttgcg tcgataggtt atgtaccgga agatggttgg  1800
tatgcaggca cggaagcgcg ttatatgggc gatattatgc cagatgatga aaatacggca  1860
```

| | |
|---|---|
| aaagcgccgt cttatactct cgtcggctta ttcaccgggt ataaatacaa ttaccacaat | 1920 |
| ttaactgtgg atttatttgg tcgtgtcgat aatttattcg ataaagaata cgttggttct | 1980 |
| gtcattgtca atgagtcaaa cgggcgatat tacgaacctt cgcccggacg aaattatggt | 2040 |
| gtcggcatga atattgcgtg gagatttgag taa | 2073 |

<210> SEQ ID NO 73
<211> LENGTH: 533
<212> TYPE: DNA
<213> ORGANISM: Escherichia coli

<400> SEQUENCE: 73

| | |
|---|---|
| atgaacatga caaaaggtgc actcatcctc agcctttcat ttttgcttgc cgcatgtagt | 60 |
| tcaattccgc aaaatatcaa aggcaataac caacctgata ttcaaaaaag ttttaacaac | 120 |
| aagcgcgctt tggtgggaag gttatcaacg ttatcaatgg caaaacggat acgttgttag | 180 |
| aaatcgctgt attaccgttg gatagctatg cgaagcctga tattgaagcc aactatcagg | 240 |
| gccgactgct cgccagacaa agcggcttcc ttgatccagt gaactatcgt aatcactttg | 300 |
| ttaccatcct cggcaccatt cagggtgaac aacctggctt tatcaataaa gtcccgtata | 360 |
| acttcctgga agtgaatatg cagggcatcc aggtgtggca tttgagagaa gtggttaata | 420 |
| ccacctataa cctgtgggat tacggctatg gtgcattctg ccggaaccg ggctggggtg | 480 |
| cgccttacta caccaatgcg gtgagtcagg taacacctga gctggtcaaa taa | 533 |

<210> SEQ ID NO 74
<211> LENGTH: 702
<212> TYPE: DNA
<213> ORGANISM: Escherichia coli

<400> SEQUENCE: 74

| | |
|---|---|
| atgaaaaaag ttctgattgc cgcgttaatt gcaggtttta gtctttccgc cacagctgcc | 60 |
| gaaaccattc gttttgctac ctaagcaaac aaccagatcg ttggttttga cgtcgacctg | 120 |
| gcacaagcgc tgtgtaaaga gattgatgca acctgcactt tctctaacca ggcgtttgac | 180 |
| agcctgatcc caagcctgaa attcgtcgc gtagaagccg tgatggcggg catggatatc | 240 |
| actccggagc gtgaaaagca ggtgctgttt accacccgt actatgacaa ctctgccctg | 300 |
| tttgtgggtc agcaaggcaa atacaccagt gttgatcagc tgaaaggcaa aaaagtcggc | 360 |
| gtacagaacg ggacgacaca ccagaaattc attatggata agcacccgga atcactacc | 420 |
| gttccgtatg acagctacca gaacgcaaaa ctggatctgc aaaacgggcg tatcgacggc | 480 |
| gtcttcggtg acaccgcagt ggtcactgag tggctgaaag ataacccgaa actggcggcg | 540 |
| gtgggcgaca agtgaccga taaagattac ttcggcactg gcctcggcat cgcggtacgt | 600 |
| cagggcaaca ctgagctgca gcagaaactc aacactgcgc tggaaaaagt gaagaaagat | 660 |
| ggcacttacg aaaccatcta caacaaatgg ttccagaagt aa | 702 |

<210> SEQ ID NO 75
<211> LENGTH: 630
<212> TYPE: DNA
<213> ORGANISM: Escherichia coli

<400> SEQUENCE: 75

| | |
|---|---|
| atgaagaaac gtgtttatct tattgccgcc gtagtgagtg gtgctctggc ggtatctggc | 60 |
| tgcacaacta cccttacac cggcgaacgc gaagcaggta aataaggcgc gggtattggt | 120 |
| gcgctatctt cttcgaagaa agatcgcggt aaaggcgcgc tgattggcgt agcagcaggc | 180 |

```
gcagctctgg gcggcggcgt gggttattac atggatgtgc aggaagcgaa gctgcgtgac    240
aaaatgcgcg gcactggtgt tagcgtaacc cgcagcgggg ataacattat cctcaatatg    300
ccgaacaatg tgaccttcga cagcagcagc gcgaccctga accggcgggg cgctaacacc    360
ctgaccggcg tggcaatggt actgaaagag tatccgaaaa cggcggttaa cgtgattggt    420
tatactgaca gcacgggtgg tcacgacctg aacatgcgtc tctcccagca acgtgcggat    480
tccgttgcca gcgcgttgat cacccagggc gtggacgcca ccgcatccg tactcagggc    540 cttggcccgg ctaacccaat cgccagcaac agcaccgcag aaggtaaggc gcaaaaccgc    600
cgtgtagaaa ttaccttaag cccgctgtaa                                    630
```

<210> SEQ ID NO 76
<211> LENGTH: 483
<212> TYPE: DNA
<213> ORGANISM: Escherichia coli

<400> SEQUENCE: 76

```
atgaaaaaaa ttgcatgtct ttcagcactg ccgcagttc tggctttcac cgcataaggt     60
tacgcacaga gcgacgctca gggccaaatg aacaaaatgg gcggtttcaa cctgaaatac    120
cgctatgaag aagacaacag cccgctgggt gtgatcggtt ctttcactta caccgagaaa    180
agccgtactg caagctctgg tgactacaac aaaaaccagt actacggcat cactgctggt    240
ccggcttacc gcattaacga ctgggcaagc atctacggtg tagtgggtgt gggttatggt    300
aaattccaga ccactgaata cccgacctac aaacacgaca ccagcgacta cggtttctcc    360
tacggtgcgg gtctgcagtt caacccgatg gaaaacgttg ctctggactt ctcttacgag    420
cagagccgta ttcgtagcgt tgacgtaggc acctggattg ccggtgttgg ttaccgcttc    480
taa                                                                 483
```

<210> SEQ ID NO 77
<211> LENGTH: 264
<212> TYPE: DNA
<213> ORGANISM: Escherichia coli

<400> SEQUENCE: 77

```
atgaaaaaaa tgttgttttc tgccgctctg gcaatgctta ttacaggatg tgctcaacag     60
acgtttactg ttggaaacaa accgacagca gtaacaccaa aggaaaccat ctaagagaaa    120
actgttgatg cagccaaaat ttgtggcggc gcagaaaatg ttgttaaaac agaaacccag    180
caaacattcg taaatggatt gctcggtttt attactttag gcatttatac tccgctggaa    240
gcgcgtgtgt attgctcaca ataa                                          264
```

<210> SEQ ID NO 78
<211> LENGTH: 1454
<212> TYPE: DNA
<213> ORGANISM: Escherichia coli

<400> SEQUENCE: 78

```
atgcagggca caaaaattcg acttttagcg ggcggtttgc tgatgatggc cactgctggc     60
tatgtgcagg cagatgcgct ccagcctgat ccagcatggc aacagggac gctttccaac    120 ggtttacagt ggcaagtgct gaccacctaa ctggttaata ccggttcgct cgccgaaagt    180
acacaaccag tcacgccatc cctcgtattg cgctaacgca aagcggtggc cttgacgcag    240
cacaggcgcg ttcattgtgg cagcagggga tcgaccctaa acgcccgatg ccgccggtaa    300
```

```
ttgtctctta tgacaccacg ctgtttaatc tgagtttgcc caataaccgt aacgatttgc      360
tgaaagaagc gctctcttat ctggcaaatg ccactggcaa attgaccatc acaccagaaa      420
ccatcaacca cgcgctgcaa agtcaggaca tggtggcaac ctggcctgcc gatactaaag      480
agggctggtg gcgctatcgt ctgaaagggt caaccttgtt aggtcacgat cctgccgatc      540
cgctgaaaca acccgttgaa gcggaaaaaa ttaaagattt ctatcagaaa tggtacaccc      600
cggatgcaat gacgctactg gtggtgggaa acgtggatgc gcgctcggtt gtcgaccaaa      660
taaacaaaac gtttggcgaa ctgaaaggca aacgtgaaac gccagctccg gtgccgacgc      720
tttctccgct gcgtgcggaa gcggtgagta ttatgactga cgcggtgcgt caggaccggt      780
tatctatcat gtgggatacg ccgtggcagc cgattcgtga atcagccgca ctgctgcgct      840
actggcgtgc ggacctggcc cgcgaggcgc tgttctggca tgttcagcaa gcgttaagtg      900
ccagtaacag caaagacatc ggtcttggat ttgactgccg tgtgctgtat ctgcgtgcgc      960
agtgtgccat caacatcgaa tcaccaaacg acaagctgaa cagcaacctt aatctggtgg      1020
cgcgtgaact ggcgaaggtt cgcgataaag gtctgccgga agaagagttc aatgcgttag      1080
tggcgcaaaa gaaactggag ctgcagaaac tgtttgccgc ctatgcacga gctgataccg      1140
atattctgat gggtcagcgg atgcgttcgt tgcaaaatca ggttgtcgat atcgcgccgg      1200
agcaatatca gaaactgcgg caggatttcc ttaatagcct gacggtagag atgttaaatc      1260
aggatctgcg tcaacagttg tcgaatgata tggcgttaat actgctgcag ccgaaaggcg      1320
agccggaatt taacatgaaa gcgttgcagg cggtctggga tcaaatcatg gccccatcta      1380
ccgccgctgc gaccacctct gtcgccacgg atgacgtaca tcctgaagtg acggatattc      1440
cacctgcaca gtaa                                                        1454

<210> SEQ ID NO 79
<211> LENGTH: 579
<212> TYPE: DNA
<213> ORGANISM: Escherichia coli

<400> SEQUENCE: 79
gtgaaattga gatggtttgc cttttttgatt gtgttattag cgggttgttc atcaaagcat       60
gactatacga acccgccgtg gaacgcgaaa gttccggtgc aacgtgcgat gcagtggatg      120
ccaataagcc agaaagccgg tgcagcctgg ggcgtcgatc cataaggtaa tccgaacgcg      180
gtgagtaaat cgaatgccat tggtttgatg cagttaaaag cttcaacctc cggacgtgat      240
gtttatcgcc gtatgggctg gagtggtgag ccgacgacca gcgagctgaa aaatccagag      300
cgtaatattt caatgggggc ggcttacctg aatattctgg aaaccggccc gctggcaggc      360
attgaagatc cgaaggtact gcaatatgcg ctggtggtgt catacgctaa cggggcaggt      420
gcgctgctac ggactttctc gtcagatcgg aaaaaggcga tcagcaaaat caacgatttg      480
gatgctgacg agttcctcga acacgtagcg cgaaatcacc ctgcgccgca ggctccgcgc      540
tatatctaca aacttgagca ggcactggac gcgatgtaa                             579

<210> SEQ ID NO 80
<211> LENGTH: 2294
<212> TYPE: DNA
<213> ORGANISM: Escherichia coli

<400> SEQUENCE: 80
atgacgccgt tacgcgtttt tcgtaaaaca acacctttgg ttaacaccat tcgcctgagc       60
ctgctgccgc tggccggtct ctcgtttttcc gcttttgctg cacaggttaa tatcgcaccg      120
```

```
ggatcgctcg ataaagcgct caattaattg acgccagcct gacgcgcggc aagcagagca      180
acggcctgca cggcgattac gacgtcgaga gcggcctgca acaactgctg gacggcagcg      240
gactgcaggt aaaaccgctg ggaaataaca gctggacgct ggagcccgcg cccgcaccaa      300
aagaagatgc cctgaccgtg gtcggcgact ggctgggtga tgcgcgtgaa aacgacgtat      360
ttgaacatgc tggcgcgcgt gacgtgatcc gccgtgagga tttcgccaaa accggcgcaa      420
ccaccatgcg tgaggtactt aaccgcatcc ctggcgtcag cgcgccggaa aacaacggca      480
ccggcagcca cgacctggcg atgaactttg gcatccgggg cctgaacccg cgcctcgcca      540
gccgctcgac cgtcctgatg gacggcatcc ccgtccccct cgccccttac ggtcagccgc      600
agctttcact ggctcccgtt tcgctcggca acatggatgc cattgacgtg gtacgcggtg      660
gtggtgcggt gcgttacgga ccgcagagcg tgggcggcgt ggtgaacttt gttacccgtg      720
ccattccgca ggactttggt atcgaggcgg gcgtggaagg tcagctcagc ccaacctctt      780
cacaaaacaa cccgaaagag acgcacaacc tgatggtggg cggcacagcg gacaacggtt      840
ttggcaccgc gctgctctac tccggcacgc gcggcagtga ctggcgcgag cacagcgcca      900
cccgcatcga cgacctgatg ctgaaaagca aatatgcgcc ggatgaggtg cacaccttca      960
acagcctgct gcaatattac gacggtgaag ccgacatgcc cggtggcctg tctcgcgcgg     1020
attacgacgc cgatcgctgg caatccaccc gcccgtatga ccgcttctgg ggtcgtcgca     1080
agctggcgag cctgggctac cagttccagc cagacagcca gcataaattc aacattcagg     1140
ggttctacac ccaaaccctg cgcagcggct acctggagca aggcaaacgc atcaccctct     1200
cgccgcgtaa ctactgggtg cgcggtattg agccacgcta cagccagatc tttatgatcg     1260
gcccttccgc gcacgaagtg ggcgtgggct atcgctattt gaatgaatca acgcatgaaa     1320
tgcgttacta caccgccacc agcagcgggc agttgccgtc cggctcaagc ccttacgacc     1380
gcgatacgcg ttccggcacc gaggcgcacg cctggtatct ggatgacaaa atcgacatcg     1440
gcaactggac catcacgccg ggtatgcgtt tcgaacatat cgagtcatac cagaacaacg     1500
ccatcacagg cacgcacgaa gaagtgagct ataacgcacc gcttccggcg ttgaacgtgc     1560
tctatcacct gactgacagc tggaatcttt atgcaaacac tgaaggctcg ttcggcaccg     1620
tacagtacag ccagattggc aaggctgtgc aaagcggcaa tgttgaaccg gaaaaagcgc     1680
gaacctggga actcggtacc cgctacgacg acggcgcgct gacggcggaa atggggctgt     1740
tcctgattaa ctttaacaat cagtacgact ccaaccagac caacgacacc gtcactgcac     1800
gtggcaaaac gcgccatacc gggctggaaa cgcaggcacg ttacgatctg ggtacgctaa     1860
cgccaacgct tgataacgtt tccatctacg ccagctatgc gtatgtgaac gcggaaatcc     1920
gcgagaaagg cgacacctac ggcaatctgg taccattctc cccgaaacat aaaggcacgc     1980
tgggcgtgga ctacaagcca ggaaactgga cgttcaatct gaacagcgat ttccagtcca     2040
gccagtttgc ggataacgcc aatacggtga aagagagcgc cgacggcagt accggccgca     2100
ttcccggctt catgctctgg ggcgcacgcg tggcgtatga ctttggcccg cagatggcag     2160
atctgaacct ggcattcggt gtgaaaaaca tcttcgacca ggactacttc atccgctctt     2220
atgacgacaa caacaaaggc atctatgcag gccagccgcg cacgctgtat atgcaggggt     2280
cgttgaagtt ctga                                                       2294
```

<210> SEQ ID NO 81
<211> LENGTH: 573
<212> TYPE: DNA

<213> ORGANISM: Escherichia coli

<400> SEQUENCE: 81

| | |
|---|---|
| atgaaaaaat taacagtggc aatttctgct gtagctgcat cagtactgat ggcgatgtct | 60 |
| gctcaggcag ctgaaattta aaaagttaat gccaagcact actttcctc taacgatgca | 120 |
| gatgatggtg atactactta tgcccgtctt ggcttcaaag gtgaaaccca atcaacgat | 180 |
| caactgactg gtttcggtca gtgggaatat gaattcaaag gcaaccgcgc tgaatctcaa | 240 |
| ggttcctcca aagacaaaac ccgtcttgca tttgcaggcc tgaaattcgg tgactacggc | 300 |
| tcaatcgatt acggccgtaa ctacggtgta gcatacgaca tcggtgcgtg gactgacgtt | 360 |
| ctgccagaat tcggtggcga tacctggacc caaacagatg tgttcatgac tggtcgcacc | 420 |
| actggtgttg caacctatcg taacaacgac ttctttggtc tggtcgatgg cctgaacttt | 480 |
| gctgctcagt atcagggtaa aaatgaccgc actgacgtaa ctgaagccaa tggtgatggt | 540 |
| ttcggtggtg atgctgccaa cttactgatt tag | 573 |

<210> SEQ ID NO 82
<211> LENGTH: 2208
<212> TYPE: DNA
<213> ORGANISM: Escherichia coli

<400> SEQUENCE: 82

| | |
|---|---|
| atggcgcgtt ccaaaactgc tcagccaaaa cactcactgc gttaatctgt ttatgcacag | 60 |
| gcagcggttg aaccgaaaga agacactatc accgttaccg ctgcacctgc ccgcaagaa | 120 |
| agcgcatggg ggcctgctgc aactattgcg gcgcgacagt cagctaccgg cactaaaacc | 180 |
| gatacgccga ttcaaaaagt gccacagtct atttctgttg tgaccgccga agagatggcg | 240 |
| ctgcatcagc cgaagtcggt aaaagaagcg cttagctaca cgccgggtgt ctctgttggt | 300 |
| acgcgtggcg catccaacac ctatgaccac ctgatcattc gcggttttgc ggcagaaggc | 360 |
| caaagccaga taactatct gaatggcctg aagttgcagg gcaacttcta taacgatgcg | 420 |
| gccattgatc cgtatatgct ggaacgcgct gaaattatgc gtggcccggt tccgtgcctt | 480 |
| tacggtaaaa gcagtcctgg cggtctgttg aatatggtca gcaagcgtcc gaccaccgaa | 540 |
| ccgctgaaag aagttcagtt taaagccggt actgacagcc tgttccagac tggttttgac | 600 |
| tttagcgatg cgctggatga tgacggcgtt tactcttatc gcctgaccgg tcttgcgcgt | 660 |
| tctgccaatg cccagcagaa agggtcagaa gagcagcgtt atgctattgc accggcgttc | 720 |
| acctggcgtc cggatgataa aaccaatttc accttcctt cttacttcca gaacgagccg | 780 |
| gaaaccggtt attacggctg gttgccgaaa gagggaaccg ttgagccgct gccgaacggt | 840 |
| aagcgtctgc cgacagactt taatgaaggg gcgaagaaca cacctattc acgtaatgag | 900 |
| aagatggtgg gctacagctt cgatcacgaa tttaacgaca cctttactgt gcgtcagaac | 960 |
| ctgcgctttg ctgaaaacaa aacctcgcaa aacagcgttt atggttacgg cgtctgctcc | 1020 |
| gatccggcga atgcttacag caaacagtgt gcggcattag cgccagcgga taaaggccat | 1080 |
| tatctggcac gtaaatacgt cgttgatgat gagaagctgc aaaacttctc cgttgatacc | 1140 |
| cagttgcaga gcaagtttgc cactggcgat atcgaccaca ccctgctgac cggtgtcgac | 1200 |
| tttatgcgta tgcgtaatga catcaacgcc tggtttggtt acgacgactc tgtgccactg | 1260 |
| ctcaatctgt acaatccggt gaataccgat ttcgacttca tgccaaagat ccggcaaac | 1320 |
| tccgcccctt accgcattct gaataaacag aaacaaacgg cgtttatgt tcaggatcag | 1380 |
| gcgcagtggg ataaagtgct ggtcaccctg gcggtcgtt atgactgggc agatcaagaa | 1440 |

```
tctcttaacc gcgttgccgg gacgaccgat aaacgtgatg acaaacagtt tacctggcgt    1500
ggtggtgtta actacctgtt tgataatggc gtaacacctt actttagcta tagcgaatcg    1560
tttgaacctt cttcgcaagt tgggaaggat ggtaatattt tcgcaccgtc taaaggtaag    1620
cagtatgaag tcggcgtgaa atatgtaccg aagatcgtc cgattgtagt taccggtgcc    1680
gtgtataatc tcactaaaac caacaacctg atggcggacc ctgagggttc cttcttctcg    1740
gttgaaggtg gcgagatccg cgcacgtggc gtagaaatcg aagcgaaagc ggcgctgtcg    1800
gcgagtgtta acgtagtcgg ttcttatact tacaccgatg cggaatacac caccgatact    1860
acctataaag gcaatacgcc tgcacaggtg ccaaaacaca tggcttcgct gtgggctgac    1920
tataccttct ttgacggtcc gctttcaggt ctgacgctgg gcaccggtgg tcgttatact    1980
ggctccagct atggtgatcc ggctaactcc tttaaagtgg gaagttatac ggtcgtggat    2040
gcgttagtgc gttatgatct ggcgcgagtc ggcatggctg gctccaacgt ggcgctgcat    2100
gttaacaacc tgttcgatcg tgaatacgtc gccagctgct ttaacactta tggctgcttc    2160
tggggcgcag aacgtcaggt cgttgcaacc gcaaccttcc gtttctaa                 2208
```

<210> SEQ ID NO 83
<211> LENGTH: 749
<212> TYPE: DNA
<213> ORGANISM: Escherichia coli

<400> SEQUENCE: 83

```
atgaaaaaac tggtgctatc gctctctctg gttctggcct tctccagcgc aactgcgtaa      60
ccgacccgac ctatgcgcca tttgaatcaa aaaattcaca aggcgaactg gttggcttcg    120
atatcgatct ggcaaaggaa ttatgcaaac gcatcaatac gcaatgtacg tttgtcgaaa    180
atccgctgga tgcgttaatt ccgtccttaa aagcgaagaa gattgacgcc atcatgtcat    240
cgctttccat tacggaaaaa cgtcagcaag aaatagcctt caccgacaaa ctgtacgctg    300
ccgattctcg tttggtggtg gcgaaaaatt ctgacattca gccgacagtc gagtcgctga    360
aaggcaaacg ggtaggcgta ttgcagggca ccacccagga cgttcggt aatgaacatt      420 gggcaccaaa aggcattgaa atcgtctcgt atcaggggca ggacaacatt tattctgacc    480
tgactgccgg acgtattgat gccgcgttcc aggatgaggt cgctgccagc gaaggtttcc    540
tcaaacaacc tgtcggtaaa gattacaaat tcggtggccc gtctgttaaa gatgaaaaac    600
tgtttggcgt agggaccggc atgggcctgc gtaaagaaga taacgaactg cgcgaagcac    660
tgaacaaagc ctttgccgaa atgcgcgctg acggtactta cgagaaatta gcgaaaaagt    720
acttcgattt tgatgtttat ggtggctaa                                      749
```

<210> SEQ ID NO 84
<211> LENGTH: 1308
<212> TYPE: DNA
<213> ORGANISM: Escherichia coli

<400> SEQUENCE: 84

```
atgatgatta ctctgcgcaa acttcctctg gcggttgccg tcgcagcggg cgtaatgtct     60
gctcaggcaa tggctgttga tttccacggc tatgcacgtt ccgtattggg ttggacaggt    120
taagctcaaa gtaaataccg tcttggcaac gaatgtgaaa cttatgctga attaaaattg    180
ggtcaggaag tgtggaaaga gggcgataag agcttctatt tcgacactaa cgtggcctat    240
tccgtcgcac aacagaatga ctgggaagct accgatccgg ccttccgtga agcaaacgtg    300
```

| | |
|---|---|
| cagggtaaaa aacctgatcga atggctgcca ggctccacca tctgggcagg taagcgcttc | 360 |
| taccaacgtc atgacgttca tatgatcgac ttctactact gggatatttc tggtcctggt | 420 |
| gccggtctgg aaaacatcga tgttggcttc ggtaaactct ctctggcagc aacccgctcc | 480 |
| tctgaagctg gtggttcttc ctctttcgcc agcaacaata tttatgacta taccaacgaa | 540 |
| accgcgaacg acgttttcga tgtgcgttta gcgcagatgg aaatcaaccc gggcggcaca | 600 |
| ttagaactgg gtgtcgacta cggtcgtgcc aacttgcgtg ataactatcg tctggttgat | 660 |
| ggcgcatcga aagacggctg gttattcact gctgaacata tcagagtgt cctgaagggc | 720 |
| tttaacaagt ttgttgttca gtacgctact gactcgatga cctcgcaggg taaagggctg | 780 |
| tcgcagggtt ctggcgttgc atttgataac gaaaaatttg cctacaatat caacaacaac | 840 |
| ggtcacatgc tgcgtatcct cgaccacggt gcgatctcca tgggcgacaa ctgggacatg | 900 |
| atgtacgtgg gtatgtacca ggatatcaac tgggataacg acaacggcac caagtggtgg | 960 |
| accgtcggta ttcgcccgat gtacaagtgg acgccaatca tgagcaccgt gatggaaatc | 1020 |
| ggctacgaca acgtcgaatc ccagcgcacc ggcgacaaga acaatcagta caaaattacc | 1080 |
| ctcgcacaac aatggcaggc tggcgacagc atctggtcac gcccggctat tcgtgtcttc | 1140 |
| gcaacctacg ccaagtggga tgagaaatgg ggttacgact acaccggtaa cgctgataac | 1200 |
| aacgcgaact tcggcaaagc cgttcctgct gatttcaacg gcggcagctt cggtcgtggc | 1260 |
| gacagcgacg agtggacctt cggtgcccag atggaaatct ggtggtaa | 1308 |

<210> SEQ ID NO 85
<211> LENGTH: 1158
<212> TYPE: DNA
<213> ORGANISM: Escherichia coli

<400> SEQUENCE: 85

| | |
|---|---|
| atgaaaataa aaacaggtgc acgcatcctc gcattatccg cattaacgac gatgatgttt | 60 |
| tccgcctcgg ctctcgccaa aatcgaagaa ggtaaactgt aactcgctga agtcggtaag | 120 |
| aaattcgaga aagataccgg aattaaagtc accgttgagc atccggataa actggaagag | 180 |
| aaattcccac aggttgcggc aactggcgat ggccctgaca ttatcttctg ggcacacgac | 240 |
| cgctttggtg gctacgctca atctggcctg ttggctgaaa tcaccccgga caaagcgttc | 300 |
| caggacaagc tgtatccgtt tacctgggat gccgtacgtt acaacggcaa gctgattgct | 360 |
| tacccgatcg ctgttgaagc gttatcgctg atttataaca agatctgct gccgaacccg | 420 |
| ccaaaaacct gggaagagat cccggcgctg ataaagaac tgaaagcgaa aggtaagagc | 480 |
| gcgctgatgt caacctgca agaaccgtac ttcacctggc cgctgattgc tgctgacggg | 540 |
| ggttatgcgt tcaagtatga aaacggcaag tacgacatta agacgtggg cgtggataac | 600 |
| gctggcgcga aagcgggtct gaccttcctg gttgacctga ttaaaaacaa acacatgaat | 660 |
| gcagacaccg attactccat cgcagaagct gcctttaata aaggcgaaac agcgatgacc | 720 |
| atcaacggcc cgtgggcatg gtccaacatc gacaccagca agtgaatta tggtgtaacg | 780 |
| gtactgccga ccttcaaggg tcaaccatcc aaaccgttcg ttggcgtgct gagcgcaggt | 840 |
| attaacgccg ccagtccgaa caaagagctg gcgaaagagt tcctcgaaaa ctatctgctg | 900 |
| actgatgaag gtctggaagc ggttaataaa gacaaaccgc tgggtgccgt agcgctgaag | 960 |
| tcttacgagg aagagttggc gaaagatcca cgtattgccg ccaccatgga aaacgcccag | 1020 |
| aaaggtgaaa tcatgccgaa catcccgcag atgtccgctt tctggtatgc cgtgcgtact | 1080 |
| gcggtgatca acgccgccag cggtcgtcag actgtcgatg aagccctgaa agacgcgcag | 1140 |

```
actcgtatca ccaagtaa                                           1158
```

<210> SEQ ID NO 86
<211> LENGTH: 888
<212> TYPE: DNA
<213> ORGANISM: Escherichia coli

<400> SEQUENCE: 86

```
atgaaaatga ataaaagtct catcgtcctc tgtttatcag cagggttact ggcaagcgcg    60
cctggaatta gccttgccga tgttaactac gtaccgcaaa acaccagcga cgcgccagcc   120
attccataag atcaatctaa acccagacc  acccaactgg cgaccggcgg ccaacaactg   180
aacgttcccg gcatcagtgg tccggttgct gcgtacagcg tcccggcaaa cattggcgaa   240
ctgaccctga cgctgaccag cgaagtgaac aaacaaacca gcgttttttgc gccgaacgtg   300
ctgattcttg atcagaacat gaccccatca gccttcttcc ccagcagtta tttcacctac   360
caggaaccag gcgtgatgag tgcagatcgg ctggaaggcg ttatgcgcct gacaccggcg   420
ttggggcagc aaaaacttta tgttctggtc tttaccacgg aaaagatct  ccagcagacg   480
acccaactgc tcgacccggc taaagcctat gccaagggcg tcggtaactc gatcccggat   540
atccccgatc cggttgctcg tcataccacc gatggcttac tgaaactgaa agtgaaaacg   600
aactccagct ccagcgtgtt ggtaggacct ttatttggtt cttccgctcc agctccggtt   660
acggtaggta cacggcggc  accagctgtg gctgcacccg ctccggcacc ggtgaagaaa   720
agcgagccga tgctcaacga cacgaaaagt tattttaata ccgcgatcaa aaacgctgtc   780
gcgaaaggtg atgttgataa ggcgttaaaa ctgcttgatg aagctgaacg cctgggatcg   840
acatctgccc gttccacctt tatcagcagt gtaaaaggca aggggtaa              888
```

<210> SEQ ID NO 87
<211> LENGTH: 360
<212> TYPE: DNA
<213> ORGANISM: Escherichia coli

<400> SEQUENCE: 87

```
atgaaaaaat cgcagcagt  aatcgcagta atggccctgt gcagcgcacc ggtgatggca    60
gcagagcagg gcggttttttc tggcccataa ccgaacggca gcgtaacgac tgtagaaagc   120
gcaaatccc  tgcgtgacga cacctgggta accctgcgcg gcaatatcgt tgaacgcatc   180
tctgacgatc tctacgtgtt caaagatgcc agcggtacta tcaatgttga tatcgaccac   240
aaacgctgga acggcgtgac ggtgacgccg aaagatacgg ttgagattca gggtgaagtc   300
gataaagact ggaattctgt tgaaattgac gtcaaacaga tccgcaaagt aaatccgtaa   360
```

<210> SEQ ID NO 88
<211> LENGTH: 1962
<212> TYPE: DNA
<213> ORGANISM: Escherichia coli

<400> SEQUENCE: 88

```
atgtttaggt tgaacccttt cgtacgggtc gggctgtgtt tgtccgctat ttcttgtgca    60
tggcctgtgt tagcggtcga tgatgatggc gaaacgatgg ttgtcactgc atcttcctaa   120
atcagcgtca ttacccagga agacctgcag cgaaaaccgg tacagaatct gaaggatgtc   180
ctcaaagaag tgcctggcgt acaactgacg aacgaagggg ataaccgtaa gggcgttagt   240
attcgtggtc tggacagcag ctatacctg  attctcgtcg acggtaaacg cgtgaactcc   300
```

| | |
|---|---|
| cgcaatgccg tcttccgcca caatgatttc gatctgaact ggatcccggt cgattccatc | 360 |
| gaacgtattg aagtggtccg tggcccgatg tcgtcgctgt acggttccga tgcgctcggc | 420 |
| ggtgtagtga atatcatcac caaaaaaatc ggtcagaaat ggtcgggtac cgttaccgtc | 480 |
| gataccacca ttcaggaaca tcgcgatcgc ggtgacacct ataacggtca gttctttacc | 540 |
| agtggaccat taattgatgg tgtgctggga atgaaagctt acggcagcct ggcaaaacgt | 600 |
| gaaaaggatg acccgcaaaa ctcaacgacc accgataccg gagaaacgcc gcgtattgaa | 660 |
| ggattctcca gccgcgacgg caatgtcgaa tttgcctgga caccgaatca aaatcacgat | 720 |
| ttttctgccg gatacggttt cgaccgtcag gatcgtgatt ccgactcgct ggacaaaaac | 780 |
| cgcctggaac gccagaacta ctccgtcagc cataatgggc gttgggatta cggcaccagc | 840 |
| gaactgaaat actacggtga gaaagtcgag aacaaaaacc ctggcaacag cagcccgata | 900 |
| acttccgaaa gcaatacggt cgacggcaaa tacacgttgc cgctgacggc gattaatcag | 960 |
| tttctcacgg ttggcggtga atggcgtcac gacaaactta gcgatgcggt gaacctgacc | 1020 |
| gggggaacca gctccaaaac gtctgccagc cagtacgcgc tgtttgtgga agatgaatgg | 1080 |
| cggatcttcg agccgctggg gctgacgacc ggcgtgcgta tggacgatca cgaaacctac | 1140 |
| ggtgaacact ggagtccgcg tgcctacctg gtttataacg ccaccgacac cgtaacggtg | 1200 |
| aaagggggct gggcgacggc atttaaagca ccttctctgt tgcaacttag ccctgactgg | 1260 |
| acgagcaatt cctgccgtgg cgcatgtaag attgtgggta gcccggatct gaaaccagaa | 1320 |
| accagcgaaa gttgggagct ggggctttac tacatgggtg aagaaggctg gctggaaggg | 1380 |
| gttgaatcca gcgttaccgt tttccgtaac gatgtgaaag atcgtatcag catcagccgt | 1440 |
| acgtctgacg tcaacgctgc accgggctac caaaactttg ttggttttga cgggcgct | 1500 |
| aacgacggc gcataccggt atttagctac tacaacgtta acaaagctcg tattcagggc | 1560 |
| gtggaaaccg aactgaaaat tccgttcaac gatgaatgga actgtcgat caactacacc | 1620 |
| tacaacgatg tcgtgatgt cagcaacggc gaaaacaaac cgctatccga tctgccgttc | 1680 |
| catactgcta acggtacgct ggactggaaa ccgctggcgc tggaagactg gtcattctat | 1740 |
| gtttctgggc actataccgg gcagaaacg gccgacagcg cgacggctaa acaccgggc | 1800 |
| ggttatacca tctggaatac cggcgcggcc tggcaggtga ctaaagacgt caaactgcgc | 1860 |
| gcaggcgtgc tgaaccttgg cgacaaggat ctcagtcgtg acgactacag ctataacgaa | 1920 |
| gacggacgtc gttactttat ggcagtggat tatcgcttct ga | 1962 |

<210> SEQ ID NO 89
<211> LENGTH: 2208
<212> TYPE: DNA
<213> ORGANISM: Escherichia coli

<400> SEQUENCE: 89

| | |
|---|---|
| atgaacaaga agattcattc cctggccttg ttggtcaatc tggggattta tggggtagcg | 60 |
| caggcacaag agccgaccga tactcctgtt tcacatgacg atactattgt ctaagtttcg | 120 |
| accatcaccg cagatgaaat ccgcaaaaac ccggttgccc gcgatgtgtc ggagatcatc | 180 |
| cgtaccatgc caggcgttaa cctgaccggt aactccacca gtggtcagcg tgggaataac | 240 |
| cgacagattg atattcgcgg tatgggtccg gaaaacacgc tgattttgat tgacggcaag | 300 |
| ccggtaagca gccgtaactc ggtcgtcag ggctggcgtg gcgagcgcga tacccgtggt | 360 |
| gatacttcct gggtgccacc tgaaatgatt gaacgtattg aagttctgcg tggtccggca | 420 |
| gctgcgcgtt atggcaacgg cgcggcgggc ggcgtggtta acatcattac caaaaaaggc | 480 |

```
agcggcgagt ggcacggctc ctgggacgca tatttcaatg cgccagaaca taaagaggaa      540
ggtgccacca aacgcactaa ctttagcctg accggtccgc tgggcgacga attcagcttc      600
cgtttgtatg gcaacctcga caaaacccag gctgacgcgt gggatatcaa ccagggccat      660
cagtccgcgc gtgccggaac gtatgccacg acgttaccag ccgggcgcga aggggtaatc      720
aacaaagata ttaatggcgt ggtgcgctgg gatttcgcgc cattgcaatc gctggaactg      780
gaagcaggtt acagccgcca gggtaacctg tatgcgggcg acacccagaa taccaactcc      840
gattcctata cccgctcgaa atatggcgat gaaaccaacc gtctgtatcg ccagaactac      900
gcgctgacct ggaacggtgg ctgggataac ggcgtgacca ccagcaactg ggtgcagtac      960
gaacacaccc gtaactcgcg tattccggaa ggtctggcgg gcggtaccga agggaaattt     1020
aacgaaaaag cgacacagga tttcgtcgat atcgatcttg atgacgtgat gctgcacagc     1080
gaagttaacc tgccgattga tttcctcgtt aaccagacgc tgacgctggg tacggagtgg     1140
aatcagcaac ggatgaagga cttaagttcc aacacccagg cactgaccgg aacgaatacc     1200
ggtggcgcta ttgatggcgt gagtaccacc gaccgtagcc cgtattcaaa agcagaaatt     1260
ttctcgctgt ttgccgaaaa caacatggag ctgactgaca gcaccatcgt aacgccgggg     1320
ctgcgtttcg atcatcacag tattgtcggc aataactgga gcccggcgct gaacatatcg     1380
caaggtttag gcgatgactt cacgctgaaa atgggcatcg cccgtgctta taagcgccg      1440 agcctgtacc agactaaccc gaactacatt ctctacagta aggtcagggg ttgctatgcc     1500
agcgcgggcg gctgctatct gcaaggtaac gatgacctga agcagaaaac cagcatcaac     1560
aaagagattg gtctggagtt caaacgcgac gggtggctgg cgggcgtcac ctggttccgt     1620
aacgattatc gcaataagat tgaagcgggc tatgtggctg tagggcaaaa cgcagtcggc     1680
accgatctct atcagtggga taacgtgccg aaagcggtgg ttgaaggtct ggaaggatcg     1740
ttaaacgtac cggttagcga aacggtgatg tggaccaata acatcactta tatgctgaag     1800
agtgaaaaca aaaccacggg cgaccgtttg tcgatcatcc cggagtatac gttgaactca     1860
acgctgagct ggcaggcacg ggaagatttg tcgatgcaaa cgaccttcac ctggtacggc     1920
aagcagcagc cgaagaagta caactataaa ggtcagccag cggttggacc ggaaaccaaa     1980
gaaattagtc cttacagcat tgttggcctg agcgcgacct gggatgtgac gaagaatgtc     2040
agtctgaccg gcggcgtgga caatctgttc gacaaacgtt tgtggcgtgc gggtaatgcc     2100
cagaccacgg gcgatttggc aggggccaac tatatcgccg gtgccggggc gtataccttat    2160 aacgagccgg gacgtacgtg gtatatgagc gtaaacaccc acttctga                  2208
```

<210> SEQ ID NO 90
<211> LENGTH: 729
<212> TYPE: DNA
<213> ORGANISM: Escherichia coli

<400> SEQUENCE: 90

```
atgaaaattc gcgccttatt ggtagcaatg agcgtggcaa cggtactgac cggttgccag      60
aatatggact ccaacggact gctctcatca ggagcggaag cttttcaggc ttacagtttg     120
agtgatgcgc aggtgaaata aagcaaggcg acgattgcgc agccaatagc gaatacgct      180 aaacgtctga caactattgc caatgcgcta ggcaacaata tcaacggtca gccggtaaat     240
tacaaagtgt atatgcgaa ggatgtgaac gcctttgcaa tggctaacgg ctgtatccgt      300
gtctatagcg ggctgatgga tatgatgacg gataacgaag tcgaagcggt gatcggtcac     360
```

```
gaaatggggc acgtggcgtt aggccatgtg aaaaaaggaa tgcaggtggc acttggtaca      420
aatgccgtgc gagtagctgc ggcctctgcg ggcgggattg tcggaagttt atctcaatca      480
caacttggta atctgggcga gaaattagtc aattcgcaat tctcccagcg ccaggaagca      540
gaagccgatg attattctta cgatcttctg cgccaacgcg gcatcagccc ggcaggtctt      600
gccaccagct ttgaaaaact ggcaaaactg gaagaaggtc gccaaagctc aatgtttgac      660
gaccatcctg catccgccga acgcgcccag catattcgcg atcgcatgag cgcggatggg      720
attaagtaa                                                              729

<210> SEQ ID NO 91
<211> LENGTH: 324
<212> TYPE: DNA
<213> ORGANISM: Escherichia coli

<400> SEQUENCE: 91
atgcacgtaa aatacttatc agggattgtc ggtgccgcgc tactgatggc gggttgtagc       60
tccagcaacg aattgagtgc tgccggtcag agtgtacgca ttgtggacga gcagccaggc      120
gcagagtgcc agctgattgg tactgcgaca ggtaagcaat aaggcggttc tatgcgcggc      180
gcagcaaacg atctgcgcaa ccaggcggct gcaatgggcg taacgtgat ttatggcatc       240 agcagcccgt cgcagggaat gttgtccagt tttgtcccga cggatagcca gattatcggt      300
caggtttata agtgcccgaa ctga                                             324

<210> SEQ ID NO 92
<211> LENGTH: 130
<212> TYPE: DNA
<213> ORGANISM: Escherichia coli

<400> SEQUENCE: 92
taaagcgatc ttttctgttc tggtgctttc aacagtatta actgcctgca acaccacgcg       60
tggcgttggt gaagacattt ctgatggcgg taacgcgatt tctggcgcag caacgaaagc      120
gcagcaataa                                                             130

<210> SEQ ID NO 93
<211> LENGTH: 372
<212> TYPE: DNA
<213> ORGANISM: Escherichia coli

<400> SEQUENCE: 93
atgcgtgctt aatgttccat gttaagcaga tcccctgtcg aacccgttca agcactgca        60 ccccagccga aagcggagcc tgcaaaaccg aaagcgccgc gcgccacgcc ggtccgaatt      120
tataccaatg cagaagaatt agtcggcaaa ccgttccgcg atctcggtga agtcagtggc      180
gactcttgcc aggcctctaa tcaggactct ccgccgagca ttccaaccgc acgtaagcgg      240
atgcaaatca acgcctcgaa aatgaaagcc aatgcggtat tactgcatag ctgcgaagtt      300
accagcggta cgccaggctg ctatcgtcag gctgtatgta tcggctctgc gcttaacatt      360
acggcgaaat ga                                                          372

<210> SEQ ID NO 94
<211> LENGTH: 1005
<212> TYPE: DNA
<213> ORGANISM: Escherichia coli

<400> SEQUENCE: 94
atgaaaaaga gcactctggc attagtggtg atgggcattg tggcatctgc atccgtacag       60
```

```
gccgcagaaa tataaaaagt taaagccatg cattatatga gtgataacga cagtaaagat      120
ggcgaccaga gttatatccg ttttggtttt aaaggcgaaa cacaaattaa cgatcaactg      180
actggttatg gtcgttggga agcagagttt gccggtaata aagcagagag tgatactgca      240
cagcaaaaaa cgcgtctcgc ttttgccggg ttgaaatata aagatttggg ttctttcgat      300
tatggtcgta acctgggcgc gttgtatgac gtggaagcct ggaccgatat gttcccggaa      360
tttggtggcg actcctcggc gcagaccgac aactttatga ccaaacgcgc cagcggtctg      420
gcgacgtatc ggaacaccga cttcttcggc gttatcgatg gcctgaactt aaccctgcaa      480
tatcaaggga aaaacgaaaa ccgcgacgtt aaaaagcaaa acggcgatgg cttcggcacg      540
tcattgacat atgactttgg cggcagcgat ttcgccatta gtggggccta taccaactca      600
gatcgcacca acgagcagaa cctgcaaagc cgtggcacag gcaagcgtgc agaagcatgg      660
gctacaggtc tgaaatacga tgccaataat atttatctgg caacttttta ttctgaaaca      720
cgcaaaatga cgccaataac tggcggcttt gccaataaga cacagaactt gaagcggtc       780 gctcaatacc agtttgactt tggtctgcgt ccttcgctgg ttatgtctt atcgaaaggg       840 aaagatattg aaggtatcgg tgatgaagat ctggtcaatt atatcgatgt cggggctacg      900
tattatttca acaaaaatat gtcagcgttt gttgattata aaatcaacca actggatagc      960
gataacaaat tgaatattaa taatgatgat attgtcgcgg ggtaa                     1005

<210> SEQ ID NO 95
<211> LENGTH: 1598
<212> TYPE: DNA
<213> ORGANISM: Escherichia coli

<400> SEQUENCE: 95
atgaccaaca tcaccaagag aagtttagta gcagctggcg ttctggctgc gctaatggca       60
gggaatgtcg cgtaagaaaa caaacactgg tacgtaacaa tggttcagaa gttcagtcat      120
tagatccgca caaaattgaa ggtgttccgg agtctaatat cagccgagac ctgtttgaag      180
gcttactggt cagcgatctt gacggtcatc cagcacctgg cgtcgctgaa tcctgggata      240
ataaagacgc gaaagtctgg accttccatt tgcgtaaaga tgcgaaatgg tctgatggca      300
cgccagtcac agcacaagac tttgtgtata gctggcaacg ttctgttgat ccgaacactg      360
cttctccgta tgccagttat ctgcaatatg gcatatcgc cggtattgat gaaattcttg       420
aagggaaaaa accgattacc gatctcggcg tgaaagctat tgatgatcac acattagaag      480
tcaccttaag tgaacccgtt ccgtacttct ataaattact tgttcaccca tcaacttcac      540
cggtgccaaa agccgctatc gagaaattcg gcgaaaaatg acccagcct ggtaatatcg       600 tcaccaacgg tgcctatacc ttaaaagatt gggtcgtaaa cgaacgaatc gttcttgaac      660
gcagcccgac ctactggaac aacgcgaaaa ccgttattaa ccaggtaacc tatttgccta      720
ttgcttctga gttaccgat gtcaaccgct accgtagtgg tgaaatcgac atgacttata       780
acaacatgcc gatcgaattg ttccagaagc tgaaaaaaga gatcccggac gaagttcacg      840
ttgatccata cctgtgcact actattacg aaattaacaa ccagaaaccg ccattcaacg       900
atgtgcgtgt gcgtaccgca ctgaaactag gtatggaccg cgatatcatt gttaataaag      960
tgaaagcgca gggcgacatg cccgcctatg ttacactcc accgtatact gatggcgcaa      1020
aattgactca gccggaatgg tttggctgga gccaggaaaa acgtaacgaa gaagcgaaaa     1080
aactgctggc tgaagcgggt tataccgcag acaaaccgtt gaccatcaac ctgttgtata     1140
```

| | | | | |
|---|---|---|---|---|
| acacctccga | tctgcataaa | aagctggcga | ttgctgcctc | ttcattgtgg | aagaaaaaca | 1200 |
| ttggtgtaaa | cgtcaaactg | gttaaccagg | agtggaaaac | gttcctcgac | acccgtcacc | 1260 |
| agggtacttt | tgatgtggcc | cgtgcaggct | ggtgtgctga | ctacaacgaa | ccaacttcct | 1320 |
| tcctgaacac | catgctttcg | aacagctcga | tgaataccgc | gcattataag | agcccggcct | 1380 |
| tgacagcat | tatggcggaa | acgctgaaag | tgactgacga | ggcgcagcgc | acagctctgt | 1440 |
| acactaaagc | agaacaacag | ctggataagg | attcggccat | tgttcctgtt | tattactacg | 1500 |
| tgaatgcgcg | tctggtgaaa | ccgtgggttg | gtggctatac | cggcaaagat | ccgctggata | 1560 |
| atacctatac | ccggaatatg | tacattgtga | agcactaa | | | 1598 |

<210> SEQ ID NO 96
<211> LENGTH: 780
<212> TYPE: DNA
<213> ORGANISM: Escherichia coli

<400> SEQUENCE: 96

| | | | | | | |
|---|---|---|---|---|---|---|
| atgaaatcac | tgtttaaagt | aacgctgctg | gcgaccacaa | tggccgttgc | cctgcatgca | 60 |
| ccaatcactt | tgctgctga | agctgcaaaa | cctgctacaa | ctgctgacag | caaagcagcg | 120 |
| ttctaagctt | cgctgggtcg | ttacatggaa | aactctctta | agaacaaga | aaaactgggc | 180 |
| atcaaactgg | ataaagatca | gctgatcgct | ggtgttcagg | atgcatttgc | tgataagagc | 240 |
| aaactctccg | accaagagat | cgaacagact | ctgcaagcat | cgaagctcg | cgtgaagtct | 300 |
| tctgctcagg | cgaagatgga | aaaagacgcg | gctgataacg | aagcaaaagg | taaagagtac | 360 |
| cgcgagaaat | ttgccaaaga | gaaggtgtg | aaaacctctt | caactggtct | ggtttatcag | 420 |
| gtagtagaag | ccggtaaagg | cgaagcaccg | aaagacagcg | atactgttgt | agtgaactac | 480 |
| aaaggtacgc | tgatcgacgg | taaagagttc | gacaactctt | cacccgtgg | tgaaccgctc | 540 |
| tctttccgtc | tggacggtgt | tatcccgggt | tggacagaag | gtctgaagaa | catcaagaaa | 600 |
| ggcggtaaga | tcaaactggt | tattccacca | gaactggctt | acggcaaagc | gggtgttccg | 660 |
| gggatcccac | cgaattctac | cctggtgttt | gacgtagagc | tgctggatgt | gaaaccagcg | 720 |
| ccgaaggctg | atgcaaagcc | ggaagctgat | gcgaaagccg | cagattctgc | taaaaaataa | 780 |

<210> SEQ ID NO 97
<211> LENGTH: 544
<212> TYPE: DNA
<213> ORGANISM: Escherichia coli

<400> SEQUENCE: 97

| | | | | | | |
|---|---|---|---|---|---|---|
| atgaaactcg | tgcacatggc | cagtggttta | gcggttgcga | ttgcgttggc | ggcttgcgca | 60 |
| gataaaagcg | cggatattca | gacgccagcc | ccggctgcaa | atacgtctat | ttcagcaaca | 120 |
| caataaaccg | tctaggatcc | ggcagaaagt | cgcactgccg | cctgatgctg | tgctgaccgt | 180 |
| gacactttct | gacgcgtcgt | tagccgatgc | accgtcaaaa | gtgctggcgc | agaaagcggt | 240 |
| gcgtaccgaa | ggtaaacagt | caccattcag | ctttgttctg | ccatttaatc | cggcagatgt | 300 |
| tcagccgaac | gcgcgtattc | tgttgagtgc | ggcgattacc | gtgaatgaca | aactggtatt | 360 |
| tattaccgat | accgttcagc | cggtgatcaa | caagggcgga | actaaagccg | acctgacatt | 420 |
| ggtgccggtg | cagcaaaccg | ccgtgccggt | tcaggccagc | ggtggtgcaa | cgactaccgt | 480 |
| accttcgact | tcaccaactc | aggtgaatcc | gtcttcggca | gttccagctc | ctacgcaata | 540 |
| ttaa | | | | | | 544 |

<210> SEQ ID NO 98
<211> LENGTH: 855
<212> TYPE: DNA
<213> ORGANISM: Escherichia coli

<400> SEQUENCE: 98

| | |
|---|---:|
| atgaaaaaaa cattactggc agccggtgcg gtactggcgc tctcttcgtc ttttactgtc | 60 |
| aacgcagctt aatggcacca gagcgttaac gttgtcggaa gctatcacac ccgtttcgga | 120 |
| ccgcagatcc gcaacgatac ctaccttgag tacgaagcat tcgctaaaaa agactggttc | 180 |
| gacttctatg ttatgcgga tgcgccggta ttcttcggcg gtaactccga tgcaaaaggt | 240 |
| atctggaacc acggttctcc gctgtttatg gaaatcgaac cacgtttctc catcgacaag | 300 |
| ctgaccaata ctgaccttag cttcggtccg ttcaaagagt ggtacttcgc gaacaactac | 360 |
| atttacgaca tgggtcgtaa taaagatggt cgccagagca cctggtacat gggtctgggt | 420 |
| accgatatcg acactggcct gccgatgagc ctgtccatga acgtctatgc gaaataccag | 480 |
| tggcagaact atgcgcagc gaacgaaaac gagtgggacg gttaccgttt caaaattaaa | 540 |
| tactttgtgc cgattaccga tctgtggggc ggtcagctga gctacatcgg cttcaccaac | 600 |
| ttcgactggg gttccgattt aggggatgac agcggtaacg caatcaacgg tattaagacc | 660 |
| cgtactaata actctatcgc ttccagccat attctggctc tgaactacga tcactggcac | 720 |
| tactctgtcg tagctcgtta ctggcacgac ggtggtcagt ggaacgacga tgcagaactg | 780 |
| aacttcggca acggcaactt caacgttcgc tctaccggct ggggtggtta cctggtagta | 840 |
| ggttacaact tctga | 855 |

<210> SEQ ID NO 99
<211> LENGTH: 711
<212> TYPE: DNA
<213> ORGANISM: Escherichia coli

<400> SEQUENCE: 99

| | |
|---|---:|
| gtgaagttca agttatcta agcagcgcag gctaacgaat tgccggatgg accgcatatt | 60 |
| gtcacctccg gtacggcaag cgtggatgcg gtgccagaca ttgccactct tgcgattgaa | 120 |
| gttaacgtgg ccgcgaagga tgccgctact gccaagaaac aggcagatga gcgcgtcgca | 180 |
| caatacattt ccttccttga actcaatcag atcgcgaaaa aagatatcag ctcagcgaac | 240 |
| ttacgcaccc agccagatta tgattatcag gatggtaaaa gtatccttaa aggctaccgc | 300 |
| gctgtgagaa cggtggaagt cacgctccgt cagttagaca aactgaattc cttgctggat | 360 |
| ggcgcgctga aggcgggtct taacgaaatt cgttctgtgt cgctgggcgt ggcgcagccg | 420 |
| gatgcctata agacaaagc gcgtaaggca gcgattgata cgcgattca tcaggcgcag | 480 |
| gaactggcga acggctttca tcgtaaactg gggccggtat atagcgtgcg ctaccatgtt | 540 |
| tccaactatc agcccagccc aatggtgcgg atgatgaaag ccgatgccgc gccggtgtcc | 600 |
| gcccaggaaa cttacgagca ggccgctatt cagtttgatg atcaggtcga tgtggtcttc | 660 |
| cagttagaac ctgtggatca acaacccgct aaaacacctg cagcacaata a | 711 |

<210> SEQ ID NO 100
<211> LENGTH: 306
<212> TYPE: DNA
<213> ORGANISM: Escherichia coli

<400> SEQUENCE: 100

| | |
|---|---:|
| atgaacaaga atatggcagg aattctgagt gcataatatg atcgtaccaa agaccagttt | 60 |

```
gtacagcctg tggtgaaaga cgtcaaaaaa ggcatgagcc gggcgcaggt tgcacaaatt    120
gcgggtaaac cttcgtctga agtgagcatg atccatgctc gtggtacttg ccagacctac    180
atcctgggtc aacgtgatgg taaagcagaa acctactttg tcgcgttaga tgataccgga    240
catgtcatca actccggtta tcagacctgt gctgaatacg acactgatcc acaggctgcg    300
aagtaa                                                              306
```

<210> SEQ ID NO 101
<211> LENGTH: 189
<212> TYPE: DNA
<213> ORGANISM: Escherichia coli

<400> SEQUENCE: 101

```
atgaaaaaat gggcagtaat aatttctgca gtcggactgg cgtttgctgt ttccgggtgt     60
tccagtgatt acgtcatggc gtaaaaacct gaaattgatg atgataccgg ctggtgagt    120 tatcacgatc agcaaggtaa cgcaatgcaa attaaccgtg atgatgtttc gcaaattatt    180
gaacgttaa                                                           189
```

<210> SEQ ID NO 102
<211> LENGTH: 546
<212> TYPE: DNA
<213> ORGANISM: Escherichia coli

<400> SEQUENCE: 102

```
atgaaaaaaa gcctgcttgg tttaaccttc gcgtccctga tgttctctgc cggttcagcg     60
gttgccgccg attacaaaat tgacaaagaa ggtcagcacg cctttgttaa tttccgctaa    120
acctttaaag atttcgacgg tactttacc tttgacgaaa aaatccggc tgccgataaa    180 gtgaatgtga caattaacac caccagcgtc gatactaatc acgccgaacg cgataaacat    240
cttcgcagtg cagatttcct caataccgca aaatatccac aggcaacatt cacctccacc    300
agcgtgaaga aagacggtga cgaactggat attaccggcg atctgacgct gaatggcgta    360
accaaacccg tcacgctgga agcgaaatta attggtcagg cgacgacccc atggggtggt    420
aaacgtgcag gcttcgaggc cgaaggcaaa attaagctca aggacttcaa tatcaagaca    480
gatttaggtc cagcttctca ggaagtggat ctgattattt cagtggaagg cgtacagcag    540
aagtaa                                                              546
```

<210> SEQ ID NO 103
<211> LENGTH: 225
<212> TYPE: DNA
<213> ORGANISM: Escherichia coli

<400> SEQUENCE: 103

```
atgaaaaacg taaaaaccct catcgctgcg gcgattttaa gctccatgtc attttaagaa     60
ggccaacaaa aagtcggtac aatcagtgct aacgcgggga caaatctggg atcgctggaa    120
gagcagctgg cgcaaaaagc ggatgagatg ggcgcaaaat ctttccgtat tacttctgta    180
accggtccga taccctcca tggaacagca gtaatttata aataa                    225
```

<210> SEQ ID NO 104
<211> LENGTH: 679
<212> TYPE: DNA
<213> ORGANISM: Escherichia coli

<400> SEQUENCE: 104

```
atggtgaaaa aagcgatagt gacataaatg taataatcgg gccgaagtcg atacgctttc     60
```

```
tccggcgcag gctgccgaac tgaaaccgat gccgcaaagt tggcgcggcg tgctgccgtg    120
tgccgattgc gaaggaatcg aaacctctct gttcctcgaa aaagacgaaa catgggtgat    180
gaatgagcgt tatctcggtg ctcgtgaaga accttcctcc ttcgcttcct acggtacatg    240
ggcgcgaacc gctgacaagc tggtattaac cgacagcaaa ggtgaaaagt catattatcg    300
ggcgaaaggc gatgcgctgg agatgctcga tcgtgaaggc aatccgattg aatcgcagtt    360
caactatacg ctggaagcgg cacaatccag tttacctatg acgccgatga ccctgcgggg    420
catgtatttt tatatggctg atgcggcgac cttcactgat gcgcgaccg gaaaacgttt     480 catggtagcg aataacgcag agctggagcg tagctacctg gctgcgcgcg gtcacagtga    540
aaaaccggtg ttactgtcag tagaaggtca ctttacgctt gagggtaatc cggataccgg    600
tgcgccgact aaagtattgg cacccgatac ggcagggaaa ttttaccccca accaggattg    660 cagtagtttg gggcagtaa                                                 679

<210> SEQ ID NO 105
<211> LENGTH: 839
<212> TYPE: DNA
<213> ORGANISM: Escherichia coli

<400> SEQUENCE: 105
atgcggactc tgcagggctg gttgttgccg gtgtttatgt aatgaaagag gtgcatgacg     60
cgccagcggt gcgtggcagt attatcgcca atatgctgca ggagcatgac aatccgttca    120
cgctctatcc ttatgacacc aactacctca tttacaccca aaccagcgat ctgaataaag    180
aagcgattgc cagttacgac tgggcggaaa atgcgcgtaa ggatgaagta aagtttcagt    240
tgagcctggc atttccgctg tggcgtggga ttttaggccc gaactcggtg ttgggtgcgt    300
cttatacgca aaaatcctgg tggcaactgt ccaatagcga agagtcttca ccgtttcgtg    360
aaaccaacta cgaaccgcaa ttgttcctcg gttttgccac cgattaccgt tttgcaggtt    420
ggacgctgcg cgatgtggag atggggtata accacgactc taacgggcgt tccgacccga    480
cctcccgcag ctggaaccgc ctttatactc gcctgatggc agaaaacggt aactggctgg    540
tagaagtgaa gccgtggtat gtggtgggta atactgacga taacccggat atcaccaaat    600
atatgggtta ctaccagctt aaaatcggct atcacctcgg tgatgcggtg ctcagtgcga    660
aaggacagta caactggaac accggctacg gcggcgcgga gttaggctta agttacccga    720
tcaccaaaca tgtgcgcctt tatactcagg tttacagcgg ctatggcgaa tcgctcatcg    780
actataactt caaccagacc cgtgtcggtg tggggggttat gctaaacgat ttgttttga    839

<210> SEQ ID NO 106
<211> LENGTH: 4530
<212> TYPE: DNA
<213> ORGANISM: Escherichia coli

<400> SEQUENCE: 106
atgaataaga aatttaaata taagaaatcg cttttagcgg ctattttgag cgcaaccctg     60
ttagccggtt gtgatggcgg tggttctaaa acagggtctt tgccggaagt gaaacctgat    120
ccaacaccaa acccggagcc gacgcctgag ccaacgccgg acccagaacc tacgccagaa    180 ccgataccttg atcctgaacc aacaccagaa ccggagccag aacctgttcc tacgaaaacg    240
ggttatctga ccctgggcgg aagccagcgg gtaactggtg ctacctgtaa tggtgaatcc    300
agcgatggct ttacatttaa acctggcgag gacgttactt gcgtggcggg taacacgaca    360
```

```
attgccacct tcaacactca gtcagaagct gcgcgtagct tgcgtgcggt tgaaaaagtg    420
tcgtttagcc ttgaggacgc gcaagaactg gcgggctccg atgacaagaa aagcaatgcg    480
gtttcgctgg taacgtccag taacagctgt ccggcgaata cagaacaggt ttgtctgacg    540
ttctcctcgg tgatcgagag taaacgcttc gactcgctgt ataagcaaat cgatctggca    600
ccggaagagt tcaaaaagct ggtcaatgaa gaggtggaaa acaatgctgc gaccgataaa    660
gcgccatcca ctcatacttc accggtcgtg cccgtcacca cgccgggaac aaaaccggat    720
ctgaacgctt ccttcgtgtc ggctaacgcg gaacagtttt atcagtatca acccactgaa    780
atcattctct ctgaaggtcg actggtcgat agccagggat atggtgttgc tggcgtcaac    840
tactacacca attcaggccg tggcgtgaca ggggaaaatg gtgaattttc ctttagctgg    900
ggcgaaacca tctcctttgg tatcgatacc tttgaactgg gttcagtgcg cggcaataag    960
tcgaccattg cgctgactga actgggtgat gaagttcgcg gggcgaatat tgatcagctt   1020
attcatcgct attcgacgac cgggcaaaat aatacccgtg ttgttccgga cgatgtacgc   1080
aaggtctttg ccgaatatcc caacgtgatc aacgagatta tcaatctctc gttatccaac   1140
ggtgcgacgc tgggggaagg tgagcaagtc gttaatctgc ctaacgaatt tattgagcag   1200
tttaatacgg gtcaggccaa agagatcgat accgcgattt gtgcgaaaac cgatggttgt   1260
aacgaggctc gctggttctc gctgacgacg cgcaatgtta atgacggcca gattcagggc   1320
gttatcaaca gctgtggggg cgtggatacg aactacaaat ctgtcagcaa gttccatgta   1380
ttccatgact ccaccaactt ctatggcagc acgggtaatg cgcgcggtca ggcggtggtg   1440
aatatctcca acgcggcctt cccgattctg atggcgcgta atgataaaaa ctactggctg   1500
gccttcggcg aaaaacgcgc ctgggataaa aacgagctgg cgtacattac ggaagcgcct   1560
tctcttgttg agccggaaaa cgttacgcgc gataccgcca cctttaacct gccgtttatt   1620
tcgctggggc aagtcggtga gggcaaactg atggttatcg gtaacccaca ctacaacagc   1680
attttgcgtt gcccgaacgg ttacagctgg aacgggggcg ttaataaaga tgggcagtgt   1740
acgctcaaca gcgacccgga tgacatgaag aacttcatgg agaacgtgct gcgctatctg   1800
tccgacgata aatggaagcc ggacgcgaaa gccagcatga ccgtaggcac caacctggat   1860
actgtctatt ttaaacgtca tggtcaggtt acaggaaaca gcgctgcgtt cgacttccat   1920
ccggattttg cgggcatctc tgttgagcat ttaagtagct atggcgatct cgatccgcag   1980
gaaatgccgc tgctgatcct taacggcttt gaatatgtga ctcaggtggg taacgatcct   2040
tatgcaatcc cgctgcgtgc agataccagc aaaccgaagc tgactcagca ggatgtgacc   2100
gatctgatcg cctatctgaa caaaggtgga tcggtgctga tcatggaaaa cgtgatgagc   2160
aatcttaagg aagagagcgc gtctggtttt gtgcgtctgt tggatgccgc aggtctgtcg   2220
atggcactga acaagtcggt agtaaataac gatccgcaag ggtatccgaa ccgcgttcgt   2280
cagcagcgcg caacgggcat ttgggtctat gaacgttatc ctgccgtaga tggtgcgctg   2340
ccgtacacca tcgatagtaa gacaggggaa gttaagtgga atatcaggt agaaaacaaa   2400
cctgatgaca aaccgaagct ggaagttgcc agctggctgg aagatgtaga tggcaaacag   2460
gaaacgcgtt atgcctttat tgatgaggcc gatcataaaa cagaggattc tctgaaggct   2520
gcgaaggaga aaattttcgc cgcgttcccg gggctgaaag agtgtactaa tccggcatat   2580
cactatgagg tcaactgcct ggaatatcgt cctggcacgg gggttccggt tactggtggc   2640
atgtatgttc cacagtatac gcaactaagc cttaacgccg acactgcaaa agcgatggtg   2700
caggctgcgg atttaggcac caacattcag cgtctgtatc agcatgagct ctacttccgg   2760
```

```
accaatggtc gcaaaggtga gcgtctgagc agcgtcgatc tggaacgtct gtaccagaac    2820
atgtcggtct ggctgtggaa cgatacgagc tatcgttatg aagaaggcaa aaatgacgag    2880
ctgggcttta aaacgttcac cgagttcctg aactgctacg ccaatgatgc ctatgcaggc    2940
ggcaccaagt gttctgcaga tctgaaaaaa tcgctggtcg ataacaacat gatctacggt    3000
gacggtagca gcaaagcggg catgatgaac ccgagctacc cgctcaacta tatggaaaaa    3060
ccgctgacac gcctgatgct gggccgttcc tggtgggatc tgaacatcaa agttgatgtc    3120
gagaagtatc cgggagcagt atcggaagag ggacagaacg ttactgaaac catcagcctg    3180
tactcgaatc cgaccaaatg gtttgcaggt aacatgcagt caactggcct gtgggcaccg    3240
gctcagaaag aggtcaccat taagtccaat gcgaacgttc ctgtgaccgt caccgtggcg    3300
ctggctgacg acctgaccgg acgtgagaag catgaagttg cgctgaaccg tccgccaaga    3360
gtgactaaaa cgtactctct ggacgctagc ggtacggtga agttcaaggt gccttacggt    3420
ggcctgattt atatcaaggg caatagctct accaatgaat ctgccagctt cacctttact    3480
ggcgtggtaa aagcaccgtt ctataaagac ggcgcatgga aaaacgatct gaactcaccg    3540
gctccgctgg gtgagctgga atcagacgct ttcgtctata ccacaccgaa gaagaacctg    3600
aatgccagca attacactgg cggactggag caattcgcta acgatctgga tacctttgcc    3660
agctcgatga tgacttcta cggccgtgat agcgaagacg gtaagcaccg gatgtttacc    3720
tataaaaact tgccgggcca caaacatcgt ttcaccaacg atgtgcagat ctccatcggt    3780
gatgcgcatt cgggttatcc ggtaatgaac agcagcttct cgccgaacag caccacgctg    3840
ccgacgacgc cgctgaacga ctggctgatc tggcatgaag tcggtcataa cgccgcagaa    3900
acgccgttga ctgtaccggg tgcaactgaa gtcgctaaca cgtgctggcg ctgtacatg    3960 caggatcgtt atctcggcaa gatgaaccgt gtcgctgacg atattaccgt cgcaccggaa    4020
tatctggagg agagcaacaa ccaggcatgg gcacgcggcg gtgcgggtga ccgtctgctg    4080
atgtacgcac agctgaagga atgggcagag aaaaactttg atatcaagaa atggtatcca    4140
gatggcactc ctctgccaga gttttacagc gagcgtgaag ggatgaaagg ctggaacctg    4200
ttccagttga tgcatcgtaa agcacgcggc gatgaggtca gcaatgacaa gtttggcggc    4260
aagaattact gtgctgaatc caacggtaac gcagcggaca cgctgatgct gtgtgcctcc    4320
tgggtcgccc agacggatct ttcggagttc tttaagaaat ggaatccggg cgcgaatgct    4380
taccagctgc cggggggcgag cgagatgagc ttcgagggcg gtgtgagcca gtcggcttac    4440
aacacgctcg cgtcactcga tctgccgaaa ccggaacagg gaccggaaac cattaatcag    4500
gttaccgagc ataagatgtc tgccgagtaa                                      4530
```

<210> SEQ ID NO 107
<211> LENGTH: 1651
<212> TYPE: DNA
<213> ORGANISM: Escherichia coli

<400> SEQUENCE: 107

```
atgaagtctg cattaaagaa aagtgtcgta agtacctcga tatctttgat actggcatct     60
ggtatggctg catttgctgc tcatgcggca gatgatgtaa agctgaaagc aaccaaaaca    120
aacgttgctt tctaaaaagc caaatattat cgtactaacc atggatgatc ttggttatgg    180
acaacttcct tttgataagg gatcttttga cccaaaaaca atggaaaatc gtgaagttgt    240
cgatacctac aaaataggga tagataaagc cattgaagct gcacaaaaat caacgccgac    300
```

```
gctcctttca ttaatggatg aaggcgtacg ttttactaac ggctatgtgg cacacggtgt      360
ttccggcccc tcccgcgccg caataatgac cggtcgagct cccgcccgct ttggtgtcta      420
ttccaatacc gatgctcagg atggtattcc gctaacagaa actttcttgc ctgaattatt      480
ccagaatcat ggttattaca ctgcagcagt aggtaaatgg cacttgtcaa aaatcagtaa      540
tgtgccggta ccggaagata acaaacgcg tgactatcat acaacttca ccacattttc      600 tgcggaagaa tggcaacctc aaaaccgtgg ctttgattac tttatgggat tccacgctgc      660
aggaacggca tattacaact ccccttcact gttcaaaaat cgtgaacgtg tccccgcaaa      720
aggttatatc agcgatcagt taaccgatga ggcaattggc gttgttgatc gtgccaaaac      780
acttgaccag cctttttatgc tttacctggc ttataatgct ccgcacctgc caaatgataa      840
tcctgcaccg gatcaatatc agaagcaatt taataccggt agtcaaacag cagataacta      900
ctacgcttcc gtttattctg ttgatcaggg tgtaaaacgc attctcgaac aactgaagaa      960
aaacggacag tatgacaata caattattct ctttacctcc gataatggtg cggttatcga     1020
tggtcctctg ccgctgaacg gggcgcaaaa aggctataag agtcagacct atcctggcgg     1080
tactcacacc ccaatgttta tgtggtggaa aggaaaactt caaccggta attatgacaa     1140 gctgatttcc gcaatggatt tctacccgac agctcttgat gcagccgata tcagcattcc     1200
aaaagacctt aagctggatg gcgtttcctt gctgccctgg ttgcaagata agaaacaagg     1260
cgagccacat aaaaatctga cctggataac ctcttattct cactggtttg acgaggaaaa     1320
tattccattc tgggataatt accacaaatt tgttcgccat cagtcagacg attacccgca     1380
taaccccaac actgaggact taagccaatt ctcttatacg gtgagaaata acgattattc     1440
gcttgtctat acagtagaaa acaatcagtt aggtctctac aaactgacgg atctacagca     1500
aaaagataac cttgccgccg ccaatccgca ggtcgttaaa gagatgcaag gcgtggtaag     1560
agagtttatc gacagcagcc agccaccgct tagcgaggta aatcaggaga gttttaacaa     1620
tatcaagaaa gcactaagcg aagcgaaata a                                    1651

<210> SEQ ID NO 108
<211> LENGTH: 1622
<212> TYPE: DNA
<213> ORGANISM: Escherichia coli

<400> SEQUENCE: 108
atgaaattat tgcagcgggg cgtggcgtta gcgctgttaa ccacatttac ataaataaaa       60
cctacaaaat tacagttctg cataccaatg atcatcatgg cattttttgg cgcaatgaat      120
atggcgaata tggtctggcg gcgcaaaaaa cgctggtgga tggtatccgc aaagaggttg      180
cggctgaagg cggtagcgtg ctgctacttt ccggtggcga cattaacact ggcgtgcccg      240
agtctgactt acaggatgcc gaacctgatt ttcgcggtat gaatctggtg ggctatgacg      300
cgatggcgat cggtaatcat gaatttgata atccgctcac cgtattacgc cagcaggaaa      360
agtgggccaa gttcccgttg ctttccgcga atatctacca gaaaagtact ggcgagcgcc      420
tgtttaaacc gtgggcgctg tttaagcgtc aggatctgaa aattgccgtt attgggctga      480
caaccgatga cacagcaaaa attggtaacc cggaatactt cactgatatc gaatttcgta      540
agcccgccga tgaagcgaag ctggtgattc aggagctgca acagacagaa aagccagaca      600
ttattatcgc ggcgacccat atggggcatt acgataatgg tgagcacggc tctaacgcac      660
cgggcgatgt ggagatggca cgcgcgctgc ctgccggatc gctggcgatg atcgtcggtg      720
gtcactcgca agatccggtc tgcatggcgg cagaaaacaa aaaacaggtc gattacgtgc      780
```

```
cgggtacgcc atgcaaacca gatcaacaaa acggcatctg gattgtgcag gcgcatgagt    840
ggggcaaata cgtgggacgg gctgattttg agtttcgtaa tggcgaaatg aaaatggtta    900
actaccagct gattccggtg aacctgaaga agaaagtgac ctgggaagac gggaaaagcg    960
agcgcgtgct ttacactcct gaaatcgctg aaaaccagca aatgatctcg ctgttatcac   1020
cgttccagaa caaaggcaaa gcgcagctgg aagtgaaaat aggcgaaacc aatggtcgtc   1080
tggaaggcga tcgtgacaaa gtgcgttttg tacagaccaa tatggggcgg ttgattctgg   1140
cagcccaaat ggatcgcact ggtgccgact ttgcggtgat gagcggaggc ggaattcgtg   1200
attctatcga agcaggcgat atcagctata aaaacgtgct gaaagtgcag ccattcggca   1260
atgtggtggt gtatgccgac atgaccggta agaggtgat tgattacctg accgccgtcg   1320
cgcagatgaa gccagattca ggtgcctacc cgcaatttgc caacgttagc tttgtggcga   1380
aagacggcaa actgaacgac cttaaaatca aaggcgaacc ggtcgatccg gcgaaaactt   1440
accgtatggc gacattaaac ttcaatgcca ccggcgtga tggatatccg cgccttgata   1500
acaaaccggg ctatgtgaat accggcttta ttgatgccga agtgctgaaa gcgtatatcc   1560
agaaaagctc gccgctggat gtgagtgttt atgaaccgaa aggtgaggtg agctggcagt   1620
aa                                                                 1622
```

<210> SEQ ID NO 109
<211> LENGTH: 1628
<212> TYPE: DNA
<213> ORGANISM: Escherichia coli

<400> SEQUENCE: 109

```
atggatcgtt aaccgccgtg tgcggtacca gcggcattgc ttctcttttt tctcaggcgg     60
cattcgcggc agattctgat attgccgacg ggcaaaccca gcgttttgac ttctccattc    120
tacagtcaat ggcgcacgac ttagcgcaaa cagcgtggcg tggtgcgcct cgtccgttac    180
ctgacacgct ggcgacaatg acgccgcagg cttataacag tattcaatac gacgccgaaa    240
aatcgctctg gcataacgtt gagaaccgtc aactggacgc tcagttcttc catatgggaa    300
tgggattccg tcgccgcgtt cgtatgtttt ctgtagatcc agcaacacat ctggcgcgtg    360
aaattcactt tcgcccggag ttgttcaaat acaacgatgc aggtgttgat acaaaacaat    420
tagaagggca aagcgatctc ggcttttgccg gttttcgcgt gtttaaagcc cccgaactgg    480
cgcgccgtga tgtagtatca tttctcggcg cgagttattt ccgcgccgtt gatgatacat    540 atcaatacg tttgtcggcc cgcggcctgg cgatcgacac ttacaccgac agtaaagaag    600
agttccccga ctttaccgcc ttctggtttg atacggtaaa accgggggca actaccttta    660
ccgtttatgc gttgctcgat agcgccagca ttactggtgc ctataagttc actatccatt    720
gtgagaaaag tcaggtgatt atggatgtgg aaaatcacct gtatgcgcgc aaagacatta    780
aacagctggg cattgcgccg atgaccagta tgttcagctg cggtactaat gaacgtcgga    840
tgtgcgatac aattcatccg caaattcatg actctgatcg tctgtccatg tggcggggca    900
acggcgagtg gatttgccgt ccgctgaata atccgcaaaa attgcagttc aatgcttaca    960
ccgacaacaa cccgaaaggg tttggtttat tgcaactgga tcgtgacttc tcccattatc   1020
aggacattat gggctggtat aacaaacgcc caagtctgtg ggtggaaccg cgtaacaagt   1080
ggggtaaggg caccatcggc ctgatggaaa tcccaacaac gggcgaaacg ctggataaca   1140
ttgtctgctt ctggcagcca gaaaaagctg taaaagcagg tgatgagttt gcattccagt   1200
```

```
atcgtctgta ctggagtgcg caaccgcctg ttcattgccc attagcgcgc gttatggcga    1260
cgcgtaccgg catgggcggt ttctcggaag gttgggcgcc aggtgaacac tatcccgaaa    1320
aatgggcgcg tcgttttgcc gtcgatttcg ttggtggtga tctgaaagct gccgcgccaa    1380
aaggcattga gccggtgatt acgctttcca gtggggaagc gaagcaaatc gaaattctct    1440
atattgaacc catcgatggt tatcgtattc agtttgactg gtatccgact tcggactcca    1500
ctgatccggt cgatatgcgg atgtatctac gttgtcaggg ggacgctatc agtgaaacat    1560
ggctgtatca gtatttcccg ccagcgccgg ataaacgtca gtatgttgac gaccgcgtga    1620
tgagttaa                                                              1628

<210> SEQ ID NO 110
<211> LENGTH: 1667
<212> TYPE: DNA
<213> ORGANISM: Escherichia coli

<400> SEQUENCE: 110
atgaaatccc ccgcaccttc tcgcccgcaa aaaatggcgt taattccata atgcaggcag      60
aagaaacacc ggtaacacca cagccgcctg atattttatt agggccgctg tttaatgatg     120
tgcaaaacgc caaacttttt ccggaccaaa aaacctttgc cgatgccgtg ccgaacagcg     180
atccgctgat gatccttgct gattatcgga tgcagcaaaa ccagagcgga tttgatctgc     240
gccatttcgt taacgtcaat ttcaccctgc cgaaagaagg cgagaaatat gttccgccag     300
aggggcagtc actgcgcgaa catattgacg gactttggcc ggtattaacg cgttctaccg     360
aaaacaccga aaaatgggat tctctgttac cgctgccgga accttatgtc gtgccggggcg     420 gacgctttcg cgaggtatat tactgggaca gttacttcac catgttagga cttgccgaaa     480
gcggtcactg ggataaagtc gcggatatgg tggccaattt tgctcatgaa atagacactt     540
acggtcatat tcccaacggc aaccgcagtt actatttaag ccgctcgcaa ccgcccttct     600
ttgccctgat ggtagagtta ctggcgcagc atgaaggcga tgccgcgttg aagcaatacc     660
tgccgcaaat gcaaaaagaa tatgcttact ggatggacgg tgttgaaaac ctgcaagccg     720
gacaacagga aaaacgcgtt gtcaaacttc aggatggtac ccttctcaac cgctactggg     780
acgatcgcga tacgccacga ccagagtcat gggtggaaga tattgccacc gccaaaagca     840
atccgaatcg acctgccact gaaatttacc gcgacctgcg ctctgccgct gcgtctggct     900
gggatttcag ctcgcgctgg atggacaacc cgcagcagtt aaatacctta cgcaccacca     960
gcatcgtacc ggtcgatctg aacagcctga tgtttaaaat ggaaaaaatc ctcgcccgcg    1020
ccagcaaagc tgccggagat aacgcgatgg caaaccagta cgaaacgctg gcaaatgccc    1080
gtcaaaaagg gatcgaaaaa tacctgtgga acgatcaaca aggctggtat gccgattacg    1140
acctgaaaag tcataaagtg cgcaatcagt taaccgcggc cgccctgttc ccgctgtacg    1200
tcaatgcggc agcgaaagat cgcgccaaca aaatggcgac ggcgacgaaa acacatctgc    1260
tgcaacccgg cggcctgaac accacgtcgg tgaaagtgg gcaacaatgg gatgcgccaa    1320
atggctgggc accgttacag tgggtcgcga cagaaggatt acaaaactac gggcaaaaag    1380
aggtggcgat ggacattagc tggcacttcc tgaccaatgt tcagcacacc tatgaccggg    1440
agaaaaagct ggtggaaaaa tatgatgtca gcaccaccgg aacgggggc ggcggtggcg    1500 aatatccatt acaggatggc tttggctgga ccaatggcgt gacgctgaaa atgctggatt    1560
tgatctgccc gaaagagcaa ccgtgtgaca atgttccggc gacgcgtccg accgttaagt    1620
cagcaacgac gcaacccctca accaaagagg cacaacccac accttaa                1667
```

<210> SEQ ID NO 111
<211> LENGTH: 3442
<212> TYPE: DNA
<213> ORGANISM: Escherichia coli

<400> SEQUENCE: 111

| | | | | | |
|---|---|---|---|---|---|
| atgcgctaat | ctggccgtca | tgccgatggt | cgaggcagca | ccaaccgctc | agcaacagtt | 60 |
| gctggagcaa | gttcggttag | gcgaagcgac | ccatcgtgaa | gatctggtgc | aacagtcgtt | 120 |
| atatcggctg | gaacttattg | atccgaataa | cccggacgtc | gttgccgccc | gtttccgttc | 180 |
| tttgttacgt | cagggcgata | ttgatggcgc | gcaaaaacag | ctcgatcggc | tgtcgcagtt | 240 |
| agcgccgagt | tcaaatgcgt | ataaatcgtc | gcggactacg | atgctacttt | ccacgccgga | 300 |
| tggtcgtcag | gcactgcaac | aggcacgatt | gcaggcgacg | accggtcatg | cagaagaagc | 360 |
| tgtggcgagt | tacaacaaac | tgttcaacgg | tgcgccgccg | aaggtgaca | ttgctgtcga | 420 |
| gtactggagt | acggtggcga | aaattccggc | tcgccgtggc | gaagcgatta | atcagttaaa | 480 |
| acgcatcaat | gcggatgcac | cgggcaatac | gggcctgcaa | acaatctgg | cgctattgct | 540 |
| gtttagtagc | gatcgccgtg | acgaaggttt | tgccgtcctg | aacagatgg | caaaatcgaa | 600 |
| cgccgggcgc | gaagggggcct | ctaaaatctg | gtacgggcag | attaaagaca | tgcccgtcag | 660 |
| tgatgccagt | gtgtcggcgc | tgaaaaaata | tctctcgatc | tttagtgatg | gcgatagcgt | 720 |
| ggcggctgcg | caatcgcaac | tggcagaaca | gcaaaaacag | ctggccgatc | ctgcttccg | 780 |
| cgtcgtgcg | caaggtttag | cggcggtgga | ctctggtatg | gcgggtaaag | ccattcccga | 840 |
| actacaacag | gcggtgcggg | cgaacccgaa | agacagtgaa | gctctggggg | cgctgggcca | 900 |
| ggcgtattct | cagaaaggcg | atcgcgccaa | tgcagtggcg | aatctggaaa | agccctcgc | 960 |
| actggacccg | cacagcagca | caacgacaa | atggaacagt | ctgctgaaag | taaaccgcta | 1020 |
| ctggctggcg | atccagcagg | gcgatgctgc | gctgaaagcc | aataatcctg | accgggcaga | 1080 |
| acgcctgttc | cagcaggcgc | gtaatgtcga | taacaccgac | agttatgcag | tgctggggct | 1140 |
| gggcgatgtg | gcgatggcgc | gaaaagatta | tcccgccgcc | gaacgttatt | atcagcagac | 1200 |
| cttgcgtatg | gacagcggca | cactaacgc | cgtgcgcggg | ctggcaaata | tttaccgcca | 1260 |
| gcaatcgcca | gaaaaagctg | aagcgtttat | cgcctcgctc | tctgccagtc | agcggcgtag | 1320 |
| cattgatgat | atcgaacgca | gcctgcaaaa | cgaccgtctg | gcacagcagg | cagaggcact | 1380 |
| ggaaaaccag | ggcaaatggg | cgcaggcggc | agcacttcag | cggcaacgac | tggcgctgga | 1440 |
| ccccggcagc | gtatggatta | cttaccgact | ttcgcaggat | ctctggcagg | ccggacaacg | 1500 |
| cagccaggcc | gatacgttaa | tgcgcaatct | ggcgcagcag | aagtcgaacg | acccggagca | 1560 |
| ggtttacgct | tacgggctgt | acctctctgg | tcatgaccag | gacagagcgg | cgctggcgca | 1620 |
| tatcaatagc | ctgccgcgtg | cgcagtggaa | cagcaatatt | caggagctgg | ttaatcgact | 1680 |
| gcaaagcgat | caggtgctgg | aaaccgctaa | ccgcctgcga | gaaagcggca | agaggcaga | 1740 |
| agcggaagcg | atgctgcgcc | agcaaccacc | ttccacgcgt | attgacctca | cgctggctga | 1800 |
| ctgggcgcaa | caacgacgtg | attacaccgc | cgcccgcgct | gcatatcaga | atgtcctgac | 1860 |
| gcgggagcca | gctaacgccg | acgccattct | tggtctgacg | gaagtggata | ttgctgccgg | 1920 |
| tgacaaagcg | gcggcacgta | gccagctggc | gaaactgccc | gctaccgata | acgcctcgct | 1980 |
| gaacacacag | cggcgcgtgg | cgctggcaca | ggcgcagctt | ggcgataccg | cagcagcgca | 2040 |
| gcggacgttt | aataagttga | tcccgcaggc | aaaatctcag | ccaccgtcga | tggaaagcgc | 2100 |

| | |
|---|---:|
| gatggtgctg cgtgatggtg cgaagtttga agcgcaggcg ggcgatccaa cgcaggcgct | 2160 |
| ggaaacctac aaagacgcca tggtcgcatc cggtgtgact acgacgcgtc cgcaggataa | 2220 |
| cgacaccttt acccgactga cccgtaacga cgagaaagat gactggctga aacgtggcgt | 2280 |
| gcgcagcgat gcggcggacc tctatcgcca gcaggatctt aacgtcaccc ttgagcacga | 2340 |
| ttactggggt tcgagcggca ccggtggtta ctccgatctg aaagcgcaca ctaccatgtt | 2400 |
| gcaggtggat gcgccgtatt ctgacgggcg gatgttcttt cgcagtgatt tcgtcaatat | 2460 |
| gaacgtcggc agtttctcca ctaatgccga tggcaaatgg gatgacaact ggggcacctg | 2520 |
| tacattacag gactgtagcg gcaaccgcag ccagtcggat ccggtgcca gcgtggcggt | 2580 |
| cggctggcga atgacgtct ggagctggga tatcggtacc acgccgatgg gcttcaacgt | 2640 |
| ggtggatgtg gtcggcggca tcagttacag cgatgatatc gggccgctgg gttacaccgt | 2700 |
| taacgcccac cgtcggccca tctccagttc tttgctggcc tttggtgggc aaaaagactc | 2760 |
| cccgagcaat accgggaaaa atggggtgg cgtacgtgcc gacggtgtgg ggctaagtct | 2820 |
| gagctacgat aaaggtgaag caaacggcgt ctgggcatcg cttagtggcg accagttaac | 2880 |
| cggtaaaaat gtcgaagata actggcgcgt gcgctggatg acgggctatt actataaggt | 2940 |
| cattaaccag aacaatcgcc gcgtcacaat cggcctgaac aacatgatct ggcattacga | 3000 |
| caaagatctg agtggctact cactcggtca gggcggttac tacagtccgc aggaatacct | 3060 |
| gtcgtttgcc ataccggtga tgtggcggga gcgcacggaa actggtcgt gggagctggg | 3120 |
| tgcgtctggc tcgtggtcgc attcacgcac caaaaccatg ccgcgttatc cgctgatgaa | 3180 |
| tctgatcccg accgactggc aggaagaagc tgcgcggcaa tccaacgatg gcggcagcag | 3240 |
| tcagggcttc ggctacacgg cgcgggcatt acttgaacga cgtgttactt ccaactggtt | 3300 |
| tgttggcacg gcaattgata tccagcaggc gaaagattac gcacccagcc atttcctgct | 3360 |
| ctacgtacgt tattccgccg ccggatggca gggtgacatg gatttaccgc cgcagccgct | 3420 |
| gataccttac gccgactggt aa | 3442 |

<210> SEQ ID NO 112
<211> LENGTH: 1382
<212> TYPE: DNA
<213> ORGANISM: Escherichia coli

<400> SEQUENCE: 112

| | |
|---|---:|
| atgtcactca gtcggcgtca gttcattcag gcatcggggt aaccagcgca gccgggcaac | 60 |
| agcaaccgct acccgttccg ccgctacttg aatctcgccg tgggcaaccg ctgtttatga | 120 |
| ctgtacaacg tgcgcactgg tcatttacgc cagggacacg cgcgtcggtc tggggaatca | 180 |
| atggtcgtta cctggggccg actatccgcg tctggaaggg cgacgatgtt aagcttattt | 240 |
| acagcaaccg cctgacagaa aatgtctcaa tgacggtggc cgggctacag gtaccaggcc | 300 |
| cgctgatggg cggtccggca cggatgatgt cgccaaacgc tgactggca cccgtactgc | 360 |
| ccattcgcca gaacgcagct actctgtggt atcacgccaa tactcccaac cgcacggctc | 420 |
| agcaggtcta taacggcctt gccggaatgt ggctggtgga agatgaagtc agcaagtcgc | 480 |
| tgcctatccc caaccattat ggtgtggatg attttccggt cattatccag ataaacggc | 540 |
| tggataactt tggtacgcca gaatacaacg aaccgggaag cggcggcttt gttggtgata | 600 |
| cgctgctggt taacggtgta caaagcccgt acgttgaagt ctcgcgtggc tgggtgcgct | 660 |
| tgcgactgct gaacgcgtcg aactctcgtc gctatcaact acagatgaac gatggtcgcc | 720 |
| cgttacatgt gatttctggc gatcagggat tcctgcctgc tcctgtatcg gtgaagcaac | 780 |

```
tttcgctggc accgggcgag cgccgcgaga ttctggtgga tatgagcaac ggcgatgaag    840
tgtcgatcac ctgtggcgaa gcggcgagca ttgttgatcg tattcgtggc ttctttgagc    900
catccagtat tctggtttct accctggtgc taacgctgcg cccaaccggc cttctgccgc    960
tggtcacaga cagtcttccg atgcgcttgc tgccaactga atcatggct ggttcgccaa    1020 ttcgcagtcg cgatatcagt ctgggtgatg acccgggtat taatggacag ctgtgggacg    1080
tcaaccgtat tgatgtcacc gcgcagcaag gaacgtggga acgctggacg gtacgcgcgg    1140
acgagccgca agcgttccat attgaaggcg taatgttcca gatccgtaac gtgaatggcg    1200
cgatgccgtt cccggaagac agaggctgga agataccgt ttgggttgac ggacaagtgg    1260
agctgcttgt ttatttcggt cagccttcct gggcgcactt cccgttctac ttcaacagtc    1320
agacgctgga aatggcggac cgtggctcga ttgggcaact gttggtcaat ccggtaccgt    1380
aa    1382
```

<210> SEQ ID NO 113
<211> LENGTH: 2858
<212> TYPE: DNA
<213> ORGANISM: Escherichia coli

<400> SEQUENCE: 113

```
atgccccgca gcacctggtt caaagcatta ttgttgttag ttgccctttg ggcaccctta     60
agtcaggcag aaacgggatg gcagccgatt caggaaacca tccgtaaaag tgattaaata    120
acggtatggt ggtcttgctg gtttctgatc cgcaggcagt taaatcgctc tcggcgctgg    180
tggtgcccgt tgggtcgctg gaagatcccg aggcgtacca ggggctggca cattaccttg    240
aacatatgag tctgatgggg tcgaaaaagt acccgcaggc tgacagtctg ccgaatatc    300 tcaaaatgca cggcggtagt cacaatgcca gcactgcgcc gtatcgcacg ctttctatc    360 tggaagttga gaacgacgcc ttgcctggtg cggtagaccg cctggccgat gctattgctg    420
aacctttgct cgacaagaaa tatgccgaac gtgagcgtaa tgcggtgaac gctgaattaa    480
ccatggcgcg tacgcgtgac gggatgcgca tggcacaggt cagcgcagaa accattaacc    540
cggcacaccc cggttcaaag ttttctggtg gtaacctcga aactttaagc gacaaacctg    600
gtaatccggt gcagcaggcg ctgaaagatt tccacgagaa gtactattcc gccaatttga    660
tgaaggcggt tatttacagt aataaaccgc tgccggagtt ggcaaaaatg gcggcggaca    720
cctttggtcg cgtgccgaac aaagagagca aaaaaccgga aatcaccgtg ccggtagtca    780
ccgacgcgca aaagggcatt atcattcatt acgtccctgc gctgccgcgt aaagtgttgc    840
gcgttgagtt tcgcatcgat aacaactcag cgaagttccg tagtaaaaacc gatgaattga    900 ttacctatct gattggcaat gcagcccag gtacactttc tgactggctg caaaagcagg    960
gattagttga gggcattagc gccaactccg atcctatcgt caacggcaac agcggcgtat   1020
tagcgatctc tgcgtctta accgataaag gcctggctaa tcgcgatcag gttgtggcgg   1080
caatttttag ctatctcaat ctgttacgtg aaaaaggcat tgataaacaa tacttcgatg   1140
aactggcgaa tgtgctggat atcgacttcc gttatccgtc gatcacccgt gatatggatt   1200
acgtcgaatg gctggcagat accatgatc gcgttcctgt tgagcatacg ctggatgcag   1260
tcaatattgc cgatcggtac gatgctaaag cagtaaagga acgtctggcg atgatgacgc   1320
cgcagaatgc gcgtatctgg tatatcagcc cgaaagagcc gcacaacaaa acggcttact   1380
ttgtcgatgc gccgtatcag gtcgataaaa tcagcgcaca aactttcgcc gactggcaga   1440
```

```
aaaaagccgc cgacattgcg ctctctttgc cagagcttaa cccttatatt cctgatgatt    1500
tctcgctgat taagtcagag aagaaatacg accatccaga gctgattgtt gatgagtcga    1560
atctgcgcgt ggtgtatgcg ccaagccgtt attttgccag cgagcccaaa gctgatgtca    1620
gcctgatttt gcgtaatccg aaagccatgg acagcgcccg caatcaggtg atgtttgcgc    1680
tcaatgatta tctcgcaggg ctggcgcttg atcagttaag caaccaggcg tcggttggtg    1740
gcataagttt ttccaccaac gctaacaacg gccttatggt taatgctaat ggttacaccc    1800
agcgtctgcc gcagctgttc caggcattgc tcgaggggta ctttagctat accgctacgg    1860
aagatcagct tgagcaggcg aagtcctggt ataaccagat gatggattcc gcagaaaagg    1920
gtaaagcgtt tgagcaggcg attatgcccg cgcagatgct ctcgcaagtg ccgtacttct    1980
cgcgagatga acggcgtaaa attttgccct ccattacgtt gaaagaggtg ctggcctatc    2040
gcgacgcctt aaaatcaggg gctcgaccag agtttatggt tatcggcaac atgaccgagg    2100
cccaggcaac aacgctggca cgcgatgtgc aaaaacagtt gggcgctgat ggttcagagt    2160
ggtgtcgaaa caaagatgta gtggtcgata aaaacaatc cgtcatcttt gaaaagccg    2220 gtaacagcac cgactccgca ctggcagcgg tatttgtacc gactggctac gatgaataca    2280
ccagctcagc ctatagctct ctgttggggc agatcgtaca gccgtggttc tacaatcagt    2340
tgcgtaccga agaacaattg ggctatgccg tgtttgcgtt tccaatgagc gtggggcgtc    2400 agtgggcat gggcttcctt ttgcaaagca atgataaaca gccttcattc ttgtgggagc    2460
gttacaaggc gttttttccca accgcagagg caaaattgcg agcgatgaag ccagatgagt    2520
ttgcgcaaat ccagcaggcg gtaattaccc agatgctgca ggcaccgcaa acgtcgggcg    2580
aagaagcatc gaagttaagt aaagatttcg atcgcggcaa tatgcgcttc gattcgcgtg    2640
ataaaatcgt ggcccagata aaactgctga cgccgcaaaa acttgctgat ttcttccatc    2700
aggcggtggt cgagccgcaa ggcatggcta ttctgtcgca gatttccggc agccagaacg    2760
ggaaagccga atatgtacac cctgaaggct ggaaagtgtg ggagaacgtc agcgcgttgc    2820
agcaaacaat gcccctgatg agtgaaaaga atgagtga                           2858

<210> SEQ ID NO 114
<211> LENGTH: 1317
<212> TYPE: DNA
<213> ORGANISM: Escherichia coli

<400> SEQUENCE: 114
atggtcatga gccagaaaac ctaagcactt atctccaccc aggcctggtc ggcaggcttt     60
cagttaaacg aatttctctt ctctggcctg gccgggctt attcagggga aggcgcaatt    120
gccgatgatg caggtaacgt cagccgtaac cccgcattga ttactatgtt tgaccgcccg    180 acatttctg cgggtgcggt ttatattgac ccggatgtaa atatcagcgg aacgtctcca    240
tctggtcgta gcctgaaagc cgataacatc gcgcctacgg catgggttcc gaacatgcac    300
tttgttgcac cgattaacga ccaatttggt tggggcgctt ctattacctc taactatggt    360
ctggctacag agtttaacga tacttatgca ggcggctctg tcgggggac aaccgacctt    420 gaaaccatga acctgaactt aagcggtgcg tatcgcttaa ataatgcatg gagctttggt    480
cttggtttca cgccgtctca cgctcgcgcg aaaattgaac gtttcgcagg cgatctgggg    540
cagttggttg ctggccaaat tatgcaatct cctgctggcc aaactcagca agggcaagca    600
ttggcagcta ccgccaacgg tattgacagt aataccaaaa tcgctcatct gaacggtaac    660
cagtggggct ttggctggaa cgccggaatc ctgtatgaac tggataaaaa taaccgctat    720
```

```
gcactgacct accgttctga agtgaaaatt gacttcaaag gtaactacag cagcgatctt    780
aatcgtgcgt ttaataacta cggtttgcca attcctaccg cgacaggtgg cgcaacgcaa    840
tcgggttatc tgacgctgaa cctgcctgaa atgtgggaag tgtcaggtta taaccgtgtt    900
gatccacagt gggcgattca ctatagcctg gcttacacca gctggagtca gttccagcag    960
ctgaaagcga cctcaaccag tggcgacacg ctgttccaga acatgaagg ctttaaagat    1020 gcttaccgca tcgcgttggg taccacttat tactacgatg ataactggac cttccgtacc    1080
ggtatcgcct ttgatgacag cccagttcct gcacagaatc gttctatctc cattccggac    1140
caggaccgtt tctggctgag tgcaggtacg acttacgcat ttaataaaga tgcttcagtc    1200
gacgttggtg tttcttatat gcacggtcag agcgtgaaaa ttaacgaagg cccataccag    1260
ttcgagtctg aaggtaaagc ctggctgttc ggtactaact ttaactacgc gttctga       1317

<210> SEQ ID NO 115
<211> LENGTH: 703
<212> TYPE: DNA
<213> ORGANISM: Escherichia coli

<400> SEQUENCE: 115
atgaaaaagt tagttcttgc cgctttactt gcttccttta ctttctaacg tttcagccac     60
ctatccaccc tttgaatcta taggtgctaa taatgagatt gtcggctttg atatcgatct    120
ggcaaaagcc ttgtgcaaac aaatgcaggc agaatgtact tttactaatc acgcgttcga    180
cagcctgatc ccgtccctga aattcagaaa atatgacgcc gtaatctccg gtatggatat    240
caccccggag cgtagcaaac aggtatcgtt taccacgccc tactatgaaa actcagccgt    300
cgtgattgcc aaaaaagata cctacaaaac gtttgccgat ctgaaaggca aacgtattgg    360
gatggaaaac ggtactacgc accagaaata tattcaggat cagcacccgg aagtgaaaac    420
tgtctcttat gacagttatc agaatgcctt tatcgatctg aaaaatggtc gtattgatgg    480
ggtatttggt gacacagcgg tggtaaacga atggctgaaa accaatccac aacttggtgt    540
tgctactgag aaagtgaccg atccgcaata ttttggcacc ggcctgggca tcgctgtacg    600
tccggataac aaagccctgc tggaaaaact gaataacgcg ctggcagcaa ttaaagctga    660
cggtacttat caaaaaatca gtgaccagtg gttcccacag taa                      703

<210> SEQ ID NO 116
<211> LENGTH: 726
<212> TYPE: DNA
<213> ORGANISM: Escherichia coli

<400> SEQUENCE: 116
atgaagcttc gcctgtcggc gcttgctctg ggaactacgc ttctggtggg gtgtgcgagt     60
tccggtacat aattcaaccg caccatgtac aacttcaact tcaatgtatt agacccgtat    120
attgttcgac cggtcgctgt cgcctggcgt gattatgttc cgcaaccggc gcgtaacggt    180
ttgagcaact ttactggcaa ccttgaagaa cctgcggtga tggttaacta cttcttgcag    240
ggcgaccctt atcaggggat ggtccacttt acccgctttt tcctgaacac cattttgggg    300
atgggcggtt ttattgatgt tgcagggatg gcgaacccga actgcaacg gactgaacct    360 caccgcttcg gtagtacgct tggtcattat ggcgtgggtt atgggcctta cgtccagtta    420
ccgttctacg gtagcttcac gctgcgtgat gacggtggtg atatgccgga tggtctttac    480
ccggttcttt cctggctgac ctggccgatg tctgtgggta aatggacgct tgaagggata    540
```

```
gaaactcgtg cgcagttgtt ggattccgat ggtctgctgc gtcagtcgtc cgatccttat    600
attatggtgc gcgaagcgta cttccagcgt catgatttca tcgctaatgg cggcgaactc    660
aaaccgcagg aaaatccgaa cgcacaagcg attcaggatg atttaaaaga tattgattct    720
gaataa                                                                726
```

```
<210> SEQ ID NO 117
<211> LENGTH: 21
<212> TYPE: DNA
<213> ORGANISM: Artificial Sequence
<220> FEATURE:
<223> OTHER INFORMATION: oligonucleotide primer

<400> SEQUENCE: 117
tctcaaccca atggcctgcc a                                               21

<210> SEQ ID NO 118
<211> LENGTH: 20
<212> TYPE: DNA
<213> ORGANISM: Artificial Sequence
<220> FEATURE:
<223> OTHER INFORMATION: oligonucleotide primer

<400> SEQUENCE: 118
ctccagcggc tgagtgttac                                                 20

<210> SEQ ID NO 119
<211> LENGTH: 21
<212> TYPE: DNA
<213> ORGANISM: Artificial Sequence
<220> FEATURE:
<223> OTHER INFORMATION: oligonucleotide primer

<400> SEQUENCE: 119
actggcgctc gctgcaattg c                                               21

<210> SEQ ID NO 120
<211> LENGTH: 21
<212> TYPE: DNA
<213> ORGANISM: Artificial Sequence
<220> FEATURE:
<223> OTHER INFORMATION: oligonucleotide primer

<400> SEQUENCE: 120
actggcgctc gctgcaattg c                                               21

<210> SEQ ID NO 121
<211> LENGTH: 21
<212> TYPE: DNA
<213> ORGANISM: Artificial Sequence
<220> FEATURE:
<223> OTHER INFORMATION: oligonucleotide primer

<400> SEQUENCE: 121
acctgcagta ttgtttgccg c                                               21

<210> SEQ ID NO 122
<211> LENGTH: 20
<212> TYPE: DNA
<213> ORGANISM: Artificial Sequence
<220> FEATURE:
<223> OTHER INFORMATION: oligonucleotide primer

<400> SEQUENCE: 122
ttcccgccga gacgatgcaa                                                 20
```

<210> SEQ ID NO 123
<211> LENGTH: 21
<212> TYPE: DNA
<213> ORGANISM: Artificial Sequence
<220> FEATURE:
<223> OTHER INFORMATION: oligonucleotide primer

<400> SEQUENCE: 123
ctgcaaaaac gcaacggagg c                                              21

<210> SEQ ID NO 124
<211> LENGTH: 21
<212> TYPE: DNA
<213> ORGANISM: Artificial Sequence
<220> FEATURE:
<223> OTHER INFORMATION: oligonucleotide primer

<400> SEQUENCE: 124
agataatccg ctccctgcgc a                                              21

<210> SEQ ID NO 125
<211> LENGTH: 21
<212> TYPE: DNA
<213> ORGANISM: Artificial Sequence
<220> FEATURE:
<223> OTHER INFORMATION: oligonucleotide primer

<400> SEQUENCE: 125
tgcgttggtt gagtgctgca g                                              21

<210> SEQ ID NO 126
<211> LENGTH: 23
<212> TYPE: DNA
<213> ORGANISM: Artificial Sequence
<220> FEATURE:
<223> OTHER INFORMATION: oligonucleotide primer

<400> SEQUENCE: 126
gtcttcagat tgttccagta cgc                                            23

<210> SEQ ID NO 127
<211> LENGTH: 23
<212> TYPE: DNA
<213> ORGANISM: Artificial Sequence
<220> FEATURE:
<223> OTHER INFORMATION: oligonucleotide primer

<400> SEQUENCE: 127
gaaaggacgt tgggtaaagt acc                                            23

<210> SEQ ID NO 128
<211> LENGTH: 21
<212> TYPE: DNA
<213> ORGANISM: Artificial Sequence
<220> FEATURE:
<223> OTHER INFORMATION: oligonucleotide primer

<400> SEQUENCE: 128
cagacgcggt gacgaattac g                                              21

<210> SEQ ID NO 129
<211> LENGTH: 21
<212> TYPE: DNA
<213> ORGANISM: Artificial Sequence
<220> FEATURE:

<223> OTHER INFORMATION: oligonucleotide primer

<400> SEQUENCE: 129
acttttgctg ccgatctgcc g                                    21

<210> SEQ ID NO 130
<211> LENGTH: 21
<212> TYPE: DNA
<213> ORGANISM: Artificial Sequence
<220> FEATURE:
<223> OTHER INFORMATION: oligonucleotide primer

<400> SEQUENCE: 130
ttcacggcgg tgaaggttgc a                                    21

<210> SEQ ID NO 131
<211> LENGTH: 21
<212> TYPE: DNA
<213> ORGANISM: Artificial Sequence
<220> FEATURE:
<223> OTHER INFORMATION: oligonucleotide primer

<400> SEQUENCE: 131
cggcttattg gctctgtctg g                                    21

<210> SEQ ID NO 132
<211> LENGTH: 21
<212> TYPE: DNA
<213> ORGANISM: Artificial Sequence
<220> FEATURE:
<223> OTHER INFORMATION: oligonucleotide primer

<400> SEQUENCE: 132
cgacggtttc ggtaccggat a                                    21

<210> SEQ ID NO 133
<211> LENGTH: 21
<212> TYPE: DNA
<213> ORGANISM: Artificial Sequence
<220> FEATURE:
<223> OTHER INFORMATION: oligonucleotide primer

<400> SEQUENCE: 133
tgcggtttct tctcatgccg c                                    21

<210> SEQ ID NO 134
<211> LENGTH: 21
<212> TYPE: DNA
<213> ORGANISM: Artificial Sequence
<220> FEATURE:
<223> OTHER INFORMATION: oligonucleotide primer

<400> SEQUENCE: 134
gcgccagatc gacgttttg g                                     21

<210> SEQ ID NO 135
<211> LENGTH: 22
<212> TYPE: DNA
<213> ORGANISM: Artificial Sequence
<220> FEATURE:
<223> OTHER INFORMATION: oligonucleotide primer

<400> SEQUENCE: 135
cattaacttc cgccgtaacg ca                                   22

```
<210> SEQ ID NO 136
<211> LENGTH: 20
<212> TYPE: DNA
<213> ORGANISM: Artificial Sequence
<220> FEATURE:
<223> OTHER INFORMATION: oligonucleotide primer

<400> SEQUENCE: 136
cactccagcg ccttctggct                                           20

<210> SEQ ID NO 137
<211> LENGTH: 22
<212> TYPE: DNA
<213> ORGANISM: Artificial Sequence
<220> FEATURE:
<223> OTHER INFORMATION: oligonucleotide primer

<400> SEQUENCE: 137
taggaatcgc ggtgagtctg gc                                        22

<210> SEQ ID NO 138
<211> LENGTH: 21
<212> TYPE: DNA
<213> ORGANISM: Artificial Sequence
<220> FEATURE:
<223> OTHER INFORMATION: oligonucleotide primer

<400> SEQUENCE: 138
gccccaacct gaccgtcttt g                                         21

<210> SEQ ID NO 139
<211> LENGTH: 21
<212> TYPE: DNA
<213> ORGANISM: Artificial Sequence
<220> FEATURE:
<223> OTHER INFORMATION: oligonucleotide primer

<400> SEQUENCE: 139
cgcaactgtg gcagggatag t                                         21

<210> SEQ ID NO 140
<211> LENGTH: 21
<212> TYPE: DNA
<213> ORGANISM: Artificial Sequence
<220> FEATURE:
<223> OTHER INFORMATION: oligonucleotide primer

<400> SEQUENCE: 140
cacttcgagc acgccacctt t                                         21

<210> SEQ ID NO 141
<211> LENGTH: 23
<212> TYPE: DNA
<213> ORGANISM: Artificial Sequence
<220> FEATURE:
<223> OTHER INFORMATION: oligonucleotide primer

<400> SEQUENCE: 141
gactgccgca attatttctg cct                                       23

<210> SEQ ID NO 142
<211> LENGTH: 23
<212> TYPE: DNA
<213> ORGANISM: Artificial Sequence
<220> FEATURE:
<223> OTHER INFORMATION: oligonucleotide primer
```

```
<400> SEQUENCE: 142
ctgatccagt tcgaccatct ctt                                           23

<210> SEQ ID NO 143
<211> LENGTH: 21
<212> TYPE: DNA
<213> ORGANISM: Artificial Sequence
<220> FEATURE:
<223> OTHER INFORMATION: oligonucleotide primer

<400> SEQUENCE: 143
tccgtccgac agaccgtttt g                                             21

<210> SEQ ID NO 144
<211> LENGTH: 21
<212> TYPE: DNA
<213> ORGANISM: Artificial Sequence
<220> FEATURE:
<223> OTHER INFORMATION: oligonucleotide primer

<400> SEQUENCE: 144
aaaccaggca cgctggtcag t                                             21

<210> SEQ ID NO 145
<211> LENGTH: 23
<212> TYPE: DNA
<213> ORGANISM: Artificial Sequence
<220> FEATURE:
<223> OTHER INFORMATION: oligonucleotide primer

<400> SEQUENCE: 145
caagagcgta acgatgatta cgc                                           23

<210> SEQ ID NO 146
<211> LENGTH: 21
<212> TYPE: DNA
<213> ORGANISM: Artificial Sequence
<220> FEATURE:
<223> OTHER INFORMATION: oligonucleotide primer

<400> SEQUENCE: 146
cgtaggcacc tttacctacc g                                             21

<210> SEQ ID NO 147
<211> LENGTH: 21
<212> TYPE: DNA
<213> ORGANISM: Artificial Sequence
<220> FEATURE:
<223> OTHER INFORMATION: oligonucleotide primer

<400> SEQUENCE: 147
ggtgcactca tcctcagcct t                                             21

<210> SEQ ID NO 148
<211> LENGTH: 24
<212> TYPE: DNA
<213> ORGANISM: Artificial Sequence
<220> FEATURE:
<223> OTHER INFORMATION: oligonucleotide primer

<400> SEQUENCE: 148
cagcgatttc taacaacgta tccg                                          24

<210> SEQ ID NO 149
<211> LENGTH: 21
```

<212> TYPE: DNA
<213> ORGANISM: Artificial Sequence
<220> FEATURE:
<223> OTHER INFORMATION: oligonucleotide primer

<400> SEQUENCE: 149
tctttccgcc acagctgccg a                                         21

<210> SEQ ID NO 150
<211> LENGTH: 22
<212> TYPE: DNA
<213> ORGANISM: Artificial Sequence
<220> FEATURE:
<223> OTHER INFORMATION: oligonucleotide primer

<400> SEQUENCE: 150
acggcttcta cgcgacggaa tt                                        22

<210> SEQ ID NO 151
<211> LENGTH: 21
<212> TYPE: DNA
<213> ORGANISM: Artificial Sequence
<220> FEATURE:
<223> OTHER INFORMATION: oligonucleotide primer

<400> SEQUENCE: 151
agtggtgctc tggcggtatc t                                         21

<210> SEQ ID NO 152
<211> LENGTH: 21
<212> TYPE: DNA
<213> ORGANISM: Artificial Sequence
<220> FEATURE:
<223> OTHER INFORMATION: oligonucleotide primer

<400> SEQUENCE: 152
atgtaataac ccacgccgcc g                                         21

<210> SEQ ID NO 153
<211> LENGTH: 21
<212> TYPE: DNA
<213> ORGANISM: Artificial Sequence
<220> FEATURE:
<223> OTHER INFORMATION: oligonucleotide primer

<400> SEQUENCE: 153
gcatgtcttt cagcactggc c                                         21

<210> SEQ ID NO 154
<211> LENGTH: 21
<212> TYPE: DNA
<213> ORGANISM: Artificial Sequence
<220> FEATURE:
<223> OTHER INFORMATION: oligonucleotide primer

<400> SEQUENCE: 154
gcagtacggc ttttctcggt g                                         21

<210> SEQ ID NO 155
<211> LENGTH: 21
<212> TYPE: DNA
<213> ORGANISM: Artificial Sequence
<220> FEATURE:
<223> OTHER INFORMATION: oligonucleotide primer

<400> SEQUENCE: 155
ctgccgctct ggcaatgctt a                                              21

<210> SEQ ID NO 156
<211> LENGTH: 23
<212> TYPE: DNA
<213> ORGANISM: Artificial Sequence
<220> FEATURE:
<223> OTHER INFORMATION: oligonucleotide primer

<400> SEQUENCE: 156
ccgagcaatc catttacgaa tgt                                            23

<210> SEQ ID NO 157
<211> LENGTH: 21
<212> TYPE: DNA
<213> ORGANISM: Artificial Sequence
<220> FEATURE:
<223> OTHER INFORMATION: oligonucleotide primer

<400> SEQUENCE: 157
gcggtttgct gatgatggcc a                                              21

<210> SEQ ID NO 158
<211> LENGTH: 21
<212> TYPE: DNA
<213> ORGANISM: Artificial Sequence
<220> FEATURE:
<223> OTHER INFORMATION: oligonucleotide primer

<400> SEQUENCE: 158
gcgtgactgt aaccgctctg t                                              21

<210> SEQ ID NO 159
<211> LENGTH: 21
<212> TYPE: DNA
<213> ORGANISM: Artificial Sequence
<220> FEATURE:
<223> OTHER INFORMATION: oligonucleotide primer

<400> SEQUENCE: 159
catgactata cgaacccgcc g                                              21

<210> SEQ ID NO 160
<211> LENGTH: 21
<212> TYPE: DNA
<213> ORGANISM: Artificial Sequence
<220> FEATURE:
<223> OTHER INFORMATION: oligonucleotide primer

<400> SEQUENCE: 160
cacgtccgga ggttgaagct t                                              21

<210> SEQ ID NO 161
<211> LENGTH: 27
<212> TYPE: DNA
<213> ORGANISM: Artificial Sequence
<220> FEATURE:
<223> OTHER INFORMATION: oligonucleotide primer

<400> SEQUENCE: 161
ctcgttcgac tcatagctga acacaac                                        27

<210> SEQ ID NO 162
<211> LENGTH: 22
<212> TYPE: DNA
<213> ORGANISM: Artificial Sequence

```
<220> FEATURE:
<223> OTHER INFORMATION: oligonucleotide primer

<400> SEQUENCE: 162
cgtccagcag ttgttgcagg cc                                              22

<210> SEQ ID NO 163
<211> LENGTH: 22
<212> TYPE: DNA
<213> ORGANISM: Artificial Sequence
<220> FEATURE:
<223> OTHER INFORMATION: oligonucleotide primer

<400> SEQUENCE: 163
ggcaatttct gctgtagctg ca                                              22

<210> SEQ ID NO 164
<211> LENGTH: 22
<212> TYPE: DNA
<213> ORGANISM: Artificial Sequence
<220> FEATURE:
<223> OTHER INFORMATION: oligonucleotide primer

<400> SEQUENCE: 164
gaccgaaacc agtcagttga tc                                              22

<210> SEQ ID NO 165
<211> LENGTH: 20
<212> TYPE: DNA
<213> ORGANISM: Artificial Sequence
<220> FEATURE:
<223> OTHER INFORMATION: oligonucleotide primer

<400> SEQUENCE: 165
taattcctgc cctgctcgcc                                                 20

<210> SEQ ID NO 166
<211> LENGTH: 23
<212> TYPE: DNA
<213> ORGANISM: Artificial Sequence
<220> FEATURE:
<223> OTHER INFORMATION: oligonucleotide primer

<400> SEQUENCE: 166
tgtattccca ttgaccgtag cca                                             23

<210> SEQ ID NO 167
<211> LENGTH: 22
<212> TYPE: DNA
<213> ORGANISM: Artificial Sequence
<220> FEATURE:
<223> OTHER INFORMATION: oligonucleotide primer

<400> SEQUENCE: 167
gcgttcgatg cttctttgag cg                                              22

<210> SEQ ID NO 168
<211> LENGTH: 24
<212> TYPE: DNA
<213> ORGANISM: Artificial Sequence
<220> FEATURE:
<223> OTHER INFORMATION: oligonucleotide primer

<400> SEQUENCE: 168
acgcgtgacg cagtagcggt aaac                                            24
```

```
<210> SEQ ID NO 169
<211> LENGTH: 21
<212> TYPE: DNA
<213> ORGANISM: Artificial Sequence
<220> FEATURE:
<223> OTHER INFORMATION: oligonucleotide primer

<400> SEQUENCE: 169
gcgcgttcca aaactgctca g                                              21

<210> SEQ ID NO 170
<211> LENGTH: 20
<212> TYPE: DNA
<213> ORGANISM: Artificial Sequence
<220> FEATURE:
<223> OTHER INFORMATION: oligonucleotide primer

<400> SEQUENCE: 170
gtgccggtag ctgactgtcg                                                20

<210> SEQ ID NO 171
<211> LENGTH: 21
<212> TYPE: DNA
<213> ORGANISM: Artificial Sequence
<220> FEATURE:
<223> OTHER INFORMATION: oligonucleotide primer

<400> SEQUENCE: 171
ctcacaacgg gtatccatgc g                                              21

<210> SEQ ID NO 172
<211> LENGTH: 22
<212> TYPE: DNA
<213> ORGANISM: Artificial Sequence
<220> FEATURE:
<223> OTHER INFORMATION: oligonucleotide primer

<400> SEQUENCE: 172
ctgaagattc acggtgaccg ac                                             22

<210> SEQ ID NO 173
<211> LENGTH: 21
<212> TYPE: DNA
<213> ORGANISM: Artificial Sequence
<220> FEATURE:
<223> OTHER INFORMATION: oligonucleotide primer

<400> SEQUENCE: 173
ctggtgctat cgctctctct g                                              21

<210> SEQ ID NO 174
<211> LENGTH: 21
<212> TYPE: DNA
<213> ORGANISM: Artificial Sequence
<220> FEATURE:
<223> OTHER INFORMATION: oligonucleotide primer

<400> SEQUENCE: 174
cgcatccagc ggattttcga c                                              21

<210> SEQ ID NO 175
<211> LENGTH: 21
<212> TYPE: DNA
<213> ORGANISM: Artificial Sequence
<220> FEATURE:
<223> OTHER INFORMATION: oligonucleotide primer
```

<400> SEQUENCE: 175
tgtctgctca ggcaatggct g                                              21

<210> SEQ ID NO 176
<211> LENGTH: 22
<212> TYPE: DNA
<213> ORGANISM: Artificial Sequence
<220> FEATURE:
<223> OTHER INFORMATION: oligonucleotide primer

<400> SEQUENCE: 176
ggccacgtta gtgtcgaaat ag                                             22

<210> SEQ ID NO 177
<211> LENGTH: 21
<212> TYPE: DNA
<213> ORGANISM: Artificial Sequence
<220> FEATURE:
<223> OTHER INFORMATION: oligonucleotide primer

<400> SEQUENCE: 177
cgcatcctcg cattatccgc a                                              21

<210> SEQ ID NO 178
<211> LENGTH: 21
<212> TYPE: DNA
<213> ORGANISM: Artificial Sequence
<220> FEATURE:
<223> OTHER INFORMATION: oligonucleotide primer

<400> SEQUENCE: 178
gccgcaacct gtgggaattt c                                              21

<210> SEQ ID NO 179
<211> LENGTH: 21
<212> TYPE: DNA
<213> ORGANISM: Artificial Sequence
<220> FEATURE:
<223> OTHER INFORMATION: oligonucleotide primer

<400> SEQUENCE: 179
agcgcgcctg gaattagcct t                                              21

<210> SEQ ID NO 180
<211> LENGTH: 21
<212> TYPE: DNA
<213> ORGANISM: Artificial Sequence
<220> FEATURE:
<223> OTHER INFORMATION: oligonucleotide primer

<400> SEQUENCE: 180
agttcgccaa tgtttgccgg g                                              21

<210> SEQ ID NO 181
<211> LENGTH: 22
<212> TYPE: DNA
<213> ORGANISM: Artificial Sequence
<220> FEATURE:
<223> OTHER INFORMATION: oligonucleotide primer

<400> SEQUENCE: 181
taatcgcagt aatggccctg tg                                             22

<210> SEQ ID NO 182

```
<211> LENGTH: 23
<212> TYPE: DNA
<213> ORGANISM: Artificial Sequence
<220> FEATURE:
<223> OTHER INFORMATION: oligonucleotide primer

<400> SEQUENCE: 182
gaacacgtag agatcgtcag aga                                          23

<210> SEQ ID NO 183
<211> LENGTH: 23
<212> TYPE: DNA
<213> ORGANISM: Artificial Sequence
<220> FEATURE:
<223> OTHER INFORMATION: oligonucleotide primer

<400> SEQUENCE: 183
gggctgtgtt tgtccgctat ttc                                          23

<210> SEQ ID NO 184
<211> LENGTH: 21
<212> TYPE: DNA
<213> ORGANISM: Artificial Sequence
<220> FEATURE:
<223> OTHER INFORMATION: oligonucleotide primer

<400> SEQUENCE: 184
cgtcagttgt acgccaggca c                                            21

<210> SEQ ID NO 185
<211> LENGTH: 21
<212> TYPE: DNA
<213> ORGANISM: Artificial Sequence
<220> FEATURE:
<223> OTHER INFORMATION: oligonucleotide primer

<400> SEQUENCE: 185
cattccctgg ccttgttggt c                                            21

<210> SEQ ID NO 186
<211> LENGTH: 21
<212> TYPE: DNA
<213> ORGANISM: Artificial Sequence
<220> FEATURE:
<223> OTHER INFORMATION: oligonucleotide primer

<400> SEQUENCE: 186
tggcatggta cggatgatct c                                            21

<210> SEQ ID NO 187
<211> LENGTH: 21
<212> TYPE: DNA
<213> ORGANISM: Artificial Sequence
<220> FEATURE:
<223> OTHER INFORMATION: oligonucleotide primer

<400> SEQUENCE: 187
tggcaacggt actgaccggt t                                            21

<210> SEQ ID NO 188
<211> LENGTH: 23
<212> TYPE: DNA
<213> ORGANISM: Artificial Sequence
<220> FEATURE:
<223> OTHER INFORMATION: oligonucleotide primer

<400> SEQUENCE: 188
```
tgttgcctag cgcattggca ata                                          23

<210> SEQ ID NO 189
<211> LENGTH: 21
<212> TYPE: DNA
<213> ORGANISM: Artificial Sequence
<220> FEATURE:
<223> OTHER INFORMATION: oligonucleotide primer

<400> SEQUENCE: 189
tactgattgc cgcctgtcac g                                            21

<210> SEQ ID NO 190
<211> LENGTH: 22
<212> TYPE: DNA
<213> ORGANISM: Artificial Sequence
<220> FEATURE:
<223> OTHER INFORMATION: oligonucleotide primer

<400> SEQUENCE: 190
cgctggtgcc gttgaaaagt tg                                           22

<210> SEQ ID NO 191
<211> LENGTH: 22
<212> TYPE: DNA
<213> ORGANISM: Artificial Sequence
<220> FEATURE:
<223> OTHER INFORMATION: oligonucleotide primer

<400> SEQUENCE: 191
gcgttatctg ttaatcgaga ct                                           22

<210> SEQ ID NO 192
<211> LENGTH: 23
<212> TYPE: DNA
<213> ORGANISM: Artificial Sequence
<220> FEATURE:
<223> OTHER INFORMATION: oligonucleotide primer

<400> SEQUENCE: 192
ccttctacgt taatgctgac cac                                          23

<210> SEQ ID NO 193
<211> LENGTH: 21
<212> TYPE: DNA
<213> ORGANISM: Artificial Sequence
<220> FEATURE:
<223> OTHER INFORMATION: oligonucleotide primer

<400> SEQUENCE: 193
caacgaattg agtgctgccg g                                            21

<210> SEQ ID NO 194
<211> LENGTH: 24
<212> TYPE: DNA
<213> ORGANISM: Artificial Sequence
<220> FEATURE:
<223> OTHER INFORMATION: oligonucleotide primer

<400> SEQUENCE: 194
ccataaatca cgttaccgcc catt                                         24

<210> SEQ ID NO 195
<211> LENGTH: 21
<212> TYPE: DNA

```
<213> ORGANISM: Artificial Sequence
<220> FEATURE:
<223> OTHER INFORMATION: oligonucleotide primer

<400> SEQUENCE: 195
cgtagcgcac gctgaaggta a                                              21

<210> SEQ ID NO 196
<211> LENGTH: 21
<212> TYPE: DNA
<213> ORGANISM: Artificial Sequence
<220> FEATURE:
<223> OTHER INFORMATION: oligonucleotide primer

<400> SEQUENCE: 196
gtaaagcggc gaccagtaag c                                              21

<210> SEQ ID NO 197
<211> LENGTH: 21
<212> TYPE: DNA
<213> ORGANISM: Artificial Sequence
<220> FEATURE:
<223> OTHER INFORMATION: oligonucleotide primer

<400> SEQUENCE: 197
tctcccgcgc tgccagctaa t                                              21

<210> SEQ ID NO 198
<211> LENGTH: 21
<212> TYPE: DNA
<213> ORGANISM: Artificial Sequence
<220> FEATURE:
<223> OTHER INFORMATION: oligonucleotide primer

<400> SEQUENCE: 198
cacgcgtggt gttgcaggca g                                              21

<210> SEQ ID NO 199
<211> LENGTH: 20
<212> TYPE: DNA
<213> ORGANISM: Artificial Sequence
<220> FEATURE:
<223> OTHER INFORMATION: oligonucleotide primer

<400> SEQUENCE: 199
ccacgtaatc cgcagtgcgg                                                20

<210> SEQ ID NO 200
<211> LENGTH: 21
<212> TYPE: DNA
<213> ORGANISM: Artificial Sequence
<220> FEATURE:
<223> OTHER INFORMATION: oligonucleotide primer

<400> SEQUENCE: 200
gttgctgcct tgcctgagca g                                              21

<210> SEQ ID NO 201
<211> LENGTH: 21
<212> TYPE: DNA
<213> ORGANISM: Artificial Sequence
<220> FEATURE:
<223> OTHER INFORMATION: oligonucleotide primer

<400> SEQUENCE: 201
ctggcaaagg ttgcgggtgt t                                              21
```

```
<210> SEQ ID NO 202
<211> LENGTH: 21
<212> TYPE: DNA
<213> ORGANISM: Artificial Sequence
<220> FEATURE:
<223> OTHER INFORMATION: oligonucleotide primer

<400> SEQUENCE: 202
atgtccagcg ccttaccgac a                                             21

<210> SEQ ID NO 203
<211> LENGTH: 21
<212> TYPE: DNA
<213> ORGANISM: Artificial Sequence
<220> FEATURE:
<223> OTHER INFORMATION: oligonucleotide primer

<400> SEQUENCE: 203
gcccaaaatt caccgttcgc c                                             21

<210> SEQ ID NO 204
<211> LENGTH: 21
<212> TYPE: DNA
<213> ORGANISM: Artificial Sequence
<220> FEATURE:
<223> OTHER INFORMATION: oligonucleotide primer

<400> SEQUENCE: 204
ggctgctgta ccggctgaat t                                             21

<210> SEQ ID NO 205
<211> LENGTH: 23
<212> TYPE: DNA
<213> ORGANISM: Artificial Sequence
<220> FEATURE:
<223> OTHER INFORMATION: oligonucleotide primer

<400> SEQUENCE: 205
aatatcattc aggacgggcg ctt                                           23

<210> SEQ ID NO 206
<211> LENGTH: 21
<212> TYPE: DNA
<213> ORGANISM: Artificial Sequence
<220> FEATURE:
<223> OTHER INFORMATION: oligonucleotide primer

<400> SEQUENCE: 206
ttcggttttg caggctccgc t                                             21

<210> SEQ ID NO 207
<211> LENGTH: 21
<212> TYPE: DNA
<213> ORGANISM: Artificial Sequence
<220> FEATURE:
<223> OTHER INFORMATION: oligonucleotide primer

<400> SEQUENCE: 207
atctgcatcg cggcaggaat g                                             21

<210> SEQ ID NO 208
<211> LENGTH: 21
<212> TYPE: DNA
<213> ORGANISM: Artificial Sequence
<220> FEATURE:
```

<223> OTHER INFORMATION: oligonucleotide primer

<400> SEQUENCE: 208
cgagacggat cctgcacgat t                                              21

<210> SEQ ID NO 209
<211> LENGTH: 23
<212> TYPE: DNA
<213> ORGANISM: Artificial Sequence
<220> FEATURE:
<223> OTHER INFORMATION: oligonucleotide primer

<400> SEQUENCE: 209
aagagcactc tggcattagt ggt                                            23

<210> SEQ ID NO 210
<211> LENGTH: 25
<212> TYPE: DNA
<213> ORGANISM: Artificial Sequence
<220> FEATURE:
<223> OTHER INFORMATION: oligonucleotide primer

<400> SEQUENCE: 210
ccataaccag tcagttgatc gttaa                                          25

<210> SEQ ID NO 211
<211> LENGTH: 21
<212> TYPE: DNA
<213> ORGANISM: Artificial Sequence
<220> FEATURE:
<223> OTHER INFORMATION: oligonucleotide primer

<400> SEQUENCE: 211
caggtcaaat tccctgcctg g                                              21

<210> SEQ ID NO 212
<211> LENGTH: 21
<212> TYPE: DNA
<213> ORGANISM: Artificial Sequence
<220> FEATURE:
<223> OTHER INFORMATION: oligonucleotide primer

<400> SEQUENCE: 212
ttcgcatcca taccagtgcc g                                              21

<210> SEQ ID NO 213
<211> LENGTH: 23
<212> TYPE: DNA
<213> ORGANISM: Artificial Sequence
<220> FEATURE:
<223> OTHER INFORMATION: oligonucleotide primer

<400> SEQUENCE: 213
tgatggttat tgccagccag ctt                                            23

<210> SEQ ID NO 214
<211> LENGTH: 23
<212> TYPE: DNA
<213> ORGANISM: Artificial Sequence
<220> FEATURE:
<223> OTHER INFORMATION: oligonucleotide primer

<400> SEQUENCE: 214
ccggtttctt tggtgaactg ttc                                            23

```
<210> SEQ ID NO 215
<211> LENGTH: 23
<212> TYPE: DNA
<213> ORGANISM: Artificial Sequence
<220> FEATURE:
<223> OTHER INFORMATION: oligonucleotide primer

<400> SEQUENCE: 215
agagaagttt agtagcagct ggc                                              23

<210> SEQ ID NO 216
<211> LENGTH: 23
<212> TYPE: DNA
<213> ORGANISM: Artificial Sequence
<220> FEATURE:
<223> OTHER INFORMATION: oligonucleotide primer

<400> SEQUENCE: 216
tcgctgacca gtaagccttc aaa                                              23

<210> SEQ ID NO 217
<211> LENGTH: 21
<212> TYPE: DNA
<213> ORGANISM: Artificial Sequence
<220> FEATURE:
<223> OTHER INFORMATION: oligonucleotide primer

<400> SEQUENCE: 217
acaatggccg ttgccctgca t                                                21

<210> SEQ ID NO 218
<211> LENGTH: 21
<212> TYPE: DNA
<213> ORGANISM: Artificial Sequence
<220> FEATURE:
<223> OTHER INFORMATION: oligonucleotide primer

<400> SEQUENCE: 218
tcctgaacac cagcgatcag c                                                21

<210> SEQ ID NO 219
<211> LENGTH: 23
<212> TYPE: DNA
<213> ORGANISM: Artificial Sequence
<220> FEATURE:
<223> OTHER INFORMATION: oligonucleotide primer

<400> SEQUENCE: 219
gatggctgct gttttcgctc ttt                                              23

<210> SEQ ID NO 220
<211> LENGTH: 21
<212> TYPE: DNA
<213> ORGANISM: Artificial Sequence
<220> FEATURE:
<223> OTHER INFORMATION: oligonucleotide primer

<400> SEQUENCE: 220
aagccaggaa tgacgcggtg a                                                21

<210> SEQ ID NO 221
<211> LENGTH: 21
<212> TYPE: DNA
<213> ORGANISM: Artificial Sequence
<220> FEATURE:
<223> OTHER INFORMATION: oligonucleotide primer
```

```
<400> SEQUENCE: 221
gttggcggct tgcgcagata a                                              21

<210> SEQ ID NO 222
<211> LENGTH: 20
<212> TYPE: DNA
<213> ORGANISM: Artificial Sequence
<220> FEATURE:
<223> OTHER INFORMATION: oligonucleotide primer

<400> SEQUENCE: 222
tgacggtgca tcggctaacg                                                20

<210> SEQ ID NO 223
<211> LENGTH: 23
<212> TYPE: DNA
<213> ORGANISM: Artificial Sequence
<220> FEATURE:
<223> OTHER INFORMATION: oligonucleotide primer

<400> SEQUENCE: 223
tggcatgacg caacaacaag ttg                                            23

<210> SEQ ID NO 224
<211> LENGTH: 22
<212> TYPE: DNA
<213> ORGANISM: Artificial Sequence
<220> FEATURE:
<223> OTHER INFORMATION: oligonucleotide primer

<400> SEQUENCE: 224
gttaccactc agcgcaggtt tg                                             22

<210> SEQ ID NO 225
<211> LENGTH: 20
<212> TYPE: DNA
<213> ORGANISM: Artificial Sequence
<220> FEATURE:
<223> OTHER INFORMATION: oligonucleotide primer

<400> SEQUENCE: 225
acattactgg cagccggtgc                                                20

<210> SEQ ID NO 226
<211> LENGTH: 23
<212> TYPE: DNA
<213> ORGANISM: Artificial Sequence
<220> FEATURE:
<223> OTHER INFORMATION: oligonucleotide primer

<400> SEQUENCE: 226
cataaccata gaagtcgaac cag                                            23

<210> SEQ ID NO 227
<211> LENGTH: 21
<212> TYPE: DNA
<213> ORGANISM: Artificial Sequence
<220> FEATURE:
<223> OTHER INFORMATION: oligonucleotide primer

<400> SEQUENCE: 227
aagcttgcct ccagaggtcc t                                              21

<210> SEQ ID NO 228
<211> LENGTH: 21
```

```
<212> TYPE: DNA
<213> ORGANISM: Artificial Sequence
<220> FEATURE:
<223> OTHER INFORMATION: oligonucleotide primer

<400> SEQUENCE: 228
gcaagagtgg caatgtctgg c                                         21

<210> SEQ ID NO 229
<211> LENGTH: 23
<212> TYPE: DNA
<213> ORGANISM: Artificial Sequence
<220> FEATURE:
<223> OTHER INFORMATION: oligonucleotide primer

<400> SEQUENCE: 229
aggcgatcaa tataagatcg ccg                                       23

<210> SEQ ID NO 230
<211> LENGTH: 21
<212> TYPE: DNA
<213> ORGANISM: Artificial Sequence
<220> FEATURE:
<223> OTHER INFORMATION: oligonucleotide primer

<400> SEQUENCE: 230
accggttttc tgcgctacct g                                         21

<210> SEQ ID NO 231
<211> LENGTH: 25
<212> TYPE: DNA
<213> ORGANISM: Artificial Sequence
<220> FEATURE:
<223> OTHER INFORMATION: oligonucleotide primer

<400> SEQUENCE: 231
gaacaagaat atggcaggaa ttctg                                     25

<210> SEQ ID NO 232
<211> LENGTH: 22
<212> TYPE: DNA
<213> ORGANISM: Artificial Sequence
<220> FEATURE:
<223> OTHER INFORMATION: oligonucleotide primer

<400> SEQUENCE: 232
caggatgtag gtctggcaag ta                                        22

<210> SEQ ID NO 233
<211> LENGTH: 23
<212> TYPE: DNA
<213> ORGANISM: Artificial Sequence
<220> FEATURE:
<223> OTHER INFORMATION: oligonucleotide primer

<400> SEQUENCE: 233
ccactgttgc tgcattaagc gta                                       23

<210> SEQ ID NO 234
<211> LENGTH: 22
<212> TYPE: DNA
<213> ORGANISM: Artificial Sequence
<220> FEATURE:
<223> OTHER INFORMATION: oligonucleotide primer

<400> SEQUENCE: 234
```

```
caccgctacg agcttcagta at                                               22
```

<210> SEQ ID NO 235
<211> LENGTH: 25
<212> TYPE: DNA
<213> ORGANISM: Artificial Sequence
<220> FEATURE:
<223> OTHER INFORMATION: oligonucleotide primer

<400> SEQUENCE: 235

```
aacagactat tatcataggt gagcc                                            25
```

<210> SEQ ID NO 236
<211> LENGTH: 23
<212> TYPE: DNA
<213> ORGANISM: Artificial Sequence
<220> FEATURE:
<223> OTHER INFORMATION: oligonucleotide primer

<400> SEQUENCE: 236

```
cttgctgatc gtgataactc acc                                              23
```

<210> SEQ ID NO 237
<211> LENGTH: 21
<212> TYPE: DNA
<213> ORGANISM: Artificial Sequence
<220> FEATURE:
<223> OTHER INFORMATION: oligonucleotide primer

<400> SEQUENCE: 237

```
tcgcgtccct gatgttctct g                                                21
```

<210> SEQ ID NO 238
<211> LENGTH: 22
<212> TYPE: DNA
<213> ORGANISM: Artificial Sequence
<220> FEATURE:
<223> OTHER INFORMATION: oligonucleotide primer

<400> SEQUENCE: 238

```
gtgattagta tcgacgctgg tg                                               22
```

<210> SEQ ID NO 239
<211> LENGTH: 21
<212> TYPE: DNA
<213> ORGANISM: Artificial Sequence
<220> FEATURE:
<223> OTHER INFORMATION: oligonucleotide primer

<400> SEQUENCE: 239

```
gtcgtgcggt actggtttac t                                                21
```

<210> SEQ ID NO 240
<211> LENGTH: 23
<212> TYPE: DNA
<213> ORGANISM: Artificial Sequence
<220> FEATURE:
<223> OTHER INFORMATION: oligonucleotide primer

<400> SEQUENCE: 240

```
tcagaaagtt gttgctggag ttg                                              23
```

<210> SEQ ID NO 241
<211> LENGTH: 23
<212> TYPE: DNA
<213> ORGANISM: Artificial Sequence

```
<220> FEATURE:
<223> OTHER INFORMATION: oligonucleotide primer

<400> SEQUENCE: 241
aacgtaaaaa ccctcatcgc tgc                                              23

<210> SEQ ID NO 242
<211> LENGTH: 24
<212> TYPE: DNA
<213> ORGANISM: Artificial Sequence
<220> FEATURE:
<223> OTHER INFORMATION: oligonucleotide primer

<400> SEQUENCE: 242
gtaatacgga aagattttgc gccc                                             24

<210> SEQ ID NO 243
<211> LENGTH: 23
<212> TYPE: DNA
<213> ORGANISM: Artificial Sequence
<220> FEATURE:
<223> OTHER INFORMATION: oligonucleotide primer

<400> SEQUENCE: 243
tgcactccaa gcaacgttat tga                                              23

<210> SEQ ID NO 244
<211> LENGTH: 20
<212> TYPE: DNA
<213> ORGANISM: Artificial Sequence
<220> FEATURE:
<223> OTHER INFORMATION: oligonucleotide primer

<400> SEQUENCE: 244
tgcagtggtg tggacgccgt                                                  20

<210> SEQ ID NO 245
<211> LENGTH: 21
<212> TYPE: DNA
<213> ORGANISM: Artificial Sequence
<220> FEATURE:
<223> OTHER INFORMATION: oligonucleotide primer

<400> SEQUENCE: 245
agcttaagaa caccctcctg g                                                21

<210> SEQ ID NO 246
<211> LENGTH: 23
<212> TYPE: DNA
<213> ORGANISM: Artificial Sequence
<220> FEATURE:
<223> OTHER INFORMATION: oligonucleotide primer

<400> SEQUENCE: 246
gtcgacaaca taaaagagg cgg                                               23

<210> SEQ ID NO 247
<211> LENGTH: 24
<212> TYPE: DNA
<213> ORGANISM: Artificial Sequence
<220> FEATURE:
<223> OTHER INFORMATION: oligonucleotide primer

<400> SEQUENCE: 247
cgttagttgc tctgtttatg cttg                                             24
```

<210> SEQ ID NO 248
<211> LENGTH: 19
<212> TYPE: DNA
<213> ORGANISM: Artificial Sequence
<220> FEATURE:
<223> OTHER INFORMATION: oligonucleotide primer

<400> SEQUENCE: 248
ggaggcggtc agggtaacg                                                  19

<210> SEQ ID NO 249
<211> LENGTH: 21
<212> TYPE: DNA
<213> ORGANISM: Artificial Sequence
<220> FEATURE:
<223> OTHER INFORMATION: oligonucleotide primer

<400> SEQUENCE: 249
cgccttctcc tgcgatgata g                                               21

<210> SEQ ID NO 250
<211> LENGTH: 21
<212> TYPE: DNA
<213> ORGANISM: Artificial Sequence
<220> FEATURE:
<223> OTHER INFORMATION: oligonucleotide primer

<400> SEQUENCE: 250
ccgtggattg cgtttgcgtc t                                               21

<210> SEQ ID NO 251
<211> LENGTH: 21
<212> TYPE: DNA
<213> ORGANISM: Artificial Sequence
<220> FEATURE:
<223> OTHER INFORMATION: oligonucleotide primer

<400> SEQUENCE: 251
cgtttgaaag ccgcgcgttg t                                               21

<210> SEQ ID NO 252
<211> LENGTH: 23
<212> TYPE: DNA
<213> ORGANISM: Artificial Sequence
<220> FEATURE:
<223> OTHER INFORMATION: oligonucleotide primer

<400> SEQUENCE: 252
cccggtttta ccttctttca cca                                             23

<210> SEQ ID NO 253
<211> LENGTH: 21
<212> TYPE: DNA
<213> ORGANISM: Artificial Sequence
<220> FEATURE:
<223> OTHER INFORMATION: oligonucleotide primer

<400> SEQUENCE: 253
caggctggca tcgaaagcac a                                               21

<210> SEQ ID NO 254
<211> LENGTH: 21
<212> TYPE: DNA
<213> ORGANISM: Artificial Sequence
<220> FEATURE:
<223> OTHER INFORMATION: oligonucleotide primer -continued

<400> SEQUENCE: 254
gcatcggttt cagttcggca g                                         21

<210> SEQ ID NO 255
<211> LENGTH: 21
<212> TYPE: DNA
<213> ORGANISM: Artificial Sequence
<220> FEATURE:
<223> OTHER INFORMATION: oligonucleotide primer

<400> SEQUENCE: 255
ggactctgca gggctggttg t                                         21

<210> SEQ ID NO 256
<211> LENGTH: 23
<212> TYPE: DNA
<213> ORGANISM: Artificial Sequence
<220> FEATURE:
<223> OTHER INFORMATION: oligonucleotide primer

<400> SEQUENCE: 256
cgctggtttg ggtgtaaatg agg                                       23

<210> SEQ ID NO 257
<211> LENGTH: 21
<212> TYPE: DNA
<213> ORGANISM: Artificial Sequence
<220> FEATURE:
<223> OTHER INFORMATION: oligonucleotide primer

<400> SEQUENCE: 257
gcggctattt tgagcgcaac c                                         21

<210> SEQ ID NO 258
<211> LENGTH: 23
<212> TYPE: DNA
<213> ORGANISM: Artificial Sequence
<220> FEATURE:
<223> OTHER INFORMATION: oligonucleotide primer

<400> SEQUENCE: 258
caggatcagg tatcggttct ggc                                       23

<210> SEQ ID NO 259
<211> LENGTH: 21
<212> TYPE: DNA
<213> ORGANISM: Artificial Sequence
<220> FEATURE:
<223> OTHER INFORMATION: oligonucleotide primer

<400> SEQUENCE: 259
ctggcatctg gtatggctgc a                                         21

<210> SEQ ID NO 260
<211> LENGTH: 26
<212> TYPE: DNA
<213> ORGANISM: Artificial Sequence
<220> FEATURE:
<223> OTHER INFORMATION: oligonucleotide primer

<400> SEQUENCE: 260
gggtcaaaag atcccttatc aaaagg                                    26

<210> SEQ ID NO 261

```
<211> LENGTH: 21
<212> TYPE: DNA
<213> ORGANISM: Artificial Sequence
<220> FEATURE:
<223> OTHER INFORMATION: oligonucleotide primer

<400> SEQUENCE: 261
cgcgtgctga tcaaattccg g                                              21

<210> SEQ ID NO 262
<211> LENGTH: 23
<212> TYPE: DNA
<213> ORGANISM: Artificial Sequence
<220> FEATURE:
<223> OTHER INFORMATION: oligonucleotide primer

<400> SEQUENCE: 262
tcgcgaactg ttcaacatcg ctt                                            23

<210> SEQ ID NO 263
<211> LENGTH: 24
<212> TYPE: DNA
<213> ORGANISM: Artificial Sequence
<220> FEATURE:
<223> OTHER INFORMATION: oligonucleotide primer

<400> SEQUENCE: 263
gtcggttgtg ttaataacga cacc                                           24

<210> SEQ ID NO 264
<211> LENGTH: 22
<212> TYPE: DNA
<213> ORGANISM: Artificial Sequence
<220> FEATURE:
<223> OTHER INFORMATION: oligonucleotide primer

<400> SEQUENCE: 264
gttccgccac caacagtatt cc                                             22

<210> SEQ ID NO 265
<211> LENGTH: 23
<212> TYPE: DNA
<213> ORGANISM: Artificial Sequence
<220> FEATURE:
<223> OTHER INFORMATION: oligonucleotide primer

<400> SEQUENCE: 265
gcgcacaaag tcagacttta tct                                            23

<210> SEQ ID NO 266
<211> LENGTH: 19
<212> TYPE: DNA
<213> ORGANISM: Artificial Sequence
<220> FEATURE:
<223> OTHER INFORMATION: oligonucleotide primer

<400> SEQUENCE: 266
cgggatcgtc ggcaccgag                                                 19

<210> SEQ ID NO 267
<211> LENGTH: 21
<212> TYPE: DNA
<213> ORGANISM: Artificial Sequence
<220> FEATURE:
<223> OTHER INFORMATION: oligonucleotide primer

<400> SEQUENCE: 267
```
cattgctggg ttgcgtgcag a                                              21

<210> SEQ ID NO 268
<211> LENGTH: 21
<212> TYPE: DNA
<213> ORGANISM: Artificial Sequence
<220> FEATURE:
<223> OTHER INFORMATION: oligonucleotide primer

<400> SEQUENCE: 268
gcgactgcgc aggcattaaa c                                              21

<210> SEQ ID NO 269
<211> LENGTH: 21
<212> TYPE: DNA
<213> ORGANISM: Artificial Sequence
<220> FEATURE:
<223> OTHER INFORMATION: oligonucleotide primer

<400> SEQUENCE: 269
ggcgtggcgt tagcgctgtt a                                              21

<210> SEQ ID NO 270
<211> LENGTH: 22
<212> TYPE: DNA
<213> ORGANISM: Artificial Sequence
<220> FEATURE:
<223> OTHER INFORMATION: oligonucleotide primer

<400> SEQUENCE: 270
cagccgcaac ctctttgcgg at                                             22

<210> SEQ ID NO 271
<211> LENGTH: 26
<212> TYPE: DNA
<213> ORGANISM: Artificial Sequence
<220> FEATURE:
<223> OTHER INFORMATION: oligonucleotide primer

<400> SEQUENCE: 271
ccagaaggac tcactttcag gtatgg                                         26

<210> SEQ ID NO 272
<211> LENGTH: 21
<212> TYPE: DNA
<213> ORGANISM: Artificial Sequence
<220> FEATURE:
<223> OTHER INFORMATION: oligonucleotide primer

<400> SEQUENCE: 272
gtttgcgcta agtcgtgcgc c                                              21

<210> SEQ ID NO 273
<211> LENGTH: 23
<212> TYPE: DNA
<213> ORGANISM: Artificial Sequence
<220> FEATURE:
<223> OTHER INFORMATION: oligonucleotide primer

<400> SEQUENCE: 273
gcagctagtg cgatcctgaa cta                                            23

<210> SEQ ID NO 274
<211> LENGTH: 21
<212> TYPE: DNA

-continued

```
<213> ORGANISM: Artificial Sequence
<220> FEATURE:
<223> OTHER INFORMATION: oligonucleotide primer

<400> SEQUENCE: 274
cggctgtggt gttaccggtg t                                            21

<210> SEQ ID NO 275
<211> LENGTH: 21
<212> TYPE: DNA
<213> ORGANISM: Artificial Sequence
<220> FEATURE:
<223> OTHER INFORMATION: oligonucleotide primer

<400> SEQUENCE: 275
ccctgtttgg acaaggctgg g                                            21

<210> SEQ ID NO 276
<211> LENGTH: 23
<212> TYPE: DNA
<213> ORGANISM: Artificial Sequence
<220> FEATURE:
<223> OTHER INFORMATION: oligonucleotide primer

<400> SEQUENCE: 276
tcgcttcgcc taaccgaact tgc                                          23

<210> SEQ ID NO 277
<211> LENGTH: 21
<212> TYPE: DNA
<213> ORGANISM: Artificial Sequence
<220> FEATURE:
<223> OTHER INFORMATION: oligonucleotide primer

<400> SEQUENCE: 277
ggggaacact ttcctgcacg g                                            21

<210> SEQ ID NO 278
<211> LENGTH: 21
<212> TYPE: DNA
<213> ORGANISM: Artificial Sequence
<220> FEATURE:
<223> OTHER INFORMATION: oligonucleotide primer

<400> SEQUENCE: 278
taaacagcgg ttgcccacgg c                                            21

<210> SEQ ID NO 279
<211> LENGTH: 21
<212> TYPE: DNA
<213> ORGANISM: Artificial Sequence
<220> FEATURE:
<223> OTHER INFORMATION: oligonucleotide primer

<400> SEQUENCE: 279 gggcacccett aagtcaggca g                                           21

<210> SEQ ID NO 280
<211> LENGTH: 21
<212> TYPE: DNA
<213> ORGANISM: Artificial Sequence
<220> FEATURE:
<223> OTHER INFORMATION: oligonucleotide primer

<400> SEQUENCE: 280
gatcttccag cgacccaacg g                                            21
```

-continued

<210> SEQ ID NO 281
<211> LENGTH: 22
<212> TYPE: DNA
<213> ORGANISM: Artificial Sequence
<220> FEATURE:
<223> OTHER INFORMATION: oligonucleotide primer

<400> SEQUENCE: 281
ctttgttagc ggcgttttca gg                                           22

<210> SEQ ID NO 282
<211> LENGTH: 21
<212> TYPE: DNA
<213> ORGANISM: Artificial Sequence
<220> FEATURE:
<223> OTHER INFORMATION: oligonucleotide primer

<400> SEQUENCE: 282
agccgtgccg ctaacgtcat a                                            21

<210> SEQ ID NO 283
<211> LENGTH: 21
<212> TYPE: DNA
<213> ORGANISM: Artificial Sequence
<220> FEATURE:
<223> OTHER INFORMATION: oligonucleotide primer

<400> SEQUENCE: 283
cctacacttc gcgctcctgt t                                            21

<210> SEQ ID NO 284
<211> LENGTH: 21
<212> TYPE: DNA
<213> ORGANISM: Artificial Sequence
<220> FEATURE:
<223> OTHER INFORMATION: oligonucleotide primer

<400> SEQUENCE: 284
tgcgccttcc cctgaataag c                                            21

<210> SEQ ID NO 285
<211> LENGTH: 21
<212> TYPE: DNA
<213> ORGANISM: Artificial Sequence
<220> FEATURE:
<223> OTHER INFORMATION: oligonucleotide primer

<400> SEQUENCE: 285
tcattcaggt acgagagcag g                                            21

<210> SEQ ID NO 286
<211> LENGTH: 21
<212> TYPE: DNA
<213> ORGANISM: Artificial Sequence
<220> FEATURE:
<223> OTHER INFORMATION: oligonucleotide primer

<400> SEQUENCE: 286
ttccttccac ccgtacgctc a                                            21

<210> SEQ ID NO 287
<211> LENGTH: 22
<212> TYPE: DNA
<213> ORGANISM: Artificial Sequence
<220> FEATURE:

<223> OTHER INFORMATION: oligonucleotide primer

<400> SEQUENCE: 287
gacagacggg agttccatca tg                                    22

<210> SEQ ID NO 288
<211> LENGTH: 27
<212> TYPE: DNA
<213> ORGANISM: Artificial Sequence
<220> FEATURE:
<223> OTHER INFORMATION: oligonucleotide primer

<400> SEQUENCE: 288
cattctgcct gcatttgttt gcacaag                               27

<210> SEQ ID NO 289
<211> LENGTH: 21
<212> TYPE: DNA
<213> ORGANISM: Artificial Sequence
<220> FEATURE:
<223> OTHER INFORMATION: oligonucleotide primer

<400> SEQUENCE: 289
tgggtaccaa agccgcaact g                                     21

<210> SEQ ID NO 290
<211> LENGTH: 21
<212> TYPE: DNA
<213> ORGANISM: Artificial Sequence
<220> FEATURE:
<223> OTHER INFORMATION: oligonucleotide primer

<400> SEQUENCE: 290
ttggcaccgt ctacgcccat a                                     21

<210> SEQ ID NO 291
<211> LENGTH: 22
<212> TYPE: DNA
<213> ORGANISM: Artificial Sequence
<220> FEATURE:
<223> OTHER INFORMATION: oligonucleotide primer

<400> SEQUENCE: 291
tactgctgcc aggactgctt tc                                    22

<210> SEQ ID NO 292
<211> LENGTH: 23
<212> TYPE: DNA
<213> ORGANISM: Artificial Sequence
<220> FEATURE:
<223> OTHER INFORMATION: oligonucleotide primer

<400> SEQUENCE: 292
gtccgctgca tagacaacgt tgt                                   23

<210> SEQ ID NO 293
<211> LENGTH: 22
<212> TYPE: DNA
<213> ORGANISM: Artificial Sequence
<220> FEATURE:
<223> OTHER INFORMATION: oligonucleotide primer

<400> SEQUENCE: 293
cagctgctgc gccaggtaat aa                                    22

```
<210> SEQ ID NO 294
<211> LENGTH: 21
<212> TYPE: DNA
<213> ORGANISM: Artificial Sequence
<220> FEATURE:
<223> OTHER INFORMATION: oligonucleotide primer

<400> SEQUENCE: 294
gcggttgctc attcttcagg c                                        21

<210> SEQ ID NO 295
<211> LENGTH: 20
<212> TYPE: DNA
<213> ORGANISM: Artificial Sequence
<220> FEATURE:
<223> OTHER INFORMATION: oligonucleotide primer

<400> SEQUENCE: 295
agcttcgcct gtcggcgctt                                          20

<210> SEQ ID NO 296
<211> LENGTH: 21
<212> TYPE: DNA
<213> ORGANISM: Artificial Sequence
<220> FEATURE:
<223> OTHER INFORMATION: oligonucleotide primer

<400> SEQUENCE: 296
caaaccgtta cgcgccggtt g                                        21

<210> SEQ ID NO 297
<211> LENGTH: 5
<212> TYPE: PRT
<213> ORGANISM: Unknown
<220> FEATURE:
<223> OTHER INFORMATION: lipobox

<400> SEQUENCE: 297

Leu Ala Gly Ala Cys
1               5

<210> SEQ ID NO 298
<211> LENGTH: 5
<212> TYPE: PRT
<213> ORGANISM: Unknown
<220> FEATURE:
<223> OTHER INFORMATION: lipobox

<400> SEQUENCE: 298

Leu Ser Gly Ala Cys
1               5

<210> SEQ ID NO 299
<211> LENGTH: 228
<212> TYPE: DNA
<213> ORGANISM: Unknown
<220> FEATURE:
<223> OTHER INFORMATION: plasmidic DNA

<400> SEQUENCE: 299
attcaagtgg aagcgactga caaagatctg ggcccgaatg ccatgtaac ttattcaatc     60 gttacggata cagatatcca ggtagaggca accgataaag atttaggtcc caatggccac    120
gtcacatata gtatcgtaac ggataccgac attcaggtgg aagctaccga taaagacctg   180
ggtccgaatg gtcacgtgac gtattctatt gttaccgata cagattga                228
```

<210> SEQ ID NO 300
<211> LENGTH: 972
<212> TYPE: DNA
<213> ORGANISM: Escherichia coli

<400> SEQUENCE: 300

```
atggaaacga aaaaaataa tagcgaatac attcctgagt ttgataaatc ctttcgccac      60
ccgcgctact ggggagcatg gctgggcgta gcagcgatgg cgggtatcgc tttaacgccg     120
ccaaagttcc gtgatcccat tctggcacgg ctgggacgta ttgccggacg actgggaaaa    180
agctcacgcc gtcgtgcgtt aatcaatctg tcgctctgct ttccagaacg tagtgaagct    240
gaacgcgaag cgattgttga tgagatgttt gccaccgcgc cgcaagcgat ggcaatgatg   300
gctgagttgg caatacgcgg gccggagaaa attcagccgc gcgttgactg gcaagggctg    360
gagatcatcg aagagatgcg gcgtaataac gagaaagtta tctttctagt gccgcacggt    420
tgggccgtcg atattcctgc catgctgatg gcctcgcaag ggcagaaaat ggcagcgatg    480
ttccataatc agggcaaccc ggttttgat tatgtctgga acacggtgcg tcgtcgcttt     540
ggcggtcgtc tgcatgcgag aaatgacggt attaaaccat tcatccagtc ggtacgtcag    600
gggtactggg atattatttt acccgatcag gatcatggcc cagagcacag cgaatttgtg   660
gatttctttg ccacctataa agcgacgttg cccgcgattg gtcgtttgat gaaagtgtgc    720
cgtgcgcgcg ttgtaccgct gtttccgatt tatgatggca agacgcatcg tctgacgatt    780
caggtgcgcc caccgatgga tgatctgtta gaggcggatg atcatacgat tgcgcggcgg    840
atgaatgaag aagtcgagat ttttgttggt ccgcgaccag aacaatacac ctggatacta    900
aaattgctga aactcgcaa accgggcgaa atccagccgt ataagcgcaa agatctttat    960
cccatcaaat aa                                                        972
```

<210> SEQ ID NO 301
<211> LENGTH: 942
<212> TYPE: DNA
<213> ORGANISM: Escherichia coli

<400> SEQUENCE: 301

```
atggaaacga aaaaaataa tagcgaatac attcctgagt ttgataaata actgggcgta      60
gcagcgatgg cgggtatcgc tttaacgccg ccaaagttcc gtgatcccat tctggcacgg    120
ctgggacgta ttgccggacg actgggaaaa agctcacgcc gtcgtgcgtt aatcaatctg    180
tcgctctgct ttccagaacg tagtgaagct gaacgcgaag cgattgttga tgagatgttt    240
gccaccgcgc cgcaagcgat ggcaatgatg gctgagttgg caatacgcgg gccggagaaa    300
attcagccgc gcgttgactg gcaagggctg gagatcatcg aagagatgcg gcgtaataac    360
gagaaagtta tctttctagt gccgcacggt tgggccgtcg atattcctgc catgctgatg    420
gcctcgcaag ggcagaaaat ggcagcgatg ttccataatc agggcaaccc ggttttgat     480
tatgtctgga acacggtgcg tcgtcgcttt ggcggtcgtc tgcatgcgag aaatgacggt    540
attaaaccat tcatccagtc ggtacgtcag gggtactggg atattattt acccgatcag     600
gatcatggcc cagagcacag cgaatttgtg gatttctttg ccacctataa agcgacgttg    660
cccgcgattg gtcgtttgat gaaagtgtgc cgtgcgcgcg ttgtaccgct gtttccgatt    720
tatgatggca agacgcatcg tctgacgatt caggtgcgcc caccgatgga tgatctgtta    780
gaggcggatg atcatacgat tgcgcggcgg atgaatgaag aagtcgagat ttttgttggt    840
ccgcgaccag aacaatacac ctggatacta aaattgctga aactcgcaa accgggcgaa    900
```

```
atccagccgt ataagcgcaa agatctttat cccatcaaat aa                    942
```

<210> SEQ ID NO 302
<211> LENGTH: 561
<212> TYPE: DNA
<213> ORGANISM: Escherichia coli

<400> SEQUENCE: 302

```
atgaacgtga gtaaatatgt cgctatcttt tcctttgttt ttattcagtt aatcagcgtt    60
ggtaaagttt ttgctaacgc agatgagtgg atgacaacgt ttagagaaaa tattgtacaa   120
acctggcaac agcctgaaca ttatgattta tatattcctg ccatcacctg gcatgcacgt   180
ttcgcttacg acaaagaaaa aaccgatcgc tataacgagc gaccgtgggg tggcggtttt   240
ggcctgtcgc gttgggatga aaaaggaaac tggcatggcc tgtatgccat ggcatttaag   300
gactcgtgga acaaatggga accgattgcc ggatacggat gggaaagtac ctggcgaccg   360
ctggcggatg aaaattttca tttaggtctg ggattcaccg ctggcgtaac ggcacgcgat   420
aactggaatt acatccctct cccggttcta ctgccattgg cctccgtggg ttatggccca   480
gttacttttc agatgaccta cattccgggt acctacaaca tggcaatgtg tactttgcc   540
tggatgcgct ttcagttttg a                                             561
```

<210> SEQ ID NO 303
<211> LENGTH: 531
<212> TYPE: DNA
<213> ORGANISM: Escherichia coli

<400> SEQUENCE: 303

```
atgaacgtga gtaaatatgt cgctatcttt tcctttgttt ttattcagtt aatcagcgtt    60
ggtaaagttt ttgctaacgc agatgagtgg atgtaacaac agcctgaaca ttatgattta   120
tatattcctg ccatcacctg gcatgcacgt ttcgcttacg acaaagaaaa aaccgatcgc   180
tataacgagc gaccgtgggg tggcggtttt ggcctgtcgc gttgggatga aaaaggaaac   240
tggcatggcc tgtatgccat ggcatttaag gactcgtgga acaaatggga accgattgcc   300
ggatacggat gggaaagtac ctggcgaccg ctggcggatg aaaattttca tttaggtctg   360
ggattcaccg ctggcgtaac ggcacgcgat aactggaatt acatccctct cccggttcta   420
ctgccattgg cctccgtggg ttatggccca gttacttttc agatgaccta cattccgggt   480
acctacaaca tggcaatgtg tactttgcc tggatgcgct ttcagttttg a              531
```

<210> SEQ ID NO 304
<211> LENGTH: 27
<212> TYPE: PRT
<213> ORGANISM: Artificial Sequence
<220> FEATURE:
<223> OTHER INFORMATION: synthetic peptide

<400> SEQUENCE: 304

```
Asp Lys Pro Leu Arg Arg Asn Asn Ser Tyr Thr Ser Tyr Ile Met Ala
1               5                   10                  15

Ile Cys Gly Met Pro Leu Asp Ser Phe Arg Ala
            20                  25
```

<210> SEQ ID NO 305
<211> LENGTH: 27
<212> TYPE: PRT
<213> ORGANISM: Artificial Sequence
<220> FEATURE:

<223> OTHER INFORMATION: synthetic peptide

<400> SEQUENCE: 305

Pro Leu Leu Pro Phe Tyr Pro Pro Asp Glu Ala Leu Glu Ile Gly Leu
1               5                   10                  15

Glu Leu Asn Ser Ser Ala Leu Pro Pro Thr Glu
            20                  25

<210> SEQ ID NO 306
<211> LENGTH: 25
<212> TYPE: PRT
<213> ORGANISM: Artificial Sequence
<220> FEATURE:
<223> OTHER INFORMATION: synthetic peptide

<400> SEQUENCE: 306

Val Ile Leu Pro Gln Ala Pro Ser Gly Pro Ser Tyr Ala Thr Tyr Leu
1               5                   10                  15

Gln Pro Ala Gln Ala Gln Met Leu Thr
            20                  25

<210> SEQ ID NO 307
<211> LENGTH: 27
<212> TYPE: PRT
<213> ORGANISM: Artificial Sequence
<220> FEATURE:
<223> OTHER INFORMATION: synthetic peptide

<400> SEQUENCE: 307

Glu His Ile His Arg Ala Gly Gly Leu Phe Val Ala Asp Ala Ile Gln
1               5                   10                  15

Val Gly Phe Gly Arg Ile Gly Lys His Phe Trp
            20                  25

<210> SEQ ID NO 308
<211> LENGTH: 27
<212> TYPE: PRT
<213> ORGANISM: Artificial Sequence
<220> FEATURE:
<223> OTHER INFORMATION: synthetic peptide

<400> SEQUENCE: 308

Val Thr Ser Ile Pro Ser Val Ser Asn Ala Leu Asn Trp Lys Glu Phe
1               5                   10                  15

Ser Phe Ile Gln Ser Thr Leu Gly Tyr Val Ala
            20                  25

<210> SEQ ID NO 309
<211> LENGTH: 228
<212> TYPE: DNA
<213> ORGANISM: Artificial Sequence
<220> FEATURE:
<223> OTHER INFORMATION: plasmidic insert

<400> SEQUENCE: 309
attcaagtgg aagcgactga caaagatctg ggcccgaatg ccatgtaac ttattcaatc     60 gttacggata cagatatcca ggtagaggca accgataaag atttaggtcc caatggccac    120
gtcacatata gtatcgtaac ggataccgac attcaggtgg aagctaccga taaagacctg    180
ggtccgaatg gtcacgtgac gtattctatt gttaccgata cagattga                228

METHOD FOR THE PRODUCTION OF OUTER MEMBRANE VESICLES AND IMMUNOGENIC COMPOSITIONS THEREOF

This application is a U.S. national stage of PCT/EP2020/060762 filed on 16 Apr. 2020, which claims priority to and the benefit of European Application No. 19170231.5 filed on 18 Apr. 2019, the contents of which are incorporated herein by reference in their entireties.

This invention relates to genetically modified gram-negative bacteria specifically designed to optimize the production and therapeutic use of Outer Membrane Vesicles (OMVs), to OMVs produced by such bacteria and immunogenic compositions thereof.

BACKGROUND ART

Bacterial Outer Membrane Vesicles (OMVs)

All Gram-negative bacteria spontaneously release outer membrane vesicles (OMVs) during growth both in vitro and in vivo. OMVs are closed spheroid particles, 20-300 nm in diameter, generated through a "budding out" of the bacterial outer membrane. Consistent with that, the majority of OMV components are represented by LPS, glycerophospholipids, outer membrane proteins, lipoproteins and periplasmic proteins (A. Kulp and Kuehn M. J. (2010) *Annu. Rev. Microbiol.* 64, 163-184; T. N. Ellis and Kuehn M. J. (2010) *Microbiol. Mol. Biol. Rev.* 74, 81-94).

OMVs represent a distinct secretory pathway with a multitude of functions, including inter and intra species cell-to-cell cross-talk, biofilm formation, genetic transformation, defense against host immune responses and toxin and virulence factor delivery to host cells (A. Kulp and Kuehn M. J. (2010) *Annu. Rev. Microbiol.* 64, 163-184). OMVs interaction to host cells can occur by endocytosis after binding to host cell receptors or lipid rafts. Alternatively, OMVs have been reported to fuse to host cell membrane, leading to the direct release of their content into the cytoplasm of the host cells (A. Kulp and Kuehn M. J. (2010) *Annu. Rev. Microbiol.* 64, 163-184; T. N. Ellis and Kuehen M. J. (2010) *Micrbiol. Mol. Biol. Rev.* 74, 81-94).

OMVs as Vaccines

OMVs purified from several pathogens, including *Neisseria, Salmonella, Pseudomonas, Vibrio cholerae Burkholderia*, and *E. coli*, induce potent protective immune responses against the pathogens they derive from (B. S. Collins (2011) *Discovery Medicine*, 12 7-15), and highly efficacious anti-*Neisseria* OMV-based vaccines are already available for human use (J. Holst et al. (2009) *Vaccine*, 27S, B3-B12). Such remarkable protection is attributed to two main properties of OMVs. First, they carry the proper immunogenic and protective antigens, which, in extracellular pathogens, usually reside on the surface and therefore are naturally incorporated in OMVs. Indeed, OMV immunization induces potent antibody responses against the major membrane-associated antigens. However, OMV immunogenicity is not restricted to antibody responses. For instance, mice immunized with *Salmonella* OMVs develop robust *Salmonella*-specific B and T cell responses, and OMVs stimulate IFN-γ production by a large proportion of CD4+ T cells from mice previously infected with *Salmonella*, indicating that OMVs are an abundant source of antigens recognized by *Salmonella*-specific CD4+ T cells (R. C. Alaniz et al., (2007) *J. Immunol.* 179, 7692-7701). Second, OMVs possess a strong "built-in" adjuvanticity since they carry many of the bacterial Pathogen-Associated-Molecular Patterns (PAMPs) which, by binding to pathogen recognition receptors (PRRs), play a key role in stimulating innate immunity and in promoting adaptive immune responses. OMV-associated PAMPs include LPS which, in concert with MD-2 and CD14, binds TLR-4, lipoproteins whose acylpeptide derivatives interact with TLR-1/2 and 2/6 heterodimers, and peptidoglycan whose degradation products bind to intracellular NOD1/2 (A. Moshiri et al., *Hum. Vaccines. Immunother.* (2012) 8, 953-955; T. N. Ellis et al., (2010) *Inn. Immun.* 78, 3822-3831; M. Kaparakis et al., (2010) *Cell. Miocrobiol.* 12, 372-385). The engagement of this group of PRRs results in the activation of transcription factors (NF-kB) and the consequent expression of specific cytokines. Interestingly, LPS, lipoproteins and peptidoglycan can work synergistically, thus potentiating the built-in adjuvanticity of OMVs (D. J. Chen et al., (2010) *PNAS*, 107, 3099-3104).

OMVs also have the capacity to induce protection at the mucosal level. Protection at the mucosal sites is known to be at least partially mediated by the presence of pathogen-specific IgAs and Th17 cells. In particular, a growing body of evidence suggests that Th17 cells have evolved to mediate protective immunity against a variety of pathogens at different mucosal sites. Interestingly, Th17 cells have recently also been shown to play a crucial role in the generation of vaccine-induced protective responses. For instance, it has been reported that in mice whole cell pertussis vaccines (Pw) induce Th17 cells and neutralization of IL-17 after vaccination reduces protection against a pulmonary challenge with *B. pertussis*. Similarly, in a CD4+ T cell dependent, antibody-independent model of vaccine-induced protection following *S. pneumoniae* challenge, treatment with anti-IL-17 antibodies resulted in reduced immunity to pneumococcal colonization compared to the control serum treated mice (Malley R, et al. (2006) *Infect Immun.*, 74:2187-95). Elicitation of IgAs and Th17 cells by OMVs has been well documented and this can explain mechanistically the good protective activities of OMVs against several mucosal pathogens. For instance, immunization with *Vibrio cholerae*-derived OMVs protects rabbits against *Vibrio cholerae* oral challenge (Roy N. et al. (2010) *Immunol. Clinical Microbiol.* 60, 18-27) and *Pasteurella multocida*-derived and *Mannheimia haemolytica*-derived OMVs protect mice from oral challenge with *P. multocida* (Roier S. et al., (2013) *Int. J. Med. Microbiol.* 303, 247-256). In addition, intranasal immunization with *Porphyromonas gingivalis* OMVs elicits potent IgA production at both serum and mucosal level and immunization with *Escherichia coli*-derived OMVs prevent bacteria-induced lethality. Protective effect of *Escherichia coli*-derived OMVs is primarily mediated by OMV-specific, IFN-γ and IL-17 producing, T cells (Kim O Y et al., (2013) *J. Immunol.* 190, 4092-4102).

In addition to their "built-in" adjuvanticity, OMVs are becoming a promising vaccine platform for two main reasons.

1. OMVs are amenable for large scale production—In general, the amount of OMVs released by Gram-negative bacteria when grown under laboratory conditions is too low to allow their exploitation in biotechnological applications. However, two approaches can be used to enhance the yields of OMVs and make them compatible with industrial applications. The first one exploits the addition of mild detergents to the bacterial biomass to promote the vesiculation process and, at the same time, to decrease the level of OMV reactogenicity by removing a substantial amount of LPS (Fredriksen J. H. et al, (1991) NIPH Ann. 14, 67-79). Although this process has been proved to produce safe and effective vaccines against Meningococcal B (Granoff D. (2010), *Clin. Infect. Dis.* 50, S54-S65; Crum-Cianflone N, Sullivan E. (2016) Meningococcal vaccinations. *Infect Dis Ther.*, 5, 89-112) its main drawback is that the detergent treatment favors bacterial cell lysis with the consequence that the OMV preparations are heavily contaminated with cytoplasmic proteins (Ferrari et al., (2006) *Proteomics*, 6, 1856-1866). The second approach to enhance OMV production is to insert into the genome of the OMV-producing strain mutations that enhance vesiculation. For instance, in *Neisseria meningitidis*, a mutation in the gna33 gene, encoding a glucosyltransferase, has been shown to drive the release of several milligrams of vesicles per liter in the culture supernatant (Ferrari et al., (2006) *Proteomics*, 6, 1856-1866). Similar quantities of vesicles are obtained from *Escherichia coli* strains carrying deletions in the genes encoding the Tol/Pal system (a protein complex involved in the connection of the inner membrane with the outer membrane) (Bernadac A. et al., (1998) *J. Bacteriol.* 180, 4872-4878) and in the ompA gene, encoding one of the major outer membrane proteins of *E. coli* (Fantappiè et al., (2014) Journal of Extracellular Vesicles, 3, 24015). Deletion of the VacJ/Yrb ABC (ATP-binding cassette) transport system, a proposed phospholipid transporter, was also shown to increase OMVs production in two distantly related Gram-negative bacteria, *Haemophilus influenzae* and *Vibrio cholerae* (Roier S. et al, (2016) *Nat. Commun.* 7, 10515). Such quantities make the production process of OMVs highly efficient and inexpensive. A number of other mutations have been described that enhance the production of OMVs in several Gram negative bacteria, including *Salmonella* and *E. coli* (Deatherage B. L. et al. (2009) *Mol. Microbiol.* 72, 1395-1407; McBroom A. J. and Kuehen M. J. (2007) *Mol. Microbiol.* 63, 545-558). Furthermore, a high-throughput method developed to measure vesiculation values for the whole genome knock out library of *E. coli* mutant strains (Keio collection (Baba T. et al. (2006) *Molecular System Biology* DOI: 10.1038/msb4100050)) revealed 171 mutant strains with significant vesiculation phenotypes. Of these, 73 exhibited over-vesiculation phenotypes and 98 showed under-vesiculation phenotypes (Kulp A. J. et al (2015) *PLos ONE* 10(9): e0139200).

As far as the purification of OMVs from the culture supernatant is concerned, centrifugation and tangential flow filtration (TFF) are commonly used. The yield of OMV production using centrifugation couple to TFF can easily exceed 100 mg/liter of culture 5 (Berlanda Scorza F. et al., (2012) *PlosOne* 7, e35616) and therefore the process is perfectly compatible with large scale production.

2. OMVs can be manipulated in their protein content by genetic engineering. This feature was demonstrated for the first time by Kesty and Kuehn who showed that *Yersinia enterocolitica* outer membrane protein Ail assembled on OMVs surface when expressed in 10 *E. coli*, and that the GFP fluorescence protein fused to the "twin arginine transport (Tat)" signal sequence was incorporated in the OMV lumen (N. C. Kesty and Kuhen M. J. (2004) *J. Biol. Chem.* 279, 2069-2076). Following the observation by Kesty and Kuehn, an increasing number of heterologous proteins have been successfully delivered to OMVs using a variety of strategies. For instance, heterologous antigens have been delivered to the surface of OMVs by fusing them to the β-barrel forming autotransporter AIDA and to hemolysin ClyA, two proteins that naturally compartmentalized into *E. coli* OMVs (J. Schroeder and Aebischer T. (2009) *Vaccine*, 27, 6748-6754; D. J. Chen et al., (2010) *PNAS*, 107, 3099-3104). Recently, heterologous antigens from Group A *Streptococcus* and Group B *Streptococcus* were delivered to the lumen of *E. coli* vesicles by fusing their coding sequences to the leader peptide of *E. coli* OmpA. Interestingly, when the recombinant vesicles were used to immunize mice, they elicited high titers of functional antibodies against the heterologous antigens, despite their luminal location (Fantappiè et al., (2014) Journal of Extracellular Vesicles, 3, 24015). More recently, we have shown that heterologous antigens can be delivered to the vesicular compartment by expressing them as lipoproteins in the OMV-producing strain (WO2015/144691, WO2006/024954, Fantappie' et. al (2017) *Mol. Cell. Proteomics* 16:1348-1364). Interestingly, lipoproteins can also serve as chaperones to deliver foreign polypeptides to the OMVs compartment, thus allowing the decoration of vesicles with a variety of polypeptides and their exploitation in different biotechnological applications, including vaccines and immunotherapy.

Optimization of OMVs for Vaccine Purposes

As mentioned above, two types of OMV-based vaccines are possible: 1) vaccines based on OMVs purified from the pathogen of interest (this is the case of Menigococcus B vaccines which are constituted by OMVs purified from the same strain against which the vaccine is designed for; 2) vaccines based on OMVs engineered with heterologous antigens and designed to target a species different from the OMV-producing strain. In this latter case, since any OMV-producing strain carries a conspicuous number of endogenous proteins (REFs), such proteins can potentially negatively affect the immune response against the heterologous antigens. Ideally, OMVs should be deprived of as many endogenous proteins as possible in order to "concentrate" the immune response toward the heterologous antigens. Obviously, not all proteins can be eliminated since a number of proteins are strictly necessary for vital biological functions. Previous studies showed that only 303 out of the 4288 genes in *E. coli* K-12 strain BW25113 could not be deleted and that a large fraction of "dispensable" proteins representing the 93% of the entire *E. coli* proteome are potentially removable (Baba T. et al. (2006) Construction of *Escherichia coli* K-12 in-frame, single-gene knockout mutants: the Keio collection. Molecular System Biology DOI: 10.1038/msb4100050). Furthermore in an attempt to identify the minimal gene set required for cell viability, different approaches of sequential genome reduction have been used to generate several *E. coli* strains harboring reduced genomes (Kolisnychenko V. et al. (2002). *Genome Res* 12, 640-647; Yu B. et al (2002). *Nat Biotechnol* 20, 1018-1023; Hashimoto M. et al (2005). *Mol Microbiol* 55, 137-149; Posfai G. et al (2006). *Science* 312, 1044-1046. Mizoguchi H. et al (2007). *Biotechnol Appl Biochem* 46, 157-167; Kato J. & Hashimoto, M. (2008). *Methods Mol Biol* 416, 279-293; Hirokawa Y. et al (2013). *J Biosci Bioeng* 116, 52-58). Using different strategies up to 35% of the *E. coli* genome was successfully deleted, generating strains containing only the necessary genes to maintain self-replicable cells. Cell morphology, viability and doubling time in LB media were tested, however none of these studies evaluated vesiculation phenotypes of the strains generated.

However, with the current level of scientific knowledge, it is impossible to predict which proteins belonging to the "dispensable" OMV proteome can be cumulatively eliminated without impairing strain viability or OMV production.

STATE OF THE ART

WO2016/184860 discloses fusion proteins comprising a bacterial protein and a tumor antigen, and isolated bacterial outer membrane vesicles containing said fusion proteins, wherein the bacterial protein is selected from Factor H Binding Protein (fHbp), *Neisseria* heparin binding antigen (NHBA), Maltose Binding Protein (MBP), Outer Membrane Protein-F (ompF) and *Aggregatibacter actinomycetemcomitans* Factor H binding protein (Aa-fHbp).

WO2015/144691 discloses outer membrane vesicles isolated from a Gram-negative bacterium, wherein the OMV comprises at least one *S. aureus* antigen, which can be FhuD2. The same antigen can be lipidated, e.g. with an acylated N-terminus cysteine.

WO2006/024954 discloses fusion proteins for use as vaccine comprising a bacterial protein and an antigen, and outer membrane vesicles containing them.

WO2014/106123 discloses bacterial signal peptides/secretion chaperones as N-terminal fusion partners in translational reading frame with recombinant encoded tumor protein antigens, for use in stimulating an immune response.

DISCLOSURE OF THE INVENTION

The present invention relates to gram-negative bacteria that have been deprived of endogenous proteins naturally present in the OMVs. In particular the inventors have identified gene-inactivating mutations that cause deletion of proteins belonging to the OMV proteome, without impairing the growth capacity of the strains and at the same time maintaining or even increasing their ability to produce vesicles. The OMVs produced by such strains are decorated with heterologous proteins and can be conveniently used in the preparation of immunogenic compositions or vaccines characterized by reduced immunogenicity against endogenous OMV proteins.

According to a first embodiment, the invention provides a method for preparing isolated bacterial outer membrane vesicles (OMVs) expressing heterologous proteins, which comprises:
  (i) culturing a gram-negative bacterium, wherein said bacterium:
    (a) carries gene-inactivating mutations at the ompA gene and at one or more of the following genes that encode proteins belonging to the OMV proteome:
    ybis, ais, eco, glpQ, mltA, proX, ydcL, glnH, efeO, bglX, agp, ygdI, yncD, slp, artI, yiaD, ompX, borD, yhiJ, emtA, fecA, nmpC, fhuA, hisJ, lamB, malE, malM, ygiW, cirA, fepA, loiP, yjeI, ecnB, rcsF, phoE, oppA, fkpA, ybaY, tsx, yggE, osmE, ygdR, yceI, bhsA, nlpE, pldA, yghJ, ydeN, ushA, mdoD, treA, bcsC, ftsP, ptrA, fadL, artJ, mlaA;
    (b) expresses heterologous proteins in the OMVs
  (ii) separating the OMVs from the bacterial culture, and optionally
  (iii) purifying the OMVs.

The gram-negative bacterium is preferably of the genus *Escherichia, Pseudomonas, Neisseria* or *Shigella*. *E. coli* strains are particularly preferred.

The bacterium is cultured in conditions suitable for growth and vesiculation, which can include the use of rich media such as LB supplemented with additional carbon and nitrogen sources, or chemically defined media using different carbohydrates as carbon sources. Growth temperatures typically vary from 20° C. to 37° C. and the supernatants containing the vesicles can be collected toward the end of the exponential phase or in the stationary phase of growth, depending upon the growth conditions in use. The conditions suitable for bacterial growth and vesiculation are known to anyone skilled in the art and are described for instance in Berlanda Scorza, F. et al. "High yield production process for *Shigella* outer membrane particles", *PLOS One* 7, e35616 (2012).

The genome of the bacterium of interest is analyzed to identify genes homologous to the 58 genes described above and such genes are inactivated or deleted using standard genome editing techniques, thus obtaining a strain producing OMVs depleted of the endogenous proteins encoded by the inactivated/deleted genes.

Preferably, the genes which are most represented in the OMVs in terms of expression amount are inactivated. This allows a significant reduction of the risk of undesired immune reactions against endogenous bacterial proteins when the OMVs are administered in immunogenic compositions.

Accordingly, in a preferred embodiment the bacterium used to produce the OMVs is genetically modified by inactivation of the ompA gene and at least one, preferably at least 5, more preferably at least 10 and yet more preferably all of the following genes, which encode proteins with the highest expression levels in the OMVs:
  amB, malE, ompX, fkpA, malM, fepA, yncD, borD, oppA, glpQ, osmE, ycdO, tsx, ydcL, agp, cirA, fecA, ygiW, art and hisJ.

The OMV-producing bacterium can carry other mutations or gene inactivations in addition to those indicated above. The further inactivation of the two genes msbB and pagP involved in the LPS biosynthetic pathway is particularly preferred as it enables the mutated strain to release significantly less reactogenic vesicles.

However, certain proteins previously reported to be dispensable (Baba T. et al. (2006) Construction of *Escherichia coli* K-12 in-frame, single-gene knockout mutants: The Keio collection. *Molecular System Biology* DOI: 10.1038/msb4100050) are preferably not deleted as their deletion may reduce the strain growth capacity or its vesiculation activity. Accordingly, in a preferred embodiment the bacteria used to produce the OMVs do not carry gene-inactivating mutations at one or more of the following genes:
  mdoG, yncE, ompN, lpp, gltI, kpsD, degP, mipA, surA, bamC, nlpD, rlpA, pal, potD, ppiA, bamE, skp, yhcN, cpoB, yfeY, ydgH, yajG, yifL, IpoA, prc, slyB, IpoB, yfhG, dsbC, degQ, yraP, bamB, mlaC.

It was found that the bacteria according to the invention have a better OMV producing phenotype with respect to the progenitor strains. In particular, the bacteria carrying all of the above identified 58 mutations were found to produce more than three-fold higher amount OMVs compared to the progenitor strain. More surprisingly, the OMVs obtained with the method of invention, deprived of the proteins encoded by the genes identified above, elicit higher heterologous protein-specific antibody titers compared to $OMVs_{\Delta ompA}$. This is likely due to a reduced dilution and/or interference of the immune responses in favor of the recombinant antigen or epitope of choice. Furthermore, the endogenous protein-depleted OMVs according to the invention show reactogenic properties similar if not inferior to the limits reported for OMV vaccines in clinical use.

As used herein, gene inactivation refers to a modification of the gene sequence that enables to permanently suppress its function or activity, thereby abolishing the production of the gene-encoded protein or of a functional form thereof.

Preferably gene inactivation is carried out by: deletion of the entire coding sequence; deletion of other portions of the gene; insertion of stop codons; inactivation of the transcription and translation signals. For example the following methods can be used to inactivate genes: 1) the classical gene knockout protocol according to which mutants are created by inserting selective markers between PCR products derived from the upstream and downstream regions of the target gene. Mutant colonies are isolated in the appropriate selective medium after transformation with linear or circular constructs and the selection marker is subsequently eliminated by counter-selection, leaving a "scarless" chromosomal mutation. 2) the method described by Court and co-workers according to which chromosomal gene mutations can be achieved without the need of selection markers and using synthetic oligonucleotides which anneal to their complementary chromosomal regions during replication and mediate recombination and gene modification (Yu, D., et al., An efficient recombination system for chromosome engineering in *Escherichia coli*. Proc Natl Acad Sci USA, 2000. 97(11): p. 5978-83). 3) CRISPR/Cas-based methods such as the one proposed by Jiang and co-workers (Jiang, W., et al., RNA-guided editing of bacterial genomes using CRISPR-Cas systems. Nat Biotechnol. 31(3): p. 233-9). However, any other genome editing methods described in the literature and known to those skilled in the art can be applied.

In one embodiment, gene inactivation is carried out by deleting 28-35 nucleotides located in the proximity of the first 5% length of the protein coding sequence and by adding an in frame stop codon immediately after the deleted portion of the gene. By doing so it was found that the total genome of an *E. coli* strain carrying the highest number of gene inactivations (58) is reduced by 1799 base pairs, corresponding to the 0.039% of the genome (number of nucleotides in *E. coli* BL21(DE3) strain=4.558.953).

The strains of the invention are genetically engineered to express heterologous antigen/polypeptide/epitope of bacterial, viral, parasitic and cancer origin on the OMVs. The heterologous antigens can be expressed in the lumen of the OMVs, in the membrane, and can also be exposed on the surface of OMVs. Furthermore, the heterologous antigen expressed in the OMVs can be a fusion protein constituted by a carrier protein and an immunogenic polypeptide. Fusion proteins comprising a bacterial protein and one or more copies of a tumor antigen protein are disclosed in WO2016/184860. Furthermore, the heterologous proteins can be lipidated to enhance their incorporation in the OMVs, as disclosed in EP3312192.

As used herein the term "heterologous" means that the protein is from a species that is different from the species of bacterium from which the OMV is obtained (the heterologous organism). Typically, the protein is an antigen from a pathogen genus different from the genus of bacterium from which the OMV is obtained. The protein may also be a human protein, and any portion of it, such as a tumor-associated and tumor-specific antigen, polypeptide and epitope.

In another embodiment of the invention the heterologous polypeptide can be any portion of a human protein that carries a specific amino acid mutation and where such mutation generates an immunogenic CD4+ and/or CD8+ T cell epitope.

The tumor antigens that can be expressed on the OMVs as such or as suitable fusion proteins include any CD4+ and/or CD8+ T cell neo-epitope generated as a consequence of mutations occurring in cancer cells.

Other tumor antigens that can be expressed on the OMVs as such or as suitable fusion proteins include:

(a) the cancer-testis antigens NY-ESO-1, SSX2, SCP1 as well as RAGE, BAGE, GAGE and MAGE family polypeptides, for example, GAGE-1, GAGE-2, MAGE-1, MAGE-2, MAGE-3, MAGE-4, MAGE-5, MAGE-6, and MAGE-12, which can be used, for example, to address melanoma, lung, head and neck, NSCLC, breast, gastrointestinal, and bladder tumours; (b) mutated antigens, including p53, associated with various solid tumours, e.g., colorectal, lung, head and neck cancer; p21/Ras associated with, e.g., melanoma, pancreatic cancer and colorectal cancer; CDK4, associated with, e.g., melanoma; MUM1 associated with, e.g., melanoma; caspase-8 associated with, e.g., head and neck cancer; CIA 0205 associated with, e.g., bladder cancer; HLA-A2-R1701, beta catenin associated with, e.g., melanoma; TCR associated with, e.g., T-cell non-Hodgkin lymphoma; BCR-abl associated with, e.g., chronic myelogenous leukemia; triosephosphate isomerase; KIA 0205; CDC-27, and LDLR-FUT; (c) over-expressed antigens, including, Galectin 4 associated with, e.g., colorectal cancer; Galectin 9 associated with, e.g., Hodgkin's disease; proteinase 3 associated with, e.g., chronic myelogenous leukemia; WT 1 associated with, e.g., various leukemias; carbonic anhydrase associated with, e.g., renal cancer; aldolase A associated with, e.g., lung cancer; PRAME associated with, e.g., melanoma; HER-2/neu associated with, e.g., breast, colon, lung and ovarian cancer; mammaglobin, alpha-fetoprotein associated with, e.g., hepatoma; KSA associated with, e.g., colorectal cancer; gastrin associated with, e.g., pancreatic and gastric cancer; telomerase catalytic protein, MUC-1 associated with, e.g., breast and ovarian cancer; G-250 associated with, e.g., renal cell carcinoma; p53 associated with, e.g., breast, colon cancer; and carcinoembryonic antigen associated with, e.g., breast cancer, lung cancer, and cancers of the gastrointestinal tract such as colorectal cancer; (d) shared antigens, including melanoma-melanocyte differentiation antigens such as MART-I/Melan A; gplOO; MC1R; melanocyte-stimulating hormone receptor; tyrosinase; tyrosinase related protein-1/TRP1 and tyrosinase related protein-2/TRP2 associated with, e.g., melanoma; (e) prostate associated antigens including PAP, PSA, PSMA, PSH-P1, PSM-P1, PSM-P2, associated with e.g., prostate cancer; (f) immunoglobulin idiotypes associated with myeloma and B cell lymphomas. In certain embodiments, the one or more TAA can be selected from pi 5, Hom/Mel-40, H-Ras, E2A-PRL, H4-RET, IGH-IGK, MYL-RAR, Epstein Barr virus antigens, EBNA, human papillomavirus (HPV) antigens, including E6 and E7, hepatitis B and C virus antigens, human T-cell lymphotropic virus antigens, TSP-180, p185erbB2, pl 80erbB-3, c-met, mn-23H1, TAG-72-4, CA 19-9, CA 72-4, CAM 17.1, NuMa, K-ras, pi 6, TAGE, PSCA, CT7, 43-9F, 5T4, 791 Tgp72, beta-HCG, BCA225, BTAA, CA 125, CA 15-3 (CA 27.29\BCAA), CA 195, CA 242, CA-50, CAM43, CD68\KP1, CO-029, FGF-5, Ga733 (EpCAM), HTgp-175, M344, MA-50, MG7-Ag, MOV18, NB/70K, NY-CO-1, RCAS1, SDCCAG16, TA-90 (Mac-2 binding protein/cyclophilin C-associated protein), TAAL6, TAG72, TLP, TPS.

The bacterial heterologous proteins that can be used according to the present invention include any antigen, expressed on the OMVs as such or as suitable fusion protein, which induces protective immune responses against the corresponding pathogen. Typical antigens include: the Factor H binding protein (fHbp) and NHBA from *Neisseria* sp., the pilus subunits and their sub-domains of *Streptococcus agalactiae*, the extracellular cholesterol depending streptolysin O (Slo-dm) from *Streptococcus pyogenes*, the Spy-CEP from *Streptococcus pyogenes*, Hla and its mutated forms, such as $Hla_{H35L}$, from *Staphylococcus aureus*, Spa and its mutated forms, such as SpaKKAA, from *Staphylococcus aureus*, the LukE and LukD antigens and other leukocidins, such as PVL, from *Staphylococcus aureus*, the FhuD2 antigen from *Staphylococcus aureus*, the CsA1 antigen from *Staphylococcus aureus*, the Clamping Factor A (ClfA) from *Staphylococcus aureus*.

The bacterial vesicles can conveniently be separated from whole bacterial culture by filtration e.g. through a 0.22 μm filter. Bacterial filtrates may be clarified by centrifugation, for example high speed centrifugation (e.g. 200,000×g for about 2 hours). Another useful process for OMV preparation is described in WO2005/004908 and involves ultrafiltration on crude OMVs, instead of high speed centrifugation. The process may involve a step of ultracentrifugation after the ultrafiltration takes place. A simple process for purifying bacterial vesicles comprises: (i) a first filtration step in which the vesicles are separated from the bacteria based on their different sizes, and (ii) tangential flow filtration using membranes that retain vesicles, thus allowing their concentration.

In a further embodiment, the invention provides an immunogenic composition comprising a bacterial outer membrane vesicle as herein disclosed, together with pharmaceutical acceptable vehicles and excipients. The composition can contain a mixture of outer membrane vesicles carrying cancer-specific T cell epitopes and such mixture of vesicles can be used as personalized cancer vaccine.

The composition of the invention is in a suitable administration form and it is preferably in the form of a vaccine. Vaccines according to the invention may either be prophylactic (e.g. to prevent cancer) or therapeutic (e.g. to treat cancer). Pharmaceutical compositions used as vaccines comprise an immunologically effective amount of antigen(s), as well as any other components, as needed. By 'immunologically effective amount', it is meant that the administration of that amount to an individual, either in a single dose or as part of a series, is effective for treatment or prevention. This amount varies depending upon the health and physical condition of the individual to be treated, age, the taxonomic group of individual to be treated (e.g. non-human primate, primate, etc.), the capacity of the individual's immune system. The amount of OMVs in the compositions of the invention may generally be between 10 and 500 μg, preferably between 25 and 200 μg, and more preferably about 50 μg or about 100 μg.

Compositions of the invention may be prepared in various liquid forms. For example, the compositions may be prepared as injectables, either as solutions or suspensions. The composition may be prepared for pulmonary administration e.g. by an inhaler, using a fine spray. The composition may be prepared for nasal, aural or ocular administration e.g. as spray or drops, and intranasal vesicle vaccines are known in the art. Injectables for intramuscular administration are typical. Injection may be via a needle (e.g. a hypodermic needle), but needle-free injection may alternatively be used.

The OMVs and the immunogenic compositions according to the invention are conveniently used for the stimulation of an immune response against heterologous antigens in a subject in need thereof. Particularly they can be used for the prevention or treatment of various infectious diseases and of different types of tumor, including but not limited to bronchogenic carcinoma, nasopharyngeal carcinoma, laryngeal carcinoma, small cell and non-small cell lung carcinoma, lung adenocarcinoma, hepatocarcinoma, pancreatic carcinoma, bladder carcinoma, colon carcinoma, breast carcinoma, cervical carcinoma, ovarian carcinoma, prostate cancer or lymphocytic leukaemias.

In another embodiment, OMVs are used for "in situ vaccination" meaning that they are administered directly into tumors thus eliciting local and systemic tumor specific immune responses at tumor site. The OMVs used for in situ vaccination carry cancer-specific antigens/epitopes which are either added to the OMV preparation before injection or are expressed in the OMVs by properly engineering the OMV-producing strains.

Figure 1:
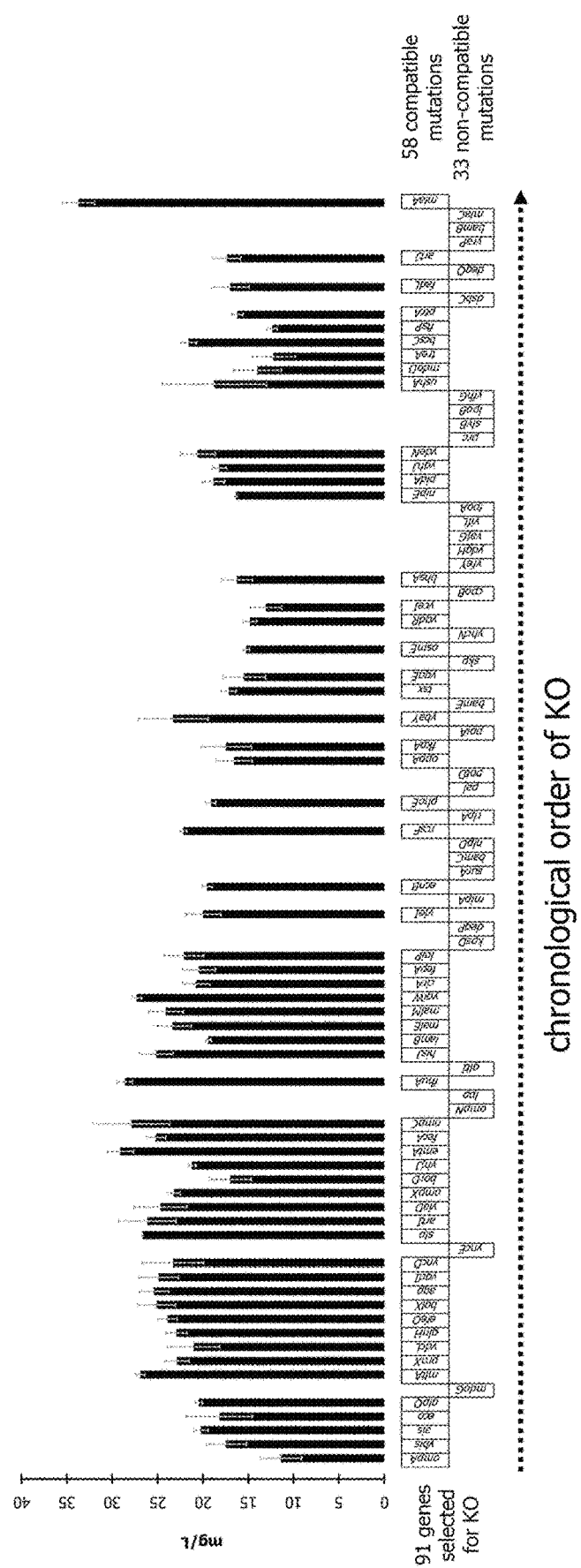
FIG. 1

Amount of OMVs (mg of OMV proteins/L of culture) purified from the culture supernatant of *E. coli* OMV_MUT derivatives. The bars (mg/l) show the mean of three independent experiments and their standard deviations from all *E. coli* ompA OMV_MUT strains in consecutive order. The starting point was the hypervesiculating *E. coli* BL21(DE3) ΔompA strain.

FIG. 2

Electrophoretic analysis on 2% agarose gels of PCR products obtained by amplifying portions of the 58 inactivated genes using the chromosomal DNA of *E. coli* BL21 (DE3) and *E. coli* OMV_MUT57 as templates. The primers used for the amplification are reported in Table 5.

FIG. 3

SDS-PAGE of OMVs obtained from *E. coli* BL21(DE3) ΔompA and the 57 *E. coli* OMV_MUT derivatives. All purified OMVs were normalised for 20 μg of total protein content and loaded onto Criterion TGX any kD SDS-polyacrylamide gels (Bio-Rad Laboratories, Hercules, CA). The gels were stained with Coomassie brilliant blue.

FIG. 4

2-DE gels of OMVs from BL21(DE3)ΔompA (A) and *E. coli*-OMV_MUT57 (B) strains. OMV proteins were first focused on non-linear immobilized pH 3-10 gradient gels and then separated on house-made 9-16% SDS-polyacrylamide gels. Analytical 2-DE gels were stained with ammoniacal silver nitrate. The figure clearly showed that several protein spots present in BL21(DE3)ΔompA (A) disappear in *E. coli*-OMV_MUT57 (B).

FIG. 5

Schematic representation of plasmid pET-LukE expressing lipidated *S. aureus* LukE antigen

FIG. 6

Schematic representation of plasmid pET-FhuD2 expressing lipidated *S. aureus* FhuD2 antigen

FIG. 7

Schematic representation of plasmid pET-FhuD2-D8-hFAT1-3x, expressing lipidated FhuD2 carrying three copies of D8-hFAT1 epitope at its C-terminus (SEQ ID NO: 309).

FIG. 8

SDS-PAGE analysis of OMVs from *E. coli* OMV_MUT57 expressing LukE, FhuD2 and FhuD2-D8-hFAT1 fusion. 20 μg of OMVs purified from the supernatants of *E. coli* OMV_MUT57 transformed with plasmids pET-LukE pET-FhuD2 pET-FhuD2-D8-hFAT1-3x and pET vector ("Empty") as control. Arrows indicate the recombinant antigens which accumulate in the OMV preparations.

FIG. 9

Schematic representation of plasmid pET-Nm-fHbpvIII expressing lipidated neisserial fHbp carrying three copies of EGFRvIII epitope at its C-terminus.

FIG. 10

Flow cytometry analysis of BL21(DE3)ΔompA and *E. coli* OMV_MUT57 cells expressing heterologous antigens—Surface exposition of FhuD2, FhuD2-hFAT1 and fHbp-EGFRvIII fusion proteins was evaluated on bacterial cells after 2 h induction with 0.1 mM IPTG. Cells were stained with pAb anti-FhuD2 (cells expressing FhuD2), mAb anti-hFAT1 (cells expressing FhuD2-hFAT1) and pAb anti-EGFRvIII (cells expressing fHbp-EGRF-vIII-3x), followed by incubation with FITC secondary antibodies. Fluorescence was measured by flow cytometry. Cells not included in the gates represent the background fluorescence signals obtained incubating the cells with the secondary antibody only.

FIG. 11

Immunogenicity against endogenous proteins of *E. coli* BL21(DE3).

Endogenous OMV$_{\Delta ompA}$-associated proteins identified by 2-DE coupled to Mass Spectrometry were cloned from *E. coli* BL21(DE3) and purified as recombinant His6-tagged products by IMAC. Purified proteins were analyzed by SDS-PAGE and Western Blot loading 1 µg of purified proteins. Western Blots were incubated with sera (1:2,000 dilution) from CD1 mice immunized i.p. 3 times at 2-wk interval with 2 µg of either OMV$_{\Delta ompA}$ or, OMV$_{\Delta 58}$, or OMV$_{\Delta 60}$. Two proteins (*), which are expressed (not inactivated) in both *E. coli* BL21(DE3)Δ58 and *E. coli* BL21 (DE3)Δ60 were selected as controls.

FIG. 12

Heterologous antigen expression.

*E. coli* BL21(DE3)ΔompA and *E. coli* BL21(DE3)Δ60 strains expressing different heterologous antigens as lipoproteins were grown in LB at 30° C. At OD$_{600}$=0.5, 0.1 mM IPTG was added and after 2 h, OMVs were purified from culture supernatants by ultracentrifugation. Aliquots corresponding to 7.5 µg of total OMV proteins were loaded to each lane, which were analysed by densitometry. The ratio between antigen to total protein was calculated for each lane and compared for each antigen (upper panel).

FIG. 13

Evaluation of immunogenicity and protection in mice of engineered OMVs from *E. coli* BL21(DE3)ΔompA and *E. coli* BL21(DE3)Δ60.

A) IgG titers in mice immunized with OMVs expressing lipidated heterologous antigens. Groups of 5 female Balb/c mice were immunized i.p. 3 times at 2-wk interval with 2 µg of OMVs formulated with alum as adjuvant expressing lipidated FhuD2, FhuD2-Bp, Hla$_{H35L}$, and FhuD2-mFAT1 antigens. Sera were collected 7 d after the third immunization and IgG titers were analyzed by ELISA using plates coated with the corresponding recombinant antigen or peptide (200 ng/well).

B) CD8 and T-cell

C) protection HLA

D) tumor growth/protection OVA in C57 mice

FIG. 14

In situ vaccination of BALB/c challenge with CT26 tumour cells.

A) treatment of mice. CT26 tumor cells were subcutaneously injected at two distal sites. When tumour volume reached 50-100 mm$^3$, one tumour was vaccinated in situ. Then vaccinations were every two days for three vaccinations with PBS, OMVs Δ60 or OMVs Δ60+100 µg pentatope. Tumour volumes of both the injected and later tumour were recorded every two days. B) Analysis of both situ injected tumour volumes and lateral tumour volumes in mice from each group at day 26. D) Analysis of the sum of tumour volumes per mouse in each group at day 26. Human endpoints were always respected therefore in the PBS group some of the mice were sacrificed earlier than day 26 and these mice were assigned single tumour volumes of 2000 mm$^3$. Statistical significance was calculated using an unpaired one-tailed T-test with Welch's correction. Not significant (ns)=P>0.1; *=P<0.1; =P<0.01; *=P<0.001.

DETAILED DESCRIPTION OF THE INVENTION

Selection of Proteins to be Eliminated from the OMVs

The OMV proteome includes two classes of proteins: periplasmic proteins and outer membrane (OM) proteins. OM proteins can be subdivided in lipoproteins and transmembrane proteins. Several algorithms and database are available that can predict with a high degree of precision such categories of proteins. We used a number of these bioinformatics tools, including PSORT and PFAM, to ultimately select the list of OMV-associated proteins. The list was further filtered by removing those proteins classified as "indispensable" according to the Keio collection (Baba T. et al. (2006) Construction of *Escherichia coli* K-12 in-frame, single-gene knockout mutants: the Keio collection. *Molecular System Biology* DOI: 10.1038/msb4100050). At the end, a final list of 91 proteins were selected and reported in Table 1. In particular, the list comprises 45 periplasmic proteins, 14 integral membrane proteins and 32 outer membrane lipoproteins. Many of these proteins (and their homologs) have been described to be present the OMVs by using 2DE coupled to mass spectrometry (Fantappie' et. al (2017) Gram negative promiscuous lipoproteins keep surface topology when transplanted from one species to another and can deliver foreign polypeptides to the bacterial surface. *Mol. Cell. Proteomics* 16:1348-1364).

TABLE 1 list of 91 proteins selected for gene inactivation

| | |
|---|---|
| Periplasmic proteins | agp, artI, artJ, bcsC, bglX, cirA, degP, degQ, dsbC, eco, fkpA, ftsP, glnH, glpQ, gltI, hisJ, skp, kpsD, malE, malM, mdoG, mdoD, oppA, potD, ppiA, prc, proX, ptrA, surA, treA, ushA, cpoB, ybis, efeO, yceI, bhsA, ydeN, ydgH, yggE, ygiW, yhcN, yhjJ, yncE, yraP, mlaC |
| Outer membrane lipoproteins | ais, ecnB, lpp, mltA, emtA, bamC, nlpD, nlpE, osmE, pal, rcsF, rlpA, slp, slyB, bamE, yghJ, mlaA, yajG, ybaY, borD, ipoB, ydcL, yfeY, bamB, yfhG, ygdI, ygdR, loiP, yiaD, yifL, yjeI, lpoA |
| Integral membrane proteins | fadL, fecA, fepA, fhuA, lamB, mipA, nmpC, ompA, ompN, ompX, phoE, pldA, tsx, yncD |

| bis-list of inactivated genes |
|---|
| ompA (wt: SEQ ID NO: 1; mutated: SEQ ID NO: 59); |
| ybis (wt: SEQ ID NO: 2; mutated: SEQ ID NO: 60), |
| ais (wt: SEQ ID NO: 3; mutated: SEQ ID NO: 61), |
| eco (wt: SEQ ID NO: 4; mutated: SEQ ID NO: 62), |
| glpQ (wt: SEQ ID NO: 5 mutated: SEQ ID NO: 63), |
| mltA (wt: SEQ ID NO: 6 mutated: SEQ ID NO: 64), |
| proX (wt: SEQ ID NO: 7 mutated: SEQ ID NO: 65), |
| ydcL (wt: SEQ ID NO: 8 mutated: SEQ ID NO: 66), |
| glnH (wt: SEQ ID NO: 9 mutated: SEQ ID NO: 67), |
| efeO (wt: SEQ ID NO: 10 mutated: SEQ ID NO: 68), |
| bglX (wt: SEQ ID NO: 11 mutated: SEQ ID NO: 69), |
| agp (wt: SEQ ID NO: 12; mutated: SEQ ID NO: 70), |
| ygdI (wt: SEQ ID NO: 13; mutated: SEQ ID NO: 71), |
| yncD (wt: SEQ ID NO: 14; mutated: SEQ ID NO: 72), |
| slp (wt: SEQ ID NO: 15; mutated: SEQ ID NO: 73), |
| artI (wt: SEQ ID NO: 16; mutated: SEQ ID NO: 74), |
| yiaD (wt: SEQ ID NO: 17; mutated: SEQ ID NO: 75), |
| ompX (wt: SEQ ID NO: 18; mutated: SEQ ID NO: 76), |
| borD (wt: SEQ ID NO: 19; mutated: SEQ ID NO: 77), |
| yhiJ (wt: SEQ ID NO: 20; mutated: SEQ ID NO: 78), |

TABLE 1-continued emtA (wt: SEQ ID NO: 21; mutated: SEQ ID NO: 79),
fecA (wt: SEQ ID NO: 22; mutated: SEQ ID NO: 80),
nmpC (wt: SEQ ID NO: 23; mutated: SEQ ID NO: 81),
fhuA (wt: SEQ ID NO: 24; mutated: SEQ ID NO: 82),
hisJ (wt: SEQ ID NO: 25; mutated: SEQ ID NO: 83),
lamB (wt: SEQ ID NO: 26; mutated: SEQ ID NO: 84),
malE (wt: SEQ ID NO: 27; mutated: SEQ ID NO: 85),
malM (wt: SEQ ID NO: 28; mutated: SEQ ID NO: 86),
ygiW (wt: SEQ ID NO: 29; mutated: SEQ ID NO: 87),
cirA (wt: SEQ ID NO: 30; mutated: SEQ ID NO: 88),
fepA (wt: SEQ ID NO: 31; mutated: SEQ ID NO: 89),
loip (wt: SEQ ID NO: 32; mutated: SEQ ID NO: 90),
yjeI (wt: SEQ ID NO: 33; mutated: SEQ ID NO: 91),
ecnB (wt: SEQ ID NO: 34; mutated: SEQ ID NO: 92),
rcsF (wt: SEQ ID NO: 35; mutated: SEQ ID NO: 93),
phoE (wt: SEQ ID NO: 36; mutated: SEQ ID NO: 94),
oppA (wt: SEQ ID NO: 37; mutated: SEQ ID NO: 95),
fkpA (wt: SEQ ID NO: 38; mutated: SEQ ID NO: 96),
ybaY (wt: SEQ ID NO: 39; mutated: SEQ ID NO: 97),
tsx (wt: SEQ ID NO: 40; mutated: SEQ ID NO: 98),
yggE (wt: SEQ ID NO: 41; mutated: SEQ ID NO: 99),
osmE (wt: SEQ ID NO: 42; mutated: SEQ ID NO: 100),
ygdR (wt: SEQ ID NO: 43; mutated SEQ ID NO: 101),
yceI (wt: SEQ ID NO: 44; mutated: SEQ ID NO: 102),
bhsA (wt: SEQ ID NO: 45; mutated: SEQ ID NO: 103),
nlpE (wt: SEQ ID NO: 46; mutated: SEQ ID NO: 104),
pldA (wt: SEQ ID NO: 47; mutated: SEQ ID NO: 105),
yghJ (wt: SEQ ID NO: 48; mutated SEQ ID NO: 106),
ydeN (wt: SEQ ID NO: 49; mutated: SEQ ID NO: 107),
ushA (wt: SEQ ID NO: 50; mutated: SEQ ID NO: 108),
mdoD (wt: SEQ ID NO: 51; mutated: SEQ ID NO: 109),
treA (wt: SEQ ID NO: 52; mutated: SEQ ID NO: 110),
bcsC (wt: SEQ ID NO: 53; mutated: SEQ ID NO: 111),
ftsP (wt: SEQ ID NO: 54; mutated: SEQ IID NO: 112),
ptrA (wt: SEQ ID NO: 55; mutated: SEQ ID NO: 113),
fadL (wt: SEQ ID NO: 56; mutated: SEQ ID NO: 114),
artJ (wt: SEQ ID NO: 57; mutated: SEQ ID NO: 115),
mlaA (wt: SEQ ID NO: 58; mutated: SEQ ID NO: 116),
msbB (wt: SEQ ID NO: 300; mutated: SEQ ID NO: 301),
pagP (wt: SEQ ID NO: 302; mutated: SEQ ID NO: 303).

Inactivation of Selected OMV Proteins

There are three main protocols for the manipulation of chromosomal DNA in *E. coli*, all utilizing phage recombinase-mediated homologous recombination (recombineering), using either the Rac prophage system [Zhang, Y., et al., A new logic for DNA engineering using recombination in *Escherichia coli*. Nat Genet, 1998. 20(2): p. 123-8; Datta, S., N. Costantino, and D. L. Court, A set of recombineering plasmids for gram-negative bacteria. Gene, 2006. 379: p. 109-15) or the bacteriophage λ Red proteins, Exo, Beta, and Gam (Murphy, K. C., Use of bacteriophage lambda recombination functions to promote gene replacement in *Escherichia coli*. J Bacteriol, 1998. 180(8): p. 2063-71; Muyrers, J. P., et al., Rapid modification of bacterial artificial chromosomes by ET-recombination. Nucleic Acids Res, 1999. 27(6): p. 1555-7; Ellis, H. M., et al., High efficiency mutagenesis, repair, and engineering of chromosomal DNA using single-stranded oligonucleotides. Proc Natl Acad Sci USA, 2001. 98(12): p. 6742-6).

According to the first protocol, gene knockout mutants are created by inserting antibiotic resistance markers (or other selection markers) between double-stranded DNA (ds-DNA) PCR products derived from the upstream and downstream regions of the target gene. Mutant colonies are isolated in the appropriate selective medium after transformation with linear or circular constructs and, when necessary, the selection marker is subsequently eliminated by counter-selection, leaving a "scarless" chromosomal mutation.

The second protocol was described by Court and co-workers who demonstrated that chromosomal gene mutations can be achieved without the need of selection markers and using synthetic single stranded DNAs (ss-DNAs) or ds-DNAs, which anneal to their complementary chromosomal regions during replication and mediate recombination and gene modification (Yu, D., et al., An efficient recombination system for chromosome engineering in *Escherichia coli*. Proc Natl Acad Sci USA, 2000. 97(11): p. 5978-83; Yu, D., et al., Recombineering with overlapping single-stranded DNA oligonucleotides: testing a recombination intermediate. Proc Natl Acad Sci USA, 2003. 100(12): p. 7207-12).

The third approach, proposed for the first time by Jiang and co-workers (Jiang, W., et al., RNA-guided editing of bacterial genomes using CRISPR-Cas systems. Nat Biotechnol. 31(3): p. 233-9), makes use of the CRISPR/Cas9 technology (Doudna, J. A. and E. Charpentier, Genome editing. The new frontier of genome engineering with CRISPR-Cas9. Science, 2014. 346(6213): p. 1258096; Sternberg, S. H. and J. A. Doudna, Expanding the Biologist's Toolkit with CRISPR-Cas9. Mol Cell, 2015. 58(4): p. 568-74; Singh, V., D. Braddick, and P. K. Dhar, Exploring the potential of genome editing CRISPR-Cas9 technology. Gene, 2017. 599: p. 1-18. Briefly, the strain to be modified is first genetically manipulated to express the Cas9 nuclease and the λ Red machinery, and subsequently the strain is co-transformed with (i) a plasmid (pCRISPR) encoding the guide RNA, which anneals with the chromosomal region to be modified and promotes a site-specific DNA cleavage by the Cas9, and (ii) a donor DNA (PCR-derived or chemically synthesized) partially homologous to the cleaved extremities, which promotes the repair of the double stranded break through 2 Red-mediated recombination thereby introducing the desired mutation.

The "classical" gene KO method, which involves the use of PCR products flaking a selective marker, is usually very efficient to obtain large deletions but is more laborious. The Court's approach is theoretically the simplest one since only a synthetic oligonucleotide carrying the desired mutation is needed. By following the detailed procedure described by Sawitzke J. and co-workers (Sawitzke J. et al. (2013) Recombineering: highly efficient in vivo genetic engineering using single-strand oligos. *Methods Enzymol.* 533:157-77) good gene inactivation efficiencies can be obtained. However the method might require the screening of several colonies (recommended from 40 to 100) to identify the one carrying the desired mutations. Finally, the CRISPR/Cas9-based methods are extremely efficient but requires the preparation of recombinant plasmids expressing the guide RNA and the synthesis of "donor" oligonucleotides. Both have to be properly selected to guarantee consistent mutagenesis efficiencies.

By using any of these approaches, which those skilled in the art can apply following published protocols, the progressive inactivation of the 91 genes was attempted following the order reported in FIG. 1 and in Table 2. In particular, the strategy was to inactivate the selected gene by creating deletions of approximately 30 bp followed by the in-frame insertion of a stop codon. Obviously, any other strategy for gene inactivation and known to those skilled in the art can be applied.

Figure 2:
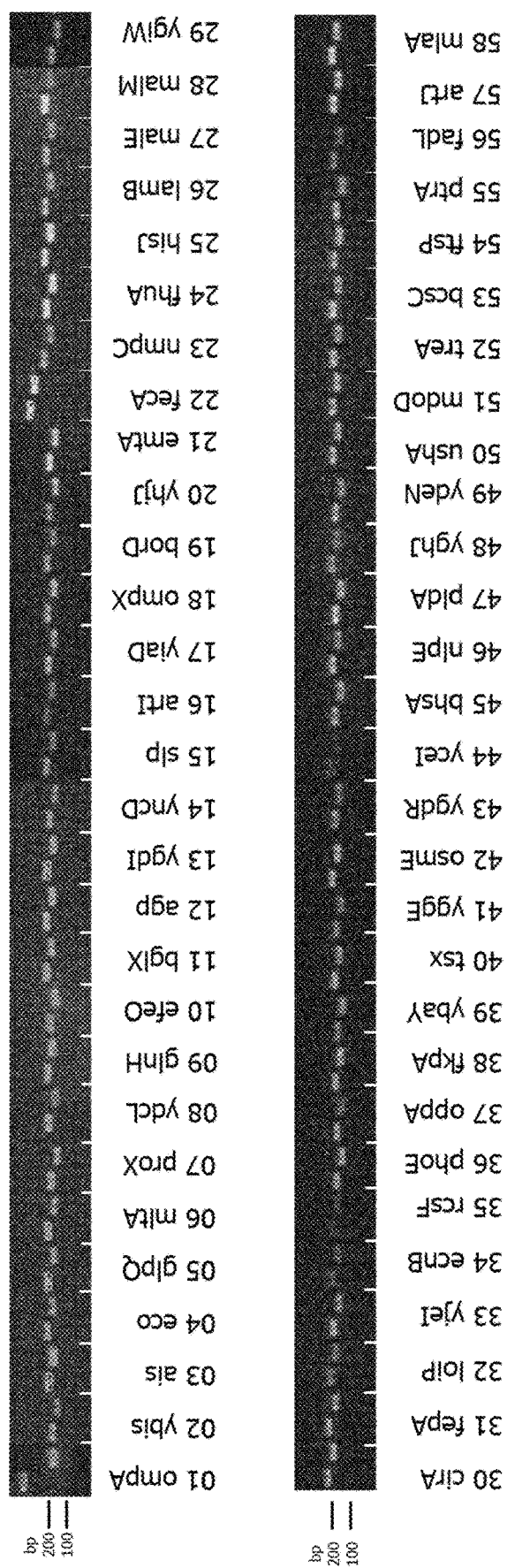

In total 57 *E. coli* BL21(DE3) ΔompA derivatives were obtained, named *E. coli* OMV_MUT 1 throughout 57, whose genotypes are reported in Table 3. In essence, the 58 strains carry a progressive number of mutations, *E. coli* OMV_MUT1 having the inactivation of one gene (ybis) (in addition to ompA inactivation) and *E. coli* OMV_MUT57, having 57 mutations (in addition to ompA). It was found that when 33 out of the 91 attempted deletions added up to some of the 58-gene mutations here reported, the growth of the mutant strains was reduced (Table 4). These 33 mutations were thus classified as non-compatible (FIG. 1). The correctness of the introduced mutations in each strain was verified by sequencing analysis of PCR products obtained using the primers reported in Table 5. Briefly, the PCR reaction was carried out mixing the appropriate primer couples, bacterial cells from a colony picked from an LB agar plate and the 2× GoTaq Master Mix. The PCR was run with one step of initial denaturation (3 min at 95° C.), 30 cycles of denaturation (30 sec at 95° C.), annealing (30 sec at 60° C.) and elongation (30 sec at 72° C.), and a final elongation step (5 min at 72° C.). FIG. 2 shows the electrophoretic analysis on 2% agarose gels of all 58 PCR products obtained from *E. coli* BL21(DE3)ΔompA and *E. coli* OMV_MUT57 strain. As shown in the figure, each amplification product from *E. coli* OMV_MUT57 had a smaller molecular weight with respect to the electrophoretic mobility of the corresponding fragment amplified from the chromosomal DNA of *E. coli* BL21(DE3) ΔompA. All amplified products from all mutated genes were sequenced and the analysis confirmed the deletion of a 30 bp fragment and the insertion of a stop codon (TAA) in each gene.

TABLE 2

List of genes subjected gene deletion attempts in chronological order ompA, ybis, ais, eco, glpQ, mdoG, mltA, proX, ydcL, glnH, efeO, bglX, agp, ygdI, yncD, yncE, slp, artI, yiaD, ompX, borD, yhjJ, emtA, fecA, nmpC, ompN, lpp, fhuA, gltI, hisJ, lamB, malE, malM, ygiW, cirA, fepA, loiP, kpsD, degP, yjeI, mipA, ecnB, surA, bamC, nlpD, rcsF, rlpA, phoE, pal, potD, oppA, fkpA, ppiA, ybaY, bamE, tsx, yggE, skp, osmE, yhcN, ygdR, yceI, cpoB, bhsA, yfeY, ydgH, yajG, yifL, lpoA, nlpE, pldA, yghJ, ydeN, prc, slyB, lpoB, yfhG, ushA, mdoD, treA, bcsC, ftsP, ptrA, dsbC, fadL, degQ, artJ, yraP, bamB, mlaC, mlaA

TABLE 3

List of mutant strains

| Name | genotype |
|---|---|
| *E.coli* OMV_MUT1 | ompA, ybis |
| *E.coli* OMV_MUT2 | ompA, ybis, ais |
| *E.coli* OMV_MUT3 | ompA, ybis, ais, eco |
| *E.coli* OMV_MUT4 | ompA ybis ais eco glpQ |
| *E.coli* OMV_MUT5 | ompA ybis ais eco glpQ mltA |
| *E.coli* OMV_MUT6 | ompA ybis ais eco glpQ mltA proX |
| *E.coli* OMV_MUT7 | ompA ybis ais eco glpQ mltA proX ydcL |
| *E.coli* OMV_MUT8 | ompA ybis ais eco glpQ mltA proX ydcL glnH |
| *E.coli* OMV_MUT9 | ompA ybis ais eco glpQ mltA proX ydcL glnH efeO |
| *E.coli* OMV_MUT10 | ompA ybis ais eco glpQ mltA proX ydcL glnH efeO bglX |
| *E.coli* OMV_MUT11 | ompA ybis ais eco glpQ mltA proX ydcL glnH efeO bglX agp |
| *E.coli* OMV_MUT12 | ompA ybis ais eco glpQ mltA proX ydcL glnH efeO bglX agp ygdI |
| *E.coli* OMV_MUT13 | ompA ybis ais eco glpQ mltA proX ydcL glnH efeO bglX agp ygdI yncD |
| *E.coli* OMV_MUT14 | ompA ybis ais eco glpQ mltA proX ydcL glnH efeO bglX agp ygdI yncD slp |
| *E.coli* OMV_MUT15 | ompA ybis ais eco glpQ mltA proX ydcL glnH efeO bglX agp ygdI yncD slp artI |
| *E.coli* OMV_MUT16 | ompA ybis ais eco glpQ mltA proX ydcL glnH efeO bglX agp ygdI yncD slp artI yiaD |
| *E.coli* OMV_MUT17 | ompA ybis ais eco glpQ mltA proX ydcL glnH efeO bglX agp ygdI yncD slp artI yiaD ompX |
| *E.coli* OMV_MUT18 | ompA ybis ais eco glpQ mltA proX ydcL glnH efeO bglX agp ygdI yncD slp artI yiaD ompX borD |
| *E.coli* OMV_MUT19 | ompA ybis ais eco glpQ mltA proX ydcL glnH efeO bglX agp ygdI yncD slp artI yiaD ompX borD yhjJ |
| *E.coli* OMV_MUT20 | ompA ybis ais eco glpQ mltA proX ydcL glnH efeO bglX agp ygdI yncD slp artI yiaD ompX borD yhjJ emtA |
| *E.coli* OMV_MUT21 | ompA ybis ais eco glpQ mltA proX ydcL glnH efeO bglX agp ygdI yncD slp artI yiaD ompX borD yhjJ emtA fecA |
| *E.coli* OMV_MUT22 | ompA ybis ais eco glpQ mltA proX ydcL glnH efeO bglX agp ygdI yncD slp artI yiaD ompX borD yhjJ emtA fecA nmpC |
| *E.coli* OMV_MUT23 | ompA ybis ais eco glpQ mltA proX ydcL glnH efeO bglX agp ygdI yncD slp artI yiaD ompX borD yhjJ emtA fecA nmpC fhuA |
| *E.coli* OMV_MUT24 | ompA ybis ais eco glpQ mltA proX ydcL glnH efeO bglX agp ygdI yncD slp artI yiaD ompX borD yhjJ emtA fecA nmpC fhuA hisJ |
| *E.coli* OMV_MUT25 | ompA ybis ais eco glpQ mltA proX ydcL glnH efeO bglX agp ygdI yncD slp artI yiaD ompX borD yhjJ emtA fecA nmpC fhuA hisJ lamB |
| *E.coli* OMV_MUT26 | ompA ybis ais eco glpQ mltA proX ydcL glnH efeO |

TABLE 3-continued

List of mutant strains

| Name | genotype |
|---|---|
| E.coli OMV_MUT27 | bglX agp ygdI yncD<br>slp artI yiaD ompX<br>borD yhjJ emtA fecA<br>nmpC fhuA hisJ lamB<br>malE |
| E.coli OMV_MUT28 | ompA ybis ais eco<br>glpQ mltA proX<br>ydcL glnH efeO<br>bglX agp ygdI yncD<br>slp artI yiaD ompX<br>borD yhjJ emtA fecA<br>nmpC fhuA hisJ lamB<br>malE malM |
| E.coli OMV_MUT29 | ompA ybis ais eco<br>glpQ mltA proX<br>ydcL glnH efeO<br>bglX agp ygdI yncD<br>slp artI yiaD ompX<br>borD yhjJ emtA fecA<br>nmpC fhuA hisJ lamB<br>malE malM ygiW |
| E.coli OMV_MUT30 | ompA ybis ais eco<br>glpQ mltA proX<br>ydcL glnH efeO<br>bglX agp ygdI yncD<br>slp artI yiaD ompX<br>borD yhjJ emtA fecA<br>nmpC fhuA hisJ lamB<br>malE malM ygiW cirA |
| E.coli OMV_MUT31 | ompA ybis ais eco<br>glpQ mltA proX<br>ydcL glnH efeO<br>bglX agp ygdI yncD<br>slp artI yiaD ompX<br>borD yhjJ emtA fecA<br>nmpC fhuA hisJ lamB<br>malE malM ygiW cirA<br>fepA |
| E.coli OMV_MUT32 | ompA ybis ais eco<br>glpQ mltA proX<br>ydcL glnH efeO<br>bglX agp ygdI yncD<br>slp artI yiaD ompX<br>borD yhjJ emtA fecA<br>nmpC fhuA hisJ lamB<br>malE malM ygiW cirA<br>fepA loiP |
| E.coli OMV_MUT33 | ompA ybis ais eco<br>glpQ mltA proX<br>ydcL glnH efeO<br>bglX agp ygdI yncD<br>slp artI yiaD ompX<br>borD yhjJ emtA fecA<br>nmpC fhuA hisJ lamB<br>malE malM ygiW cirA<br>fepA loiP yjeI |
| E.coli OMV_MUT34 | ompA ybis ais eco<br>glpQ mltA proX<br>ydcL glnH efeO<br>bglX agp ygdI yncD<br>slp artI yiaD ompX<br>borD yhjJ emtA fecA<br>nmpC fhuA hisJ lamB<br>malE malM ygiW cirA<br>fepA loiP yjeI ecnB |
| E.coli OMV_MUT35 | ompA ybis ais eco<br>glpQ mltA proX<br>ydcL glnH efeO<br>bglX agp ygdI yncD<br>slp artI yiaD ompX<br>borD yhjJ emtA fecA<br>nmpC fhuA hisJ lamB<br>malE malM ygiW cirA<br>fepA loiP yjeI ecnB rcsF |
| E.coli OMV_MUT36 | ompA ybis ais eco<br>glpQ mltA proX<br>ydcL glnH efeO<br>bglX agp ygdI yncD<br>slp artI yiaD ompX<br>borD yhjJ emtA fecA<br>nmpC fhuA hisJ lamB<br>malE malM ygiW cirA<br>fepA loiP yjeI ecnB rcsF<br>phoE |
| E.coli OMV_MUT37 | ompA ybis ais eco<br>glpQ mltA proX<br>ydcL glnH efeO<br>bglX agp ygdI yncD<br>slp artI yiaD ompX<br>borD yhjJ emtA fecA<br>nmpC fhuA hisJ lamB<br>malE malM ygiW cirA<br>fepA loiP yjeI ecnB rcsF<br>phoE oppA |
| E.coli OMV_MUT38 | ompA ybis ais eco<br>glpQ mltA proX<br>ydcL glnH efeO<br>bglX agp ygdI yncD<br>slp artI yiaD ompX<br>borD yhjJ emtA fecA<br>nmpC fhuA hisJ lamB<br>malE malM ygiW cirA<br>fepA loiP yjeI ecnB rcsF<br>phoE oppA fkpA |
| E.coli OMV_MUT39 | ompA ybis ais eco<br>glpQ mltA proX<br>ydcL glnH efeO<br>bglX agp ygdI yncD<br>slp artI yiaD ompX<br>borD yhjJ emtA fecA<br>nmpC fhuA hisJ lamB<br>malE malM ygiW cirA<br>fepA loiP yjeI ecnB rcsF<br>phoE oppA fkpA ybaY |
| E.coli OMV_MUT40 | ompA ybis ais eco<br>glpQ mltA proX<br>ydcL glnH efeO<br>bglX agp ygdI yncD<br>slp artI yiaD ompX<br>borD yhjJ emtA fecA<br>nmpC fhuA hisJ lamB<br>malE malM ygiW cirA<br>fepA loiP yjeI ecnB rcsF<br>phoE oppA fkpA ybaY<br>tsx |
| E.coli OMV_MUT41 | ompA ybis ais eco<br>glpQ mltA proX<br>ydcL glnH efeO<br>bglX agp ygdI yncD<br>slp artI yiaD ompX<br>borD yhjJ emtA fecA<br>nmpC fhuA hisJ lamB<br>malE malM ygiW cirA<br>fepA loiP yjeI ecnB rcsF<br>phoE oppA fkpA ybaY<br>tsx yggE |
| E.coli OMV_MUT42 | ompA ybis ais eco<br>glpQ mltA proX<br>ydcL glnH efeO<br>bglX agp ygdI yncD<br>slp artI yiaD ompX |

TABLE 3-continued

List of mutant strains

| Name | genotype |
|---|---|
| E.coli OMV_MUT43 | borD yhjJ emtA fecA<br>nmpC fhuA hisJ lamB<br>malE malM ygiW cirA<br>fepA loiP yjeI ecnB rcsF<br>phoE oppA fkpA ybaY<br>tsx yggE osmE ygdR<br>ompA ybis ais eco<br>glpQ mltA proX<br>ydcL glnH efeO<br>bglX agp ygdI yncD<br>slp artI yiaD ompX |
| E.coli OMV_MUT44 | borD yhjJ emtA fecA<br>nmpC fhuA hisJ lamB<br>malE malM ygiW cirA<br>fepA loiP yjeI ecnB rcsF<br>phoE oppA fkpA ybaY<br>tsx yggE osmE ygdR<br>yceI<br>ompA ybis ais eco<br>glpQ mltA proX<br>ydcL glnH efeO<br>bglX agp ygdI yncD<br>slp artI yiaD ompX |
| E.coli OMV_MUT45 | borD yhjJ emtA fecA<br>nmpC fhuA hisJ lamB<br>malE malM ygiW cirA<br>fepA loiP yjeI ecnB rcsF<br>phoE oppA fkpA ybaY<br>tsx yggE osmE ygdR<br>yceI bhsA<br>ompA ybis ais eco<br>glpQ mltA proX<br>ydcL glnH efeO<br>bglX agp ygdI yncD<br>slp artI yiaD ompX |
| E.coli OMV_MUT46 | borD yhjJ emtA fecA<br>nmpC fhuA hisJ lamB<br>malE malM ygiW cirA<br>fepA loiP yjeI ecnB rcsF<br>phoE oppA fkpA ybaY<br>tsx yggE osmE ygdR<br>yceI bhsA nlpE<br>ompA ybis ais eco<br>glpQ mltA proX<br>ydcL glnH efeO<br>bglX agp ygdI yncD<br>slp artI yiaD ompX |
| E.coli OMV_MUT47 | borD yhjJ emtA fecA<br>nmpC fhuA hisJ lamB<br>malE malM ygiW cirA<br>fepA loiP yjeI ecnB rcsF<br>phoE oppA fkpA ybaY<br>tsx yggE osmE ygdR<br>yceI bhsA nlpE pldA<br>ompA ybis ais eco<br>glpQ mltA proX<br>ydcL glnH efeO<br>bglX agp ygdI yncD<br>slp artI yiaD ompX |
| E.coli OMV_MUT48 | borD yhjJ emtA fecA<br>nmpC fhuA hisJ lamB<br>malE malM ygiW cirA<br>fepA loiP yjeI ecnB rcsF<br>phoE oppA fkpA ybaY<br>tsx yggE osmE ygdR<br>yceI bhsA nlpE pldA<br>yghJ<br>ompA ybis ais eco<br>glpQ mltA proX<br>ydcL glnH efeO<br>bglX agp ygdI yncD<br>slp artI yiaD ompX<br>borD yhjJ emtA fecA<br>nmpC fhuA hisJ lamB<br>malE malM ygiW cirA<br>fepA loiP yjeI ecnB rcsF |

TABLE 3-continued

List of mutant strains

| Name | genotype |
|---|---|
| E.coli OMV_MUT49 | phoE oppA fkpA ybaY<br>tsx yggE osmE ygdR<br>yceI bhsA nlpE pldA<br>yghJ ydeN<br>ompA ybis ais eco<br>glpQ mltA proX<br>ydcL glnH efeO<br>bglX agp ygdI yncD<br>slp artI yiaD ompX<br>borD yhjJ emtA fecA<br>nmpC fhuA hisJ lamB<br>malE malM ygiW cirA<br>fepA loiP yjeI ecnB rcsF<br>phoE oppA fkpA ybaY<br>tsx yggE osmE ygdR<br>yceI bhsA nlpE pldA<br>yghJ ydeN ushA |
| E.coli OMV_MUT50 | ompA ybis ais eco<br>glpQ mltA proX<br>ydcL glnH efeO<br>bglX agp ygdI yncD<br>slp artI yiaD ompX<br>borD yhjJ emtA fecA<br>nmpC fhuA hisJ lamB<br>malE malM ygiW cirA<br>fepA loiP yjeI ecnB rcsF<br>phoE oppA fkpA ybaY<br>tsx yggE osmE ygdR<br>yceI bhsA nlpE pldA<br>yghJ ydeN ushA mdoD |
| E.coli OMV_MUT51 | ompA ybis ais eco<br>glpQ mltA proX<br>ydcL glnH efeO<br>bglX agp ygdI yncD<br>slp artI yiaD ompX<br>borD yhjJ emtA fecA<br>nmpC fhuA hisJ lamB<br>malE malM ygiW cirA<br>fepA loiP yjeI ecnB rcsF<br>phoE oppA fkpA ybaY<br>tsx yggE osmE ygdR<br>yceI bhsA nlpE pldA<br>yghJ ydeN ushA mdoD<br>treA |
| E.coli OMV_MUT52 | ompA ybis ais eco<br>glpQ mltA proX<br>ydcL glnH efeO<br>bglX agp ygdI yncD<br>slp artI yiaD ompX<br>borD yhjJ emtA fecA<br>nmpC fhuA hisJ lamB<br>malE malM ygiW cirA<br>fepA loiP yjeI ecnB rcsF<br>phoE oppA fkpA ybaY<br>tsx yggE osmE ygdR<br>yceI bhsA nlpE pldA<br>yghJ ydeN ushA mdoD<br>treA bcsC |
| E.coli OMV_MUT53 | ompA ybis ais eco<br>glpQ mltA proX<br>ydcL glnH efeO<br>bglX agp ygdI yncD<br>slp artI yiaD ompX<br>borD yhjJ emtA fecA<br>nmpC fhuA hisJ lamB<br>malE malM ygiW cirA<br>fepA loiP yjeI ecnB rcsF<br>phoE oppA fkpA ybaY<br>tsx yggE osmE ygdR<br>yceI bhsA nlpE pldA<br>yghJ ydeN ushA mdoD<br>treA bcsC ftsP |
| E.coli OMV_MUT54 | ompA ybis ais eco<br>glpQ mltA proX<br>ydcL glnH efeO<br>bglX agp ygdI yncD |

TABLE 3-continued

List of mutant strains

| Name | genotype |
|---|---|
|  | slp artI yiaD ompX borD yhjJ emtA fecA nmpC fhuA hisJ lamB malE malM ygiW cirA fepA loiP yjeI ecnB rcsF phoE oppA fkpA ybaY tsx yggE osmE ygdR yceI bhsA nlpE pldA yghJ ydeN ushA mdoD treA bcsC ftsP ptrA |
| E.coli OMV_MUT55 | ompA ybis ais eco glpQ mltA proX ydcL glnH efeO bglX agp ygdI yncD slp artI yiaD ompX borD yhjJ emtA fecA nmpC fhuA hisJ lamB malE malM ygiW cirA fepA loiP yjeI ecnB rcsF phoE oppA fkpA ybaY tsx yggE osmE ygdR yceI bhsA nlpE pldA yghJ ydeN ushA mdoD treA bcsC ftsP ptrA fadL |
| E.coli OMV_MUT56 | ompA ybis ais eco glpQ mltA proX ydcL glnH efeO bglX agp ygdI yncD slp artI yiaD ompX borD yhjJ emtA fecA nmpC fhuA hisJ lamB malE malM ygiW cirA fepA loiP yjeI ecnB rcsF phoE oppA fkpA ybaY tsx yggE osmE ygdR yceI bhsA nlpE pldA yghJ ydeN ushA mdoD treA bcsC ftsP ptrA fadL artJ |
| E.coli OMV_MUT57 | ompA ybis ais eco glpQ mltA proX ydcL glnH efeO bglX agp ygdI yncD slp artI yiaD ompX borD yhjJ emtA fecA nmpC fhuA hisJ lamB malE malM ygiW cirA fepA loiP yjeI ecnB rcsF phoE oppA fkpA ybaY tsx yggE osmE ygdR yceI bhsA nlpE pldA yghJ ydeN ushA mdoD treA bcsC ftsP ptrA fadL artJ mlaA |

TABLE 4

List of genes whose inactivation may affect viability (chronological order)

mdoG, yncE, ompN, lpp, gltI, kpsD, degP, mipA, surA, bamC, nlpD, rlpA, pal, potD, ppiA, bamE, skp, yhcN, cpoB, yfeY, ydgH, yajG, yifL, lpoA, prc, slyB, lpoB, yfhG, dsbC, degQ, yraP, bamB, mlaC

TABLE 5

Primers used for the analysis of gene mutations

| Ybis | F | tctcaacccaatggcctgcca (SEQ ID NO: 117) |
|---|---|---|
|  | R | ctccagcggctgagtgttac (SEQ ID NO: 118) |

TABLE 5-continued

Primers used for the analysis of gene mutations

| Ais | F | Actggcgctcgctgcaattgc (SEQ ID NO: 119) |
|---|---|---|
|  | R | actggcgctcgctgcaattgc (SEQ ID NO: 120) |
| Eco | F | acctgcagtattgtttgccgc (SEQ ID NO: 121) |
|  | R | ttcccgccgagacgatgcaa (SEQ ID NO: 122) |
| glPQ | F | ctgcaaaaacgcaacggaggc (SEQ ID NO: 123) |
|  | R | agataatccgctccctgcgca (SEQ ID NO: 124) |
| mdoG | F | tgcgttggttgagtgctgcag (SEQ ID NO: 125) |
|  | R | gtcttcagattgttccagtacgc (SEQ ID NO: 126) |
| mltA | F | gaaaggacgttgggtaaagtacc (SEQ ID NO: 127) |
|  | R | cagacgcggtgacgaattacg (SEQ ID NO: 128) |
| proX | F | acttttgctgccgatctgccg (SEQ ID NO: 129) |
|  | R | ttcacggcggtgaaggttgca (SEQ ID NO: 130) |
| ydcL | F | cggcttattggctctgtctgg (SEQ ID NO: 131) |
|  | R | cgacggtttcggtaccggata (SEQ ID NO: 132) |
| glnH | F | tgcggtttcttctcatgccgc (SEQ ID NO: 133) |
|  | R | gcgccagatcgacgttttgg (SEQ ID NO: 134) |
| efeO | F | cattaacttccgccgtaacgca (SEQ ID NO: 135) |
|  | R | cactccagcgccttctggct (SEQ ID NO: 136) |
| bglX | F | taggaatcgcggtgagtctggc (SEQ ID NO: 137) |
|  | R | -gccccaacctgaccgtctttg (SEQ ID NO: 138) |
| agp | F | cgcaactgtggcagggatagt (SEQ ID NO: 139) |
|  | R | cacttcgagcacgccacctttt (SEQ ID NO: 140) |
| ygdI | F | gactgccgcaattatttctgcct (SEQ ID NO: 141) |
|  | R | ctgatccagttcgaccatctctt (SEQ ID NO: 142) |
| yncD | F | tccgtccgacagaccgttttg (SEQ ID NO: 143) |
|  | R | aaaccaggcacgctggtcagt (SEQ ID NO: 144) |
| yncE | F | caagagcgtaacgatgattacgc (SEQ ID NO: 145) |
|  | R | cgtaggcaccttttacctaccg (SEQ ID NO: 146) |
| slp | F | ggtgcactcatcctcagcctt (SEQ ID NO: 147) |
|  | R | cagcgatttctaacaacgtatccg (SEQ ID NO: 148) |
| artI | F | tcttccgccacagctgccga (SEQ ID NO: 149) |
|  | R | acggcttctacgcgacggaatt (SEQ ID NO: 150) |
| yiaD | F | agtggtgctctggcggtatct (SEQ ID NO: 151) |
|  | R | atgtaataacccacgccgccg (SEQ ID NO: 152) |
| ompX | F | gcatgtcttttcagcactggcc (SEQ ID NO: 153) |
|  | R | gcagtacggcttttctcggtg (SEQ ID NO: 154) |
| borD | F | ctgccgctctggcaatgctta (SEQ ID NO: 155) |
|  | R | ccgagcaatccatttacgaatgt (SEQ ID NO: 156) |
| yhjJ | F | gcggtttgctgatgatggcca (SEQ ID NO: 157) |
|  | R | gcgtgactgtaaccgctctgt (SEQ ID NO: 158) |
| emtA | F | catgactatacgaacccgccg (SEQ ID NO: 159) |
|  | R | cacgtccggaggttgaagctt (SEQ ID NO: 160) |
| fecA | F | ctcgttcgactcatagctgaacacaac (SEQ ID NO: 161) |
|  | R | cgtccagcagttgttgcaggcc (SEQ ID NO: 162) |
| nmpC | F | ggcaatttctgctgtagctgca (SEQ ID NO: 163) |
|  | R | gaccgaaaccagtcagttgatc (SEQ ID NO: 164) |
| ompN | F | taattcctgccctgctcgcc (SEQ ID NO: 165) |
|  | R | tgtattccattgaccgtagcca (SEQ ID NO: 166) |
| lpp | F | gcgttcgatgcttctttgagcg (SEQ ID NO: 167) |
|  | R | acgcgtgacgcagtagcggtaaac (SEQ ID NO: 168) |
| fhuA | F | gcgcgttccaaaactgctcag (SEQ ID NO: 169) |
|  | R | gtgccggtagctgactgtcg (SEQ ID NO: 170) |

TABLE 5-continued

Primers used for the analysis of gene mutations

| | | |
|---|---|---|
| gltI | F | ctcacaacgggtatccatgcg (SEQ ID NO: 171) |
| | R | ctgaagattcacggtgaccgac (SEQ ID NO: 172) |
| hisJ | F | ctggtgctatcgctctctctg (SEQ ID NO: 173) |
| | R | cgcatccagcggattttcgac (SEQ ID NO: 174) |
| lamB | F | tgtctgctcaggcaatggctg (SEQ ID NO: 175) |
| | R | ggccacgttagtgtcgaaatag (SEQ ID NO: 176) |
| malE | F | cgcatcctcgcattatccgca (SEQ ID NO: 177) |
| | R | gccgcaacctgtgggaatttc (SEQ ID NO: 178) |
| malM | F | agcgcgcctggaattagcctt (SEQ ID NO: 179) |
| | R | agttcgccaatgtttgccggg (SEQ ID NO: 180) |
| ygiW | F | taatcgcagtaatggccctgtg (SEQ ID NO: 181) |
| | R | gaacacgtagagatcgtcagaga (SEQ ID NO: 182) |
| cirA | F | gggctgtgtttgtccgctatttc (SEQ ID NO: 183) |
| | R | cgtcagttgtacgccaggcac (SEQ ID NO: 184) |
| fepA | F | cattccctggccttgttggtc (SEQ ID NO: 185) |
| | R | tggcatggtacggatgatctc (SEQ ID NO: 186) |
| loiP | F | tggcaacggtactgaccggtt (SEQ ID NO: 187) |
| | R | tgttgcctagcgcattggcaata (SEQ ID NO: 188) |
| kpsD | F | tactgattgccgcctgtcacg (SEQ ID NO: 189) |
| | R | cgctggtgccgttgaaaagttg (SEQ ID NO: 190) |
| degP | F | gcgttatctgttaatcgagact (SEQ ID NO: 191) |
| | R | ccttctacgttaatgctgaccac (SEQ ID NO: 192) |
| yjeI | F | caacgaattgagtgctgccgg (SEQ ID NO: 193) |
| | R | ccataaatcacgttaccgcccatt (SEQ ID NO: 194) |
| mipA | F | cgtagcgcacgctgaaggtaa (SEQ ID NO: 195) |
| | R | gtaaagcggcgaccagtaagc (SEQ ID NO: 196) |
| ecnB | F | tctcccgcgctgccagctaat (SEQ ID NO: 197) |
| | R | cacgcgtggtgttcaggcag (SEQ ID NO: 198) |
| surA | F | ccacgtaatccgcagtgcgg (SEQ ID NO: 199) |
| | R | gttgctgccttgcctgagcag (SEQ ID NO: 200) |
| bamC | F | ctggcaaaggttgcgggtgtt (SEQ ID NO: 201) |
| | R | atgtccagcgccttaccgaca (SEQ ID NO: 202) |
| nlpD | F | gcccaaaattcaccgttcgcc (SEQ ID NO: 203) |
| | R | ggctgctgtaccggctgaatt (SEQ ID NO: 204) |
| rcsF | F | aatatcattcaggacgggcgctt (SEQ ID NO: 205) |
| | R | ttcggttttgcaggctccgct (SEQ ID NO: 206) |
| rlpA | F | atctgcatcgcggcaggaatg (SEQ ID NO: 207) |
| | R | cgagacggatcctgcacgatt (SEQ ID NO: 208) |
| phoE | F | aagagcactctggcattagtggt (SEQ ID NO: 209) |
| | R | ccataaccagtcagttgatcgttaa (SEQ ID NO: 210) |
| pal | F | caggtcaaattccctgcctgg (SEQ ID NO: 211) |
| | R | ttcgcatccataccagtgccg (SEQ ID NO: 212) |
| potD | F | tgatggttattgccagccagctt (SEQ ID NO: 213) |
| | R | ccggtttctttggtgaactgttc (SEQ ID NO: 214) |
| oppA | F | agagaagtttagtagcagctggc (SEQ ID NO: 215) |
| | R | tcgctgaccagtaagccttcaaa (SEQ ID NO: 216) |
| fkpA | F | acaatggccgttgccctgcat (SEQ ID NO: 217) |
| | R | tcctgaacaccagcgatcagc (SEQ ID NO: 218) |
| ppiA | F | gatggctgctgtttttcgctcttt (SEQ ID NO: 219) |
| | R | aagccaggaatgacgcggtga (SEQ ID NO: 220) |
| ybaY | F | gttggcggcttgcgcagataa (SEQ ID NO: 221) |
| | R | tgacggtgcatcggctaacg (SEQ ID NO: 222) |
| bamE | F | tggcatgacgcaacaacaagttg (SEQ ID NO: 223) |
| | R | gttaccactcagcgcaggtttg (SEQ ID NO: 224) |
| tsx | F | acattactggcagccggtgc (SEQ ID NO: 225) |
| | R | cataaccatagaagtcgaaccag (SEQ ID NO: 226) |
| yggE | F | aagcttgcctccagaggtcct (SEQ ID NO: 227) |
| | R | gcaagagtggcaatgtctggc (SEQ ID NO: 228) |
| skp | F | aggcgatcaatataagatcgccg (SEQ ID NO: 229) |
| | R | accggttttctgcgctacctg (SEQ ID NO: 230) |
| osmE | F | gaacaagaatatggcaggaattctg (SEQ ID NO: 231) |
| | R | caggatgtaggtctggcaagta (SEQ ID NO: 232) |
| yhcN | F | ccactgttgctgcattaagcgta (SEQ ID NO: 233) |
| | R | caccgctacgagcttcagtaat (SEQ ID NO: 234) |
| ygdR | F | aacagactattatcataggtgagcc (SEQ ID NO: 235) |
| | R | cttgctgatcgtgataactcacc (SEQ ID NO: 236) |
| yceI | F | tcgcgtccctgatgttctctg (SEQ ID NO: 237) |
| | R | gtgattagtatcgacgctggtg (SEQ ID NO: 238) |
| cpoB | F | gtcgtgcggtactggtttact (SEQ ID NO: 239) |
| | R | tcagaaagttgttgctggagttg (SEQ ID NO: 240) |
| bhsA | F | aacgtaaaaacccctcatcgctgc (SEQ ID NO: 241) |
| | R | gtaatacgaaagattttgcgccc (SEQ ID NO: 242) |
| yfeY | F | tgcactccaagcaacgttattga (SEQ ID NO: 243) |
| | R | tgcagtggtgtggacgccgt (SEQ ID NO: 244) |
| ydgH | F | agcttaagaacaccctcctgg (SEQ ID NO: 245) |
| | R | gtcgacaacataaaaagaggcgg (SEQ ID NO: 246) |
| yajG | F | cgttagttgctctgtttatgcttg (SEQ ID NO: 247) |
| | R | ggaggcggtcagggtaacg (SEQ ID NO: 248) |
| yifL | F | cgccttctcctgcgatgatag (SEQ ID NO: 249) |
| | R | ccgtggattgcgtttgcgtct (SEQ ID NO: 250) |
| lpoA | F | cgtttgaaagccgcgcgttgt (SEQ ID NO: 251) |
| | R | ccccggttttaccttcttttcacca (SEQ ID NO: 252) |
| nlpE | R | caggctggcatcgaaagcaca (SEQ ID NO: 253) |
| | F | gcatcggtttcagttcggcag (SEQ ID NO: 254) |
| pldA | F | ggactctgcagggctggttgt (SEQ ID NO: 255) |
| | R | cgctggtttgggtgtaaatgagg (SEQ ID NO: 256) |
| yghJ | F | gcggctattttgagcgcaacc (SEQ ID NO: 257) |
| | R | caggatcaggtatcggttctggc (SEQ ID NO: 258) |
| ydeN | F | ctggcatctggtatggctgca (SEQ ID NO: 259) |
| | R | gggtcaaaagatcccttatcaaaagg (SEQ ID NO: 260) |
| prc | F | cgcgtgctgatcaaattccgg (SEQ ID NO: 261) |
| | R | tcgcgaactgttcaacatcgctt (SEQ ID NO: 262) |
| slyB | F | gtcggttgtgttaataacgacacc (SEQ ID NO: 263) |
| | R | gttccgccaccaacagtattcc (SEQ ID NO: 264) |
| lpoB | F | gcgcacaaagtcagactttatct (SEQ ID NO: 265) |
| | R | cgggatcgtcggcaccgag (SEQ ID NO: 266) |
| yfhG | F | cattgctgggttgcgtgcaga (SEQ ID NO: 267) |
| | R | gcgactgcgcaggcattaaac (SEQ ID NO: 268) |
| ushA | F | ggcgtggcgttagcgctgtta (SEQ ID NO: 269) |
| | R | cagccgcaacctctttgcggat (SEQ ID NO: 270) |

TABLE 5-continued

Primers used for the analysis of gene mutations

| | | |
|---|---|---|
| mdoD | F | ccagaaggactcactttcaggtatgg (SEQ ID NO: 271) |
| | R | gtttgcgctaagtcgtgcgcc (SEQ ID NO: 272) |
| treA | F | gcagctagtgcgatcctgaacta (SEQ ID NO: 273) |
| | R | cggctgtggtgttaccggtgt (SEQ ID NO: 274) |
| bcsC | F | ccctgtttggacaaggctggg (SEQ ID NO: 275) |
| | R | tcgcttcgcctaaccgaacttgc (SEQ ID NO: 276) |
| ftsP | F | ggggaacactttcctgcacgg (SEQ ID NO: 277) |
| | R | taaacagcggttgcccacggc (SEQ ID NO: 278) |
| ptrA | F | gggcacccttaagtcaggcag (SEQ ID NO: 279) |
| | R | gatcttccagcgacccaacgg (SEQ ID NO: 280) |
| dsbC | F | ctttgttagcggcgttttcagg (SEQ ID NO: 281) |
| | R | agccgtgccgctaacgtcata (SEQ ID NO: 282) |
| fadL | F | cctacacttcgcgctcctgtt (SEQ ID NO: 283) |
| | R | tgcgccttcccctgaataagc (SEQ ID NO: 284) |
| degQ | F | tcattcaggtacgagagcagg (SEQ ID NO: 285) |
| | R | ttccttccacccgtacgctca (SEQ ID NO: 286) |
| artJ | F | gacagacgggagttccatcatg (SEQ ID NO: 287) |
| | R | cattctgcctgcatttgtttgcacaag (SEQ ID NO: 288) |
| yraP | F | tgggtaccaaagccgcaactg (SEQ ID NO: 289) |
| | R | ttggcaccgtctacgcccata (SEQ ID NO: 290) |
| bamB | F | tactgctgccaggactgctttc (SEQ ID NO: 291) |
| | R | gtccgctgcatagacaacgttgt (SEQ ID NO: 292) |
| mlaC | F | cagctgctgcgccaggtaataa (SEQ ID NO: 293) |
| | R | geggttgctcattcttcaggc (SEQ ID NO: 294) |
| mlaA | F | agcttcgcctgtcggcgctt (SEQ ID NO: 295) |
| | R | caaaccgttacgcgccggttg (SEQ ID NO: 296) |

Quantification of the OMVs Released in the Culture Supernatant by Each Mutant Strain To establish the amount of OMVs released by each mutant, each strain was grown in triplicate in 200 ml LB medium (starting $OD_{600}$=0.05) and, when the cultures had reached an $OD_{600}$=1, OMVs were collected from culture supernatants by filtration through a 0.22 µm pore size filter (Millipore) followed by high-speed centrifugation (200,000×g for 2 hours). Pellets containing OMVs were finally resuspended in 1×PBS and quantified by using nanodrop (Thermo Fisher). FIG. 1 shows the amount of OMVs purified from each mutant as average of the three independent experiments. As shown, all mutants released an amount of OMVs superior to the 10 mg/L produced by progenitor strain BL21(DE3)ΔompA. In particular, the OMVs productivity varies from 15 mg/L to 35 mg/L in the case of E. coli OMV_MUT57.

Figure 3:
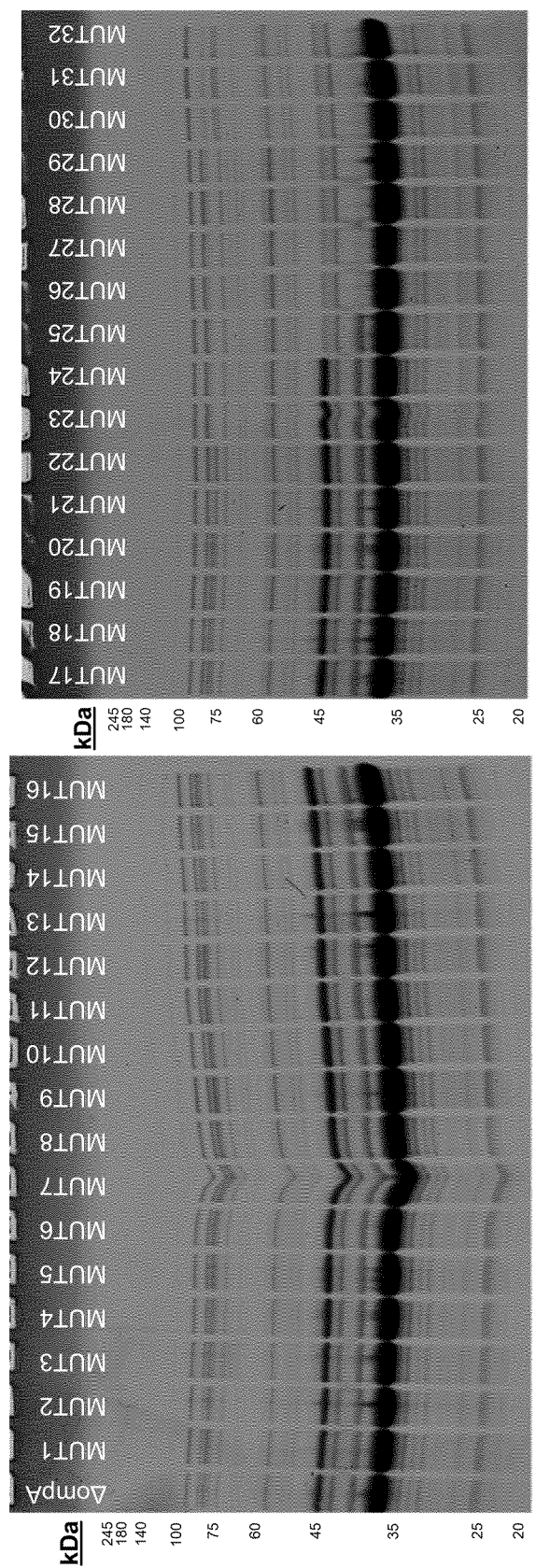
Figure 3:
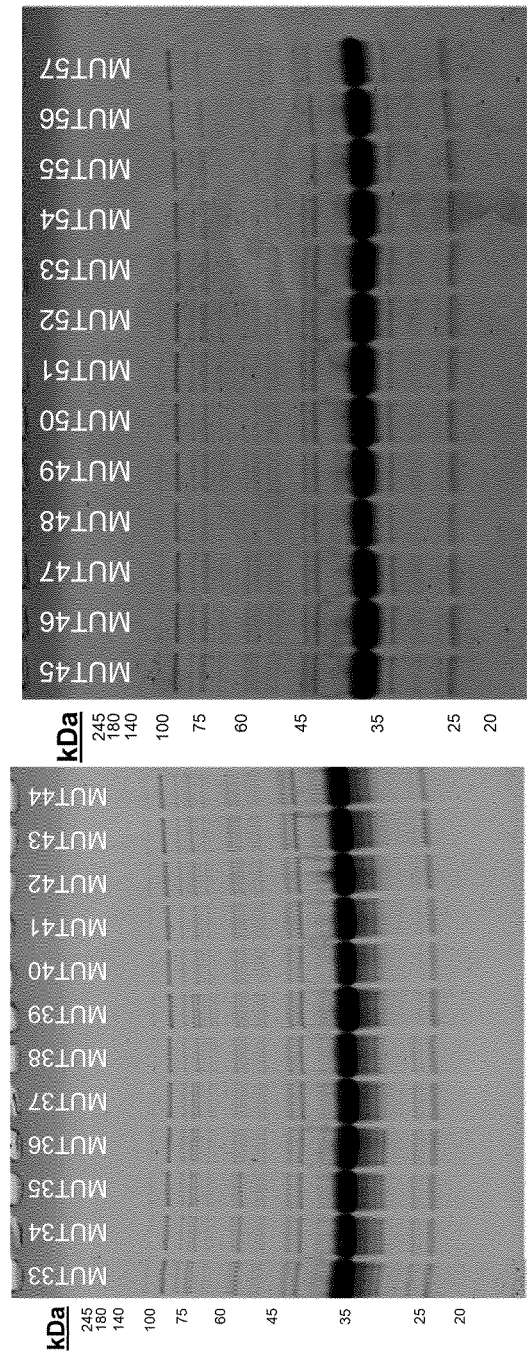

To evaluate the quality of the OMVs, 20 µg of each OMV preparation were added to sodium dodecyl sulphate-polyacrylamide gel electrophoresis (SDS-PAGE) Laemli buffer and heated at 100° C. for 5 minutes. Proteins were separated by 4-12% or 10% SDS-PAGE (Invitrogen), run in MES buffer (Invitrogen) and finally stained with Coomassie Blue. As shown in FIG. 3, in all OMV preparations no high molecular weight bands were visible, and this is a typical indication that no major cell lysis has occurred during the growth of the strains. In addition, a progressive disappearance of some protein bands is evident, in line with the increasing number of inactivated genes.

Gene Inactivation Results in the Reduction of OMV Protein Content

Since the inactivated genes encode proteins belonging to the periplasmic and outer membrane compartment, the successful inactivation of each gene should result in the progressive reduction of OMV protein content. The disappearance of proteins from the OMV compartment can be appreciated by comparing the total protein content of the OMVs purified from the different mutants and run on the SDS-PAGE shown in FIG. 3. To further demonstrate the elimination of proteins from OMVs as a consequence of gene inactivation the proteome profile of OMVs from BL21 (DE3)ΔompA and E. coli OMV_MUT57 was analyzed by 2D electrophoresis. OMV samples were resuspended in a 2-DE buffer containing 7 M Urea, 2 M Thiourea, 4% (w/v) CHAPS, 1% (w/v) DTE, and 2% (v/v) TritonX100. 500 µg of proteins were diluted in 350 µl of denaturation buffer and 0.2% or 2% (v/v) IPG-buffer (pH 3-10; GE Healthcare, Uppsala, Sweden). 2-DE was performed as previously reported (Fantappie' et. al (2017) Mol. Cell. Proteomics 16:1348-1364). The first dimension (IEF, IsoElectricFocusing) was run using the Ettan™ IPGphor unit (GE Healthcare) and non-linear wide-range IPG (Immobilized pH gradient) strips (pH 3-10; 18 cm; GE Healthcare) were rehydrated, at 16° C., with protein samples in the strip holders for 1 h at 0 V and overnight at 30 V. Successively, proteins were focused applying the following voltage steps as previously described (Fantappie' et. al (2017) Mol. Cell. Proteomics 16:1348-1364). After IEF, strips were equilibrated for 12 minutes in reducing buffer (6 M urea, 30% (v/v) glycerol, 2% (w/v) SDS, 0.05 M Tris-HCl pH 6.8, 2% (w/v) DTE), and then for further 5 min in an alkylating buffer (6 M urea, 30% (v/v) glycerol, 2% (w/v) SDS, 0.05 M Tris-HCl pH 6.8, 2.5% (w/v) iodoacetamide, and bromophenol blue in trace). Focused strips were placed on house-made 9-16% polyacrylamide linear gradient gels (18 cm×20 cm×1.5 mm) and proteins were separated at 10° C. setting 40 mA/gel constant current. Gels were stained with MS-compatible silver staining.

Figure 4:
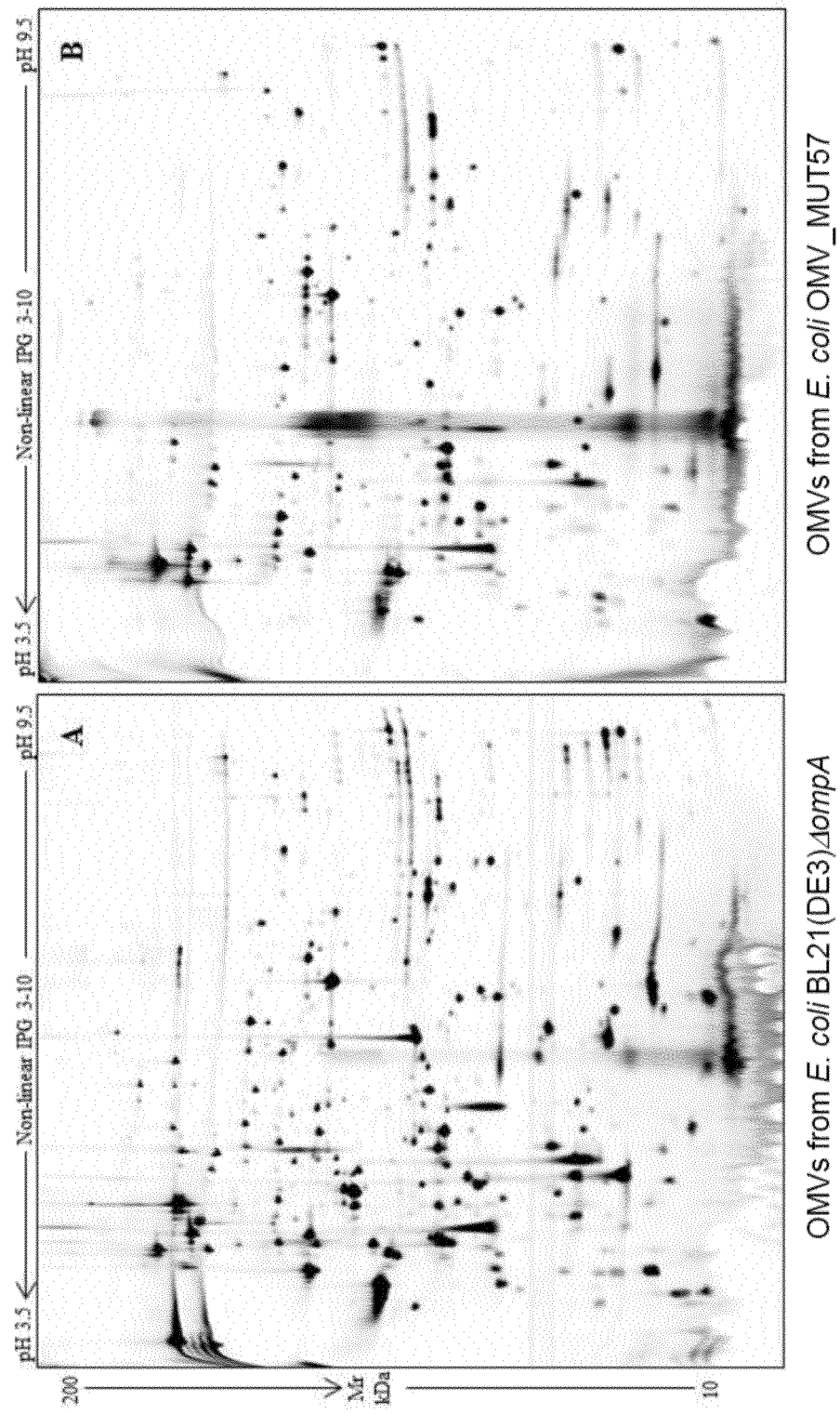

In FIG. 4, representative silver stained 2-DE gels of OMVs from BL21(DE3)ΔompA (A) and from E. coli OMV_MUT57 (B) are shown. From FIG. 4 it can be easily appreciated that a substantial number of spots disappeared from the 2D map of OMVs from E. coli OMV_MUT57.

In order to detect the statistically significant quantitative and qualitative differences, image analysis was performed on three different spot maps from three OMVs preparations using the ImageMaster 2D Platinum v. 6.0 software (GE Healthcare). Quantitative differences were considered significant only when the ratio of mean percentage relative volume (% V=V single spot/V total spots), between the two sample sets, was at least ±2 fold and satisfied statistical analysis with two-tailed Student's t-test score less than 0.05. As shown in Table 6 and Table 7 a considerable number of proteins spots emerged as significantly different in either quantitative or qualitative terms between the two OMVs preparations. The tables also report the names of the proteins as identified by Mass Spectrometry analysis, performed as already described (Fantappie' et. al (2017) Mol. Cell. Proteomics 16:1348-1364) using an Ultraflex III MALDI-TOF/TOF mass spectrometer (Bruker Daltonics, Billerica, MA), equipped with a 200 Hz Smartbeam™ I laser. Mass spectra were acquired in reflector positive mode with a laser frequency set to 100 Hz and protein identification was carried out in SwissProt database using the on-line available Mascot software (Matrix Science Ltd., London, UK, http://www.matrixscience.com).

TABLE 6

MS identified protein spots that significantly change in abundance between
E. coli ΔOmpA and E. coli-OMV_MUT57

| Spot N. | Protein description | UniProt name[a] | Mascot search results | | |
|---|---|---|---|---|---|
| | | | Score | N. of matched peptides | Sequence coverage (%) |
| 583 | Outer membrane protein TolC | TOLC_ECOLI | 253 | 20/30 | 44 |
| 617 | Periplasmic pH-dependent serine endoprotease DegQ | DEGQ_ECOLI | 169 | 10/10 | 30 |
| 622 | Outer membrane protein TolC | TOLC_ECOLI | 102 | 8/13 | 22 |
| 654 | Chaperone SurA | SURA_ECOLI | 139 | 10/13 | 27 |
| 655 | Chaperone SurA | SURA_ECOLI | 98 | 7/9 | 17 |
| 658 | Chaperone SurA | SURA_ECOLI | 99 | 6/6 | 14 |
| 659 | Chaperone SurA | SURA_ECOLI | 343 | 34/60 | 65 |
| 762 | Bifunctional polyhydroxybutyrate synthase/ABC transporter periplasmic binding protein | YDCS_ECOLI | 134 | 9/13 | 37 |
| 783 | Minor capsid protein E | WP_024748468.1 | 204 | 16/27 | 48 |
| 843 | Outer membrane protein assembly factor BamC | BAMC_ECOLI | 165 | 13/21 | 47 |
| 874 | Sulfate-binding protein | SUBI_ECOLI | 97 | 6/7 | 14 |
| 878 | Outer membrane protein assembly factor BamC | BAMC_ECOLI | 100 | 9/20 | 40 |
| 970 | ABC transporter periplasmic-binding protein YphF | YPHF_ECOLI | 100 | 7/13 | 33 |
| 991 | ABC transporter periplasmic-binding protein YtfQ | YTFQ_ECOLI | 81 | 8/24 | 23 |
| 1028 | Glutamate/aspartate import solute-binding protein | GLTI_ECOLI | 221 | 18/31 | 69 |
| 1031 | Glutamate/aspartate import solute-binding protein | GLTI_ECOLI | 170 | 14/18 | 38 |
| 1076 | Lysine/arginine/ornithine-binding periplasmic protein | ARGT_ECOLI | 145 | 10/18 | 41 |
| 1104 | Outer membrane protein assembly factor BamD | BAMD_ECOLI | 124 | 9/13 | 31 |
| 1124 | MltA-interacting protein | MIPA_ECOLI | 99 | 8/11 | 35 |
| 1135 | Probable phospholipid-binding protein MlaC | MLAC_ECOLI | 162 | 12/24 | 45 |
| 1177 | Class B acid phosphatase | APHA_ECOLI | 70 | 4/5 | 13 |
| 1182 | Class B acid phosphatase | APHA_ECOLI | 70 | 4/5 | 14 |
| 1321 | Outer-membrane lipoprotein carrier protein | LOLA_ECOLI | 167 | 10/12 | 49 |
| 1322 | Lipopolysaccharide export system protein LptA | LPTA_ECOLI | 126 | 8/15 | 37 |
| 1358 | Major outer membrane prolipoprotein Lpp | LPP_ECOLI | 69 | 5/11 | 48 |
| 1379 | Thioesterase 1/protease 1/lysophospholipase L1 | TESA_ECOLI | 92 | 5/6 | 29 |
| 1381 | Outer membrane protein YfaZ | YFAZ_ECOLI | 91 | 7/16 | 51 |

| N. | Mean %V ± SD × 10$^{-4}$[b] | | Fold change ΔOmpA/MUT57 | T-test[c] |
|---|---|---|---|---|
| | E. coli BL21(DE3)ΔompA | E. coli OMV_MUT57 | | |
| 583 | 3515 ± 261 | 11613 ± 1819 | −3.30 | 0,001582012 |
| 617 | 1399 ± 206 | 3800 ± 260 | −2.15 | 0,001102484 |
| 622 | 7511 ± 368 | 99 ± 78 | 7.55 | 0,039899155 |
| 654 | 635 ± 45 | 3408 ± 420 | −5.37 | 0,000342421 |
| 655 | 330 ± 129 | 2551 ± 149 | −7.73 | 4,09376E-05 |
| 658 | 145 ± 45 | 2512 ± 348 | −17.31 | 0,000308088 |
| 659 | 5517 ± 498 | 11507 ± 828 | −2.08 | 0,000427214 |
| 762 | 226 ± 33 | 588 ± 61 | −2.60 | 0,000819979 |
| 783 | 2976 ± 388 | 622 ± 76 | 4.78 | 0,000499047 |
| 843 | 1063 ± 260 | 6852 ± 1497 | −6.45 | 0,002729187 |
| 874 | 749 ± 59 | 1854 ± 94 | −2.47 | 6,71282E-05 |
| 878 | 3732 ± 501 | 11443 ± 536 | −3.07 | 5,36343E-05 |
| 970 | 226 ± 46 | 725 ± 156 | −3.20 | 0,006016959 |
| 991 | 1351 ± 232 | 4170 ± 133 | −3.09 | 5,31535E-05 |
| 1028 | 1564 ± 383 | 5611 ± 2600 | −3.59 | 0,055956672 |
| 1031 | 1464 ± 149 | 4543 ± 1278 | −3.10 | 0,014344153 |
| 1076 | 1944 ± 418 | 5045 ± 637 | −2.59 | 0,00213518 |
| 1104 | 288 ± 100 | 1727 ± 628 | −5.99 | 0,017244485 |
| 1124 | 1693 ± 584 | 7607 ± 2039 | −4.49 | 0,008470313 |
| 1135 | 497 ± 74 | 224 ± 144 | 2.22 | 0,043301085 |
| 1177 | 224 ± 21 | 1210 ± 3 | −5.41 | 1,34924E-07 |
| 1182 | 129 ± 17 | 1363 ± 35 | −10.58 | 6,92073E-07 |
| 1321 | 1515 ± 100 | 3242 ± 896 | −2.14 | 0,029400485 |
| 1322 | 2409 ± 139 | 4937 ± 388 | −2.05 | 0,000445675 |
| 1358 | 404 ± 16 | 1434 ± 348 | −3.55 | 0,006870082 |
| 1379 | 495 ± 24 | 1097 ± 111 | −2.21 | 0,000778907 |
| 1381 | 584 ± 71 | 3423 ± 524 | −5.86 | 0,00074402 |

[a] UmProt entry name.
[b] Each value represents the mean ± SD of individually computed %V in spot maps from OMVs of BL21(DE3)ΔompA and from OMVs of E. coli OMV_MUT57.
[c] Only protein spots showing both statistical reliability according two-tailed T-test (p ≤ 0.05) and, at least, 2 fold change in abundance are listed as significant differences.

TABLE 7

MS identified protein spots detected in OMVs from E. coli ΔOmpA and not in OMVs from E. coli-OMV_MUT57

| Spot N. | Protein description | UniProt name[a] | Mascot search results | | | Mean %V ± SD × 10$^{-4b}$ | |
|---|---|---|---|---|---|---|---|
| | | | Score | N. of matched peptides | Sequence coverage (%) | BL21(DE3) ΔompA | E. coli OMV_MUT57 |
| 128 | Cellulose synthase operon protein C | BCSC_ECOLI | 161 | 15/19 | 18 | 999 ± 216 | — |
| 190 | Protease 3 | PTRA_ECOLI | 316 | 29/34 | 27 | 2401 ± 453 | — |
| 253 | Ferrienterobactin receptor | FEPA_ECOLI | 318 | 34/67 | 56 | 10761 ± 1466 | — |
| 258 | Maltoporin | LAMB_ECOLI | 214 | 20/29 | 47 | 14837 ± 7060 | — |
| 264 | Ferrienterobactin receptor | FEPA_ECOLI | 104 | 13/29 | 21 | 1183 ± 336 | — |
| 265 | Ferrienterobactin receptor | FEPA_ECOLI | 319 | 27/36 | 46 | 3287 ± 594 | — |
| 273 | Periplasmic beta-glucosidase | BGLX_ECOLI | 100 | 8/10 | 13 | 827 ± 110 | — |
| 274 | Periplasmic beta-glucosidase | BGLX_ECOLI | 155 | 13/17 | 20 | 3334 ± 259 | — |
| 284 | Ferrienterobactin receptor | FEPA_ECOLI | 144 | 12/16 | 21 | 1429 ± 280 | — |
| 317 | Fe(3+) dicitrate transport protein FecA | FECA_ECOLI | 144 | 10/10 | 15 | 785 ± 371 | — |
| 319 | Tail-specific protease | PRC_ECOLI | 186 | 16/18 | 20 | 2739 ± 247 | — |
| 320 | Fe(3+) dicitrate transport protein FecA | FECA_ECOLI | 318 | 32/48 | 50 | 4054 ± 823 | — |
| 321 | Fe(3+) dicitrate transport protein FecA | FECA_ECOLI | 112 | 10/14 | 13 | 487 ± 218 | — |
| 323 | Ferrichrome outer membrane transporter/phage receptor | FHUA_ECOLI | 111 | 9/12 | 16 | 742 ± 243 | — |
| 325 | Ferrienterobactin receptor | FEPA_ECOLI | 191 | 23/52 | 43 | 2413 ± 852 | — |
| | Ferrichrome outer membrane transporter/phage receptor | FHUA_ECOLI | 121 | 17/52 | 28 | | |
| 331 | Probable TonB-dependent receptor YncD | YNCD_ECOLI | 109 | 13/34 | 24 | 8452 ± 500 | — |
| | Ferrichrome outer membrane transporter/phage receptor | FHUA_ECOLI | 79 | 11/34 | 18 | | |
| 332 | Ferrichrome-iron receptor | FHUA_ECOLI | 136 | 10/11 | 18 | 1264 ± 352 | — |
| 394 | Colicin I receptor | CIRA_ECOLI | 290 | 28/40 | 42 | 3503 ± 889 | — |
| 395 | Colicin I receptor | CIRA_ECOLI | 106 | 8/8 | 13 | 1893 ± 630 | — |
| 514 | Uncharacterized sulfatase YdeN | YDEN_ECOLI | 140 | 10/13 | 26 | 2505 ± 185 | — |
| 517 | Uncharacterized sulfatase YdeN | YDEN_ECOLI | 93 | 9/22 | 23 | 1827 ± 587 | — |
| | Protein UshA | USHA_ECOLI | 86 | 9/22 | 20 | | |
| 519 | Periplasmic trehalase | TREA_ECOLI | 131 | 10/14 | 22 | 724 ± 244 | — |
| 520 | Periplasmic oligopeptide-binding protein | OPPA_ECOLI | 103 | 8/12 | 19 | 198 ± 57 | — |
| 524 | Periplasmic oligopeptide-binding protein | OPPA_ECOLI | 182 | 14/21 | 34 | 1509 ± 315 | — |
| 526 | Periplasmic oligopeptide-binding protein | OPPA_ECOLI | 194 | 21/50 | 43 | 5891 ± 554 | — |
| 527 | Periplasmic oligopeptide-binding protein | OPPA_ECOLI | 168 | 14/24 | 31 | 344 ± 24 | — |
| 529 | Polysialic acid transport protein KpsD | KPSD1_ECOLX | 110 | 8/10 | 15 | 123 ± 111 | — |
| 535 | Glucans biosynthesis protein D | OPGD_ECOLI | 125 | 8/8 | 16 | 150 ± 27 | — |
| 536 | Glucans biosynthesis protein D | OPGD_ECOLI | 255 | 23/41 | 53 | 1640 ± 159 | — |
| 541 | Glucans biosynthesis protein D | OPGD_ECOLI | 116 | 9/8 | 16 | 78 ± 7 | — |
| 589 | Protein YhjJ | YHJJ_ECOLI | 235 | 19/27 | 45 | 2507 ± 539 | — |
| 651 | Maltoporin | LAMB_ECOLI | 196 | 21/47 | 60 | 13889 ± 2535 | — |
| 652 | Maltoporin | LAMB_ECOLI | 128 | 10/17 | 31 | 814 ± 353 | — |
| 660 | Maltoporin | LAMB_ECOLI | 110 | 11/19 | 28 | 1338 ± 402 | — |
| 662 | Maltoporin | LAMB_ECOLI | 190 | 22/49 | 51 | 2346 ± 119 | — |
| 688 | Glucose-1-phosphatase | AGP_ECOLI | 75 | 6/11 | 18 | 1397 ± 469 | — |
| 690 | Glucose-1-phosphatase | AGP_ECOLI | 138 | 17/37 | 34 | 4007 ± 578 | — |
| 695 | Deferrochelatase/peroxidase EfeB | EFEB_ECOLI | 109 | 7/8 | 15 | 328 ± 76 | — |
| 752 | Glycerophosphoryl diester phosphodiesterase | GLPQ_ECOLI | 141 | 14/29 | 37 | 6232 ± 1129 | — |
| 757 | Glycerophosphoryl diester phosphodiesterase | GLPQ_ECOLI | 154 | 12/18 | 34 | 1471 ± 548 | — |
| 766 | Maltose-binding periplasmic protein | MALE_ECOLI | 229 | 23/54 | 56 | 17912 ± 3142 | — |
| 771 | Maltose-binding periplasmic protein | MALE_ECOLI | 149 | 11/18 | 36 | 6318 ± 1352 | — |
| 777 | Maltose-binding periplasmic protein | MALE_ECOLI | 62 | 4/5 | 13 | 1323 ± 908 | — |
| 778 | Maltose-binding periplasmic protein | MALE_ECOLI | 128 | 10/17 | 26 | 1742 ± 1093 | — |
| 779 | Maltose-binding periplasmic protein | MALE_ECOLI | 104 | 7/9 | 18 | 2209 ± 1168 | — |
| 806 | Iron uptake system component EfeO | EFEO_ECOLI | 199 | 13/16 | 35 | 6455 ± 730 | — |
| 895 | Maltose operon periplasmic protein | MALM_ECOLI | 133 | 10/15 | 28 | 17803 ± 3060 | — |
| 927 | Uncharacterized protein YggE | YGGE_ECOLI | 107 | 8/11 | 22 | 340 ± 20 | — |
| 969 | FKBP-type peptidyl-prolyl cis-trans isomerase FkpA | FKBA_ECOLI | 123 | 8/11 | 20 | 1849 ± 406 | — |
| 975 | FKBP-type peptidyl-prolyl cis-trans isomerase FkpA | FKBA_ECO57 | 154 | 10/15 | 44 | 2269 ± 488 | — |
| 985 | FKBP-type peptidyl-prolyl cis-trans isomerase FkpA | FKBA_ECOLI | 233 | 18/36 | 61 | 12068 ± 3760 | — |
| 988 | Probable L,D-transpeptidase YbiS | YBIS_ECOLI | 154 | 12/20 | 49 | 4323 ± 166 | — |
| 989 | FKBP-type peptidyl-prolyl cis-trans isomerase FkpA | FKBA_ECOLI | 199 | 7/8 | 21 | 5716 ± 801 | — |
| 992 | Glutamate/aspartate import solute-binding protein | GLTI_ECOLI | 100 | 6/7 | 21 | 424 ± 50 | — |
| 998 | Phospholipase A1 | PA1_ECOLI | 101 | 9/21 | 39 | 2198 ± 446 | — |
| 1017 | Histidine-binding periplasmic protein | HISJ_ECOLI | 286 | 24/48 | 86 | 4447 ± 1143 | — |
| 1067 | Nucleoside-specific channel-forming protein tsx | TSX_ECOLI | 101 | 10/30 | 31 | 6298 ± 3313 | — |
| 1091 | Putative ABC transporter arginine-binding protein 2 | ARTI_ECOLI | 292 | 22/39 | 70 | 4637 ± 144 | — |
| 1115 | ABC transporter arginine-binding protein 1 | ARTJ_ECOLI | 232 | 14/17 | 59 | 3102 ± 301 | — |
| 1125 | Metalloprotease LoiP | LOIP_ECOLI | 175 | 13/18 | 38 | 1530 ± 162 | — |
| 1136 | Glutamine-binding periplasmic protein | GLNH_ECOLI | 208 | 20/46 | 67 | 4330 ± 493 | — |
| 1144 | Lipoprotein NlpE | NLPE_ECOLI | 66 | 8/26 | 42 | 2099 ± 317 | — |
| 1153 | Probable phospholipid-binding lipoprotein MlaA | MLAA_ECOLI | 108 | 9/13 | 21 | 2138 ± 426 | — |
| 1250 | Uncharacterized lipoprotein YdcL | YDCL_ECOLI | 183 | 17/27 | 66 | 5619 ± 564 | — |
| 1275 | Protein YceI | YCEI_ECOLI | 148 | 8/11 | 48 | 1728 ± 458 | — |

TABLE 7-continued

MS identified protein spots detected in OMVs from E. coli ΔOmpA and not in OMVs from E. coli-OMV_MUT57

| | | | Mascot search results | | Mean %V ± SD × $10^{-4b}$ | |
|---|---|---|---|---|---|---|
| Spot N. | Protein description | UniProt name[a] | Score | N. of matched peptides | Sequence coverage (%) | BL21(DE3) ΔompA | E. coli OMV_MUT57 |
| 1307 | Outer membrane protein X | OMPX_ECOLI | 180 | 12/28 | 56 | 2560 ± 2232 | — |
| 1308 | Outer membrane protein X | OMPX_ECOLI | 151 | 11/33 | 54 | 8131 ± 1583 | — |
| 1378 | Outer membrane protein slp | SLP_ECOLI | 85 | 7/17 | 45 | 574 ± 79 | — |
| 1408 | Ecotin | ECOT_ECOLI | 156 | 13/26 | 45 | 3757 ± 118 | — |
| 1412 | Osmotically-inducible putative lipoprotein OsmE | OSME_ECOLI | 67 | 5/11 | 37 | 6520 ± 970 | — |
| 1417 | Outer membrane protein X | OMPX_ECOLI | 186 | 12/25 | 54 | 13979 ± 5761 | — |
| 1483 | Protein YgiW | YGIW_ECOLI | 87 | 6/18 | 49 | 4883 ± 414 | — |
| 1591 | Lipoprotein bor, partial | WP_033556683.1 | 108 | 5/9 | 92 | 8198 ± 1436 | — |
| 2007 | Long-chain fatty acid transport protein | FADL_ECOLI | 130 | 13/35 | 32 | 4436 ± 895 | — |
| 2010 | Glycine betaine/prolinebetaine-binding periplasmic protein | PROX_ECOLI | 124 | 10/23 | 43 | 4210 ± 484 | — |

[a]UniProt entry name.
[b]Each value represents the mean ± SD of individually computed %V in spot maps from OMVs of BL21(DE3)ΔompA and from OMVs of E. coli OMV_MUT57.

Heterologous Antigens Efficiently Accumulate in the OMVs Deprived of Endogenous Proteins As already pointed out one important property of OMVs it that they can be manipulated in their protein content by genetic engineering. This feature was demonstrated for the first time by Kesty and Kuehn (N. C. Kesty and Kuhen M. J. (2004) J. Biol. Chem. 279, 2069-2076) and subsequently an increasing number of heterologous proteins have been successfully delivered to OMVs using a variety of strategies. For instance, heterologous antigens from Group A Streptococcus and Group B Streptococcus were delivered to the lumen of E. coli vesicles by fusing their coding sequences to the leader peptide of E. coli OmpA. (Fantappiè et al., (2014) Journal of Extracellular Vesicles, 3, 24015). More recently, we have shown that heterologous antigens can be delivered to the vesicular compartment by expressing them as lipoproteins in the OMV-producing strain (WO2015/144691, WO2006/024954, Fantappie' et. al (2017) Mol. Cell. Proteomics 16:1348-1364). Interestingly, lipoproteins can also serve as chaperones to deliver foreign polypeptides to the OMVs compartment, thus allowing the decoration of vesicles with a variety of polypeptides and their exploitation in different biotechnological applications, including vaccines and immunotherapy.

Figure 6:
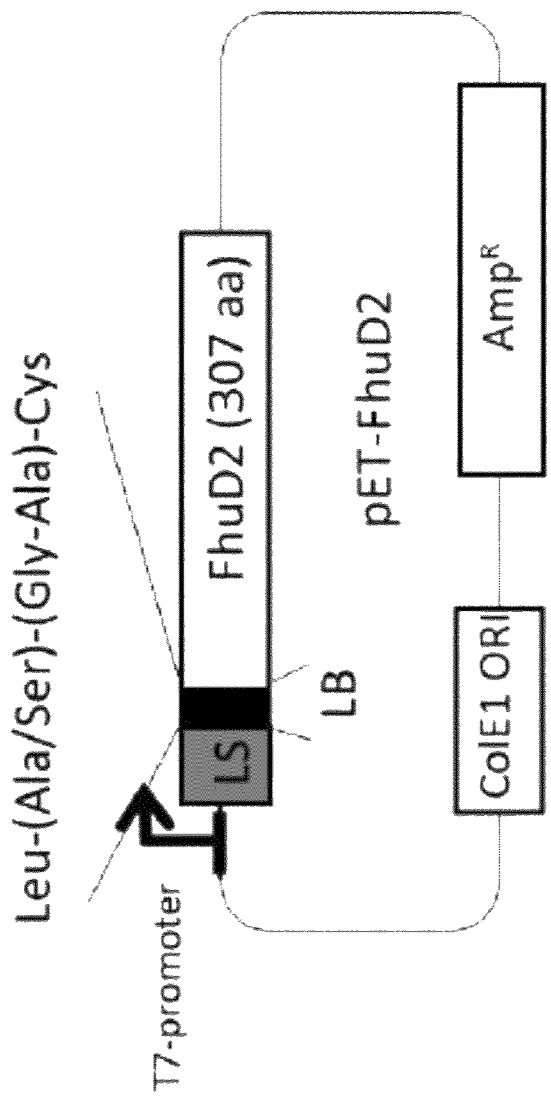
Figure 7:
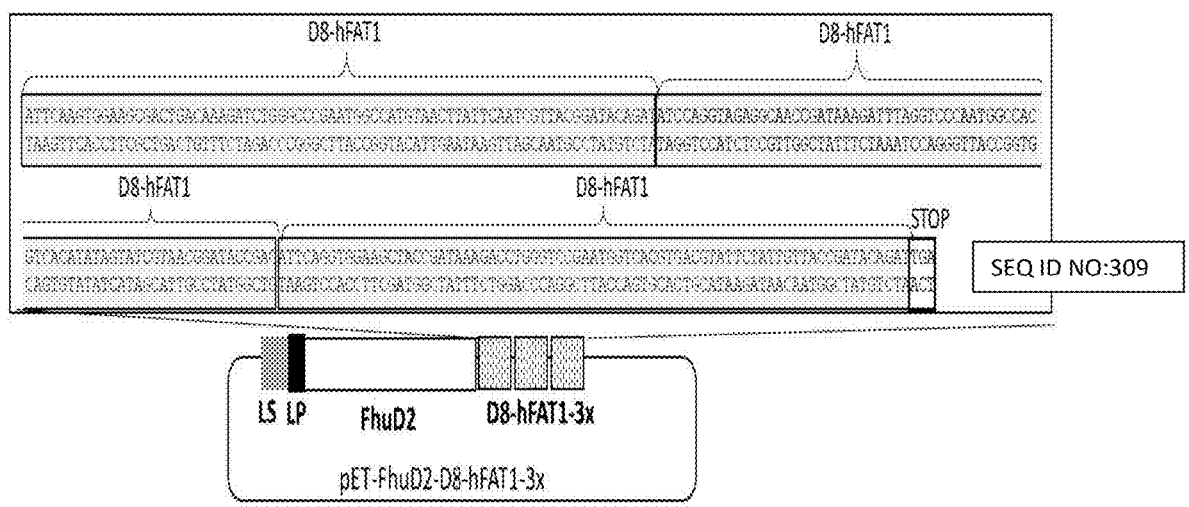
Figure 8:
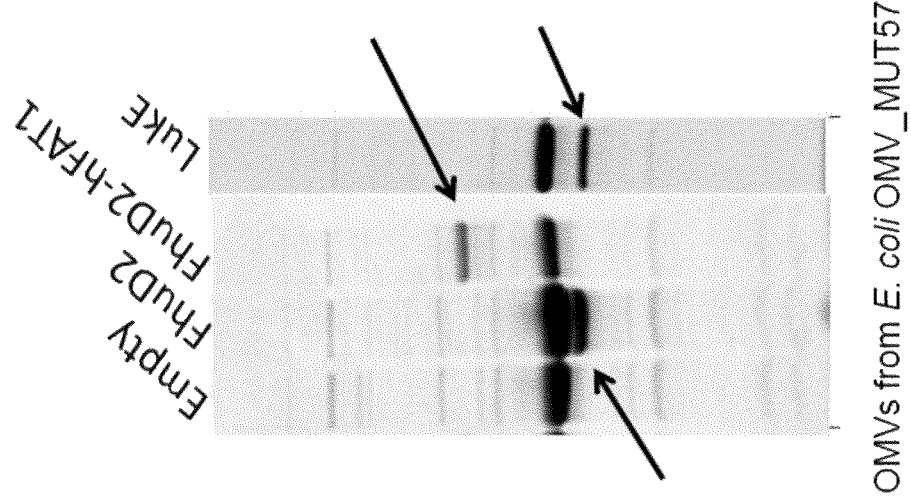

Therefore, it is important to demonstrate that the elimination of endogenous proteins has not affected the capacity of OMVs to be decorated with foreign antigens. To this aim three heterologous proteins, S. aureus LukE, FhuD2 and FhuD2-hFAT1 (WO2006/024954) were selected and their expression profile was analyzed in E. coli OMV_MUT57, the strain that carries all 58 gene inactivations. LukE is a S. aureus (Alonzo et al., (2013) PLOS Pathog.; 9: e1003143; Reyes-Robles et al., (2013) Cell Host Microbe. October 16; 14(4): 453-9, Alonzo & Torres, (2014) Microbiol Mol Biol Rev. 2014 June; 78(2): 199-230), FhuD2 is a S. aureus antigen used vaccine studies (Bagnoli F. et al. (2015) Proc Natl Acad Sci USA 112:3680-5). FhuD2-FAT1 is a fusion constituted by FhuD2 and an immunogenic epitope of FAT1 protein found overexpressed in most colon cancers (Pileri et al. (2016) Br J Cancer 115:40-51). The construction of the plasmids pET_LukE, pET-FhuD2 and pET-FhuD2-D8-hFAT1-x3, encoding the LukE, FhuD2 and FhuD2-FAT1 fusion, respectively have been already described (WO2006/024954). The maps of the three plasmids is schematically reported in FIG. 5, FIG. 6 and FIG. 7. The three plasmids were used to transform E. coli OMV_MUT57, yielding strains OMV_MUT57 (pET-LukE), OMV_MUT57 (pET-fhUD2), OMV_MUT57 (pET-fhUD2 hFAT1-3x). Proteins expression, OMV purification and analysis were carried out as described in previous sections. As shown in FIG. 8, all three heterologous proteins accumulated in the OMV compartment of E. coli OMV_MUT57 with extremely high efficiency.

Figure 9:
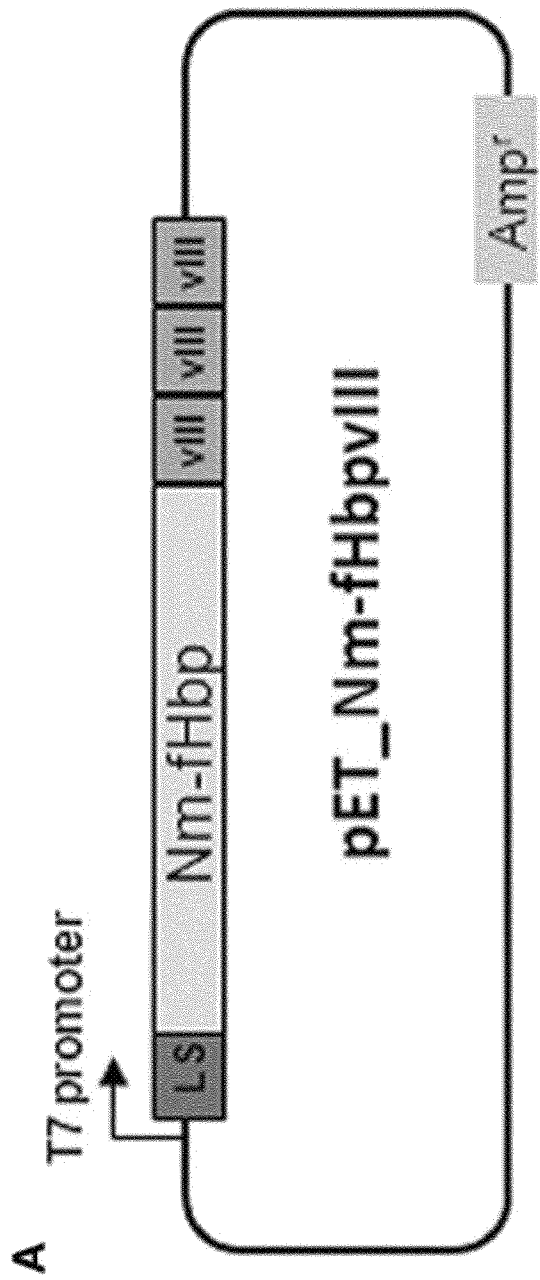
Figure 10:
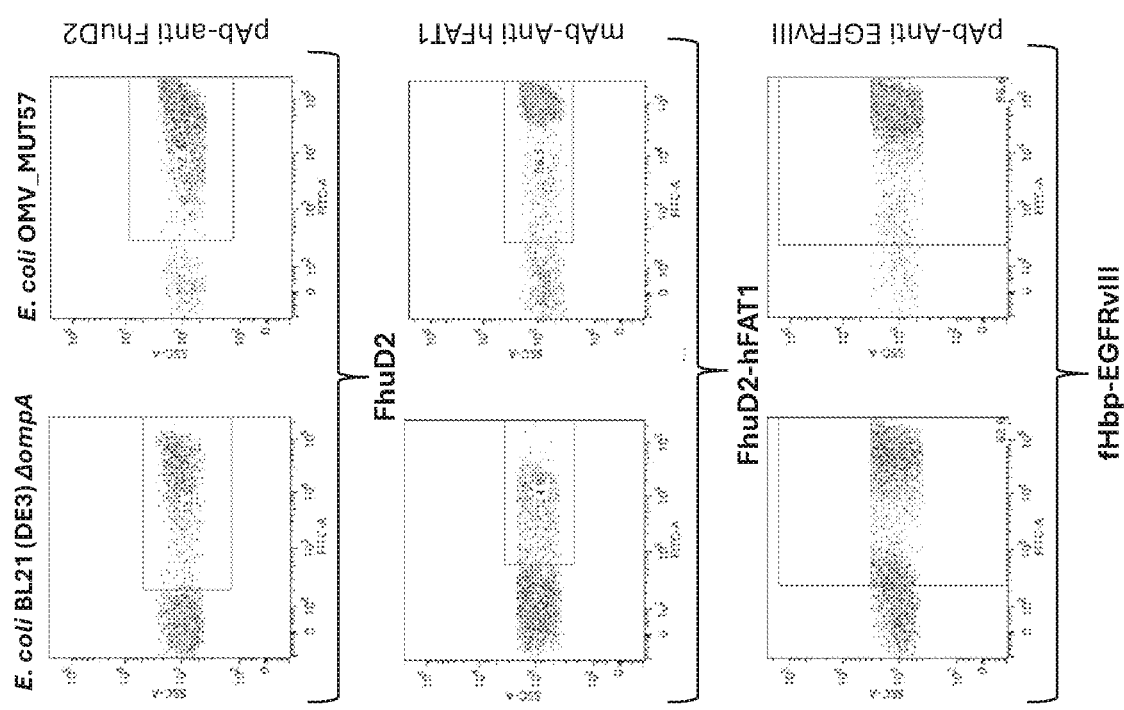

Heterologous Antigens Expressed as Lipoproteins in E. coli OMV_MUT57 Accumulate on the Surface of OMVs with High Efficiency We have recently found that a number of heterologous proteins expressed in E. coli BL21(DE3)ΔompA as fusions to a lipoprotein leader sequence are lipidated and reach the outer membrane. More surprisingly, we discovered that some of these lipidated heterologous proteins not only reach the outer membrane but are also exposed on the surface of the cells and of OMVs. This is for example the case of fHbp from Neisseria meningitidis and of fHbp carrying passenger polypeptides fused at its C-terminus (Fantappie' et. al (2017) Mol. Cell. Proteomics 16:1348-1364; Grandi A. et al. (2017) Frontiers in Oncology, 7:253. doi: 10.3389/fonc.2017.00253). Also, fhuD2 from S. aureus and of FhuD2 carrying passenger polypeptides fused to its C-terminus were also transported to the surface of E. coli BL21 (DE3)ΔompA (WO2006/024954). We tested whether the gene inactivations had somehow influenced the surface localization of lipidated heterologous proteins. To this aim the surface localization of three heterologous lipoproteins, FhuD2 and FhuD2-D8-hFAT1 described in the previous section, and fHbp-vIII was analyzed in E. coli OMV_MUT57. fHbp-vIII is a fusion protein constituted by the neisserial fHbp and the vIII variant peptide from EGFR receptor expressed in several tumors. The construction of fHbpvIII fusion has been described (Grandi A. et al. (2017) Frontiers in Oncology, 7:253. doi: 10.3389/fonc.2017.00253) and the map of the plasmid encoding the fusion is schematically reported in FIG. 9. The three plasmids encoding lipidated FhuD2, FhuD2-hFAT1 and fHbp-vIII were used to transform E. coli OMV_MUT57 and E. coli BL21(DE3)ΔompA and single colonies of each transformation were used to inoculate 20 ml of LB cultures. The cultures were grown until the $OD_{600}$=0.5 ($2.5 \times 10^8$ CFU/mL) and expression of the proteins was induced by addition of 0.1 mM IPTG and further incubation for 2 hours. Cells from 1 ml of each culture were harvested by centrifugation at 10,000×g for 5 minutes at 4° C. and resuspended in PBS+1% BSA dilution buffer in order to obtain 2×10$^7$ CFU/ml cells. 50 µl were then dispensed in a round bottom 96 well plate. Primary antibodies against proteins of interest (EGFRvIII peptide, FhuD2 and D8-hFAT1) were diluted at 10 µg/ml and 5 µl of each dilution were added in the wells containing bacteria suspension and incubated 1 h on ice. Each well was then washed twice with 200 µl PBS+1% BSA buffer. 20 µl of commercial FITC labeled secondary antibody diluted 1:200 in dilution buffer were added in each wells and incubated 1 h on ice. Each well was then washed twice with 200 µl PBS+1% BSA buffer and the plate was centrifuged at 4,000×g for 5 min. Samples were then resuspended in 2% formaldehyde solution, incubated 15 min at 4° C. and then centrifuged at 4,000×g for 5 min. Samples were resuspended in 130 µl of PBS and data were acquired by using BD FACS Canto II. As shown in FIG. 10, All three proteins were confirmed to be surface exposed in a fraction of *E. coli* BL21(DE3)ΔompA cells expressing the three antigens. Interestingly, the three proteins were also surface exposed in *E. coli* OMV_MUT57 but to a much higher level, as judged by the fact that almost all cells became positive to the antibody staining. This is a particularly useful property of *E. coli* OMV_MUT57 since many biotechnological applications, including vaccines, require the surface expression of heterologous proteins.

Properties of OMVs$_{Δ58}$ and of its Derivative OMVs$_{Δ60}$

Figure 11:
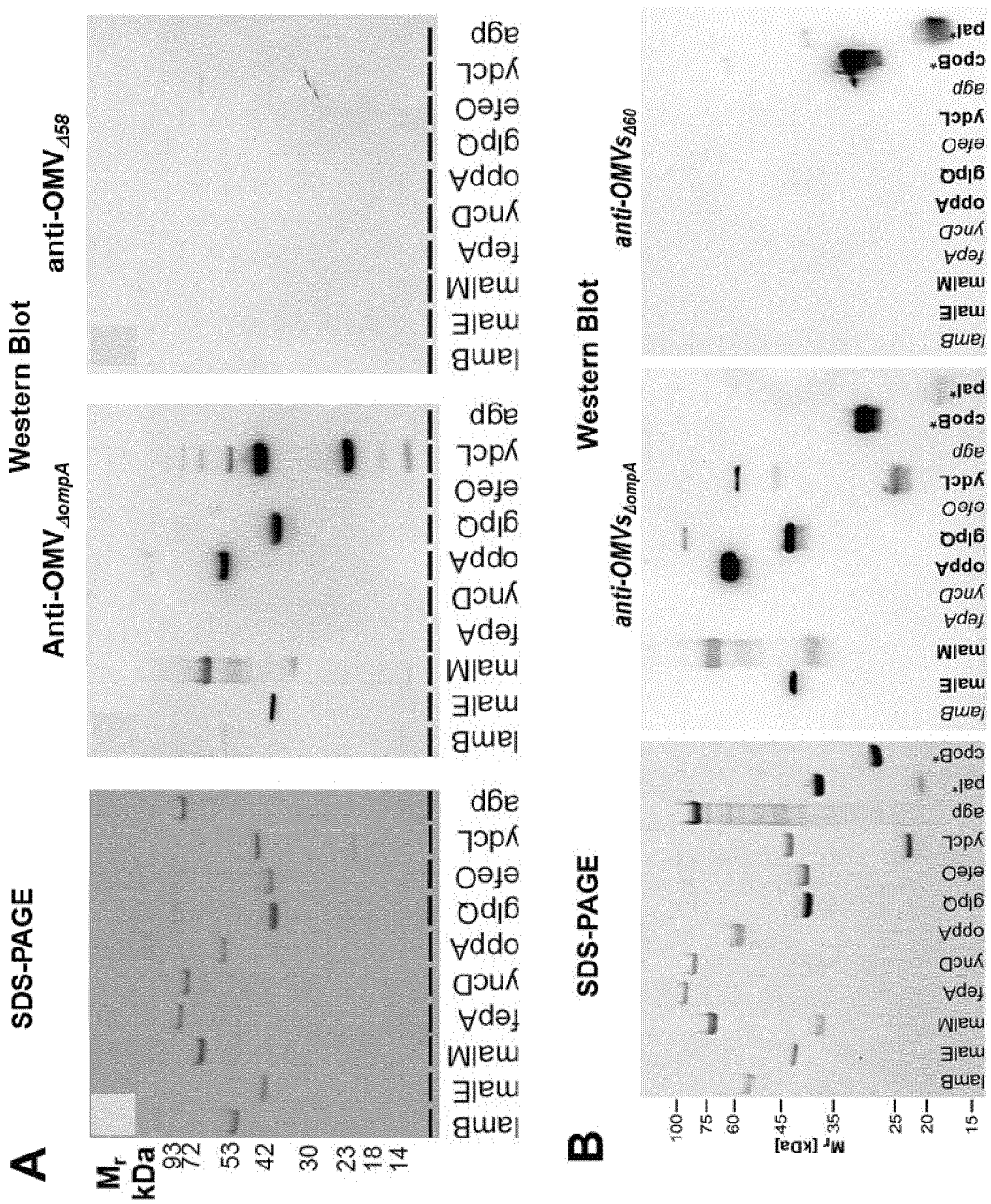

OMVs$_{ΔompA}$ carry more than hundred endogenous proteins visible in the 2-DE map. Several of these proteins have been deleted in OMVs$_{Δ58}$ with the aim to reduce the immune responses toward the OMV endogenous proteins, thus avoiding dilution and/or interference of the immune responses toward the recombinant antigens/epitopes expressed in OMVs. To test this, ten of the proteins deleted in *E. coli* BL21(DE3)Δ58 and visible in the OMVs$_{ΔompA}$ 2-DE map, were selected and expressed in, and purified from *E. coli* BL21(DE3). Purified proteins were separated by SDS-PAGE and analysed by Western Blot using sera from mice immunized with either OMVs$_{Δ58}$ or OMVs$_{ΔompA}$. As shown in FIG. 11A, five out of the ten proteins were recognized by the sera from OMV$_{ΔompA}$-immunized mice while none of the proteins were positive to sera from animals immunized with OMVs$_{Δ58}$.

We also repeated this experiment, using OMVs from a derivative of *E. coli* BL21(DE3)Δ58, named *E. coli* (BL21 (DE3)Δ60, in which two additional genes, msbB and pagP, were inactivated. These genes are involved in the biosynthesis of lipopolysaccharide (LPS) and their inactivation results in the production of a LPS carrying a pentaacylated Lipid A, which is less reactogenic with respect to wt LPS (Irene et al., (2020) PNAS 116:21780). OMVs (OMVs$_{Δ60}$) were purified from the new derivative named *E. coli* BL21 (DE3)Δ60 and used to immunize mice. Mouse sera was used in Western Blot experiments as described above. As a control, two proteins not deleted in *E. coli* BL21(DE3)Δ60, but visible the 2-DE map (the products of cpoB and pal genes), were also purified and analyzed in Western Blot. Again, five out of the ten proteins were recognized by the sera from OMV$_{ΔompA}$-immunized mice while none of the proteins were positive to sera from animals immunized with OMVs$_{Δ60}$. On the other hand, both control proteins were recognized by both anti-OMVs$_{Δ60}$ and anti-OMVs$_{ΔompA}$ sera (FIG. 11B).

Engineering of OMVs$_{Δ60}$ with Heterologous Proteins

Figure 5:
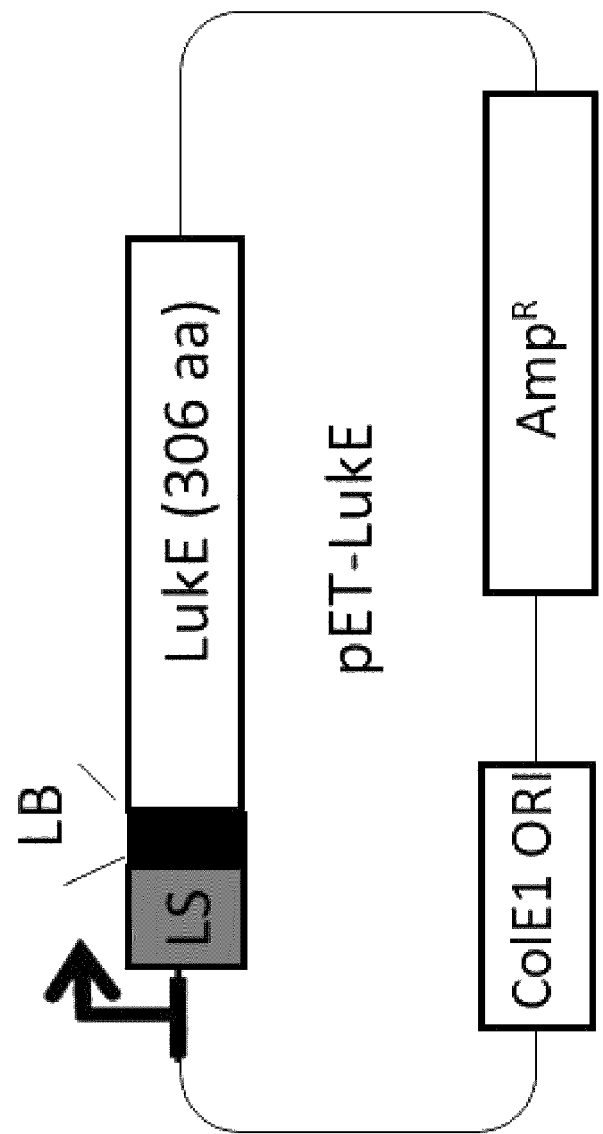
Figure 12:
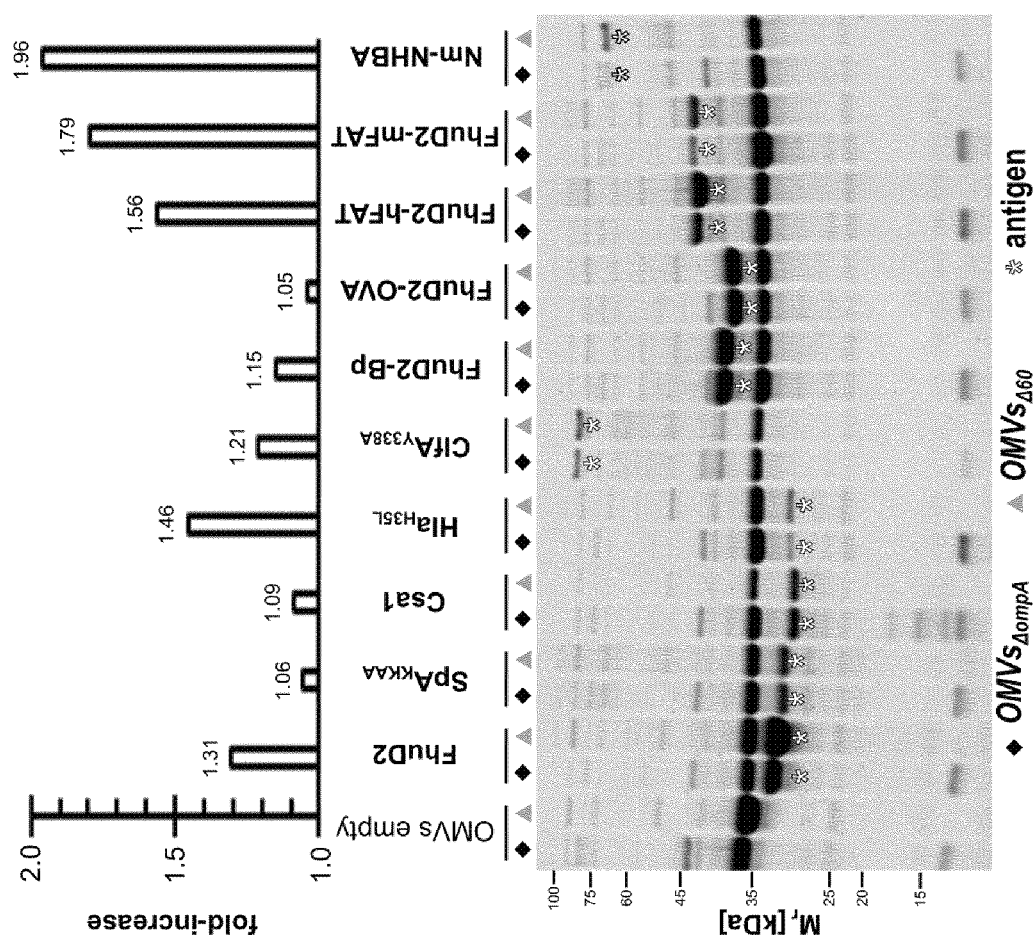

We next addressed the question as to whether the removal of the OMV endogenous proteins could have positively or negatively affected the loading capacity of OMVs. Several strategies are available for OMV engineering with foreign antigens and epitopes. One of our preferred approaches is to express them as membrane-associated lipoproteins (Fantappiè et al., 2017; Irene et al., 2019), by fusing their coding sequences either directly to a lipoprotein leader sequence (in the case of full-length proteins/protein domains) or to the end of an OMV-associated lipoprotein (Grandi et al., 2017; 2018). Therefore, we selected ten heterologous proteins and epitopes, we expressed them as lipidated antigens in both *E. coli* BL21(DE3)ΔompA and in *E. coli* BL21(DE3)Δ60 and we purified the vesicles from each recombinant strain. Purified vesicles were analyzed by SDS-PAGE and the amount of recombinant protein in each vesicle preparation was determined by densitometry analysis (FIG. 5). From these results, two main conclusions can be drawn. First, and in line with previously reported data (Irene et al., 2019), heterologous proteins efficiently compartmentalized in OMVs, where they could account for as much as 20-30% of total OMVs proteins. Second, the loading capacity of heterologous proteins was higher in OMVs$_{Δ60}$ than OMVs$_{ΔompA}$, with an increase ranging from 5% to 96% (FIG. 12).

OMVs$_{Δ60}$ as Vaccine Platform

We finally asked the question as to whether OMVs$_{Δ60}$ decorated with different heterologous antigens/epitopes could elicit antigen/epitope-specific immune responses.

Figure 13:
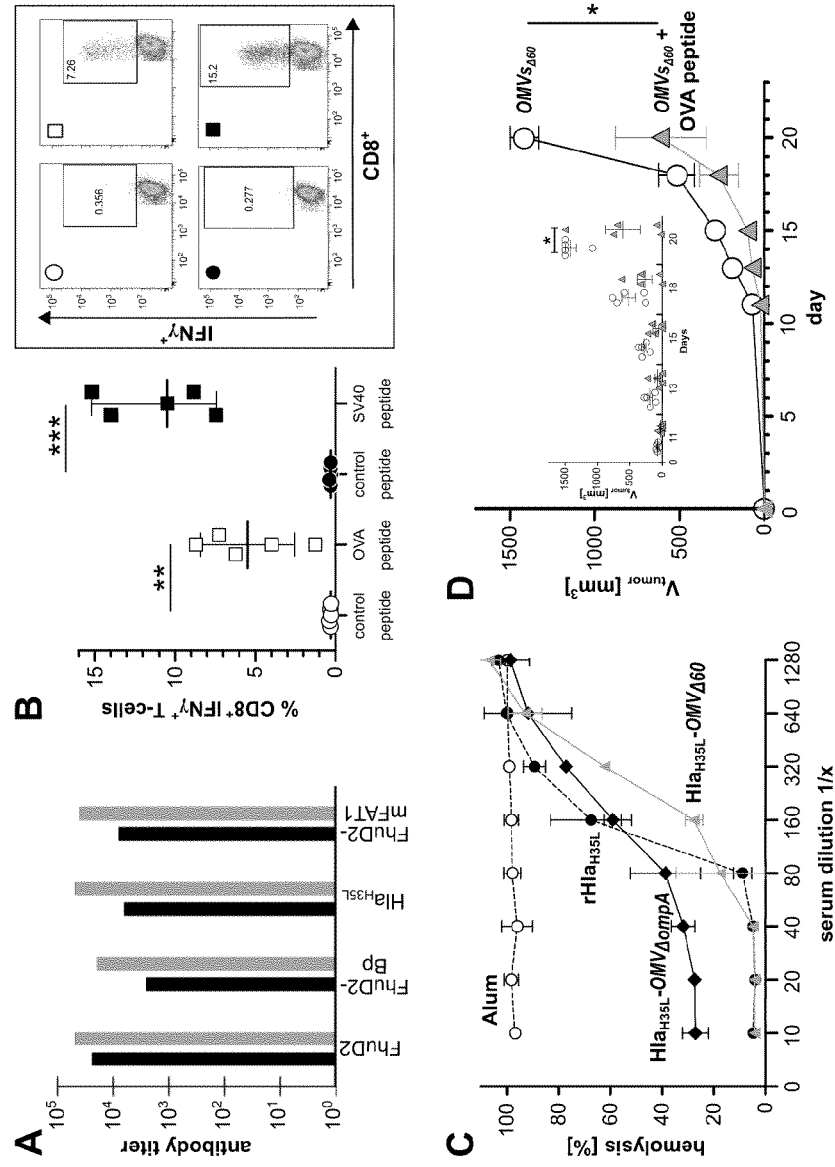

First, we selected four engineered OMVs$_{Δ60}$ decorated with lipidated FhuD2, Hla$_{H35L}$, FhuD2-mFAT1 fusion and FhuD2-Bp fusion and we used them to immunize groups of BALB/c mice. After immunization (three doses (2 µg/dose) given two weeks apart), sera from animals of each group were collected, pooled together and antigen-specific antibody titers were measured by ELISA. As shown in FIG. 13A, high IgG titers were induced against all engineered antigens and in the case of the OMVs$_{Δ60}$ decorated with Hla$_{H35L}$, FhuD2-mFAT1 and FhuD2-Bp the titers were approximately five to ten-fold higher than what obtained with animals immunized with engineered OMVs deriving from the progenitor *E. coli* BL21(DE3)ΔompA strain. In the case of Hla$_{H35L}$, we also determined the inhibition of Hla hemolytic activity of sera from mice immunized with engineered OMVs. When rabbit erythrocytes were incubated with purified Hla$_{H35L}$ in the presence of different dilutions of sera from mice immunized with Hla$_{H35L}$-OMVs$_{Δ60}$, hemolysis was inhibited in a dose dependent manner, with 50% inhibition observed at a 1:300 dilution while the sera from mice immunized with Hla$_{H35L}$-OMVs$_{ΔompA}$ inhibited hemolysis at a three-fold lower dilution (FIG. 13C). Moreover, the anti-Hla$_{H35L}$-OMVs$_{ΔompA}$ sera were not able to completely inhibit the Hla hemolytic activity even at the lowest dilution (1:10). Such result seems to suggest that the sera from mice immunized with Hla$_{H35L}$-OMVs$_{Δ60}$ and Hla$_{H35L}$-OMVs$_{ΔompA}$ differ not only in quantitative but also in qualitative terms.

We also tested the capacity of OMVs$_{Δ60}$ to induce cytotoxic CD8$^+$ T cell responses. To this aim, 2 µg of synthetic peptides corresponding to either OVA or SV40 epitopes were absorbed to 10 µg of OMVs$_{Δ60}$ and used to immunize C57BL/6 mice. Animals were given two doses, one week apart, and five days after the second immunization splenocytes were stimulated with the corresponding peptide and the frequency of IFNγ-producing CD8$^+$ T cells was determined by flow cytometry. As shown in FIG. 6B, both immunizations elicited high levels of epitope-specific T cells.

Finally, to establish the effector function of OVA-specific CD8+ T cells, C57BL/6 mice were challenged with a s.c. injection of 2×10⁵ OVA-B16F10 cells and subsequently animals were vaccinated with either "empty" OMVs$_{\Delta 60}$ or OVA peptide+OMVs$_{\Delta 60}$. As shown in FIG. 13D, tumor growth was substantially reduced in OVA-OMVs$_{\Delta 60}$ immunized mice.

In Situ Vaccination with OMVs Inhibits Tumor Growth

In situ vaccination is an effective strategy applied for the first time by Dr Coley at the end of the nintheen century (Coley's toxin) and currently in use for bladder cancer patients with BGC. The main principle is to inject adjuvants directly into the tumour and tumour microenvironment, thus stimulating an immune response at the tumour site. The rationale is that tumour-specific antigens at the tumor site are phagocytosed by the dendritic cells, which in the presence of the adjuvant promote anti-tumour T and B cell response (Sagiv-Barfi L. et al., (2018) Sci. Transl. Med. 10: eaan4488).

Considering the potent adjuvanticity of OMVs, we tested their effectiveness in in situ immunization using the syngeneic mouse model, BALB/c with CT-26 colon carcinoma cells (Grandi A. et al. (2018) Frontiers in Oncology 8, article 481). CT26 cells were injected subcutaneously at sites on both the right and left flank of the mice. When tumour size reached 50-100 mm³ mice were vaccinated in situ in just one of the tumours. Mice were given a total of 3 vaccinations every 2 days, into the same tumour. There were three treatment groups: PBS control, OMVs$_{\Delta 60}$ (the OMVs from E. coli BL21(DE3)Δ60), and OMVs$_{\Delta 60}$+100 μg (20 μg each) of five synthetic peptides (pentatope) corresponding to 5 immunogenic neoepitopes identified in CT26 cell line (Kreiter S. et al. (2015) Nature, 520, 692-696). The amino acid sequences of the peptides were as follows:

M03:
(SEQ ID NO: 304)
DKPLRRNNSYTSYIMAICGMPLDSFRA

M20:
(SEQ ID NO: 305)
PLLPFYPPDEALEIGLELNSSALPPTE;

M26:
(SEQ ID NO: 306)
VILPQAPSGPSYATYLQPAQAQMLT PP;

M27:
(SEQ ID NO: 307)
EHIHRAGGLFVADAIQVGFGRIGKHFW, and

M68:
(SEQ ID NO: 308)
VTSIPSVSNALNWKEFSFIQSTLGYVA (Grandi A. et al.

Figure 14:
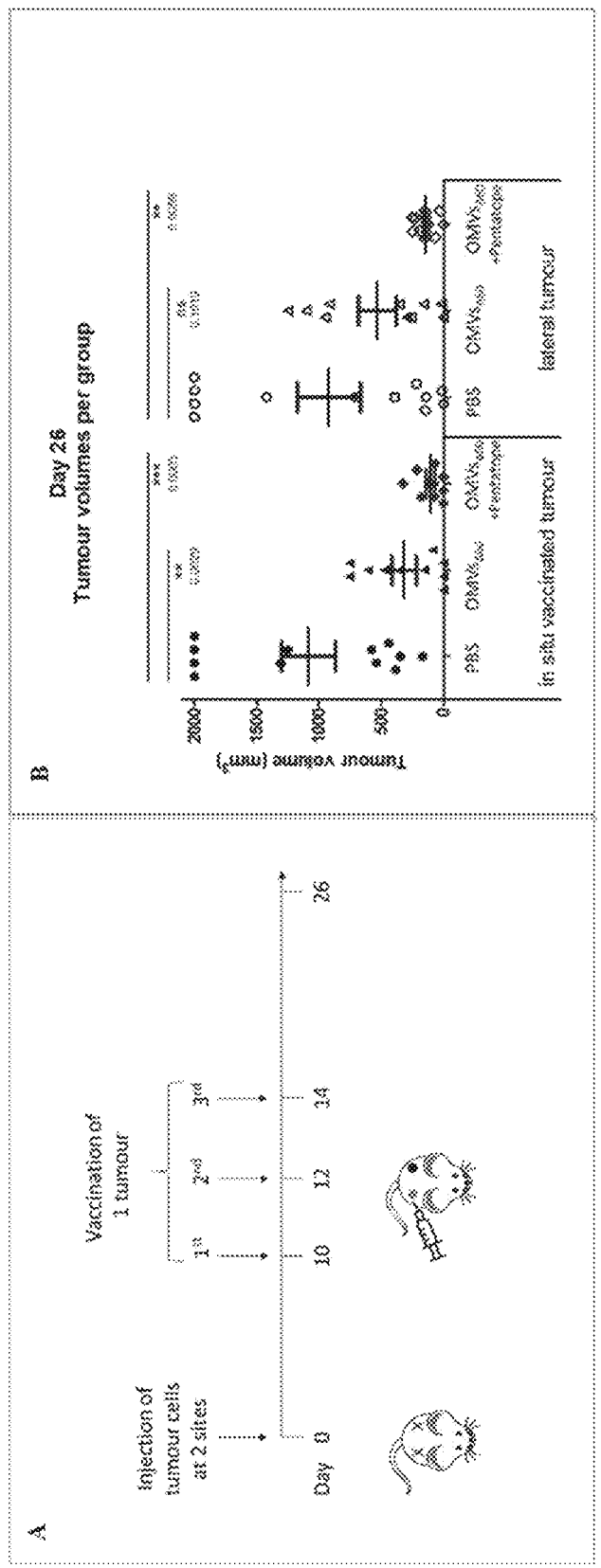

(Grandi A. et al. (2018) Frontiers in Oncology 8, article 481). Mice were sacrificed when the tumour volume of one tumour reached ≥2000 mm³, or the sum of tumour volume reached 3000 mm³. In the PBS control group, after vaccination, both the in situ vaccinated tumour and the lateral tumour continued to grow as expected (FIG. 14). In all OMV treated groups, the growth of in situ vaccinated tumours was significantly inhibited compared to PBS control, but inhibition was particularly pronounced in mice receiving OMVsΔ60+pentatope. As far as the distal tumors are concerned, g OMVsΔ60+pentatope treatment was also particularly effective.

These results (FIG. 14) indicate that 1) OMVs are highly effective in blocking tumor growth when directly injected at the tumor site, and 2) when OMVs are formulated with cancer-specific neoepitopes, the suppression of tumor growth also occurred at distal (metastatic) sites.

The invention claimed is:

1. A method for preparing isolated bacterial outer membrane vesicles (OMVs) expressing heterologous proteins, which comprises:
   (i) culturing a gram-negative bacterium in conditions suitable for vesiculation, wherein said bacterium is *E. coli* and wherein said bacterium:
      (a) carries gene-inactivating mutations at the ompA gene and at least 5 of the following genes which encode proteins naturally present in the OVMs of *E. coli:*
   ybis, ais, eco, glpQ, mltA, proX, ydcL, glnH, efeO, bglX, agp, ygdI, yncD, slp, artI, yiaD, ompX, borD, yhiJ, emtA, fecA, nmpC, fhuA, hisJ, lamB, malE, malM, ygiW, cirA, fepA, loiP, yjeI, ecnB, rcsF, phoE, oppA, fkpA, ybaY, tsx, yggE, osmE, ygdR, yceI, bhsA, nlpE, pldA, yghJ, ydeN, ushA, mdoD, treA, bcsC, ftsP, ptrA, fadL, artJ, mlaA;
      (b) expresses heterologous proteins in the OMVs
   (ii) separating the OMVs from the bacterial culture, and optionally
   (iii) purifying the OMVs.

2. The method of claim 1, wherein the bacterium carries gene-inactivating mutations at the ompA gene and at least 5 of the following genes: amB, malE, ompX, fkpA, malM, fepA, yncD, borD, oppA, glpQ, osmE, ycdO, tsx, ydcL, agp, cirA, fecA, ygiW, artI and hisJ.

3. The method of claim 1, wherein the bacterium carries additional gene-inactivating mutations at the msbB and pagP genes.

4. The method of claim 1, wherein the bacterium does not carry gene-inactivating mutations at the following genes: mdoG, yncE, ompN, Ipp, gltI, kpsD, degP, mipA, surA, bamC, nlpD, rlpA, pal, potD, ppiA, bamE, skp, yhcN, cpoB, yfeY, ydgH, yajG, yifL, IpoA, prc, slyB, IpoB, yfhG, dsbC, degQ, yraP, bamB, mlaC.

5. The method of claim 1, wherein the gene-inactivating mutations are selected from: point mutations which create a stop codon in the reading frame; deletions of one or multiple nucleotides which impair protein functions; complete deletion of the gene; inactivation of the transcription and translation signals.

6. The method of claim 1, wherein the heterologous proteins are localized in the lumen of OMVs or associated to the OMV membrane.

7. The method of claim 6, wherein said heterologous proteins are bacterial, viral, parasitic or cancer proteins.

8. The method of claim 1, wherein the OMVs are separated from the culture medium by filtration.

9. The method of claim 1, wherein the OMVs are purified by centrifugation or ultrafiltration.

10. An isolated outer membrane vesicle (OMV) obtainable by the method of claim 1.

11. The method of claim 2, wherein the bacterium carries gene-inactivating mutations at the ompA gene and at least 10 of the following genes: amB, malE, ompX, fkpA, malM, fepA, yncD, borD, oppA, glpQ, osmE, ycdO, tsx, ydcL, agp, cirA, fecA, ygiW, art and hisJ.

12. The method of claim 2, wherein the bacterium carries gene-inactivating mutations at the ompA gene and all of the following genes: amB, malE, ompX, fkpA, malM, fepA, yncD, borD, oppA, glpQ, osmE, ycdO, tsx, ydcL, agp, cirA, fecA, ygiW, artI and hisJ.

* * * * *